(12) United States Patent
Davis et al.

(10) Patent No.: US 6,310,615 B1
(45) Date of Patent: Oct. 30, 2001

(54) DUAL MODE ERASER

(75) Inventors: Richard C. Davis, Cambridge; Yonald Chery; Andrew Kelley, III, both of Somerville; William P. Moyne; Matthew D. Verminski, both of Cambridge, all of MA (US)

(73) Assignee: Virtual Ink Corporation, Boston, MA (US)

( * ) Notice: Subject to any disclaimer, the term of this patent is extended or adjusted under 35 U.S.C. 154(b) by 0 days.

(21) Appl. No.: 09/667,195

(22) Filed: Sep. 21, 2000

Related U.S. Application Data

(63) Continuation of application No. 09/589,534, filed on Jun. 7, 2000, and a continuation-in-part of application No. 09/273,887, filed on Mar. 22, 1999, now Pat. No. 6,191,778, and a continuation-in-part of application No. 09/079,430, filed on May 14, 1998, now Pat. No. 6,104,387.
(60) Provisional application No. 60/109,361, filed on Nov. 20, 1998, and provisional application No. 60/090,744, filed on Jun. 26, 1998.

(51) Int. Cl.[7] .................................................... G09G 5/00
(52) U.S. Cl. ......................... 345/173; 345/175; 345/177; 178/18.01; 178/18.04
(58) Field of Search .................................... 345/173–183, 345/104; 178/18.01–18.11, 19.01–19.07

(56) References Cited

U.S. PATENT DOCUMENTS

| Re. 33,936 | 5/1992 | Miyamori et al. ..................... 178/18 |
|---|---|---|
| 3,611,430 | 10/1971 | Watchorn et al. ..................... 346/140 |
| 3,613,066 | 10/1971 | Cooreman ............................. 340/347 |
| 3,626,438 | 12/1971 | Cornell ................................... 52/183 |
| 3,706,850 | 12/1972 | Fisher et al. ............................ 178/18 |
| 3,731,273 | 5/1973 | Hunt ....................................... 340/16 |

(List continued on next page.)

FOREIGN PATENT DOCUMENTS

| 0 169 538 A2 | 1/1986 | (EP) | ............................ G06K/11/06 |
|---|---|---|---|
| 0 284 048 A2 | 9/1988 | (EP) | ............................ G06K/11/06 |
| 0 623 872 A1 | 11/1994 | (EP) | ............................ G06F/3/033 |
| 0 772 149 A1 | 5/1997 | (EP) | ............................ G06K/11/18 |
| 2 042 726 | 9/1980 | (GB) | ............................... G01S/5/18 |
| 2 097 922 | 11/1982 | (GB) | ............................... G01S/5/18 |

(List continued on next page.)

OTHER PUBLICATIONS

Chery, Y. et al., "Detector for Use in a Transcription System", U.S. application No. 09/273,883, filed Mar. 22, 1999. (707).

Chery, Y. et al., "Method for Calibrating a Transcription System", U.S. application No. 09/274,139, filed Mar. 22, 1999. (708).

Chery, Y. et al., "Stylus for Use With Transcription System", U.S. application No. 09/274,136, filed Mar. 22, 1999. (709).

Chery, Y. et al., "Collapsible Detector Assembly", U.S. application No. 09/274,267, filed Mar. 22, 1999. (710).

(List continued on next page.)

*Primary Examiner*—Lun-Yi Lao

(57) ABSTRACT

A method and apparatus for transcribing composite images. In one embodiment, a method comprises projecting a first image onto a surface, wherein a first coordinate system defines positions within the first image and a second coordinate system defines positions on the surface. The method further comprises forming a second image on the surface by using a stylus, and recording the formation of the second image relative to the first image by periodically detecting the position of the stylus relative to the second coordinate system by receiving and processing signals transmitted from the stylus. The method also comprises translating the position of the stylus relative to the second coordinate system to a position relative to the first coordinate system, and storing the composite image comprising the first image and the second image as machine-readable data.

10 Claims, 75 Drawing Sheets

U.S. PATENT DOCUMENTS

| | | | |
|---|---|---|---|
| 3,838,212 | 9/1974 | Whetstone et al. | 179/18 |
| 3,917,955 | 11/1975 | Inuiya | 250/549 |
| 3,979,712 | 9/1976 | Ettenhofer et al. | 340/6 R |
| 4,012,588 | 3/1977 | Davis et al. | 178/18 |
| 4,124,838 | 11/1978 | Kiss | 340/1 R |
| 4,246,439 | 1/1981 | Romein | 178/18 |
| 4,263,592 | 4/1981 | Takahashi et al. | 340/707 |
| 4,294,543 | 10/1981 | Apple et al. | 356/375 |
| 4,317,005 | 2/1982 | de Bruyne | 178/19 |
| 4,318,096 | 3/1982 | Thornburg et al. | 340/706 |
| 4,357,672 | 11/1982 | Howells et al. | 364/561 |
| 4,488,000 | 12/1984 | Glenn | 178/18 |
| 4,506,354 | 3/1985 | Hansen | 367/101 |
| 4,550,438 | 10/1985 | Convis et al. | 382/56 |
| 4,558,313 | 12/1985 | Garwin et al. | 340/709 |
| 4,568,928 | 2/1986 | Biferno | 340/716 |
| 4,577,057 | 3/1986 | Blesser | 178/18 |
| 4,578,674 | 3/1986 | Baker et al. | 340/710 |
| 4,578,768 | 3/1986 | Racine | 364/560 |
| 4,633,436 | 12/1986 | Flurry | 364/900 |
| 4,654,648 | 3/1987 | Herrington et al. | 340/710 |
| 4,670,751 | 6/1987 | Enokido et al. | 340/706 |
| 4,688,933 | 8/1987 | Lapeyre | 356/1 |
| 4,712,937 | 12/1987 | Schmidt et al. | 401/213 |
| 4,758,691 | 7/1988 | de Bruyne | 178/19 |
| 4,777,329 | 10/1988 | Mallicoat | 178/18 |
| 4,800,240 | 1/1989 | Bechet | 178/18 |
| 4,814,552 | 3/1989 | Stefik et al. | 178/18 |
| 4,817,034 | 3/1989 | Hardin, Sr. et al. | 364/900 |
| 4,832,144 | 5/1989 | Murakami et al. | 178/18 |
| 4,862,152 | 8/1989 | Milner | 340/712 |
| 4,891,474 | 1/1990 | Kelly | 178/18 |
| 4,956,824 | 9/1990 | Sindeband et al. | 367/129 |
| 4,965,635 | 10/1990 | Rushefsky | 355/218 |
| 4,991,148 | 2/1991 | Gilchrist | 367/124 |
| 5,007,085 | 4/1991 | Greanias et al. | 380/25 |
| 5,009,277 | 4/1991 | Sindeband et al. | 178/18 |
| 5,023,408 | 6/1991 | Murakami et al. | 178/19 |
| 5,043,950 | 8/1991 | Schorum et al. | 367/98 |
| 5,046,053 | 9/1991 | Gilchrist | 367/98 |
| 5,050,134 | 9/1991 | Butler | 367/118 |
| 5,051,736 | 9/1991 | Bennett et al. | 340/709 |
| 5,054,005 | 10/1991 | Schorum | 367/127 |
| 5,107,541 | 4/1992 | Hilton | 382/3 |
| 5,111,005 | 5/1992 | Smith et al. | 178/19 |
| 5,128,660 | 7/1992 | DeMond et al. | 340/707 |
| 5,142,506 | 8/1992 | Edwards | 367/127 |
| 5,144,594 | 9/1992 | Gilchrist | 367/129 |
| 5,177,472 | 1/1993 | Taniishi et al. | 340/706 |
| 5,248,856 | 9/1993 | Mallicoat | 178/18 |
| 5,250,929 | 10/1993 | Hoffman et al. | 345/146 |
| 5,280,457 | 1/1994 | Figueroa et al. | 367/127 |
| 5,298,737 | 3/1994 | Proper | 250/221 |
| 5,308,936 | 5/1994 | Biggs et al. | 178/18 |
| 5,311,207 | 5/1994 | Kusumoto et al. | 345/150 |
| 5,379,269 | 1/1995 | Sindeband et al. | 367/127 |
| 5,420,607 | 5/1995 | Miller et al. | 345/156 |
| 5,434,370 | 7/1995 | Wilson et al. | 178/18 |
| 5,478,976 | 12/1995 | Kano | 178/19 |
| 5,495,427 | 2/1996 | Puma et al. | 364/516 |
| 5,500,492 | 3/1996 | Kobayashi et al. | 178/18 |
| 5,510,800 | 4/1996 | McEwan | 342/387 |
| 5,515,051 | 5/1996 | Tanaka et al. | 341/174 |
| 5,517,579 | 5/1996 | Baron et al. | 382/187 |
| 5,519,400 | 5/1996 | McEwan | 342/28 |
| 5,525,764 | 6/1996 | Junkins et al. | 178/18 |
| 5,539,159 | 7/1996 | Protheroe et al. | 178/18 |
| 5,548,092 | 8/1996 | Shriver | 178/18 |
| 5,557,301 | 9/1996 | D'Aviau de Piolant | 345/179 |
| 5,576,727 | 11/1996 | Rosenberg et al. | 345/179 |
| 5,581,269 | 12/1996 | Butcher | 345/1 |
| 5,583,323 | 12/1996 | Zurstadt et al. | 178/18 |
| 5,600,105 | 2/1997 | Fukuzaki et al. | 178/19 |
| 5,629,499 | 5/1997 | Flickinger et al. | 178/18 |
| 5,635,951 | 6/1997 | Takahashi | 345/127 |
| 5,657,053 | 8/1997 | Files et al. | 345/177 |
| 5,657,054 | 8/1997 | Files et al. | 345/177 |
| 5,661,490 | 8/1997 | McEwan | 342/387 |
| 5,691,959 | 11/1997 | Kriewall et al. | 367/129 |
| 5,717,168 | 2/1998 | DeBuisser et al. | 178/19 |
| 5,866,856 | * 2/1999 | Holtzman | 178/19.01 |
| 6,067,080 | * 5/2000 | Holtzman | 345/173 |

FOREIGN PATENT DOCUMENTS

| | | | |
|---|---|---|---|
| 2 334 003 | 8/1999 | (GB) | G08C/21/00 |
| WO 89/11144 | 11/1989 | (WO) | G09G/3/02 |
| WO 94/11844 | 5/1994 | (WO) | G06K/11/14 |
| WO 94/16422 | 7/1994 | (WO) | G08C/21/00 |
| WO 96/10817 | 4/1996 | (WO) | G10K/11/28 |
| WO 98/14888 | 4/1998 | (WO) | G06F/15/00 |
| WO 98/37508 | 8/1998 | (WO) . | |
| WO 98/38595 | 9/1998 | (WO) . | |
| WO 98/38596 | 9/1998 | (WO) . | |
| WO 98/39729 | 9/1998 | (WO) . | |
| WO 98/40838 | 9/1998 | (WO) . | |
| WO 99/36883 | 7/1999 | (WO) | G06K/11/18 |

OTHER PUBLICATIONS

Chery, Y. et al., "Detector Assembly With Board Mounted User Controls", U.S. application No. 09/273,593, filed Mar. 22, 1999. (711).

Chery, Y. et al., "Transcription System Kit For Forming Composite Images", U.S. application No. 09/273,887, filed Mar. 22, 1999. (713).

Chery, Y. et al., "Transcription System Kit Including Stylus and Powered Writing Element", U.S. application No. 09/273,921, filed Mar. 22, 1999. (719).

* cited by examiner

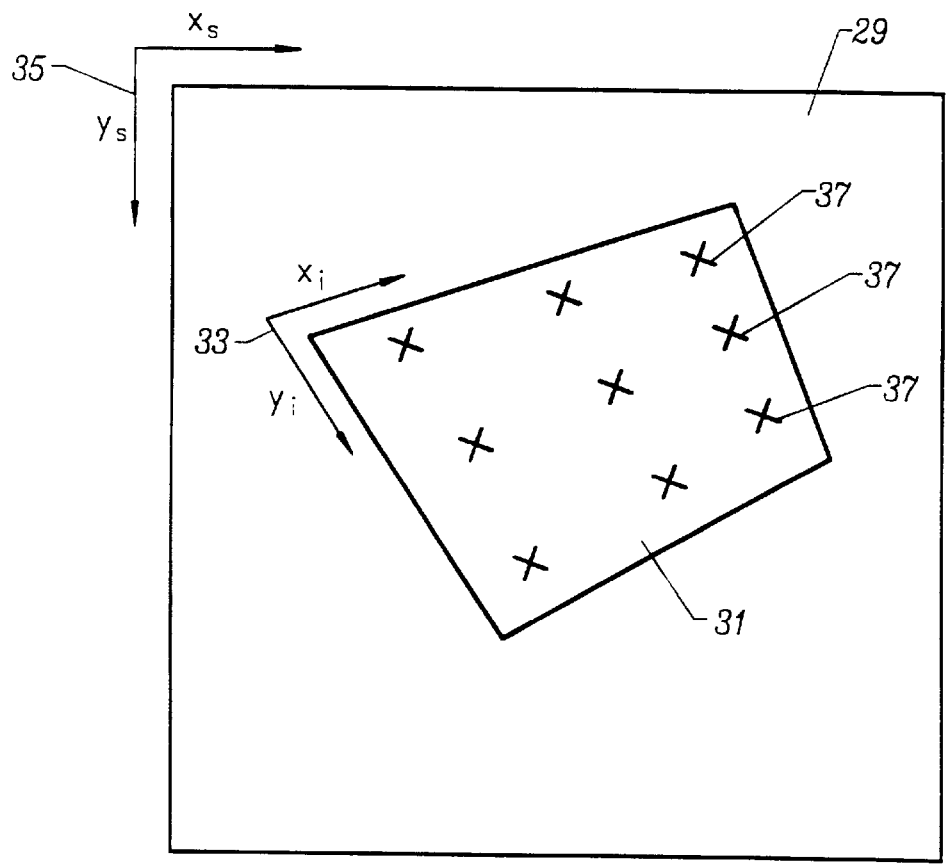
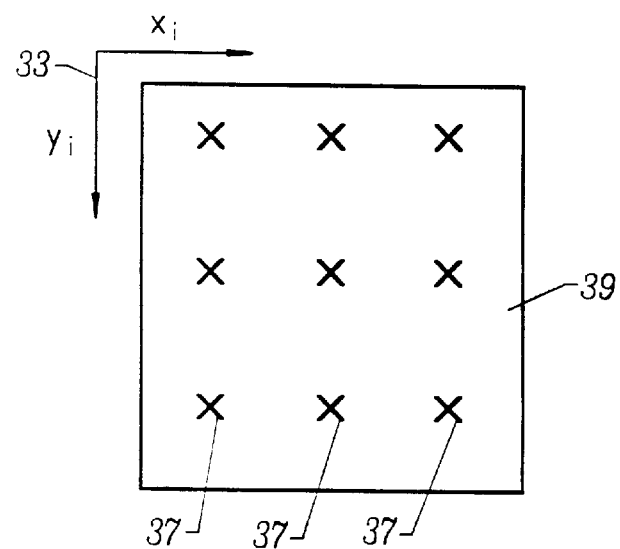
FIG. 1J

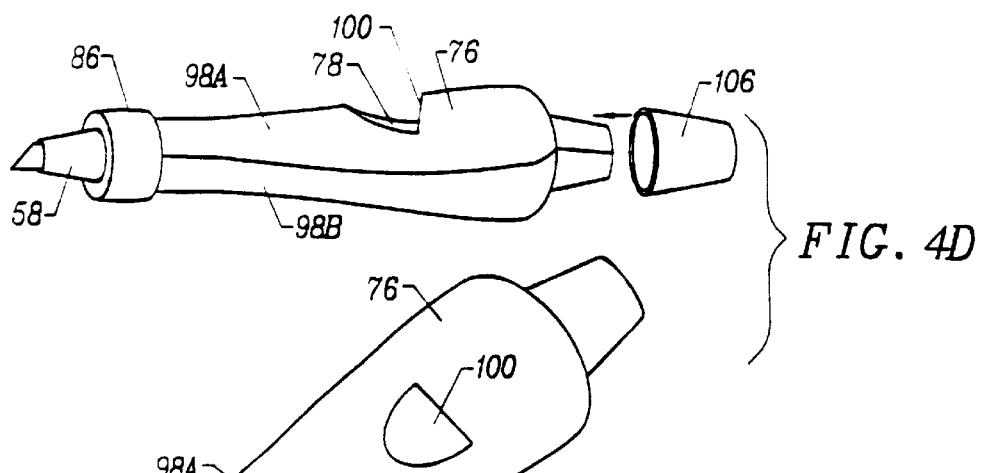
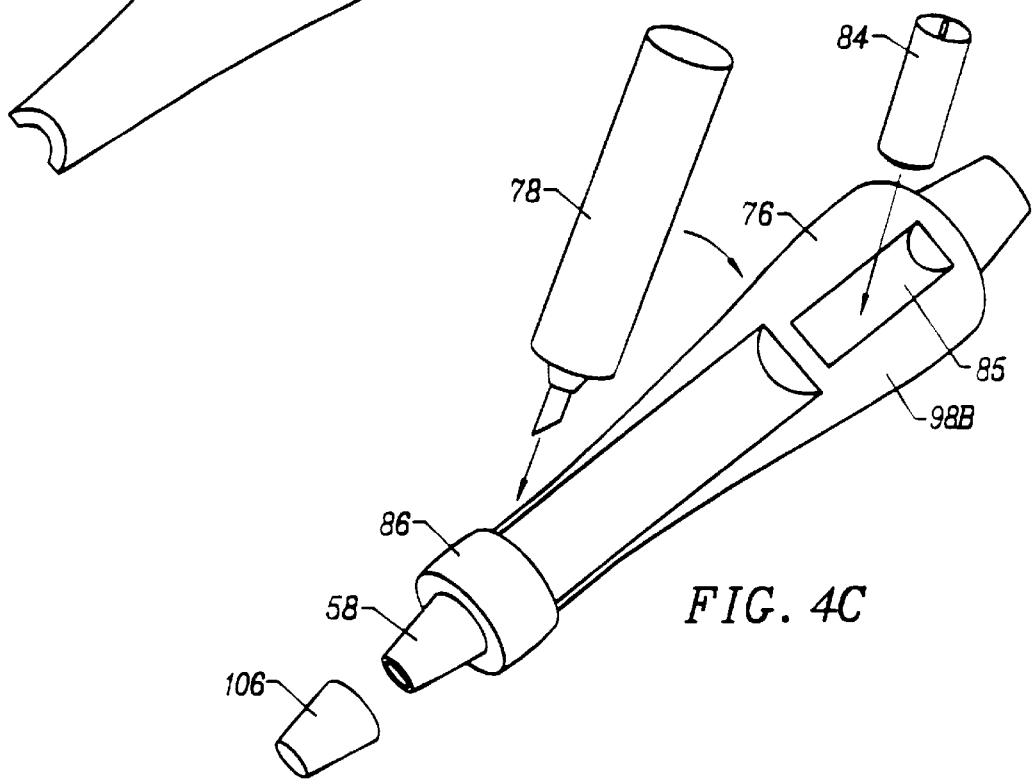
FIG. 4D
FIG. 4C

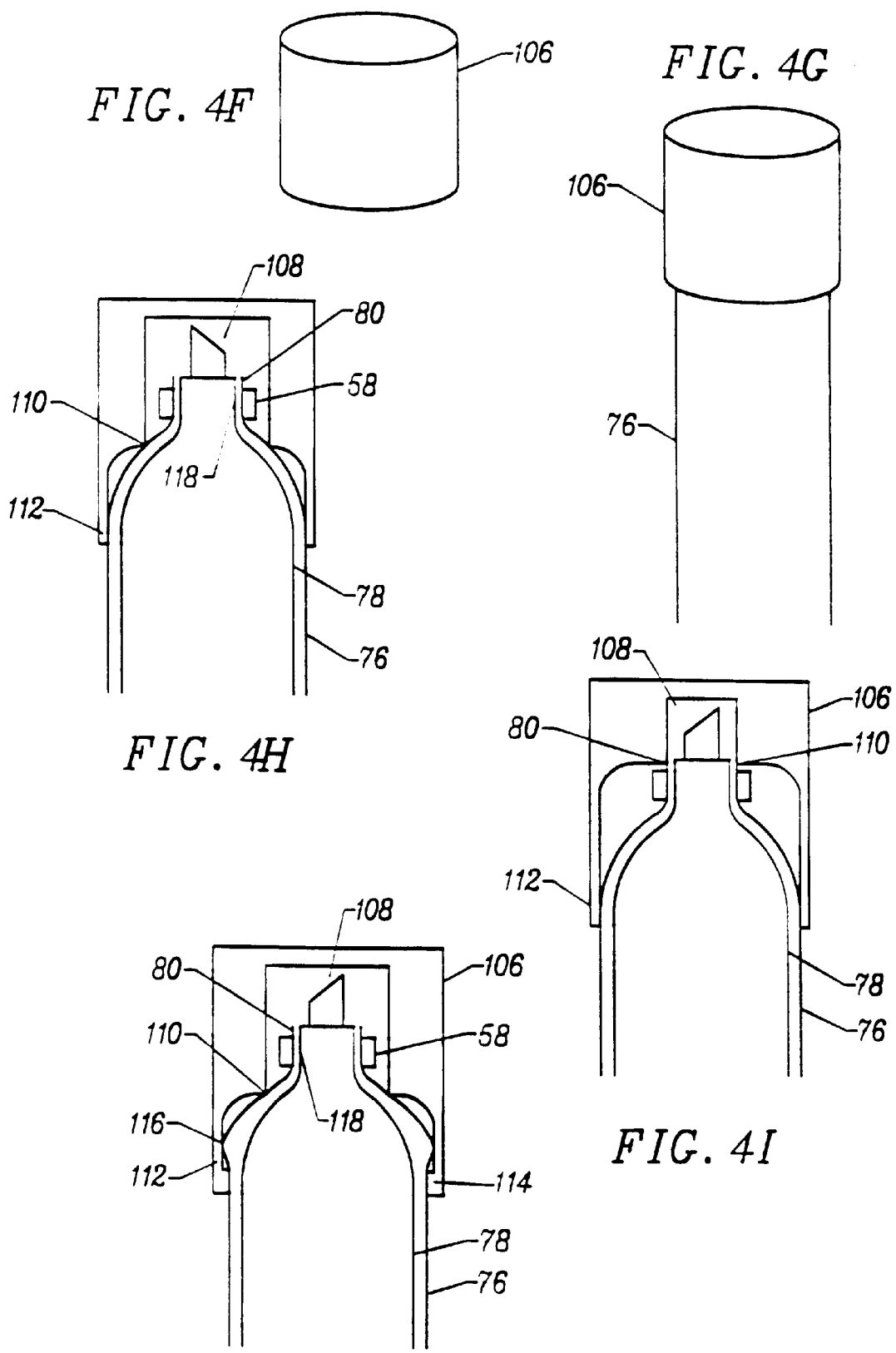

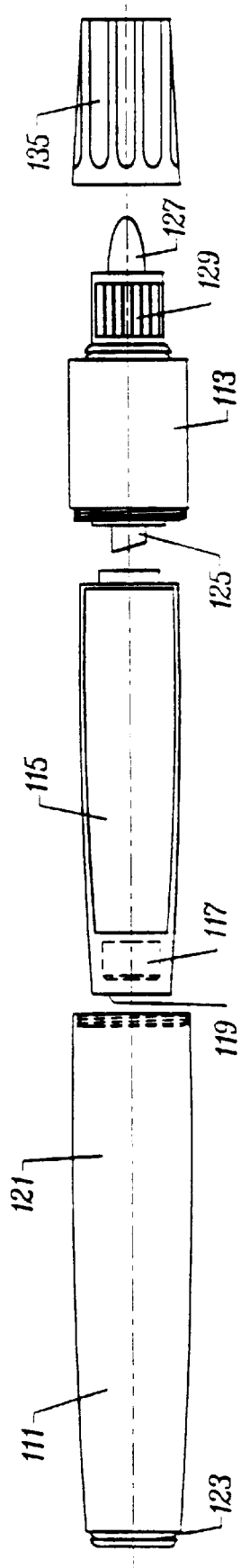
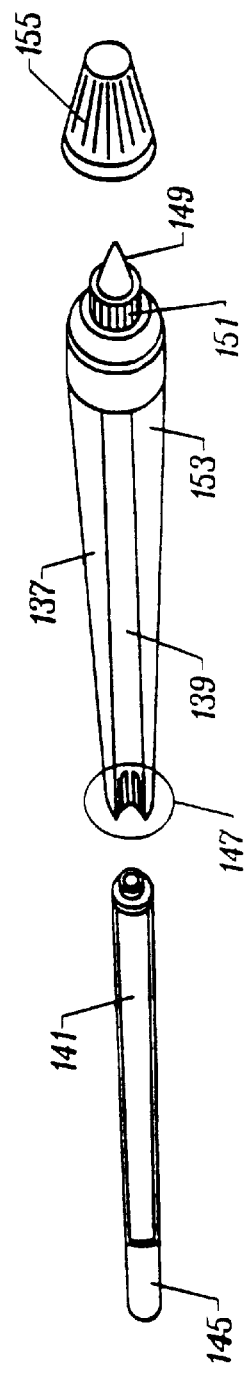
FIG. 4K
FIG. 4L

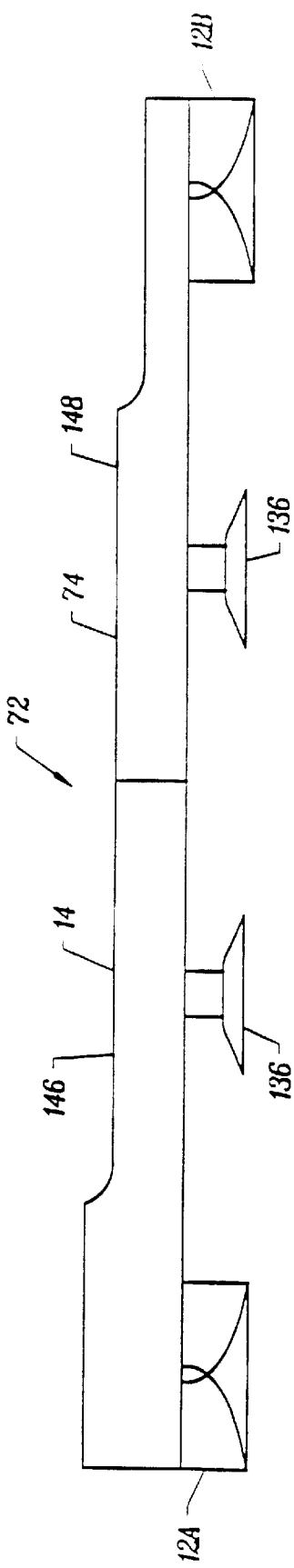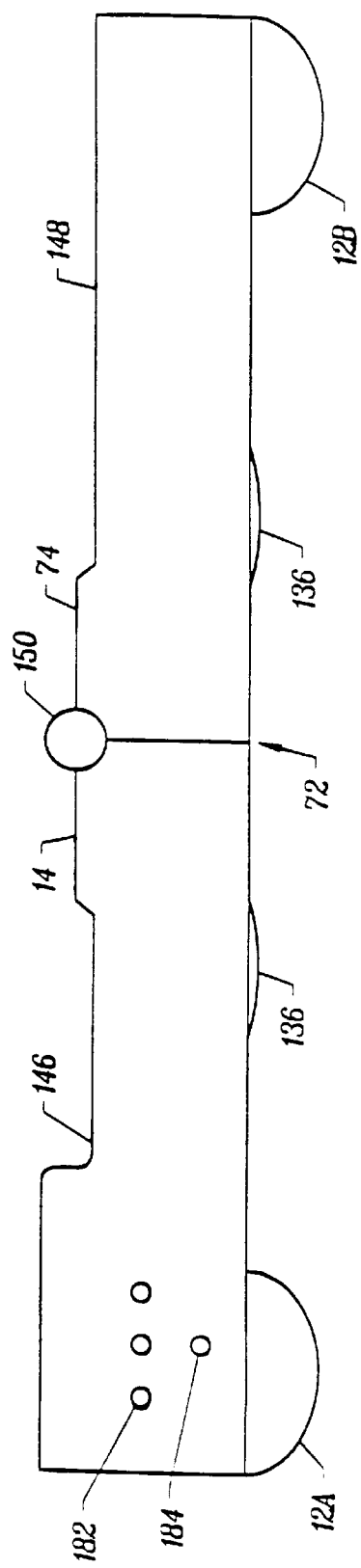
FIG. 7E
FIG. 7F

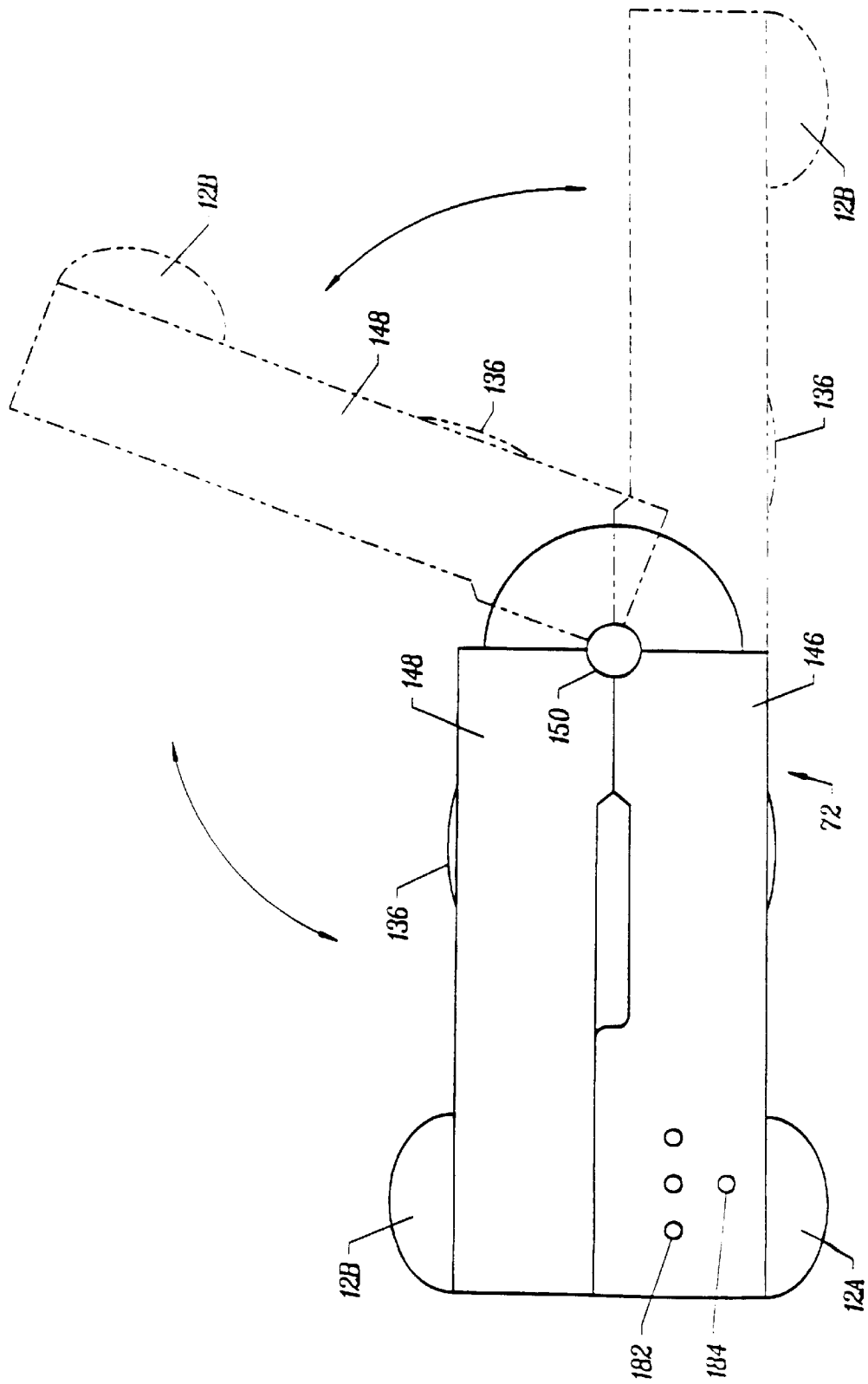

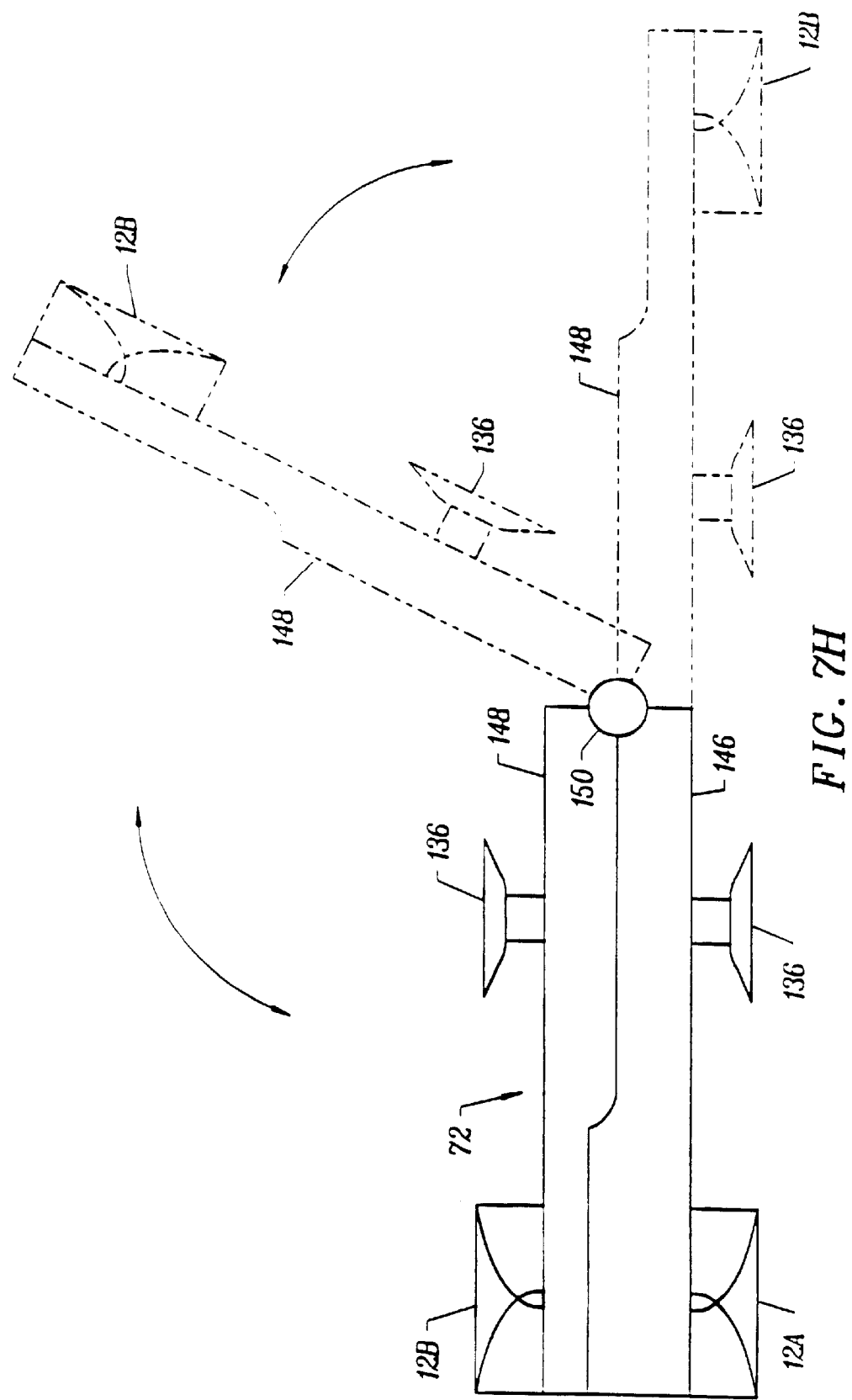

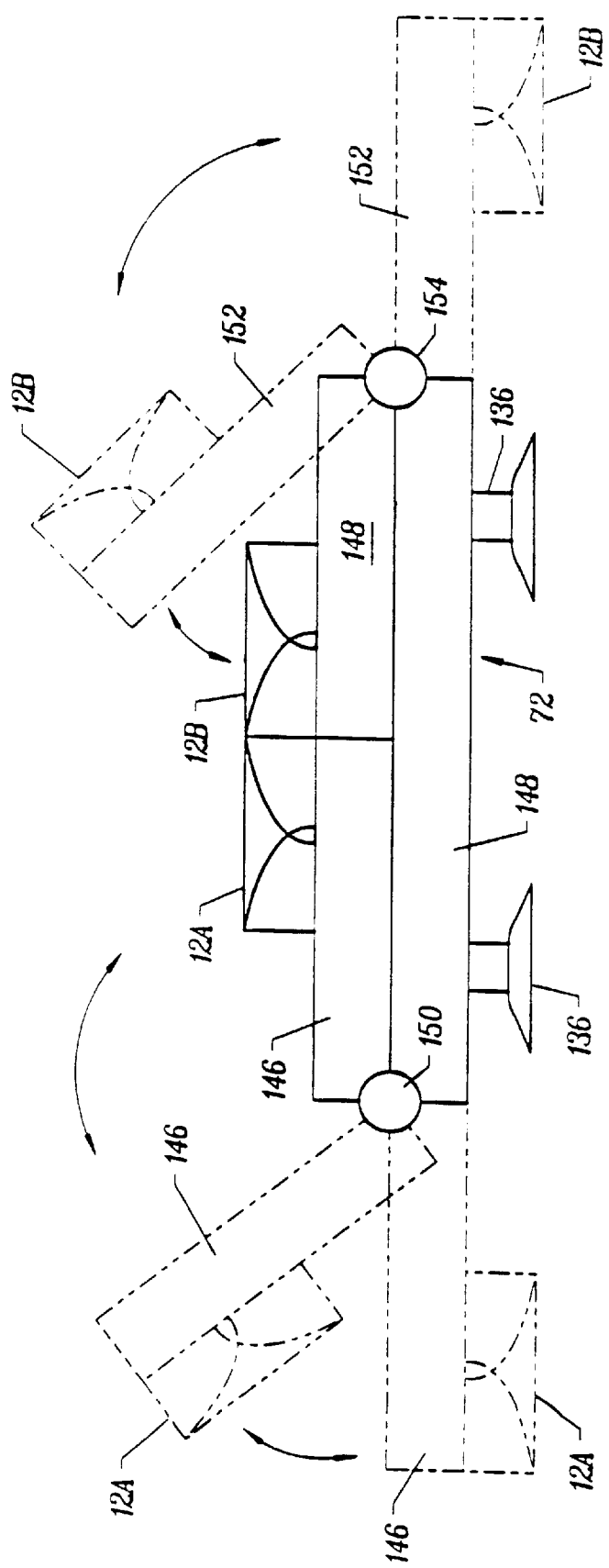

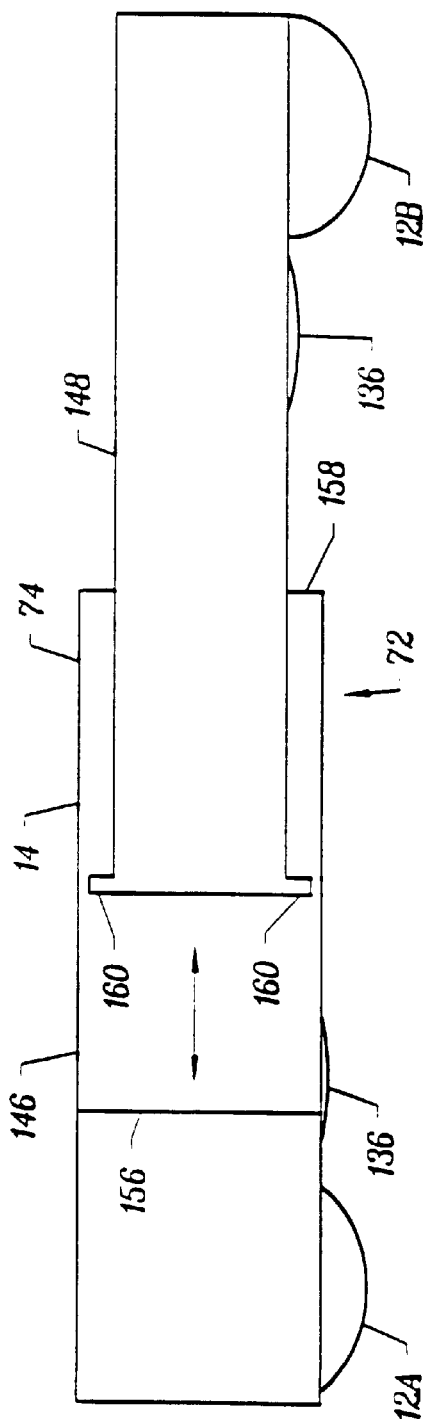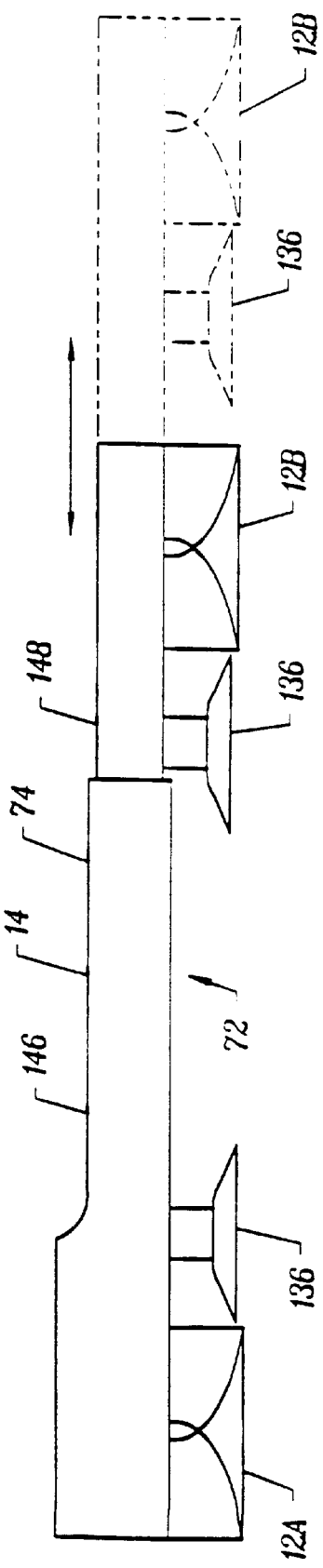

| Implement Identifier | Implement | Color | Thickness (mm) |
|---|---|---|---|
| 1 | Sytlus | Black | 1.0 |
| 2 | Sytlus | Blue | 2.0 |
| 3 | Sytlus | Red | 1.0 |
| 4 | Eraser | | |

FIG. 14

| FUNCTION — 264 | x' upper left corner — 266 | y' upper left corner — 268 | x' upper right corner — 270 | y' upper right corner — 272 | x' lower left corner — 274 | y' lower left corner — 276 | x' lower right corner — 278 | y' lower right corner — 280 |
|---|---|---|---|---|---|---|---|---|
| NEW IMAGE | | | | | | | | |
| SAVE IMAGE | | | | | | | | |
| DISABLE TRANSCRIPTION | | | | | | | | |
| PRINT | | | | | | | | |
| CALIBRATE | | | | | | | | |
| 1 | | | | | | | | |
| 2 | | | | | | | | |
| 3 | | | | | | | | |

*FIG. 15A*

| 264 | 282 | 284 | 286 | 288 | 290 | 292 | 294 | 296 |
|---|---|---|---|---|---|---|---|---|
| FUNCTION | x upper left corner | y upper left corner | x upper right corner | y upper right corner | x lower left corner | y lower left corner | x lower right corner | y lower right corner |
| NEW IMAGE | | | | | | | | |
| SAVE IMAGE | | | | | | | | |
| DISABLE TRANSCRIPTION | | | | | | | | |
| PRINT | | | | | | | | |
| CALIBRATE | | | | | | | | |
| 1 | | | | | | | | |
| 2 | | | | | | | | |
| 3 | | | | | | | | |

FIG. 15B

Uncapped Stylus (ready for writing)

Capped Stylus (ready for storage)

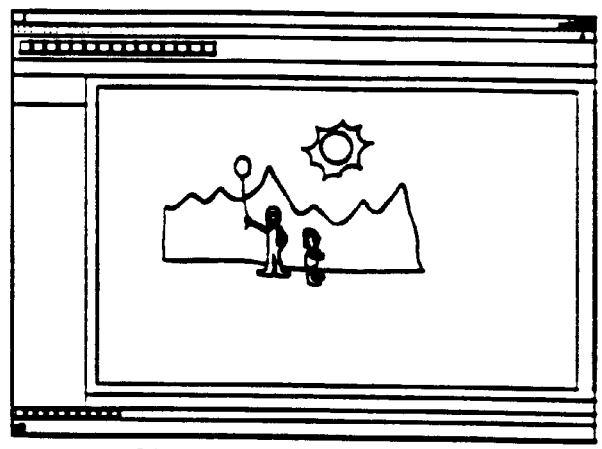
Single board display
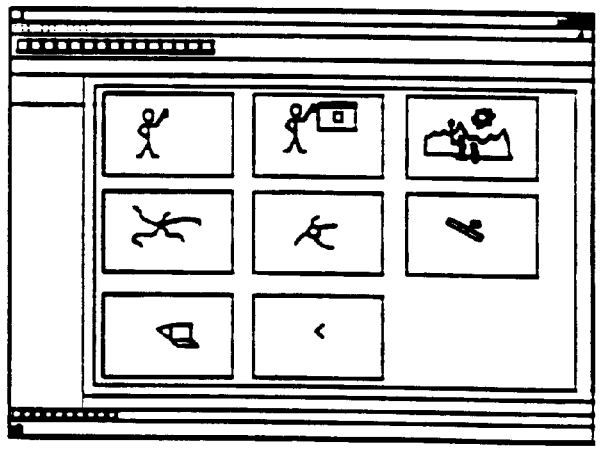
Mulitple board display
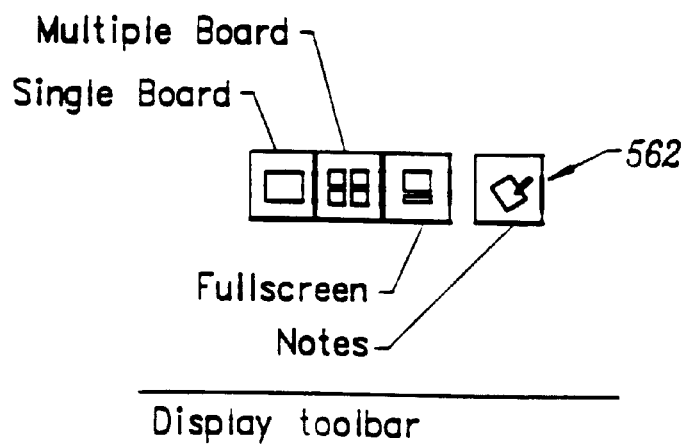
Display toolbar
*FIG. 27B*

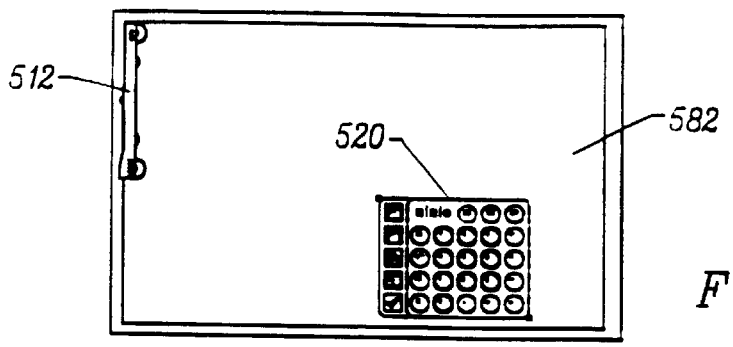
Control panel attached to whiteboard
*FIG. 27E(1)*
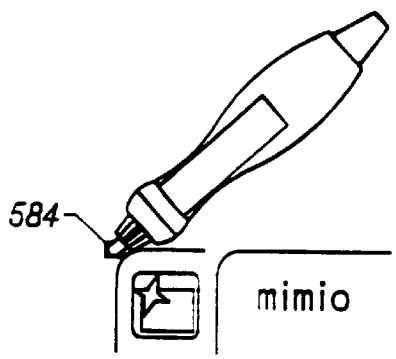
*FIG. 27E(2)*
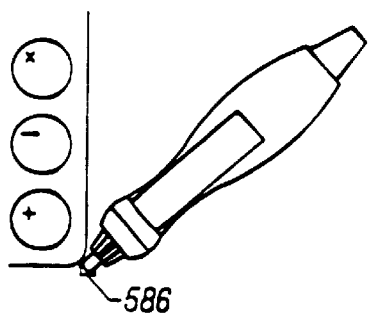
*FIG. 27E(3)*
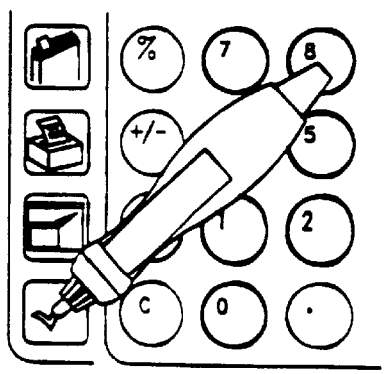
*FIG. 27E(4)*

DUAL MODE ERASER

CROSS-REFERENCE TO RELATED APPLICATIONS

This application is a continuation of U.S. patent application Ser. No. 09/589,534, filed Jun. 7, 2000 and it is a Continuation-in-Part of U.S. patent application Ser. No. 09/273,887, filed Mar. 22, 1999, U.S. Pat. No. 6,191,778, which is a Continuation-in-Part of U.S. patent application Ser. No. 09/079,430, filed May 14, 1998, entitled Transcription System U.S. Pat. No. 6,104,387 and U.S. Provisional Patent Application No. 60/109,361, filed Nov. 20, 1998, and U.S. Provisional Patent Application No. 60/090,744, filed Jun. 26, 1998.

FIELD OF THE INVENTION

The invention is in the field of recording writing performed on a surface and, more particularly in the field of recording a composite of the writing performed on the surface and a preexisting image.

BACKGROUND OF THE INVENTION

Technologies for capturing and storing handwritten notes include digitized writing surfaces such as electronic whiteboards or SMARTBOARDS™. These electronic whiteboards typically either photocopy an entire writing surface or serve as the actual input device (e.g. an electronic template) for capturing the handwritten data. The whiteboards may be active or passive electronic devices with a surface on which the user writes with a special stylus. The active devices may be touch sensitive, or responsive to a light or laser pen wherein the whiteboard includes a detector that detects the active signal. The passive electronic boards tend to use large, expensive, board-sized photocopying mechanisms.

Typical whiteboard systems are large, cumbersome, expensive and immobile.

SUMMARY OF THE DISCLOSURE

Various detectors for use in transcription systems according to the present invention are described. In one embodiment, the detector comprises a signal receiver for positioning adjacent a writing surface and for receiving a position signal transmitted from a stylus when the stylus is positioned adjacent the writing surface, the signal receiver producing a timing signal in response to receiving the position signal; and a signal focussing element having a reflecting surface which is shaped and oriented relative to the signal receiver to reflect the position signal transmitted from the stylus onto the signal receiver.

In another embodiment, the detector comprises a signal receiver for positioning adjacent a writing surface and for receiving a position signal transmitted from a stylus when the stylus is positioned adjacent the writing surface, the signal receiver producing a timing signal in response to receiving the position signal; and a signal shielding element shaped and oriented relative to the signal receiver to reflect position signals transmitted by the stylus away from the signal receiver when the stylus is positioned outside a predetermined region of the writing surface.

In yet another embodiment, the detector comprises a signal receiver for positioning adjacent a writing surface and for receiving a position signal transmitted from a stylus when the stylus is positioned adjacent the writing surface, the signal receiver producing a timing signal in response to receiving the position signal; a signal focusing element having a reflecting surface which is oriented relative to the signal receiver to reflect the position signal transmitted from the stylus onto the signal receiver; and a signal shielding element shaped and oriented relative to the signal receiver to reflect position signals transmitted by the stylus away from the signal receiver when the stylus is positioned outside a predetermined region of the writing surface.

In regard to any of the detector embodiments, the signal shielding element is optionally shaped and oriented relative to the signal receiver to reflect position signals transmitted by the stylus away from the signal receiver when the stylus is positioned adjacent the writing surface outside of an angular range of about 70 to 110 degrees extending outward from the detector parallel to the writing surface, preferably about 90 degrees. The signal shielding element may also be optionally shaped and oriented relative to the signal receiver to reflect position signals transmitted by the stylus away from the signal receiver when the stylus is positioned adjacent the writing surface outside of an angular range of about 160 to 200 degrees extending outward from the detector parallel to the writing surface, preferably about 180 degrees.

In regard to any of the detector embodiments, at least a portion of the reflecting surface may have a curved shape such as a parabolic shape. The signal receiver may be positioned adjacent a focus of the parabolic shaped portion of the reflecting surface.

In regard to any of the detector embodiments, the detector may further comprise a mechanism for removably attaching the detector to the writing surface.

Other embodiments of detectors which may be used in the transcription system of the present invention, and variations thereof, are described herein and are intended to be encompassed within the scope of the present invention.

Various detector assemblies for use in transcription systems according to the present invention are also provided. In one embodiment, the detector assembly comprises first and second signal receivers for positioning adjacent a writing surface and for receiving a position signal transmitted from a stylus when the stylus is positioned adjacent the writing surface, the first and signal receivers each producing timing signals in response to receiving the position signal.

In another embodiment, the detector assembly comprises first and second signal receivers for positioning adjacent a writing surface and for receiving a position signal transmitted from a stylus when the stylus is positioned adjacent the writing surface, the first and signal receivers each producing timing signals in response to receiving the position signal; and a member coupling the first and second signal receivers, the coupling member being capable of adopting two or more configurations where a distance between the first and second signal receivers changes in at least two of the configurations.

According to this embodiment, the coupling member may be capable of telescopic expansion and contraction. The coupling member may also include a hinge by which the signal receivers can be angularly moved relative to each other. The coupling member may include at least two hinges. The coupling member may also include an attachment mechanism for removably attaching the detector assembly to a writing surface. The coupling member may optionally hold the first and second signal receivers a predetermined distance apart from each other when the detector assembly adopts at least one of the configurations. The coupling member may also include a locking mechanism for releasably locking the detector assembly in at least one of the configurations. The locking assembly preferably holds the first and second signal receivers a predetermined distance apart from each other. The first and second signal receivers may be removably attachable to the coupling member.

Also according to this embodiment, the detector assembly may adopt a first configuration where the first and second signal receivers are separated from each other and a second configuration where the first and second signal receivers are positioned adjacent each other. The detector assembly may also adopt a first configuration where the first and second signal receivers are a first distance apart and a second configuration where the first and second signal receivers are a second distance apart that is less than 75% of the first distance, preferably less than about 50% of the first distance. The detector assembly may also be capable of adopting a first configuration having a first lateral footprint and second configuration having a second lateral footprint that is less than 75% of the first lateral footprint, preferably a second lateral footprint that is less than about 50% of the first lateral footprint. In one variation, the second lateral footprint that is between about 5% and 75% of the first lateral footprint.

In another embodiment, a detector assembly is provided which comprises a housing for mounting to the writing surface; a plurality of signal receivers; and at least one user activated control switch whose activation by a user when the detector assembly is mounted to the writing surface produces a control signal which causes the transcription system to perform a function in response.

According to this embodiment, activation of one of the control switches can cause an image displayed on a monitor operatively connected to the transcription system to be modified. Activation of one of the control switches can also cause at least a portion of an image displayed on a monitor operatively connected to the transcription system to be erased, saved, printed, electronically mailed, or facsimilied. Activation of one of the control switches can also cause a writing property associated with a stylus by the transcription system to be changed. Activation of one of the control switches can also cause a color associated with a stylus by the transcription system to be changed.

In regard to any of the detector assembly embodiments, the detector assembly may further comprise a mechanism for removably attaching the detector assembly to the writing surface. An example of such an attachment mechanism is a suction cup, preferably a cam activated suction cup.

In regard to any of the detector assembly embodiments, the detector assembly may further comprise a hardware unit which receives timing signals produced by the signal receivers, the hardware unit including logic for processing the timing signals to determine a time of flight of the position signal from the stylus to the signal receivers.

In regard to any of the detector assembly embodiments, the detector assembly may also further comprise a rectifier connected in series between the signal receivers and the hardware unit such that the hardware unit receives the timing signal from the signal receivers via the rectifier.

In regard to any of the detector assembly embodiments, the detector assembly may also further comprise a comparator connected in series between the rectifier and the hardware unit such that the hardware unit receives the timing signal from the rectifier via the comparator.

In regard to any of the detector assembly embodiments, the detector assembly may be designed to be operated under battery power. For example, the detector assembly may be operated under battery power from a laptop computer. The detector assembly may also be operated under battery power having a voltage between about 1.5 and 24 volts, preferably between about 1.5 and 12 volts.

In regard to any of the detector assembly embodiments, the detector assembly may further include a power source for operating the detector assembly. The power source may be a battery. The battery may have a voltage of between about 1.5 volts and 24 volts, preferably between about 1.5 volts and 12 volts.

In regard to any of the detector assembly embodiments, the detector assembly may optionally include any of the detector embodiments described above. In particular, the detector assembly may include signal focussing elements and/or signal shielding elements.

In regard to any of the detector assembly embodiments, the detector assembly may further include a microphone. The microphone may be used in the transcription system to record sound information during a transcription period and may be used to receive voice commands for operating the transcription system.

Other embodiments of detector assemblies which may be used in the transcription system of the present invention, and variations thereof, are described herein and are intended to be encompassed within the scope of the present invention.

Various styluses for use in transcription systems according to the present invention are also provided.

In one embodiment, the stylus comprises a stylus housing defining a volume for housing a writing element and an opening on a distal end of the stylus housing through which a portion of the writing element extends for writing on a writing surface.

In another embodiment, the stylus comprises a stylus housing defining a volume for housing a writing element, an opening on a distal end of the stylus housing through which a portion of the writing element extends for writing on a writing surface, and a door on a side of the stylus housing which may be opened or removed and through which a writing element can be introduced into and removed from the stylus housing.

In another embodiment, the stylus comprises a stylus housing defining a volume for housing a writing element and an opening on a distal end of the stylus housing through which a portion of the writing element extends for writing on a writing surface, the stylus housing including a removable adapter for adjusting the volume of the housing to accommodate a particular type of writing element to be positioned within the housing.

According to this embodiment, the particular type of writing element may be selected from the group consisting of whiteboard marker, pen, pencil and chalk. The particular type of writing element may also be a color of writing element or a brand of writing element. The removable adaptor may be color coordinated with a color of the writing element.

In another embodiment, the stylus comprises a power level sensor for sensing the power level of a power source housed within the stylus; and a signal transmitter configured to transmit power signals having information concerning the power level of the power source. The stylus may further comprise logic coupled with the power level sensor for monitoring the power level and causing the power signal to be transmitted from the signal transmitter once the power level of the power source has fallen below a pre-determined level. The power level signal may be encoded into a position signal or a reference signal. The position signal may be a sonic signal.

In another embodiment, a stylus is provided which includes a position signal transmitter; and a stylus housing defining a volume for housing a removable writing element which includes a power source for providing operating power to the stylus, a portion of the volume for housing the writing element including a power source contact area for placing the stylus in electrical contact with the writing element power source. The stylus may optionally include a writing tip and a conduit for communicating writing media from the writing element to the writing tip. The stylus of this embodiment may optionally be part of a kit which includes a removable writing element including a writing element housing sized to fit within the volume of the stylus housing, writing media contained within the writing element housing, a power source for providing operating power to the stylus, and power source contacts positioned on the writing element housing such that the power source contact area is in electrical contact with the power source contacts when the writing element is positioned within the stylus housing. The present invention also relates to the writing element which includes the power source for providing operating power to the stylus.

Further according to this embodiment, the stylus and/or the writing element may include electronics which causes a signal to be transmitted by the stylus which identifies the stylus and/or the writing element as being compatible with the transcription system. In this regard, the stylus and/or the writing element may include logic for producing encoded identification signals, the transcription system also including logic for recognizing the encoded identification signals. By incorporating this feature, use of styluses and writing elements incompatible with the transcription system can be prevented by the system.

According to any of the stylus embodiments, the stylus may include a position signal transmitter for transmitting position signals, a reference signal transmitter for transmitting reference signals and/or a position signal receiver for receiving position signals.

According to any of the stylus embodiments, at least a portion of the stylus housing may be clear or opaque such that it is possible to see the writing element within the housing. The clear or opaque portion may be sized and positioned to allow a user to determine a color of the writing element through the portion. The clear or opaque portion may also be sized and positioned to allow a user to see an amount of writing media that the writing element contains. For example, when chalk, graphite or a liquid ink reservoir is used in conjunction with the writing element, it is also possible to observe how much writing media is remaining.

According to any of the stylus embodiments, the stylus housing may include an aperture which allows a user to rotate a writing element about its longitudinal axis housed within the stylus housing without having to disassemble the stylus housing or remove the writing element from the stylus housing. It is noted that some writing elements include a tip which is not symmetrical about the longitudinal axis of the writing element, such as a wedge shaped tip of a marker. In such instances, it may be desirable to periodically alter the angular positioning of the tip of the writing element. This may be accomplished by rotating the writing element through the aperture without having to remove the writing element from the stylus housing or having to disassemble the stylus.

According to any of the stylus embodiments, the stylus may further include a sensor adjacent the distal end of the stylus housing for detecting a condition of media in the stylus. For example, the stylus may include a sensor adjacent an end of the stylus housing out of which the writing element extends which serves to detect if the writing element is low on writing media. In one variation, the sensor detects a water content or another solvent content of the portion of the writing element extending from the housing, thereby alerting the user when the writing element needs to be replaced.

According to any of the stylus embodiments, the stylus may include a mechanism for distinguishing between different writing elements by only permitting a particular type of writing element (for example, based on color) to be positioned within the housing. In one variation, the writing element may have a shaped portion associated with a particular color, such as the end of the element opposing the tip. Meanwhile, the mechanism in the housing may have a shape which only allows a writing element having a particular shaped portion to fit within the housing, thereby preventing other types of writing elements from being positioned within the housing. This embodiment is useful for allowing a set of styluses to be color coded.

According to any of the stylus embodiments, the position signal transmitter may transmit a variety of signals including an ultrasound signal, a radar signal, or a micro-impulse radar signal.

According to any of the stylus embodiments, stylus may further include a reference signal transmitter for transmitting a reference signal when the writing element is sensed by the contact switch to be in contact with the writing surface. The reference signal transmitter may transmit a variety of signals including infra-red signals and ultrasound signals.

According to any of the stylus embodiments, the stylus may further include a contact switch for sensing when the writing element is contacted with a writing surface, the position signal transmitter transmitting the position signal when the writing element is sensed by the contact switch to be in contact with the writing surface. According to this variation, the stylus may further include a reference signal transmitter which transmits a reference signal when the writing element is sensed by the contact switch to be in contact with the writing surface.

According to any of the stylus embodiments, the stylus may further include a cap removably attachable to the stylus housing distal end and sized to cover the portion of the writing element which extends from the stylus housing distal end. The cap preferably forms a seal with the stylus housing to prevent the writing element from drying out. The cap may be formed of a material which allows a user to observe the color of the writing element without having to remove the cap. For example, the cap may optionally be clear or opaque. Also the position signal transmitter may be positioned adjacent the distal end of the stylus housing and the cap may be sized to fit over the position signal transmitter.

Other embodiments of styluses which may be used in the transcription system of the present invention, and variations thereof, are described herein and are intended to be encompassed within the scope of the present invention.

The present invention also relates to the use of a temperature sensor for measuring a temperature adjacent the writing surface. The temperature sensor may be incorporated into one or more components of the transcription systems described herein, such as writing surfaces, styluses, detectors, detector assemblies, coupling members and sub-members, attachment members, hardware units, and templates. Changes in temperature can alter the speed at which position signals travel. Measurement of temperature using the temperature sensor can be used to account for these changes.

Various transcription systems embodiments can be designed in view of the present invention. Some specific examples of transcription systems embodiments are as follows.

In one embodiment, the transcription system includes a plurality of signal receivers for positioning adjacent a writing surface and for receiving a position signal transmitted from a stylus when the stylus is positioned adjacent the writing surface, the signal receivers producing timing signals in response to receiving the position signal from the stylus, the transcription system using the timing signals to determine a position of the stylus adjacent the writing surface.

In another embodiment, a transcription system includes at least one signal receiver for receiving a first power signal transmitted from a stylus and for producing a second power signal, the first and second power signal having information concerning a power level of a power source included in the stylus; a hardware unit receiving the second power signal from the at least one signal receiver and having logic for processing the second power signal to determine the power level of the power source; and an indicator coupled with the hardware unit to indicate to a user the power level of the power source within the stylus.

According to this embodiment, a signal receiver may be included in a detector which is configured to be coupled with the writing surface. Also according to this embodiment, the signal receiver may be included in a coupling member which couples a first detector to a second detector, the first and second detectors being in electrical communication with the hardware unit. According to this embodiment, the signal receiver may be included in the hardware unit. Also according to this embodiment, the signal receiver may include a photo sensor and the power signal may be encoded into an infra-red signal transmitted from the stylus. Also according to this embodiment, the signal receiver may include a piezoelectric material and the power signal may be encoded in a sonic signal transmitted from the stylus.

Other embodiments of transcription systems according to the present invention are described herein and are intended to be encompassed within the scope of the present invention.

One or more components of the transcription systems described herein, such as detectors, detector assemblies, coupling members and sub-members, attachment members, hardware units, and templates can optionally be permanently incorporated into articles which can be used as writing surfaces, such as whiteboards, chalk boards, or furniture which includes either a writing surface or a mechanism for attaching a writing surface to the furniture. For example, it is envisioned that these components of the transcription system may be incorporated into desks and other types of office furniture.

Kits for use with the various embodiments of the transcription system and its components are also provided. In its broadest sense, kits are provided which include any two same or different components of the various embodiments of transcription systems described herein. Types of components provided herein include, but are not limited to writing elements, writing surfaces such as paper, whiteboards, chalkboards, and glass, styluses, stylus caps, detectors, detector assemblies, coupling members and sub-members, attachment members, hardware units, templates, and logic in computer readable form for use in the various transcription systems.

Some specific examples of kit embodiments are as follows. In one embodiment, a kit is provided which includes first and second signal receivers for positioning adjacent a writing surface and for receiving a position signal transmitted from a stylus when the stylus is positioned adjacent the writing surface. The signal receivers produce timing signals in response to receiving the position signal from the stylus. The kit also includes a template which is coupleable to the writing surface and which has markings defining a perimeter of at least one control section sized to have a writing portion of the stylus positioned within the perimeter of the at least one control section. The kit also includes a computer readable medium including logic for identifying when the portion of the stylus is positioned within the perimeter of a given control section and for directing a processing unit of the transcription system to carry out a function associated with the given control section.

In another embodiment, the kit includes a writing surface containing a background image. The kit also includes a computer readable medium including instructions which when performed by a processor to create the background image on a monitor. The computer readable medium also includes instructions for forming a composite image corresponding to a combination of the background image and the image written upon the writing surface. According to this embodiment, the writing surface may be a blank form, such as a spreadsheet. Using this kit, it is possible to take a blank form such as a spreadsheet and fill out the blank form on the writing surface while simultaneously recording the same blank form being filled out.

In yet another embodiment, a kit is provided for use with a transcription system which includes a plurality of signal receivers for positioning adjacent a writing surface and for receiving one or more position signals transmitted from a stylus when the stylus is positioned adjacent the writing surface, the signal receivers producing timing signals in response to receiving position signals from the stylus, the kit comprising:

a template coupleable to the writing surface, the template including one or more control sections; and a computer readable medium including logic for detecting when the stylus contacts a particular control section based on receipt by the signal receivers of one or more position signals transmitted from the stylus and logic for causing a function to be performed by the transcription system in response to detecting that the stylus has contacted the particular control section.

According to this kit embodiment, the template may include a plurality of control sections, the logic for causing a function to be performed including logic for causing different functions to be performed depending on which of the plurality of control sections are contacted by the stylus.

According to this kit embodiment, the template may be comprised of a sheet of paper or plastic. The template may be devoid of electronic circuitry. The template may also not send or receive signals.

Also according to this kit embodiment, the template may include at least two calibration marks and the computer readable medium includes logic for determining a position of the template on the writing surface relative to the signal receivers based on the stylus contacting the template at the at least two calibration marks.

According to this kit embodiment, the computer readable medium may include logic for causing an image displayed on a monitor operatively connected to the transcription system to change when the stylus contacts a particular control section.

According to this kit embodiment, the computer readable medium may include logic for causing an image displayed on a monitor operatively connected to the transcription system to be saved when the stylus contacts a particular control section, deleted when the stylus contacts a particular control section, printed when the stylus contacts a particular control section, facsimilied when the stylus contacts a particular control section, or electronically mailed when the stylus contacts a particular control section.

According to this kit embodiment, the one or more control sections may include control sections for performing calculator functions, the computer readable medium including logic for performing the calculator functions when the stylus contacts particular control sections.

According to this kit embodiment, the computer readable medium may include a data file identifying the positions of the control sections of the template.

According to this kit embodiment, the kit may include a plurality of different templates and the computer readable medium may include one or more data files for the plurality of different templates which identify positions of control sections on each template, the computer readable medium further including logic which allows a user to select which of the plurality of templates is going to be used.

According to this kit embodiment, the computer readable medium may include logic which allows a user to specify what function is performed by the transcription system in response to the stylus contacting a particular control section.

In another embodiment, a kit is provided for use with a transcription system which includes a plurality of signal receivers for positioning adjacent a writing surface and for receiving position signals transmitted from a stylus when the stylus is positioned adjacent the writing surface, the transcription system recording writing performed by the stylus on the writing surface. According to this embodiment, the kit comprises a background image coupleable to the writing surface. The kit also comprises a computer readable medium including logic for detecting a position of the background image on the writing surface, logic for detecting a position of the stylus relative to the background image on the writing surface, logic for recording writing by the stylus relative to the background image, and logic for forming a composite image comprising the background image and the writing by the stylus on the background image.

According to this embodiment, the background image may comprise a sheet of paper or plastic. The background image may be formed of a material which allows the writing by the stylus to be erased. The background image may be devoid of electronic circuitry and does not send or receive signals. The background image may comprises a blank form of a computer application or a spreadsheet. The background image may comprise at least two calibration marks and the computer readable medium includes logic for determining a position of the background image on a writing surface based on the stylus being positioned adjacent to the background image at the at least two calibration marks.

The computer readable medium may optionally include logic for causing an image displayed on a monitor operatively connected to the transcription system to change when the stylus is placed adjacent to a particular portion of the background image.

The computer readable medium may optionally include logic for causing the composite image to be saved, deleted, printed, facsimilied, or electronically mailed when the stylus is placed adjacent to a particular portion of the background image.

Although various versions of computer readable media are described above as being a part of various kit embodiments, it is noted that the computer readable medium may also be provided separately from the kits.

A variety of different methods are also provided for use with transcription systems according to the present invention.

In one embodiment, a method is provided which comprises:

positioning a pad adjacent the writing surface, the pad including one or more input sections;

positioning the stylus adjacent a particular input section, the stylus transmitting a position signal in response;

having the transcription system determine that the stylus has been positioned adjacent the particular input section and perform a function associated with the particular input section in response.

According to this embodiment, the input section may be a calibration mark, the function performed by the transcription system being calibration of the transcription system by determining a separation between the signal receivers.

Also according to this embodiment, the function associated with the input section may be modifying an image displayed on a monitor operatively connected to the transcription system, the transcription system modifying the image in response to determining that the stylus contacted the save input section. The function associated with the input section may also be saving an image displayed on a monitor operatively connected to the transcription system, the transcription system saving the image in response to determining that the stylus contacted the save input section. The function associated with the input section may also be erasing an image displayed on a monitor operatively connected to the transcription system, the transcription system erasing the image in response to determining that the stylus contacted the save input section. The function associated with the input section also may be changing a color of an image displayed on a monitor operatively connected to the transcription system, the transcription system changing the color of the image in response to determining that the stylus contacted the save input section.

Associated with this method is a computer readable medium including:

logic for taking a file encoding positions of one or more input sections on a pad to be positioned adjacent the writing surface and associating with the one or more input sections a function to be performed when the stylus is detected as having been positioned adjacent to one of the input sections;

logic for determining that the stylus has been positioned adjacent to a particular input section based on times of flight of position signals from the stylus adjacent the particular input section to the plurality of signal receivers; and logic for causing the transcription system to perform the function associated with the input section in response to determining that the stylus has been positioned adjacent to the particular input section.

In one variation, the function associated with the input section may be modifying an image displayed on a monitor operatively connected to the transcription system, the logic for causing the transcription system to perform a function including logic for causing the transcription system to modify the image in response to determining that the stylus contacted the save input section.

In another variation, the function associated with the input section is saving an image displayed on a monitor operatively connected to the transcription system, the logic for causing the transcription system to perform a function including logic for causing the transcription system to save the image in response to determining that the stylus contacted the save input section.

In yet another variation, the function associated with the input section is erasing an image displayed on a monitor operatively connected to the transcription system, the logic for causing the transcription system to perform a function including logic for causing the transcription system to erase the image in response to determining that the stylus contacted the save input section.

Also associated with this method is a transcription system comprising:

a stylus which transmits position signals when positioned adjacent a writing surface;

a plurality of signal receivers for positioning adjacent the writing surface which receive the position signals transmitted from the stylus and produce timing signals in response;

a pad for positioning adjacent the writing surface, the pad including one or more input sections; and a processing unit including logic for taking a file encoding positions of the one or more input sections on the pad and associating with each input section a function to be performed when the stylus is detected as having been positioned adjacent the input section, logic for determining that the stylus has been positioned adjacent an input section based on times of flight of position signals from the stylus adjacent the input section to the plurality of signal receivers, and logic for causing the transcription system to perform the function associated with the input section in response to determining that the stylus has been positioned adjacent to the input section. According to this embodiment, the function may be selected from the group consisting of modifying, saving, and erasing an image displayed on a monitor operatively connected to the transcription system. Also according to this embodiment, the input section may be a calibration mark and the function performed by the transcription system is calibration of the transcription system by determining a separation between the signal receivers.

A method is also provided comprising:

activating a user activated control switch mounted on the writing surface;

producing as a result of activating the user activated control switch a control signal which is communicated to the transcription system; and having the transcription system perform a function in response to receiving the control signal.

According to the method, activation of the control switch may cause at least a portion of an image displayed on a monitor operatively connected to the transcription system to be modified.

Also according to the method, activation of the control switch may cause at least a portion of an image displayed on a monitor operatively connected to the transcription system to be erased, saved, printed, electronically mailed or facsimilied.

In another embodiment, a method is provided which comprises positioning a background image adjacent the writing surface such that the background image can be seen by a user;

having the transcription system determine a position of the background image relative to the signal receivers;

having the user write adjacent the background image using the stylus such that the user sees a composite image comprising the background image and the writing;

having the transcription system detect the writing by detecting the position of the stylus; and having the transcription system create an electronic equivalent of the composite image by combining the background image with the writing.

According to the method, the method may further comprise displaying the electronic equivalent of the composite image on a monitor operatively connected to the transcription system.

Also according to the method, positioning the background image adjacent the writing surface may include attaching a sheet of material including the background image adjacent the writing surface.

Also according to the method, the sheet may be attached to the writing surface. The sheet may be erasable. The sheet may comprise paper or plastic.

Also according to the method, the writing surface may be translucent and the sheet may be positioned behind the writing surface.

Also according to the method, positioning the background image adjacent the writing surface may include displaying the background image adjacent the writing surface. Displaying the background image adjacent the writing surface can include projecting the background image onto the writing surface.

Also according to the method, the background image may comprise a screen from a computer application. The background image may comprise a variety of images including a website, a spreadsheet, or a grid.

According to the method, the background image may comprise at least two calibration marks and determining a position of the background image relative to the signal receivers may include placing the stylus adjacent the calibration marks.

Also according to the method, the background image may comprise one or more control sections, the method further including causing the transcription system to perform a function by placing the stylus adjacent one of the control sections. The function performed by the transcription system may include modifying an image displayed on a monitor operatively connected to the transcription system. The function performed by the transcription system may also include removing at least a portion of the composite image from an image displayed on a monitor operatively connected to the transcription system, saving the electronic equivalent of the composite image, deleting the electronic equivalent of the composite image, and printing the electronic equivalent of the composite image.

In one embodiment in which the background image is projected onto a writing surface, a first image is projected onto the writing surface. A first coordinate system defines positions within the first image and a second coordinate system defines positions on the writing surface. A second image is formed on the surface by using a stylus. Formation of the second image relative to the first image is recorded by periodically detecting a position of the stylus relative to the second coordinate system. The position of the stylus is detected by receiving and processing signals transmitted from the stylus. The position of the stylus relative to the second coordinate system is translated to a position relative to the first coordinate system, and the composite image comprising the first image and the second image is stored as machine-readable data.

In another embodiment, a method is providing for correcting for the effect of temperature on the speed of ultrasound signals in the transcription system. The method comprises measuring a temperature adjacent a writing surface where an ultrasound transcription system is being employed; and adjusting time of flight calculations using the measured temperature adjacent the writing surface. Temperature is preferably measured periodically in order to account for changes in condition, for example, a change in whether sunlight is impacting upon the writing surface. This method may be employed in combination with any of the other methods of the present invention, According to these methods, temperature sensors may optionally be incorporated into the stylus, template and/or positioned adjacent one or more of the detectors.

A method is also provided for forming or modifying an image displayed on a monitor or projected on a surface by forming that image or modifying that image on a writing surface using a stylus and transcription system of the present invention. It is noted that modifying the image may include erasing a portion of the image on the writing surface which causes the erased portion to be removed from the monitor or projected image.

A variety of calibration methods are provided. In one embodiment, the calibration method comprises:

attaching the plurality of signal receivers to the writing surface at unknown distances from one another, each signal receiver including a calibration mark at a known position relative to the signal receiver;

transmitting position signals from each calibration mark; and using times of flight of the position signals to determine separation distances between the plurality of signal receivers.

According to this embodiment, the position signals may be transmitted from a stylus by contacting the stylus to the calibration marks.

In another embodiment, a method is provided which comprises:

positioning a pad adjacent the writing surface, the pad including a plurality of calibration marks;

positioning the stylus adjacent to each calibration mark, the stylus transmitting a position signal to the signal receivers in response;

having the transcription system determine separations between the signal receivers based on times of flight between the calibration mark and the signal receivers.

According to this embodiment, two calibration marks and two signal receivers may be utilized to perform the method.

In another embodiment, the method comprises:

attaching a template to the writing surface, the template having two or more calibration marks at known separation distances from one another;

transmitting position signals from a stylus at the two or more calibration marks to at the signal receivers;

using times of flight of the position signals from the calibration marks to the signal receivers to determine separation distances between the calibration marks and the signal receivers; and using the determined separation distances between the calibration marks and the signal receivers and the known separation distances between the calibration marks to determine separation distances between the signal receivers.

According to this embodiment, the method may optionally further include determining the position of the template on the writing surface relative to the signal receivers. Also according to this embodiment, the template may include one or more control sections at known positions relative to the calibration marks, the method further including determining the position of the one or more control sections relative to the signal receivers.

Associated with these calibration methods are computer readable medium for performing all or a portion of these methods.

In one embodiment, the computer readable medium comprises:

logic for taking times of flight of position signals from calibration marks on a template attached to a writing surface to a plurality of signal receivers attached to the writing surface, the calibration marks being at known separation distances from each other, and using the times of flight to determine separation distances between the calibration marks and the signal receivers; and logic for using the determined separation distances between the calibration marks and the signal receivers and the known separation distances between the calibration marks to determine separation distances between the signal receivers.

According to this embodiment, the computer readable medium may further include logic for determining the position of the template on the writing surface relative to the signal receivers.

Also according to this embodiment, the template may include one or more control sections at known positions relative to the calibration marks, the computer readable medium further including logic for determining the position of the one or more control sections relative to the signal receivers.

Also according to this embodiment, the template may include a mouse region which serves as a virtual touch pad for the user. In this regard, the user can move the stylus within the mouse region and cause a cursor associated with the system to move. Thus, by moving the stylus within the mouse region, the stylus can serve as a mouse for the system. In this embodiment, the system includes logic for utilizing the movement of the stylus within the system as a mouse.

Also according to this embodiment, the template may include a graffiti region which can recognize handwritten signals, such as graffiti used with the PALM PILOT. In this embodiment, the system includes logic for utilizing the movement of the stylus within the graffiti region and translating that movement into handwritten signals.

In another embodiment, the computer readable medium includes logic for taking times of flight of position signals from calibration marks to signal receivers and using the times of flight to determine separation distances between the signal receivers.

It is noted in regard to methods of the present invention that these methods employ logic and a processor for executing the logic. The logic may be software or firmware and may be stored in any form of computer-readable medium including diskettes, CDs, and hard drives. The logic may also be maintained on a server. The present invention is intended to encompass any device which includes logic for performing any method according to the present invention. The present invention is also intended to encompass any form of computer-readable medium which includes logic for performing any method according to the present invention.

Each of the above methods is preferably performed by a processor. Accordingly, an aspect of the present invention relates to a computer-readable medium, such as a diskette, CD, or hard drive which including instructions to be carried out by a processor for performing the various methods of the present invention. The present invention also relates to a computer, PDA, server, and the like which incorporates logic for performing the various methods of the present invention.

BRIEF DESCRIPTION OF THE DRAWINGS

FIG. 1G illustrates a template with control sections and icons indicating the function correlated with each control section.

FIG. 1J illustrates a source background image and the source background image projected onto a writing surface.

FIG. 4C is a disassembled side view of a stylus including a stylus housing, a door and a stylus.

FIG. 4D is a side view of the stylus illustrated in FIG. 4C assembled.

FIG. 4F is a side view of a cap according to the present invention.

FIG. 4G is a side view of a stylus with a cap in place.

FIG. 4H is a cross section of a stylus coupled with a cap adapted to accommodate a position signal transmitter or receiver.

FIG. 4I is a cross section of a stylus coupled with a cap adapted to accommodate a position signal transmitter or receiver.

FIG. 4J is a cross section of a stylus with a ridge coupled with a cap a cap adapted to accommodate a position signal transmitter or receiver.

FIG. 4K illustrates a stylus embodiment where the stylus electronics are positioned toward a distal end of the stylus adjacent the tip.

FIG. 4L illustrates a stylus embodiment where an elongated writing element is employed which allows the diameter of the stylus to be further reduced.

FIG. 7E is a side view of a detector assembly with a coupling member to which serves as a hardware unit.

FIG. 7F is a top view of a detector assembly with a coupling member which serves as a hardware unit.

FIG. 7G is a top view of a detector assembly capable of adopting two or more configurations.

FIG. 7H is a side view of a detector assembly capable of adopting two or more configurations.

FIG. 7I is a side view of a detector assembly having first and second hinges which permit the detector assembly to adopt two or more configurations.

FIG. 7J is a side view of a detector assembly where a coupling member is constructed from a second member slidably positioned within a first member.

FIG. 7K is a top view of a detector assembly where a coupling member is constructed from a second member is slidably positioned within a first member.

FIG. 7O illustrates a detector with a shielding element which shields a position signal receiver from position signals transmitted from outside a predetermined region extending over about 180 degrees.

FIG. 14 illustrates an implement characteristic data structure used to identify whether an implement is an eraser or a stylus and to identify the characteristics of each stylus.

FIG. 15A illustrates a control section relative to template data structure.

FIG. 15B illustrates a control section relative to detectors data structure.

FIG. 26B also illustrates a user interface which shows an electronically transcribed image of the smiley face.

FIG. 27B illustrates the display toolbar and its operation.

FIG. 27E(1) illustrates the template and the detector assembly on a writing surface.

FIG. 27E(2–4) illustrate a sequence of images displayed on a user interface to allow the transcription to determine the position of the template relative to the detector assembly on the writing surface

DETAILED DESCRIPTION

Transcription System Overview

The present invention relates to a system for recording writing performed on a surface and its components and related methods where the position of a stylus used in the system to write on the surface is tracked using signals. Writing is intended to include the formation or modification of any type of image on a surface by a writing element, including printing, drawing, sketching, erasing and the like. The surface on which the writing is performed may be any surface on which writing may be performed. Examples of suitable surfaces include but are not limited to, whiteboards, blackboards, clipboards, desktops, walls, projection screens, flip chart tablets, and glass panes whether or not covered by a material such as paper, glass, metal, or plastic which can be written upon. The surface is preferably a relatively smooth and relatively flat surface, although it is noted that the surface may have a degree of curvature.

In a system according to the present invention, a stylus including a housing and a writing element is provided. The writing element may optionally be removable from the housing. In one embodiment, the writing element is removed from an end of the housing while in another embodiment the writing element is removable from a side of the stylus housing. Also provided is a detector assembly which may be permanently or removably affixed to a writing surface and is used in combination with the stylus to detect the position of the stylus on the writing surface. Also provided in the system is hardware for controlling when reference and position signals, described herein, are sent between the stylus and the two or more detectors.

The system may also include a processing unit which contains logic and processing capabilities for performing the various calibration and calculation functions necessary to determine the position of the stylus relative to the two or more detectors at multiple times over a period of time that the stylus is used to write. Alternatively, the system may produce signals corresponding to timing data which can be communicated to a processor external to the system for providing positioning data.

Incorporated into the stylus and the plurality of detectors are one or more transmitters and one or more receivers for transmitting and receiving signals between the stylus and detectors. Used in combination, the one or more transmitters and one or more receivers determine a separation between the stylus and the plurality of detectors based on a time of flight of the signals between them which can be used to determine a positioning of the stylus. As will be discussed in greater detail below, a variety of ranging media can be used in the system including, for example, ultrasound and radar, such as MIR.

Figure 1A:
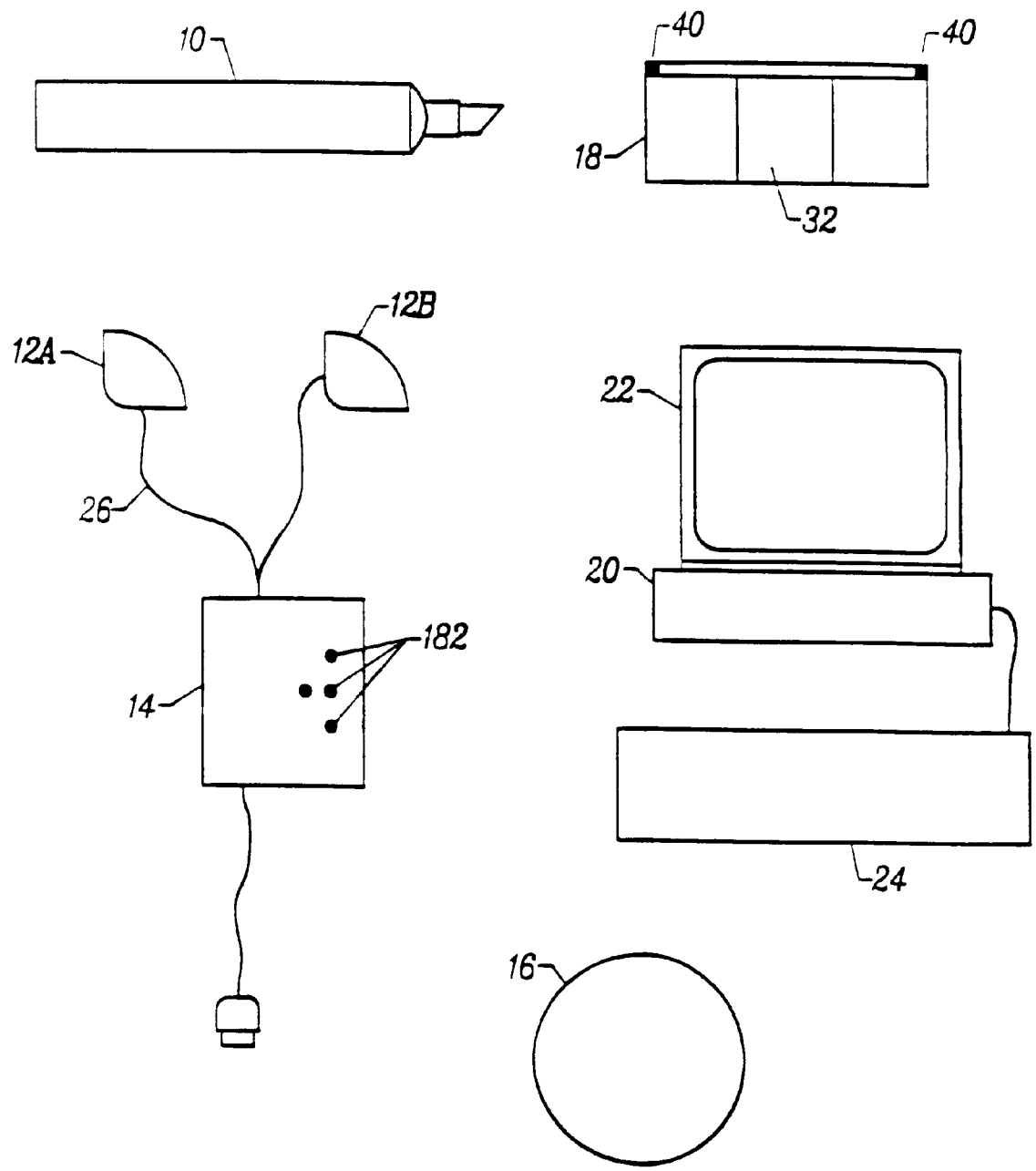
FIG. 1A illustrates several components of a transcription system.

FIG. 1A illustrates one embodiment of a transcription system according to the present invention. As illustrated, the system includes a stylus 10, a first detector 12A, a second detector 12B and a hardware unit 14. As illustrated, the system can optionally include an eraser 16, template 18, processing unit 20, monitor 22 and user interface 24. The user interface can be typical devices which allow users to interact with processing unit, hardware controllers and other processor based systems. For instance, the user interface can include a keyboard, and/or a mouse or even a touchpad imposed on the monitor 22.

Signals from the first detector 12A and the second detector 12B may be transmitted to the hardware unit 14 through a wire 26. These signals may be electrical or optical in nature. The signals can also be transmitted wirelessly to the hardware unit 14, for example through a form of electromagnetic radiation. As will be explained below, the system can also be designed such that signals are transmitted from the stylus 10 or the eraser 16 to the hardware unit 14. Suitable wires for transmitting the signals include cables similar to the cables used for standard telephone to jack connections. The detectors 12A, 12B and the hardware unit 14 can include ports which receive the cables which can be easily withdrawn from the ports.

Figure 1B:
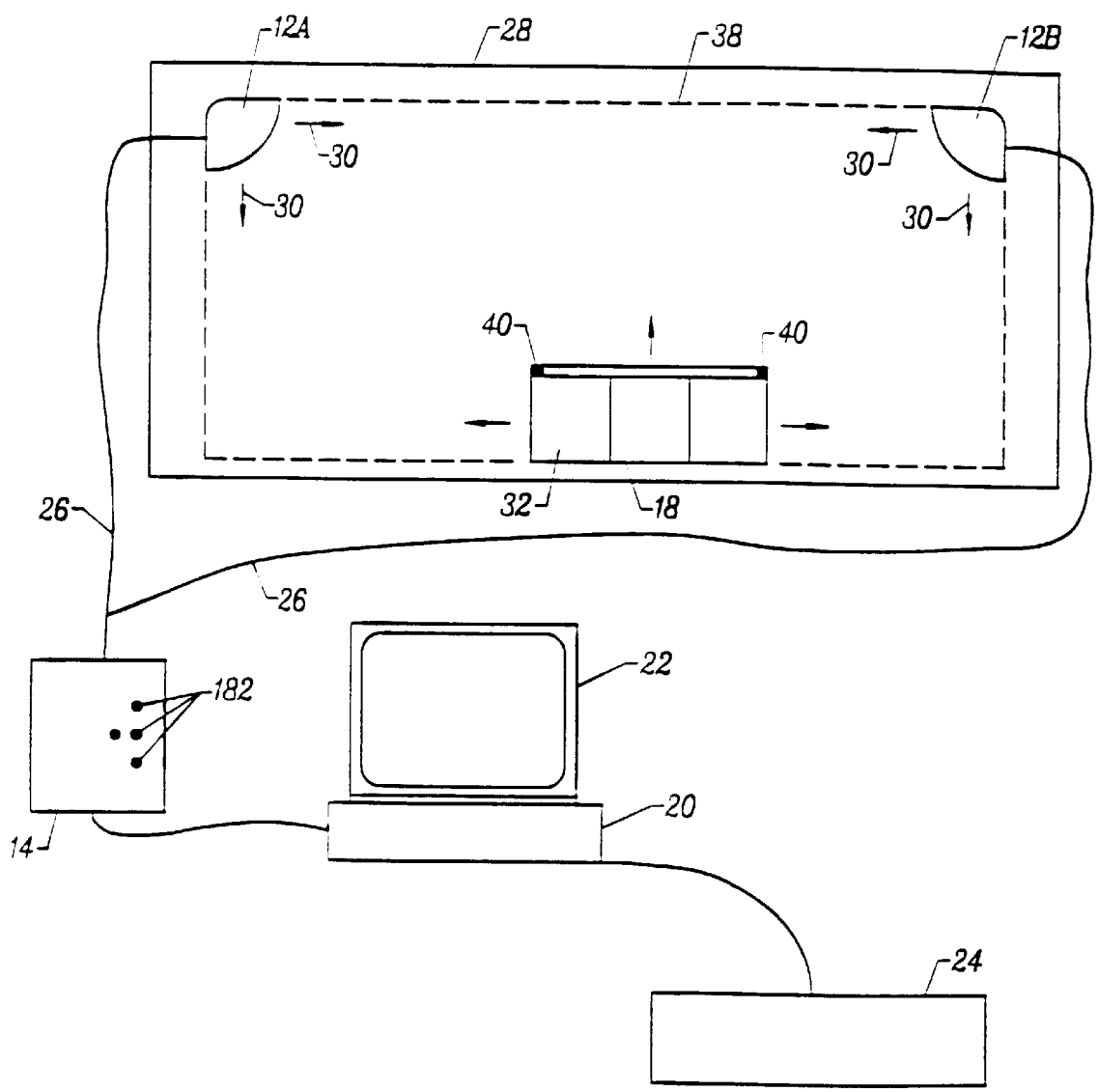
FIG. 1B illustrates installation of the transcription system.

FIG. 1B illustrates how the transcription system illustrated in FIG. 1A may be installed relative to a writing surface 28. The first detector 12A and the second detector 12B are removably coupled to the writing surface 28. As illustrated by the arrows 30, the first detector 12A and second detector 12B can be placed anywhere on the writing surface 28. However, it is generally preferred that the first detector 12A and the second detector 12B be positioned adjacent an edge of the writing surface 28. It is also noted that the first detector 12A and the second detector 12B may optionally be permanently attached to the writing surface 28.

As illustrated in FIGS. 1A through 1E, a template 18 positioned on or adjacent to the writing surface can be used to control the transcription system using a stylus adjacent the writing surface. As illustrated, the template 18 includes markings which define the perimeter of several control sections 32. The control sections on the template 18 can be used to initiate functions which are carried out by the hardware unit 14 and/or the processing unit 20. An advantage of the template is that it allows the user to control the monitor image 34 and the transcription system through the template as opposed to the user interface 24.

Examples of functions that can be associated with a control section include, but are not limited to, causing the current monitor image 34 to be saved; causing the current monitor image 34 to be saved and moved to the background while a new monitor image area 36 is brought to the foreground for the creation of a new monitor image 34; causing the current monitor image 34 to be moved to the background while a new monitor image area 36 is brought to the foreground for the creation of a new monitor image 34; causing a copy of the current monitor image to be saved in the background while the current monitor image remains in the foreground for any additional adjustments; causing the entire monitor image 34 to be erased while retaining the current monitor image area 36 in the foreground; bringing a new monitor image area 36 into the foreground; maximizing the size of the current monitor image area 36 to fill the available space on the monitor; bringing the last monitor image area 36 to the foreground when another program was last used in the foreground; initiating calibration or recalibration of the transcription system; enabling or disabling selected functions; changing or selecting the color of particular strokes on the monitor image 34 or changing the particular color correlated with a particular stylus 10; faxing the monitor image 34; E-mailing the monitor image 34; and/or printing the monitor image 34.

In one embodiment, the template includes a mouse region which serves as a virtual touch pad for the user. In this regard, the user can move the stylus within the mouse region and cause a cursor associated with the system to move. Thus, by moving the stylus within the mouse region, the stylus can serve as a mouse for the system. In this embodiment, the system includes logic for utilizing the movement of the stylus within the system as a mouse.

In another embodiment, the template includes a graffiti region which can recognize handwritten signals, such as graffiti used with the PALM PILOT. In this embodiment, the system includes logic for utilizing the movement of the stylus within the graffiti system and translating that movement into handwritten signals.

A background image can also be positioned on the writing surface. Alternatively, the background image may be projected onto or printed onto the writing surface itself. In a sense, the background image serves as a template for forming a composite image comprising a combination of the written image and the background image. One or more control sections can be used in combination with the background image in order to align the positioning of the written image relative to the background image so that the composite image recorded by the system is substantially the same as the composite image formed on the writing surface by the user.

The background image may include a blank form of a computer application, such as an EXCEL spreadsheet or a POWERPOINT slide. As a result, writing within the blank form causes entries to be entered into the corresponding locations in the computer program as they appear on the background image. The background image can also be graphics, such as a webpage, where the user writes on the writing surface and thereby edits the graphics by forming a composite image.

The control sections 32 can also be used to control the various functions of other programs. For instance, during a presentation to a group, the transcription system can be used simultaneously with other programs such as POWER POINT. For example, positioning the writing portion of the stylus within a particular control section 32 can cause POWER POINT to move to the next slide or display. Similarly, positioning the writing portion of the stylus within a different section 32 can cause POWER POINT to move to the previous slide or display. As a result, a user can scroll through the slides of a presentation and capture any notes the user makes on a writing surface 28 during the presentation. In this regard, the template can also function as a remote control or mouse for the system for various computer applications.

As can be seen from the above illustrative list of how a template can be used, a wide variety of additional system functions can be envisioned and are intended to fall within the scope of the present invention. The various control sections of the template can be defined with different colored sections of the template 18 or outlined sections of the template 18.

Templates used with the system can be selected from a series of different templates stored into memory which are recognized by the transcription system. In use, the system is instructed as to which template has been selected. Optionally, the template may be selected by printing the template out from memory. Once selected, the template is placed adjacent the writing surface.

Templates may also be user defined. In one variation, a template is user defined within a program employed with the system. The user defined template is then printed out and the system is instructed that template will be used. In another variation, a template is user defined by drawing the template on the writing surface in combination with instructing a program employed with the system that the template being drawn is to be used. Predetermined control signal images, in combination with handwriting recognition can be used to assist the system in reading the template into memory that is drawn on the writing surface.

The template 18 can be constructed from any material suitable for attaching to a flat surface such as a piece of paper on which a template has been printed and a thin plastic sheet which can attach itself to the writing surface 28 via static cling. A feature of the present invention is that the template may be devoid of electronic circuitry and need not receive or transmit any signals.

When a template is employed, the template is preferably positioned at a distance from the first detector and the second detector. For example, in FIG. 1A the template 18 is illustrated as being positioned on an opposite side of a writing area 38 relative to the first detector 12A and the second detector 12B. Where possible, the template 18 is more preferably positioned approximately equidistant from each of the first detector 12A and the second detector 12B on the opposite side of the writing area 38 from the first detector 12A and the second detector 12B. Although the template 18 is shown to be removably attachable to the writing surface 28, it is noted that the template 18 may optionally be permanently attached to the writing surface 28.

In one embodiment, the transcription system is readily attachable to and detachable from different writing surfaces 28. Detachability enables the transcription system to be portable and to be used with different writing surfaces 28 and with different sized writing surfaces 28. It is noted that attachment to a writing surface is intended to encompass attachment adjacent to a writing surface.

As will be explained below, when the transcription system is used with different writing surfaces 28, it may be necessary to calibrate the system. During calibration, the distance between the detectors, L, can be determined. In some embodiments of the system, the dimensions of the writing area 38 are determined including the writing area width, W; the writing area height, H; and the diagonal distance of the writing area, D. In other embodiments, the position of the template 18 is determined during the calibration.

Some embodiments of the system are self-calibrating, for example when the distance between detectors is fixed. In other embodiments, the system needs to be calibrated by the user. A variety of different calibration methods have been developed which optionally include entering information into the user interface 24 and/or by the user following a series of computer prompts.

Figure 1C:
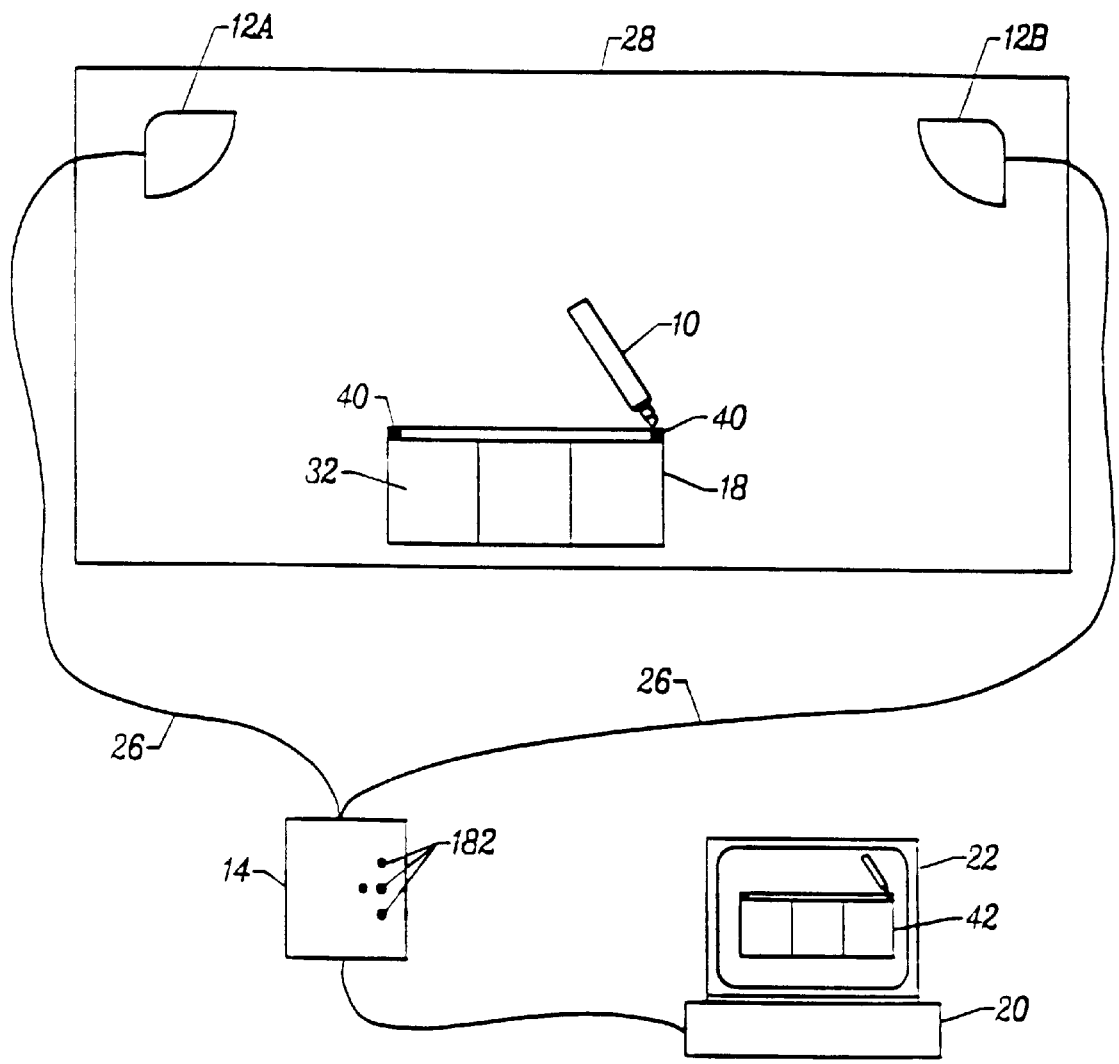
FIG. 1C illustrates calibration of a transcription system.

FIG. 1C illustrates an example of a system which is calibrated by the user following a series of computer prompts. As illustrated, during the calibration, the user contacts one or more different calibration marks 40 on the template 18 with the stylus 10. The calibration marks 40 can be positioned on the template 18 as illustrated. The calibration marks 40 can also be positioned on one or both the detectors 12A, 12B.

To prompt the user, the processing unit 20 may optionally produce an image on the monitor 22. For instance, the processing unit 20 can create a template image 42 on the monitor 22 as illustrated in FIG. 1C. An image of a stylus can be shown contacting a calibration mark 40 of the template image 42. In response, the user contacts the stylus 10 with the calibration mark 40 on the template 18 as illustrated. In another embodiment, the processing unit 20 can create an image of a stylus contacting a calibration mark 40 on an image of a detector. In response, the user contacts a calibration mark 40 on the first detector 12A. The transcription system will be calibrated after the user follows each prompt provided by the processing unit 20. Because the transcription system is easily calibrated by the user, the transcription system is readily usable with different sized writing surfaces 28.

Figure 1D:
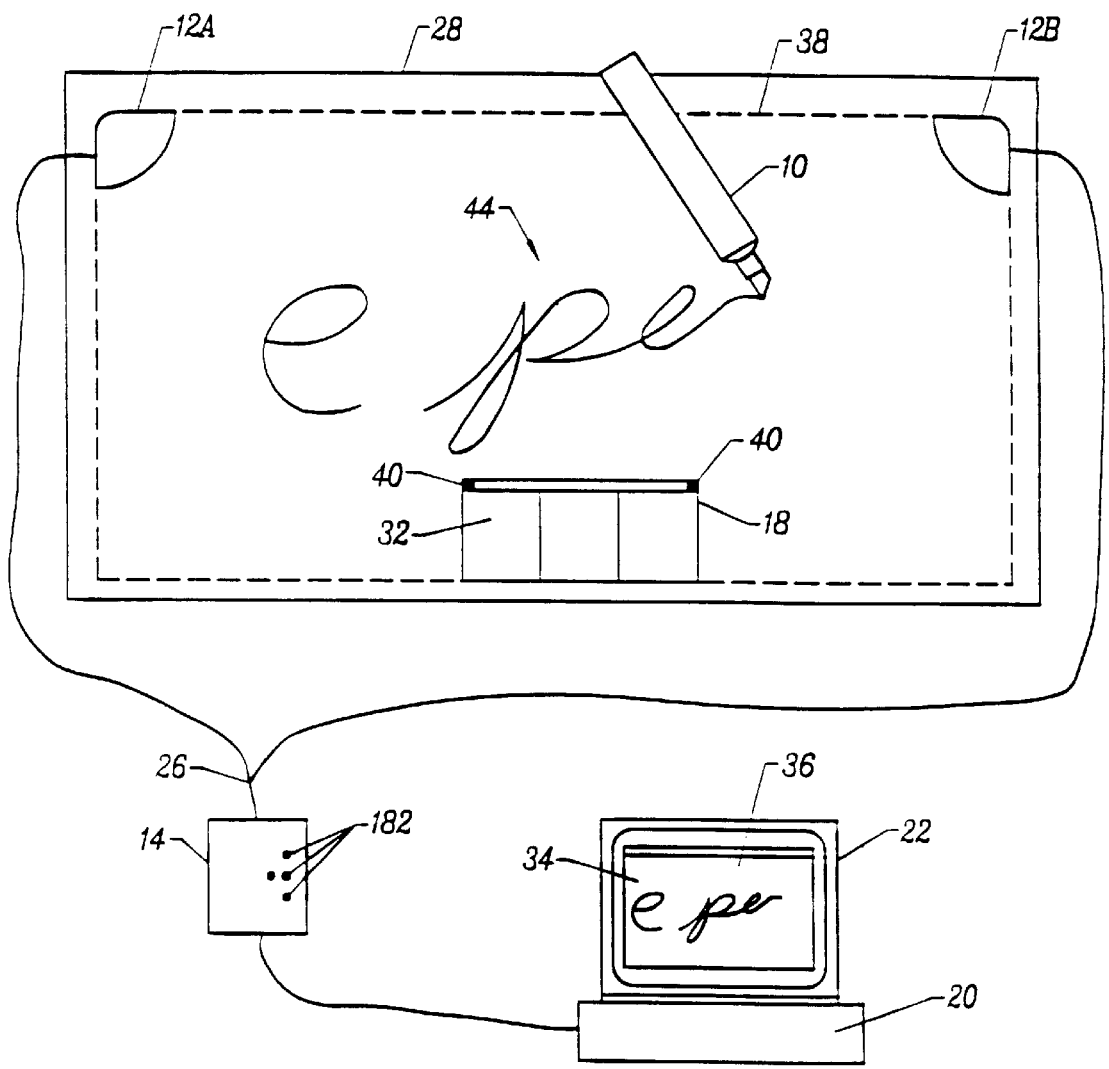
FIG. 1D illustrates operation of a transcription system.
Figure 1E:
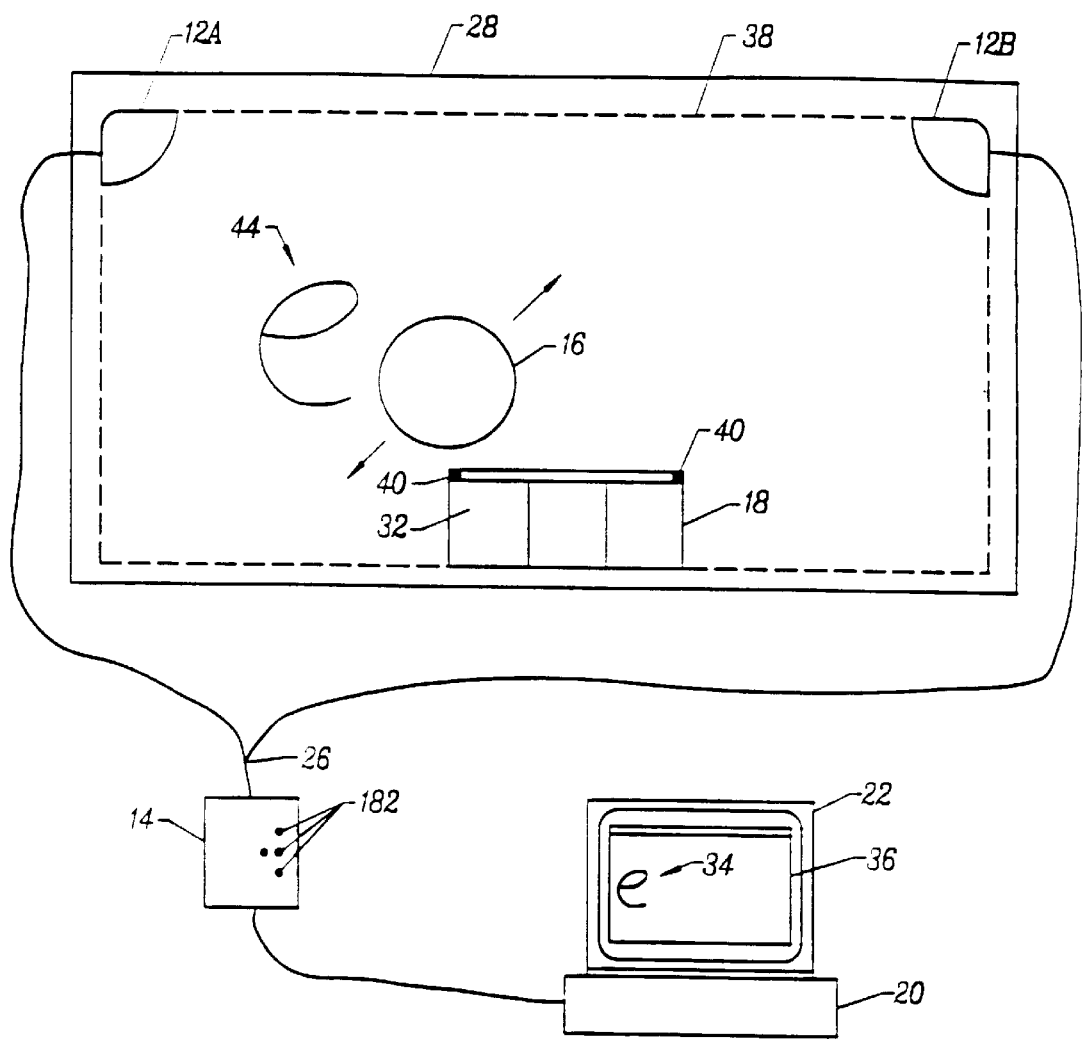
FIG. 1E illustrates operation of an eraser which can be used with a transcription system.

After the transcription system has been calibrated, the system is generally ready for use, As illustrated in FIG. 1D, the user can write in the writing area 38 with the stylus 10. While the user is creating an image in the writing area 38, a similar image appears in a monitor image area 36 of the monitor 22. The image in the writing area 38 is referred to as the written image 44 and the image on the monitor 22 is referred to as the monitor image 34. As illustrated in FIG. 1E, the written image 44 can also be erased using an eraser 16. The monitor image 34 is erased as the written image 44 is erased using the eraser 16.

Optionally, the system is periodically recalibrated during operation to account for temperature changes adjacent the writing surface. Changes in temperature can occur, for example, due to a change in whether sunlight is impacting upon the writing surface (e.g., opening or closing blinds, passage of time). These temperature changes can alter the speed at which position signals travel. Measurement of temperature can be used to detect these temperature changes and recalibrate the system accordingly. In one variation, a method is providing for correcting for the effect of temperature on the speed of ultrasound signals in the transcription system comprising measuring a temperature adjacent a writing surface where an ultrasound transcription system is being employed; and adjusting time of flight calculations using the measured temperature adjacent the writing surface. This method may be employed in combination with any other calibration method.

The monitor image 34 can be stored for later editing and manipulation or can be converted to a number of electronic and digital document formats including, but not limited to, fax, e-mail, word processing programs such as WORD and WORDPERFECT, graphic presentation and preparation programs such as POWERPOINT, VISIO and design programs such as AUTOCAD. The monitor image can also be communicated in real time to remote users via a network, the INTERNET, phone lines or other communication media. The monitor image can also be projected either where the written image is being formed or in a remote location. In one embodiment, sound present in the location where the written image is being formed and modified is stored and/or communicated in combination with the monitor image.

Figure 1F:
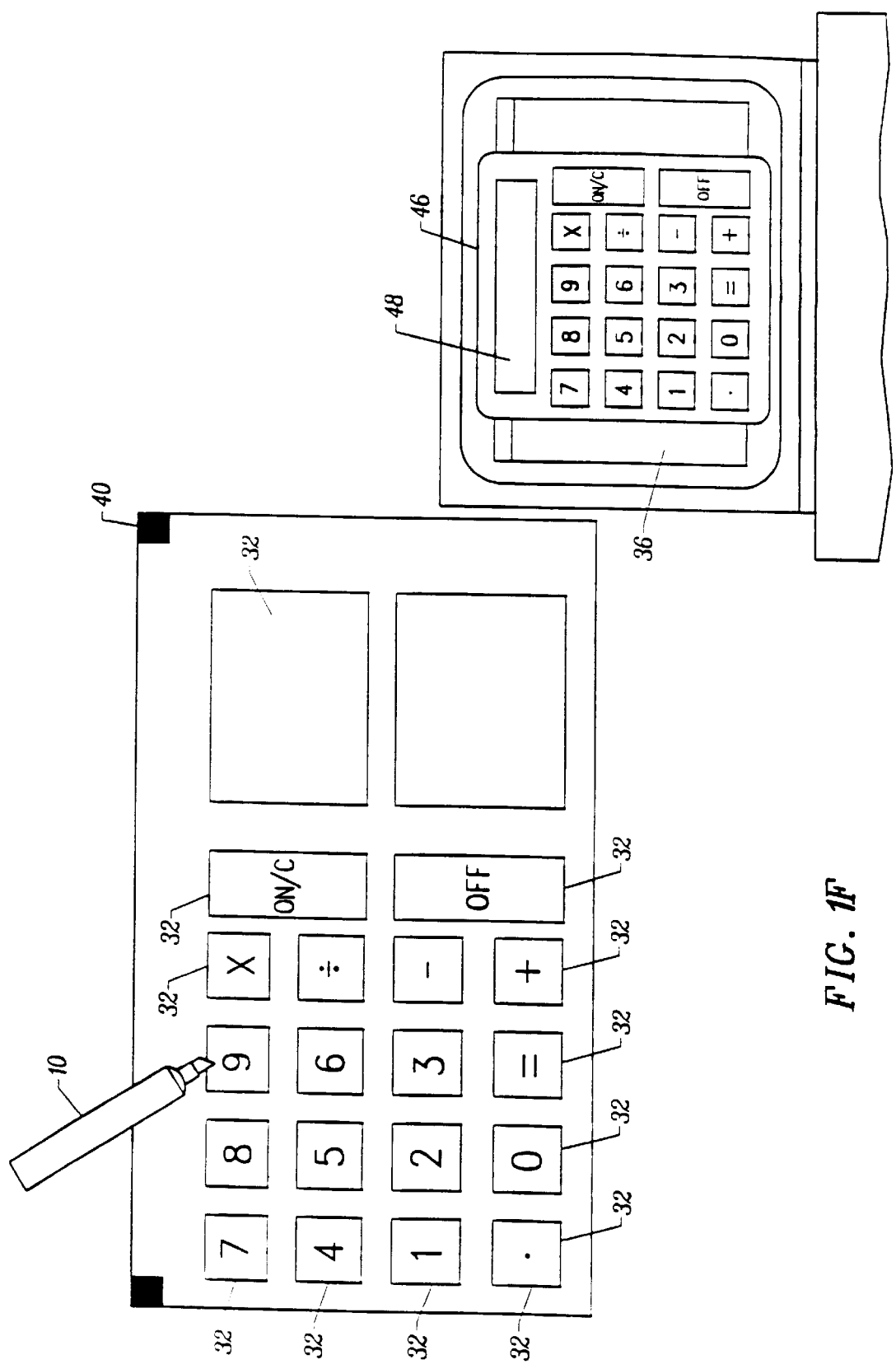
FIG. 1F illustrates operation of a template having control sections corresponding to the key pad of a calculator.
Figure 1C:
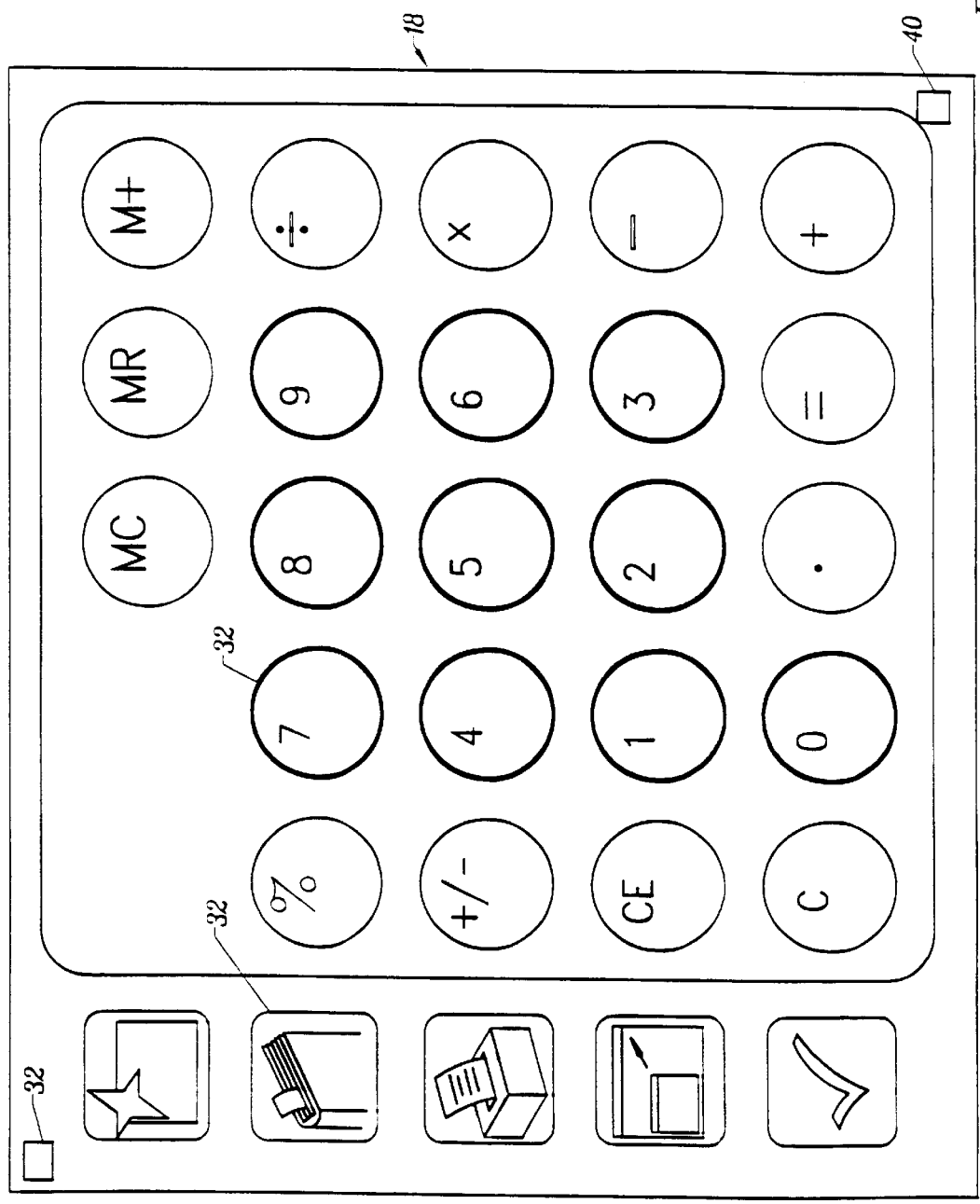

FIG. 1F illustrates one embodiment of a template 18 which includes control sections 32 which correlate to the keys on a calculator keypad. The template 18 includes a plurality of control sections 32 corresponding to the keys on a calculator. Additional control sections 32 corresponding to keys available on calculators but not illustrated in FIG. 1F are also contemplated for inclusion on the template 18. Further, control sections available on PC keyboards and/or personal digital assistants (PDAs), but not illustrated in FIG. 1F, may also be included on the template 18. Also illustrated in FIG. 1F is a calculator image 46 displayed on the monitor 22. The calculator image 46 can be similar to the calculator images commonly available in PC software. The calculator image 46 includes a display 48 where information is displayed to the user. The calculator image 46 can also optionally include a keypad with keys which are correlated to the control sections 32 included on the template 18. The number and type of keys on the keypad can also differ from the control sections 32 included on the template 18.

The control sections 32 can be used to control the display 48 on the calculator image 46. Specifically, positioning the stylus in a control section 32 causes the processing unit 20 and/or the hardware unit 14 to carry out a function associated with the control section 32. For instance, positioning the stylus 10 in the numerical control section 32 indicating the number 9 causes a number nine to appear in the display 48. As a result, the control sections 32 on the template 18 can be used as the keypad of a calculator and the display 48 on the calculator image 46 can be used as the display 48 of the calculator.

The user interface 24 can be used to control the display 48 on the to calculator image 46. For instance, if the user interface includes a keyboard which is typically used with a PC, the keys on the keyboard can be used to control the display 48 on the calculator image 46. For instance, pressing the number 2 on the keyboard can cause the number 2 to appear in the display 48. Further, if the user interface includes a mouse or other cursor control device, the cursor can be aligned with the keys illustrated on the calculator image 46. Clicking the mouse while the cursor is aligned with a particular key causes the function associated with that key to occur.

The calculator image 46 can include keys which do not correspond to any of the control sections 32 on the template 18. These keys can perform functions which are not performed by positioning the stylus within any of the control sections on the template 18. As described, the keys can be activated with a typical user interface.

The calculator image 46 need not always be visible to the user. For instance, the calculator image 46 can be manually called up onto the monitor 22 by positioning the stylus in the function control section 32 labeled "ON/C". The calculator image 46 can also be automatically called up on the monitor 22 when the stylus is positioned in control sections 32 corresponding to the calculator functions other than the functional control section 32 labeled "OFF". The calculator image 46 can be automatically withdrawn from the monitor 22 after a pre-determined period of time has elapsed. The calculator image 46 can also be manually withdrawn from the monitor 22 by positioning the stylus in the function control section 32 labeled "OFF".

When the calculator image 46 is called up, the calculator image 46 can to replace the monitor image area 36 on the monitor 22 or can appear over the monitor image area 36 as illustrated in FIG. 1F. When the calculator image 46 appears over the monitor image area 36, the user can switch between the monitor image area 36 and the calculator image 46 by using a user interface 24 such as a mouse to position a cursor on the calculator image 46 or the monitor image area 36. As is known in Windows technology, when the cursor is positioned on the calculator image 46, the calculator image 46 will be moved to the front so it is in full view. Similarly, when the cursor is positioned on the monitor image area 36, the monitor image area 36 will be moved to the front so it is in full view.

It is noted that the image being formed on the writing surface may be simultaneously projected onto the same or a different surface, for example on an adjacent projectable surface, onto the writing surface (front or rear projection) or in a remote location. In this regard, the use of the template as a calculator as described above also allows the user to project a calculator onto an adjacent projectable surface and perform calculations without the user having to move away from the writing surface.

While the template is described above in terms of having calculator functions, it has already been noted that the template may perform a wide variety of functions and thus serve as a remote control device or user interface for the user. This enables the user to operate various applications, such as the calculator described above, or a web browser (e.g., to locate bookmarks, go back and forth between screen) without having to move away from the writing surface using the stylus and the template and display images of that application. This allows the user to readily transition between using the writing surface and the stylus as a transcription system and using a template and the stylus as a user interface for a variety of programs.

The hardware unit 14 or the processing unit 20 can optionally include a voice synthesizer which audibly describes the functions performed as the stylus is positioned in a control section 32. For instance, when the stylus is positioned in the control section 32 labeled "2", the voice synthesizer can audibly announce "two". When the stylus is positioned in the control section 32 labeled "+", the voice synthesizer can audibly announce "plus". Further, when the stylus is positioned in the control section 32 labeled "=", the voice synthesizer can announce "equals" and the result. For instance, if the stylus is sequentially positioned in the control sections 32 labeled "1", "2", "x", ".", "0", "0", "3" and "=", the voice synthesizer would provide "one", "two", "times", "point", "zero", "zero", "three", "equals", "zero", "point", "zero", "three", "six". As a result, the voice synthesizer can eliminate the need for a monitor 22 and a calculator image 46.

Further, the display 48 can also be included on the hardware unit 14. For instance, the hardware unit 14 can include a liquid crystal or LED display as are commonly available in calculators. The display can then be controlled by positioning the stylus in the control sections on the template 18 or by activating control switches on the hardware unit.

FIG. 1G illustrates another embodiment of a template 18 which is suitable for use with the transcription system. Although the previously illustrated control sections 32 are square or rectangular, the control sections can have shapes including, but not limited to, triangular, elliptical, octagonal, hexagonal and round as is illustrated in FIG. 1G. FIG. 1G also illustrates the control sections 32 including icons or text which indicate to the user the function that will be performed by positioning the writing portion of the stylus within the perimeter of one of the control sections. Although the previously illustrated calibration marks are illustrated as being positioned along one edge of the template 18, the calibration marks can be positioned anywhere on a template. Preferably, the calibration marks 40 are positioned with a maximum displacement between the calibration marks. As a result, the calibration marks can be positioned in opposing corners of the template 18 as illustrated in FIG. 1G.

Figure 1H:
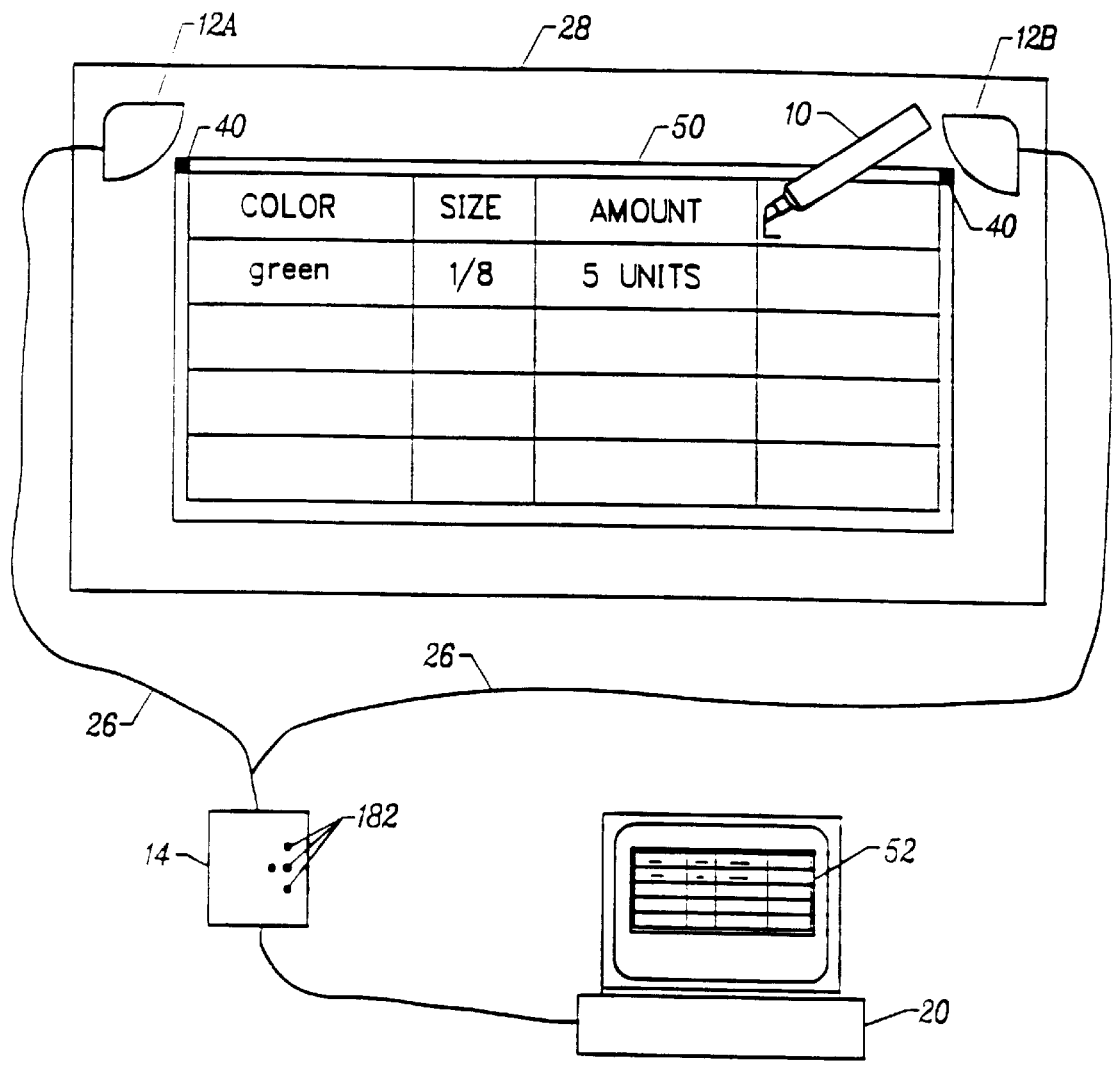
FIG. 1H illustrates a stylus creating a written image on a writing surface containing a background image to form a composite image while the same composite image is being formed on the monitor.

As illustrated in FIG. 1H, the writing surface 28 can also include a background image 50 which is either printed onto the writing surface or positioned over the writing surface. Alternatively, the background image 50 can be projected onto the writing surface. Since the writing surface can be constructed from transparent materials such as glass or plastic, the background image 50 can be projected onto the surface from either behind or in front of the writing surface. Suitable forms for the background image 50 include, but are not limited to, a spreadsheet as illustrated in FIG. 1H, blueprints, handwritten or typewritten text, notes, graphs, graphics, etc. The background image 50 can be placed on a material which is physically attached to surface and used as the writing surface. Examples of materials on which a background image 50 may appear include paper, plastic sheets and other materials which can be written upon. The background image 50 can also be an image which is projected onto a writing surface 28. For instance, the background image 50 can be an image projected onto the writing surface 28 from a front or rear projection system (e.g., a reflective or transmissive display).

As illustrated in FIG. 1H, when a background image 50 is used on the writing surface 28, writing on the writing surface in combination with the background image 50 forms a composite image 52 which appears on the monitor 22. The system can be calibrated so strokes written on the writing surface 28 are properly positioned relative to the background image 50 in the composite image 52 that is formed. For instance, when the background image 50 includes an image of a spreadsheet, an image written into a particular cell of the background image 50 appears in the same cells on the composite image 52 as illustrated in FIG. 1H.

The background image 50 and the image upon the background image 50 can be created with the processing unit 20, monitor 22 and user interface 24. For instance, the image for the background image 50 can be a spreadsheet created with a program such as EXCEL. Other images for the background image 50 can be created with graphics programs such as VISIO, CAD programs, or other programs used to make documents. The image for the background image 50 can also be externally created. For instance, the image for the background image 50 can be blueprints which are scanned into the processing unit 20 via a scanner.

The system can include logic for converting the image for the background image 50 to an Image file. During conversion to the Image file, the logic adds calibration marks 40 to the image for the background image 50. The Image file can then be printed on a conventional printer or on a printer which can print enlarged size sheets.

The background image 50 can be printed on paper or on a transparency suitable for projection from an overhead. A printed background image 50 can also be converted to a form suitable for projection such as a transparency for an overhead projector or a slide for a slide projector.

Once the background image 50 is positioned on the writing surface, a background image calibration may be required in order to determine the position of the background image 50 relative to the detectors 12A, 12B. To initiate the background image calibration, the user notifies the system that a particular background image 50 will be used in combination with a writing surface 28. Once the system is notified, the user is prompted to place the stylus in contact with one or more calibration marks 40 having a predetermined physical relationship to the background image 50. Contacting the calibration marks 40 with the stylus serves to identify the position of the background image 50 relative to the detectors 12A, 12B. Because the position of the stylus is also measured relative to the detectors, contacting the calibration marks 40 with the stylus permits a determination of the position of the stylus 10 relative to the background image.

Figure 1I:
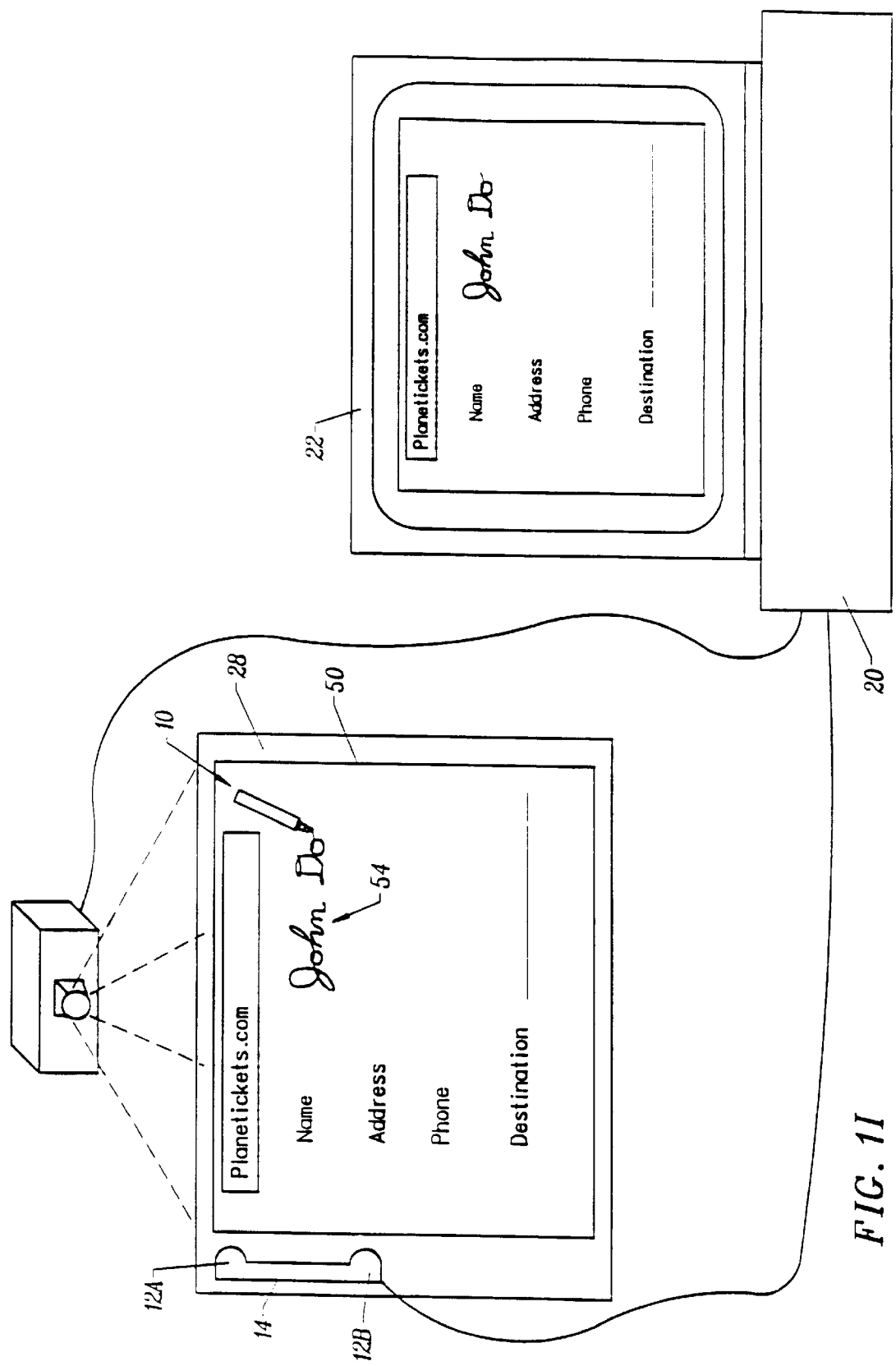
FIG. 1I illustrates a composite image comprising an image of a webpage projected onto a writing surface and writing on the writing surface in combination with the composite image being displayed on a monitor and projected on a separate surface.

In one embodiment of using a background image, illustrated in FIG. 1I, a background image 50, such as an image from a webpage, is projected onto a writing surface 28 (illustrated as a rear projection). Writing 54 is made by writing on the writing surface 28 with stylus 10, forming a composite image comprising the projected background image 50 and the writing 54. The composite image 52 of the projected background image 50 and the writing made on the writing surface can be displayed on a monitor 22, stored into memory, and/or projected in another location. As can be seen from this embodiment, a variety of composite images can be formed which allow for graphic presentations to simultaneously created, updated, and displayed to one or more remote locations.

In one embodiment, the stylus 10 is used as a mouse rather than as a writing instrument. In this case, stylus 10 is used to perform control functions, such as navigating a web page.

In another embodiment, a background image is front-projected onto a writing surface. When a background image is front-projected onto a surface at an angle with respect to the writing surface, the image may appear distorted on the writing surface. Consequently, the composite image displayed on a monitor screen may be inaccurate, or in the case of a stylus being used as a mouse, the mouse may not function properly. In this situation, it may be necessary to calibrate the system to compensate for the distortion effect.

FIG. 1J illustrates an undistorted background image 39 as it would appear, for example, on a computer monitor. FIG. 1J also illustrates a distorted front-projected image 31. The projected image 31, which is projected onto writing surface 29, exhibits a keystone effect in which the image 39 is changed from having a substantially square outline to having an arbitrary quadrilateral outline. The projected image 31 is also rotated. One effect of the distortion is that the coordinate system 33 of the projected image 31 and the coordinate system 35 writing surface 29 do not coincide. If the effect is sufficiently exaggerated, the position of stylus 10 with respect to the detectors 12A and 12B will not reflect the position of the stylus on the undistorted image 39 with respect to the detectors 12A and 12B. In this case, the composite image 52 displayed on the monitor 22 will not be the same as the composite image viewed on the writing surface 29. If stylus 10 is used as a mouse, the mouse may not operate properly in this situation.

In one embodiment, the distortion effect shown by the projected image 31 may be compensated for by performing an initial calibration so that the system operates correctly with front projection of a background image. The projected image 31 is an example of an initial calibration background image that includes nine calibration points 37. Because the projected image 31 is distorted with respect to the writing surface 29, the coordinate system 33 of the projected image 31, $(x_i, y_i)$ does not coincide with the coordinate system 35 of the writing surface 29, $(x_s, y_s)$.

According to the calibration method of one embodiment, nine calibration points 37 are found with corresponding values in both cordinate system 33 and coordinate system 35. The two coordinate systems are then related with a second-order surface equation computed from the nine calibration points 37. Once the second-order surface equation is developed, projected image points in coordinate system 33 are computed from stylus points in coordinate system 35 using the equation.

Calibration

The user is prompted to touch the stylus 10 to each calibration point 37. This yields points $$\begin{bmatrix} x_{in} \\ y_{in} \end{bmatrix} = \begin{bmatrix} x_{sn} \\ y_{sn} \end{bmatrix}$$

for n=1–9. A second-order surface terms vector function $$Q(x, y) = \begin{bmatrix} x \\ x^2 \\ y \\ y^2 \\ xy \\ x^2 y \\ xy^2 \\ x^2 y^2 \\ 1 \end{bmatrix}$$

can then be computed for the surface portion $(x_s, y_s)$ of each calibration point 37.

The following linear equation can then be solved to compute Tx. The process is repeated using the Y image calibration vector to compute Ty. Tx and Ty are stored and calibration is complete.

$$\begin{matrix} \text{X Image} & & \text{X Translation} \\ \text{Calibration} & & \text{Vector} \\ \text{Vector} & & T_x \end{matrix}$$

$$\begin{bmatrix} x_{i1} \\ x_{i2} \\ x_{i3} \\ x_{i4} \\ x_{i5} \\ x_{i6} \\ x_{i7} \\ x_{i8} \\ x_{i9} \end{bmatrix} = \begin{bmatrix} - & Q(x_{s1}, y_{s1})^T & - \\ - & Q(x_{s2}, y_{s2})^T & - \\ - & Q(x_{s3}, y_{s3})^T & - \\ - & Q(x_{s4}, y_{s4})^T & - \\ - & Q(x_{s5}, y_{s5})^T & - \\ - & Q(x_{s6}, y_{s6})^T & - \\ - & Q(x_{s7}, y_{s7})^T & - \\ - & Q(x_{s8}, y_{s8})^T & - \\ - & Q(x_{s9}, y_{s9})^T & - \end{bmatrix} \begin{bmatrix} A_x \\ B_x \\ C_x \\ D_x \\ E_x \\ F_x \\ G_x \\ H_x \\ I_x \end{bmatrix}$$

Figure 1K:
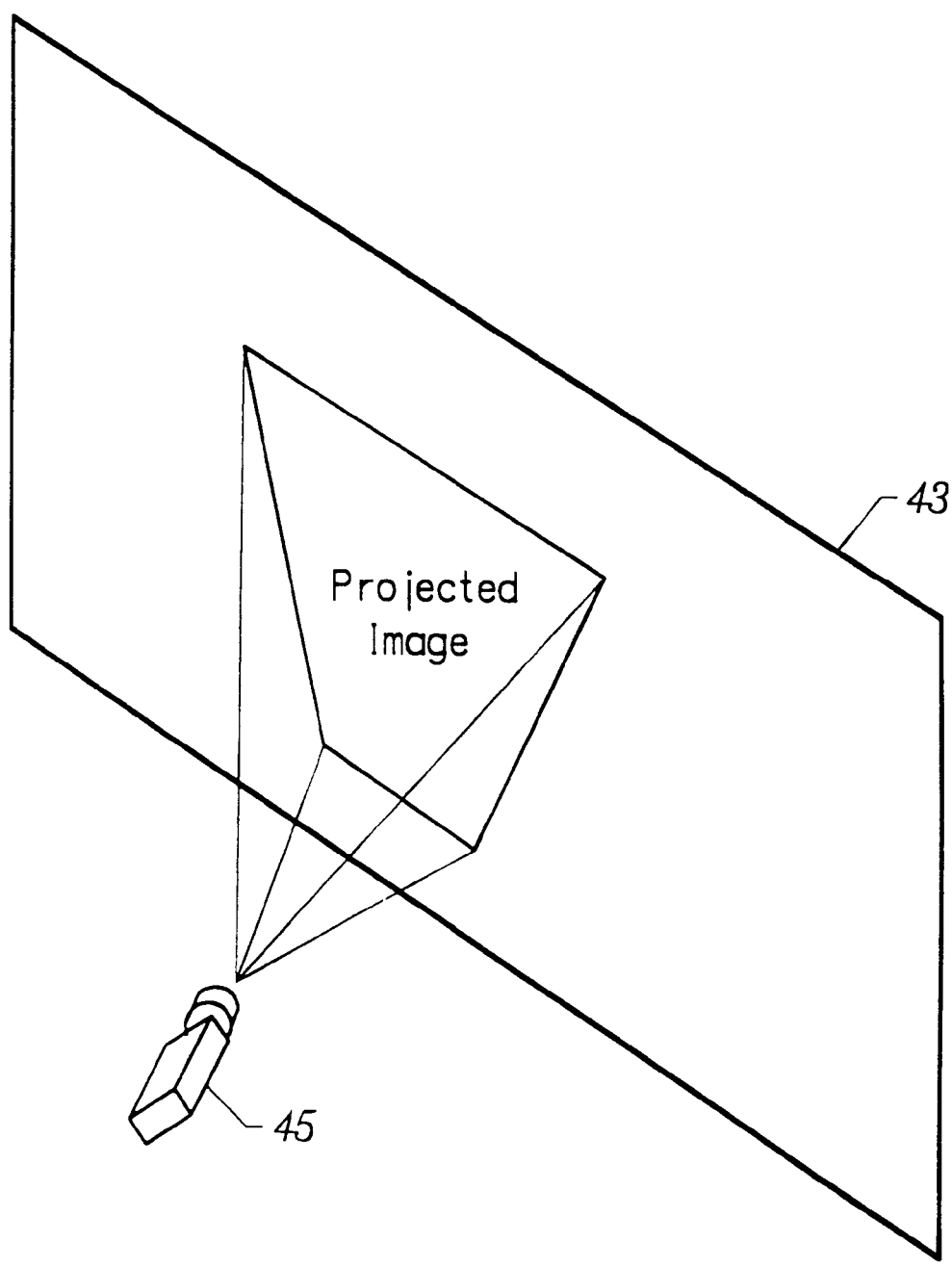
FIG. 1K illustrates a keystone effect in a background image projected onto a writing surface.

The accuracy of calibration depends upon several factors, but generally accuracy decreases as keystoning effect increases. FIG. 1K shows a keystoning 53 effect caused by alignment of the projector 45 with the writing surface 43. If the alignment is not completely true, the projected image takes on a keystone shape as shown.

Figure 1L:
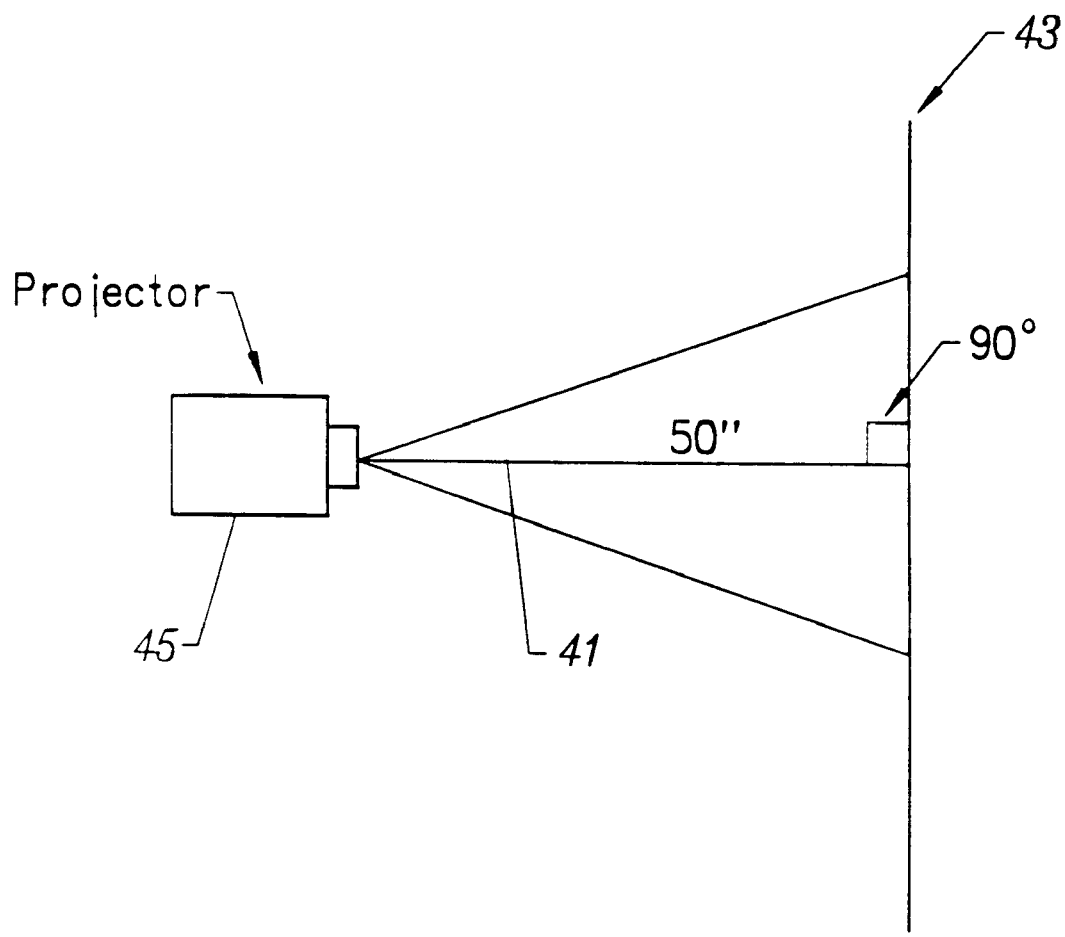
FIG. 1L illustrates an orientation of a projector projecting a background image onto a writing surface.
Figure 1M:
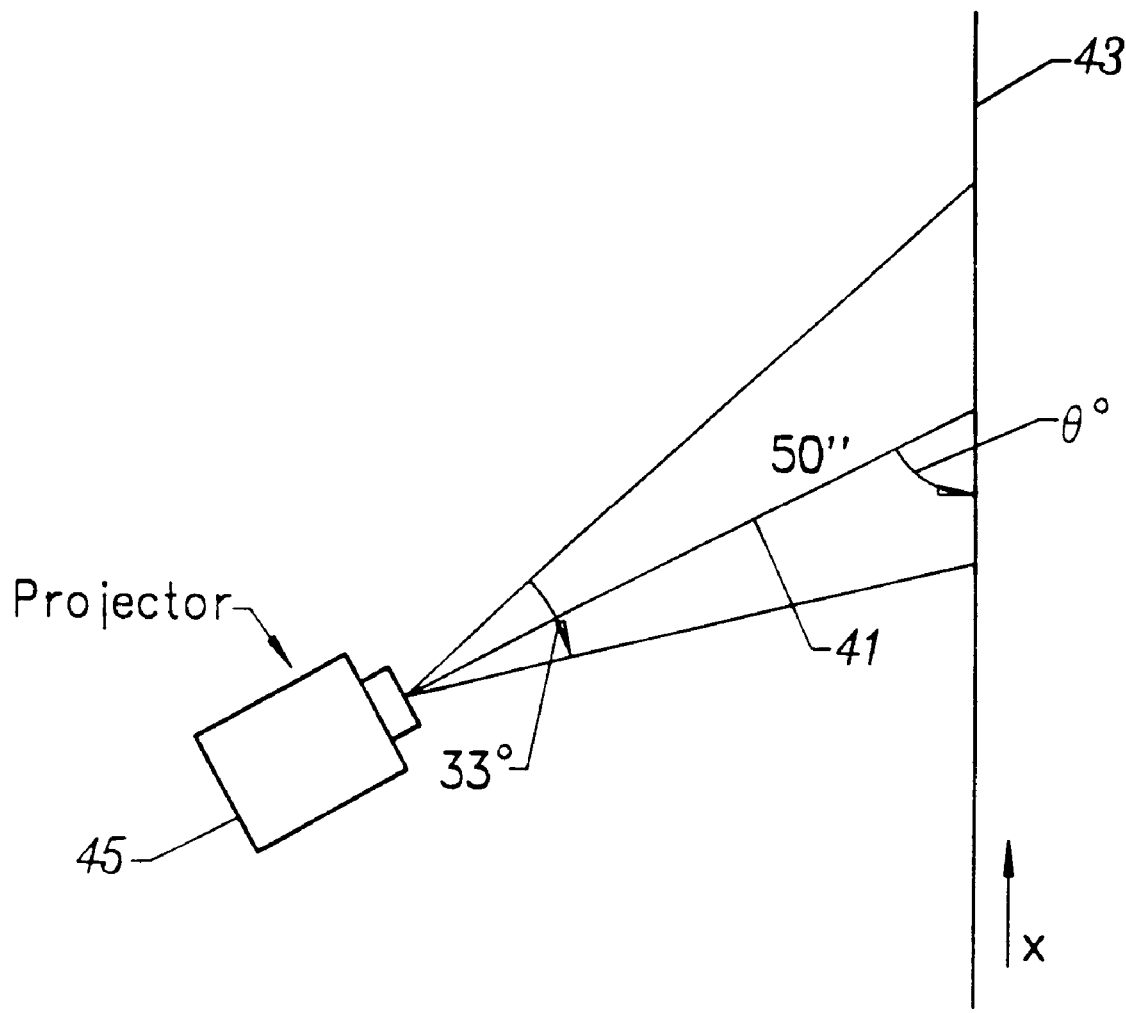
FIG. 1M illustrates an orientation of a projector projecting a background image onto a writing surface.

FIG. 1L shows a top view of projector 45 and writing surface 43. FIG. 1L shows an image being projected at 90 degree horizontal angle. The distance 41 from the projector to the writing surface is 50 inches. FIG. 1M shows a side view of the projected 45 and the writing surface 43. The vertical angle theta between the projector and the writing surface is 33 degrees.

Figure 1N:
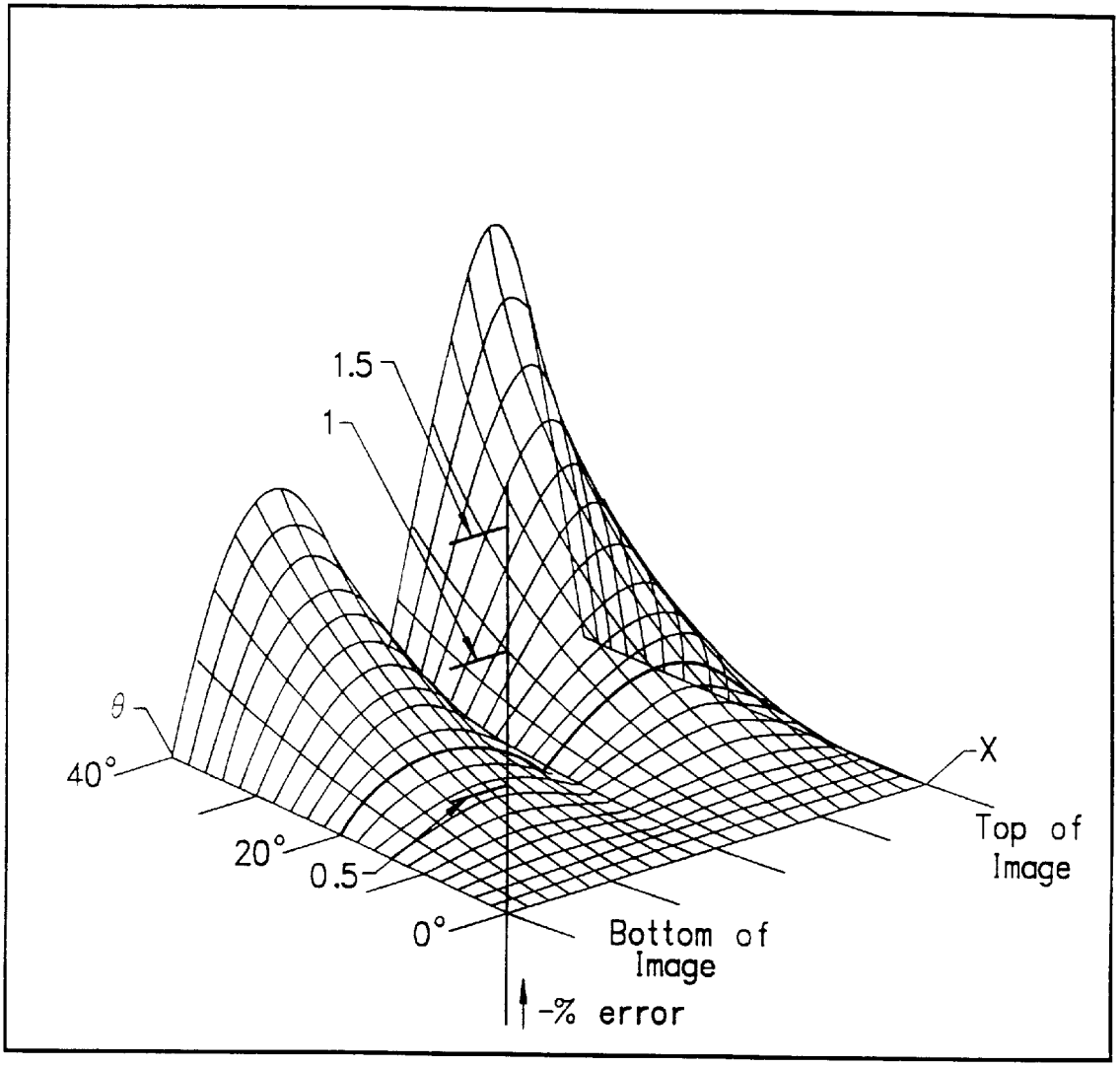
FIG. 1N is a graph depicting an error function of calibration according to one embodiment.

FIG. 1N is a graph of an error function assuming calibration of the system of FIGS. 1L and 1M as follows: the calibration points in an image projected by the projector 45 onto the writing surface 43 are arranged in a grid pattern that includes the corners of the image and the center of the image, and the user touches each calibration point at its center.

In one embodiment, points on the writing surface are calibrated with virtually no error if theta=90 degrees. Points on the writing surface are calibrated to within 0.26% of the projected image if theta=70 degrees. Points on the writing surface are calibrated to within 1.60% of the projected image if theta=50 degrees.

Translation

Given a new point on the writing surface $$\begin{bmatrix} x_s \\ y_s \end{bmatrix}$$

(as detected using the stylus and detectors), a corresponding projected background image point $$\begin{bmatrix} x_i \\ y_i \end{bmatrix}$$

is as follows:

$$\begin{bmatrix} x_i \\ y_i \end{bmatrix} = \begin{bmatrix} - & (T_x)^T & - \\ - & (T_y)^T & - \end{bmatrix} \begin{bmatrix} | \\ | \\ Q(x_s, y_s) \\ | \\ | \end{bmatrix}$$

$$\begin{bmatrix} x_i \\ y_i \end{bmatrix} = \begin{bmatrix} A_x x_s + B_x x_s^2 + C_x y_s + D_x y_s^2 + E_x x_s y_s + F_x x_s^2 y_s + G_x x_s y_s^2 + H_x x_s^2 y_s^2 + I_x \\ A_y x_s + B_y x_s^2 + C_y y_s + D_y y_s^2 + E_y x_s y_s + F_y x_s^2 y_s + G_y x_s y_s^2 + H_y x_s^2 y_s^2 + I_y \end{bmatrix}$$

Thus, each point can be computed with a relatively small number of multiply and add operations. The system calculates successive image points as the stylus is moved over the writing surface and the result is a composite image.

System Variations

In general, the transcription system records the written image 44 by detecting the position of the stylus 10 on the writing surface 28 at multiple times, each position detected serving to form a point on the monitor image 34. By detecting the position of the stylus 10 at a sampling rate that is fast relative to the speed with which the stylus 10 is moved during writing, an image 34 corresponding to what has been written can be recorded and displayed in real time. As will be described in detail below, each point is determined based on the time that it takes for a position signal to travel between the stylus 10 and the first and second detectors 12A, 12B. This time is called the position signal's time of flight.

Several different system designs may be employed in order to determine a position signal's time of flight between the stylus 10 and the first and second detectors 12A, 12B. Several of these different system designs are described with regard to FIGS. 2A–2D. It is noted however that additional system configurations may also be envisioned and are intended to fall within the scope of the present invention.

Figure 2A:
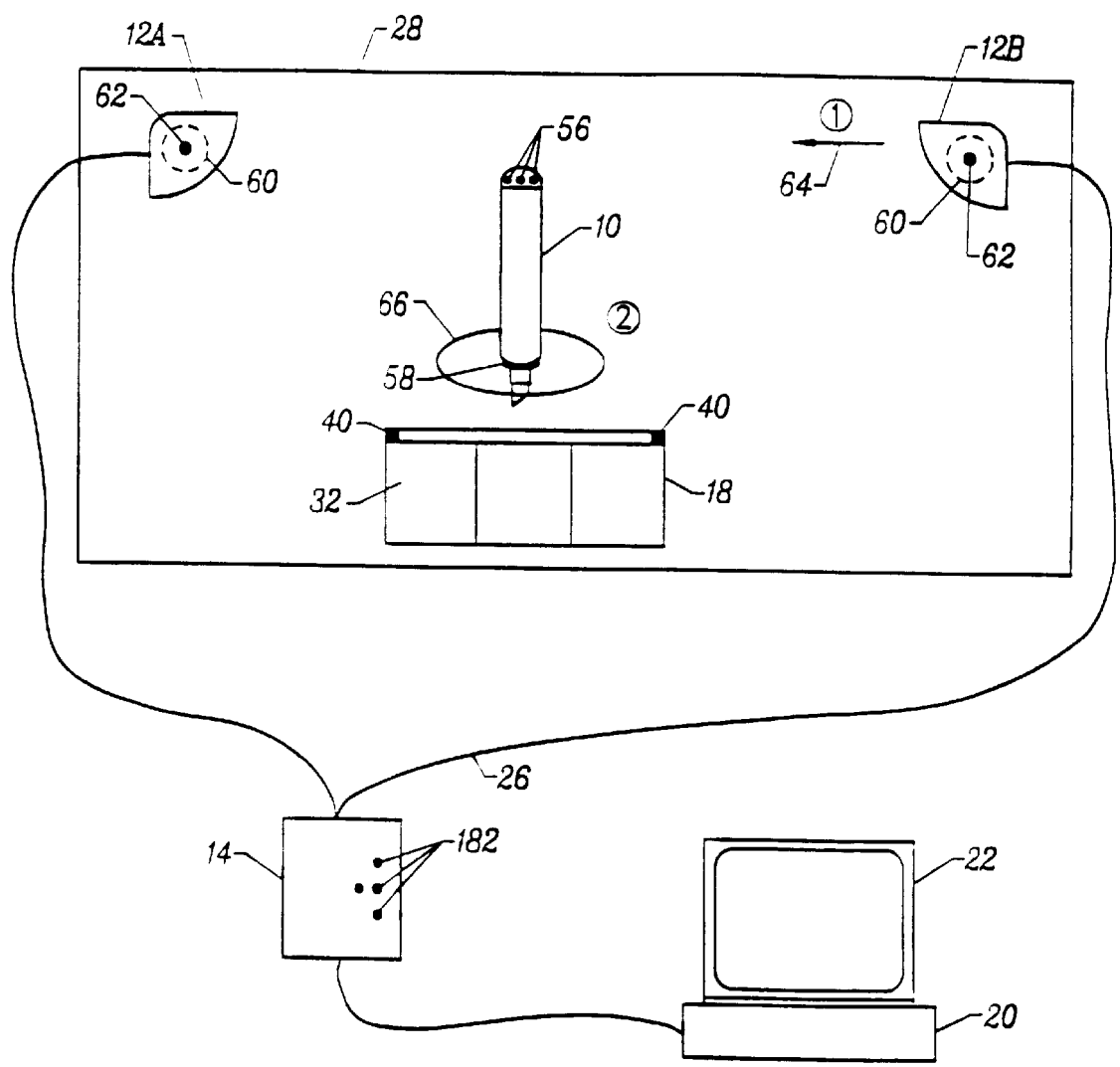
FIG. 2A illustrates a transcription system where a stylus receives a reference signal and transmits a position signal.

FIG. 2A illustrates an embodiment where the stylus 10 includes at least one reference signal receiver 56 and a position signal transmitter 58. Meanwhile, the first detector 12A and the second detector 12B each include a position signal receiver 60. Located somewhere in the system is a reference signal transmitter 62. In FIG. 2A, the reference signal transmitter 62 is included in the second detector 12B. In other embodiments, the reference signal transmitter 62 can be included in the hardware unit 14.

As illustrated in FIG. 2A, a reference signal 64 is transmitted to the stylus 10. Receipt of the reference signal 64 by the stylus 10 triggers the stylus 10 to transmit a position signal 66. The position signal 66 is propagated radially from the stylus 10 and received by the first detector 12A and the second detector 12B at a time that is dependent on the distance between the stylus 10 and each of the first detector 12A and the second detector 12B at the time that the position signal 66 is produced. Since the position signal 66 is transmitted at a known time after the reference signal 64 is transmitted, the time of flight of the position signal 66 to the first and second detectors 12A, 12B can be determined.

The hardware unit 14 receives position signals 66 from the first and second detectors 12A, 12B and controls the transmission of the reference signals 64 from the reference signal transmitter 62. The hardware unit 14 uses the received position signals 66 to determine the time of flight of the position signal 66 from the stylus 10 to the first detector 12A and the second detector 12B. The time of flight is received by the processing unit 20 which includes logic for using the time of flight data to determine the position of the stylus 10 relative to the first detector 12A and the second detector 12B. The logic may employ a variety of methodologies for determining the position of the stylus 10 including, for example, triangulation or a look-up table containing different positions associated with different times of flight to the first and second detectors 12A, 12B.

A variety of reference signals 64 may be used. In general, the reference signal 64 should be at least as fast as the position signal 66 and is preferably significantly faster than the position signal 66. When the reference signal 64 is significantly faster than the position signal 66 (e.g., speed of light vs. speed of sound), it is possible to disregard the time of flight of the reference signal 64 when determining the time of flight of the position signal 66. In one embodiment, the reference signal 64 travels at the speed of sound and in another travels at the speed of light. In a particular embodiment, the reference signal 64 is a form of electromagnetic radiation, such as an infra-red (IR) or radio frequency (RF) signal. The position signal may also be ultrasound.

A variety of position signals 66 may be used. In one embodiment, the position signal 66 is ultrasound. In another embodiment, the position signal 66 is a form of electromagnetic radiation, preferably micro-impulse radar which yields an effective time of flight for electromagnetic signals.

Figure 2B:
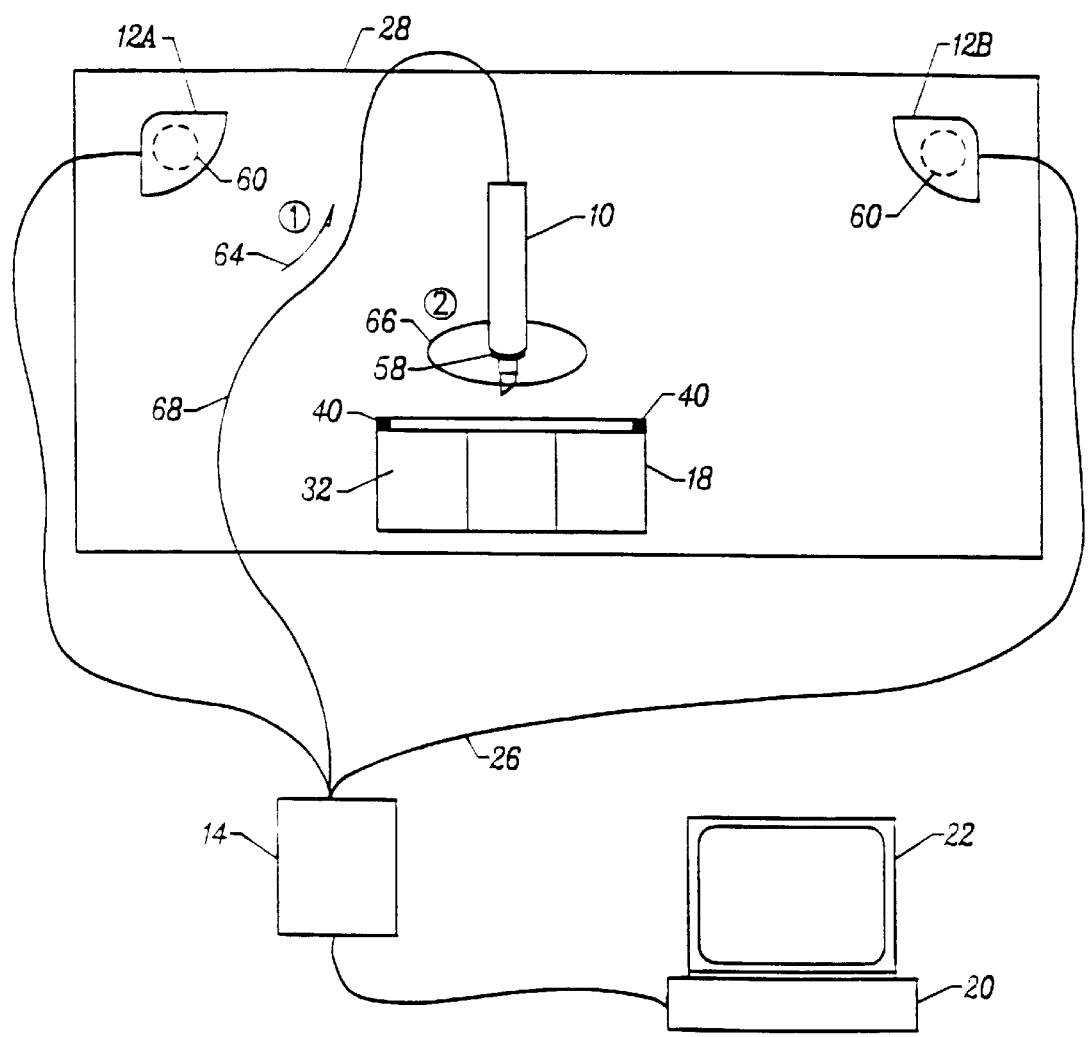
FIG. 2B illustrates a transcription system where a stylus receives a reference signal via an electrical wire.

FIG. 2B illustrates an alternative embodiment where the stylus 10 includes a position signal transmitter 58 and is physically attached to the hardware unit 14 by a wire 68. Meanwhile, the first detector 12A and the second detector 12B each include a position signal receiver 60.

As illustrated in FIG. 2B, a reference signal 64 is transmitted to the stylus 10 from the hardware unit 14 via the wire 68. When the reference signal 64 is received, the stylus 10 transmits a position signal 66 which propagates radially from the stylus 10 and is received by the first detector 12A and the second detector 12B at a time that is dependent on the distance between the stylus 10 and the first detector 12A and the second detector 12B at the time that the position signal 66 is produced. Since the position signal 66 is transmitted at a known time after the reference signal 64 is transmitted, the time of flight of the position signal 66 to the first and second detectors 12A, 12B can be determined.

Figure 2C:
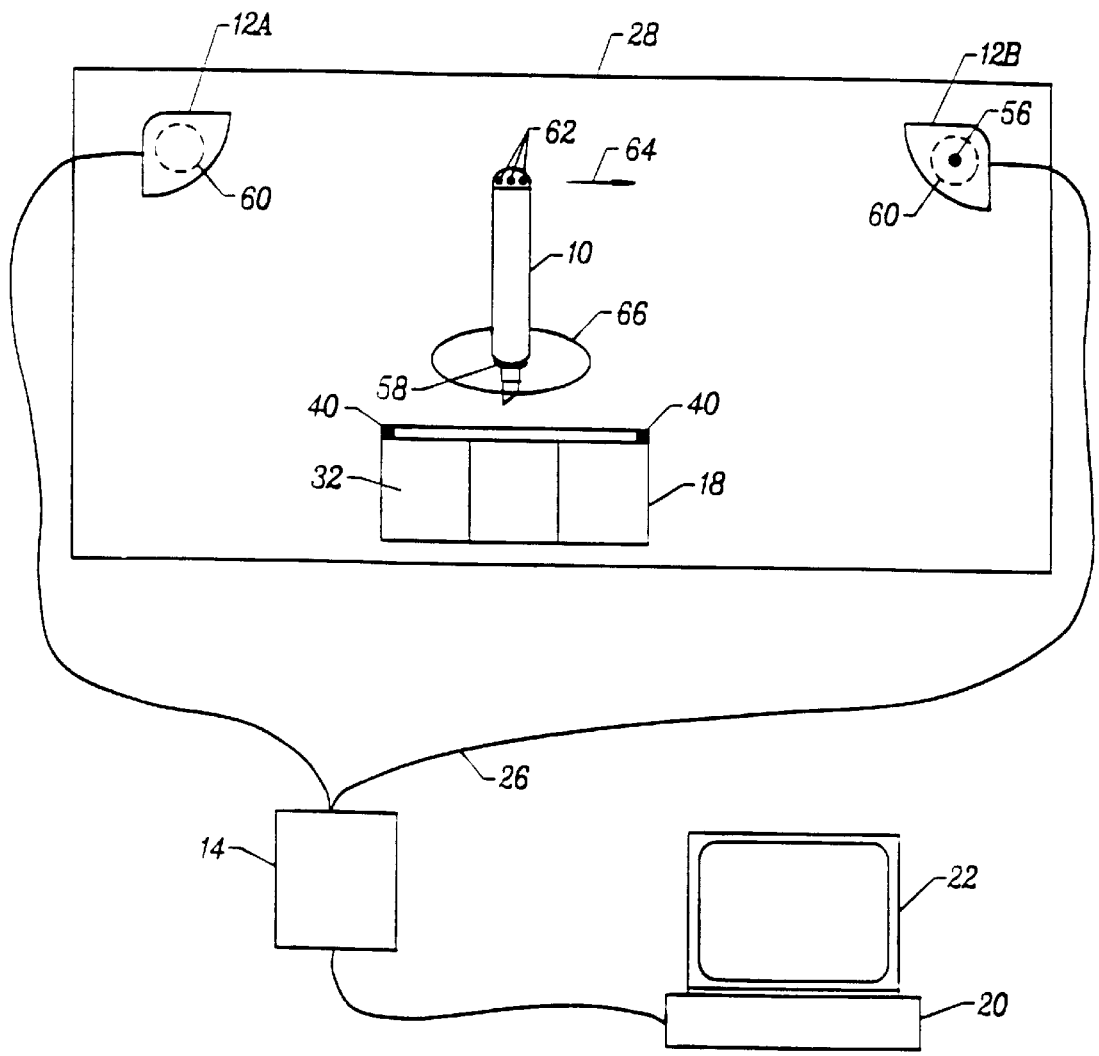
FIG. 2C illustrates a transcription system where a stylus transmits a position signal and a reference signal.

FIG. 2C illustrates an alternative embodiment where the stylus 10 includes a position signal transmitter 58 and the first detector 12A and the second detector 12B each include position signal receivers 60. The stylus 10 also includes a reference signal transmitter 62 and the second detector 12B includes a reference signal receiver 56 in addition to the position signal receiver 60.

As illustrated in FIG. 2C, a reference signal 64 is transmitted by the stylus 10 to the second detector 12B to signal that a position signal 66 is being transmitted or is about to be transmitted. The position signal 66 is received by the first detector 12A and the second detector 12B. Since the position signal 66 is transmitted at a known time after the reference signal 64 is transmitted, the time of flight of the position signal 66 to the first and second detectors 12A, 12B can be determined by the processing unit 20.

In the embodiment illustrated in FIG. 2C, the reference signal 64 and the position signal 66 can be transmitted together for each point in the monitor image 34. However, the position signal 66 can also be transmitted without the reference signal 64. For instance, the reference signal 64 can serve to synchronize the timing of the stylus 10 and the hardware housing and/or the processing unit 20. When the reference signal 64 serves as a synchronizing signal, the stylus 10 is configured to transmit a series of position signals 66 at a known time interval. The reference signal 64 indicates when the first position signal 66 in the series is transmitted. The hardware unit 14 includes a timer which is started after receiving the reference signal 64. The first time of flight determination for a particular detector is made by measuring the time between starting the timer and receiving the position signal 66 at the particular detector. Since subsequent position signals 66 are transmitted at known intervals, the hardware housing and/or the processing unit 20 can include logic for determining when each subsequent position signal 66 is transmitted. As a result, the time of flight to a particular detector can be calculated by determining the time between when the position signal 66 is transmitted and when the position signal 66 is received at that detector without each time of flight needing a reference signal to obtain the measurement.

Figure 2D:
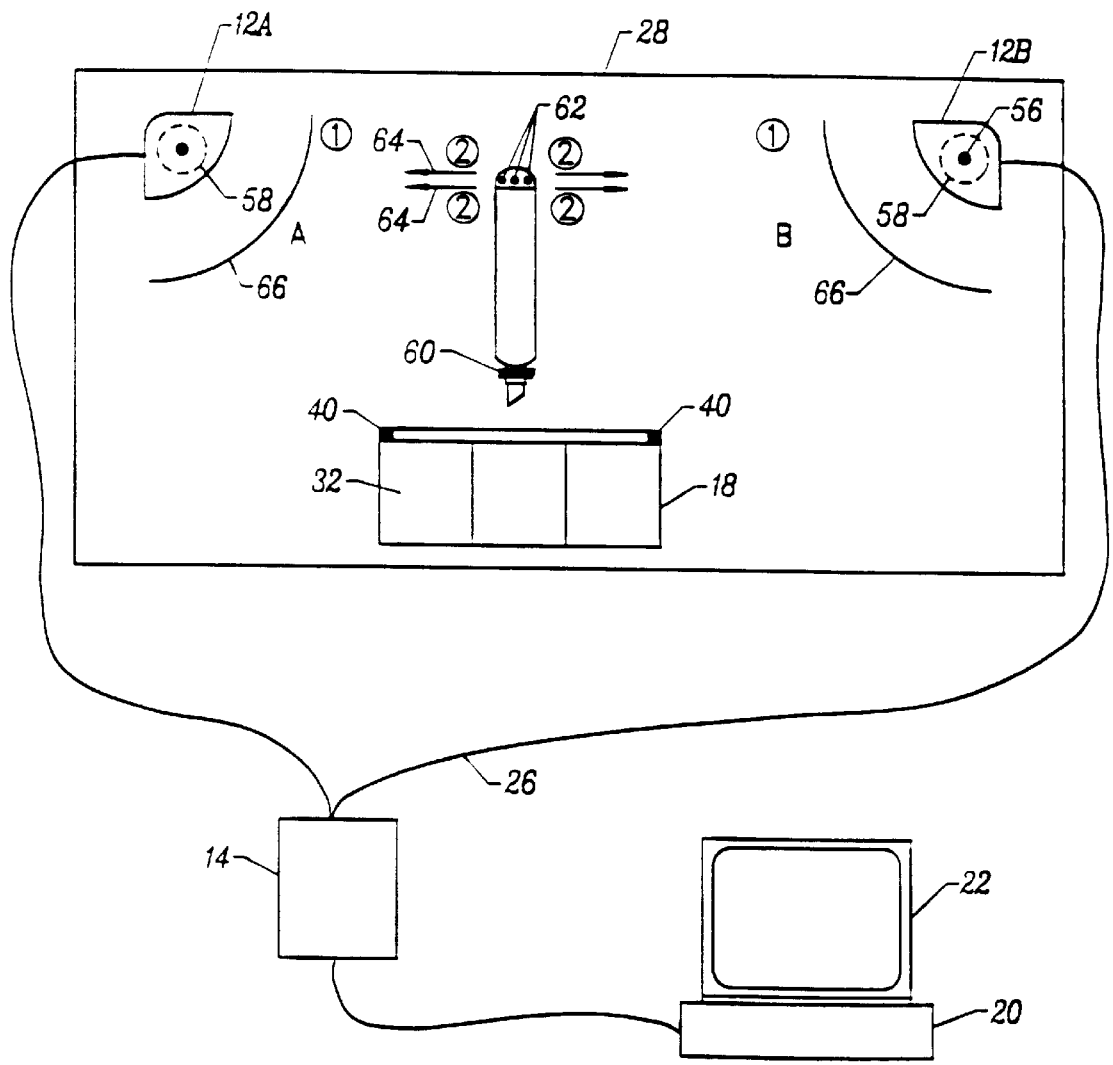
FIG. 2D illustrates a transcription system where a stylus transmits two different reference signals in response to receiving different position signals.

FIG. 2D illustrates yet another embodiment where the stylus 10 includes a position signal receiver 60 and a reference signal transmitter 62. The first detector 12A and the second detector 12B include position signal transmitters 58 and reference signal receivers 56. It is noted that this embodiment can be readily varied where the stylus 10 includes a reference signal receiver 56 and one or both of the first detector 12A and the second detector 12B include a reference signal transmitter 62.

As illustrated in FIG. 2D, the first and second detectors 12A, 12B transmit different position signals 66 which can be distinguished by the position signal receiver(s) 60 on the stylus 10. When the stylus 10 receives one or more of the position signals 66, the stylus 10 transmits a reference signal 64 to confirm receipt of the position signal 66 and request that the next position signals 66 be sent.

System Variations Relating To Calibration:

The systems described above may require calibration. For example, it may be necessary to determine a separation between detectors, a dimension of the writing area, a temperature adjacent the writing surface, a position of a template relative to a writing surface, and/or a position of a background image positioned on, printed on, or projected on a writing surface.

Figure 3A:
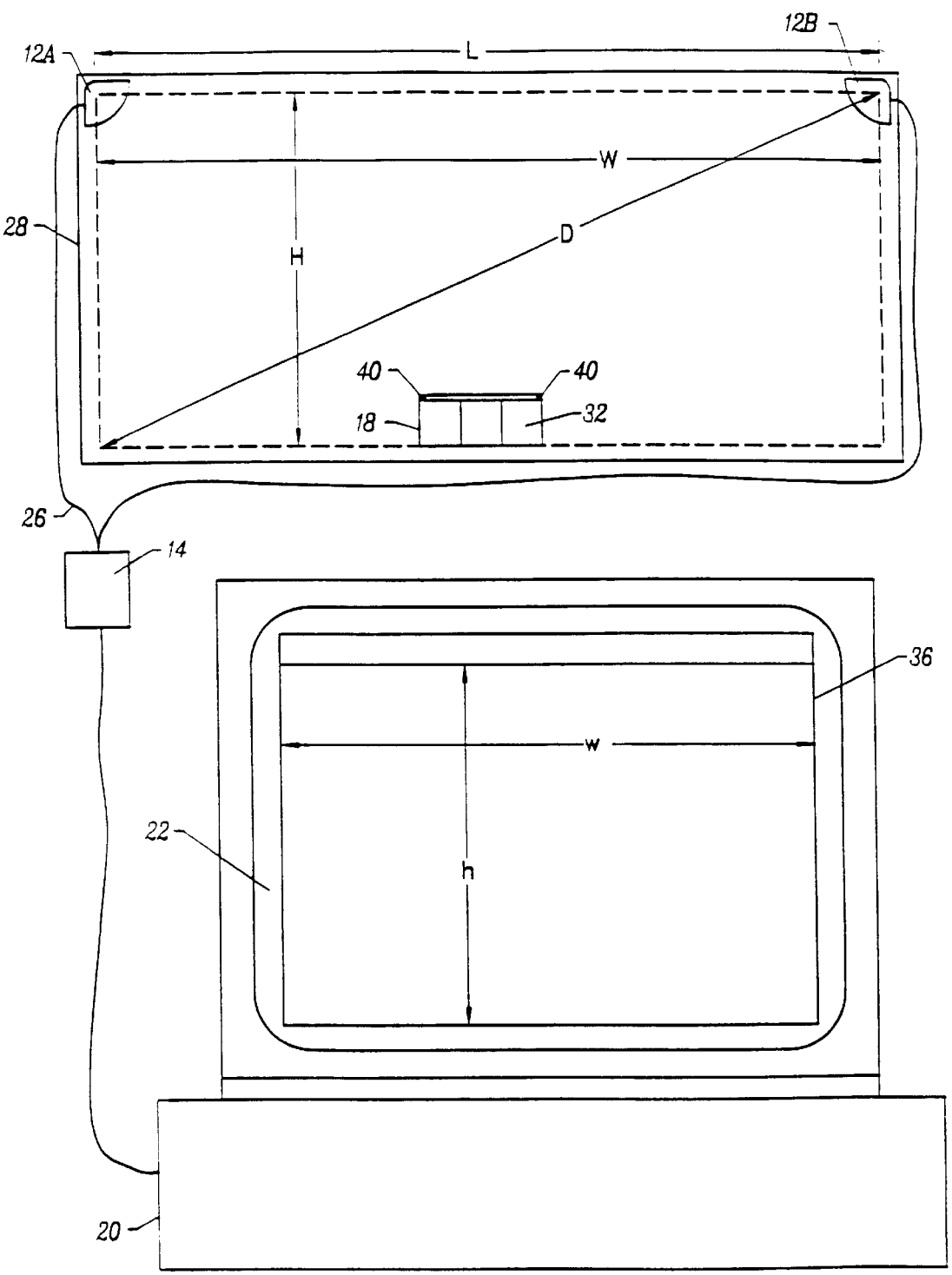
FIG. 3A illustrates dimensions of a writing area.

The displacement, L, between first and second detectors can be determined. The dimension of the writing area 38 can also be determined during calibration. For instance, the writing area height, H, writing area width, W, and writing area diagonal, D, are some of the dimensions which can be determined during calibration. Each of these dimensions are illustrated in FIG. 3A. The position of the template 18 and each of the control sections 32 can also be determined during the calibration of the system. Different embodiments of the transcription system require that different combinations of these variables or none of these variables be determined during calibration.

Figure 3B:
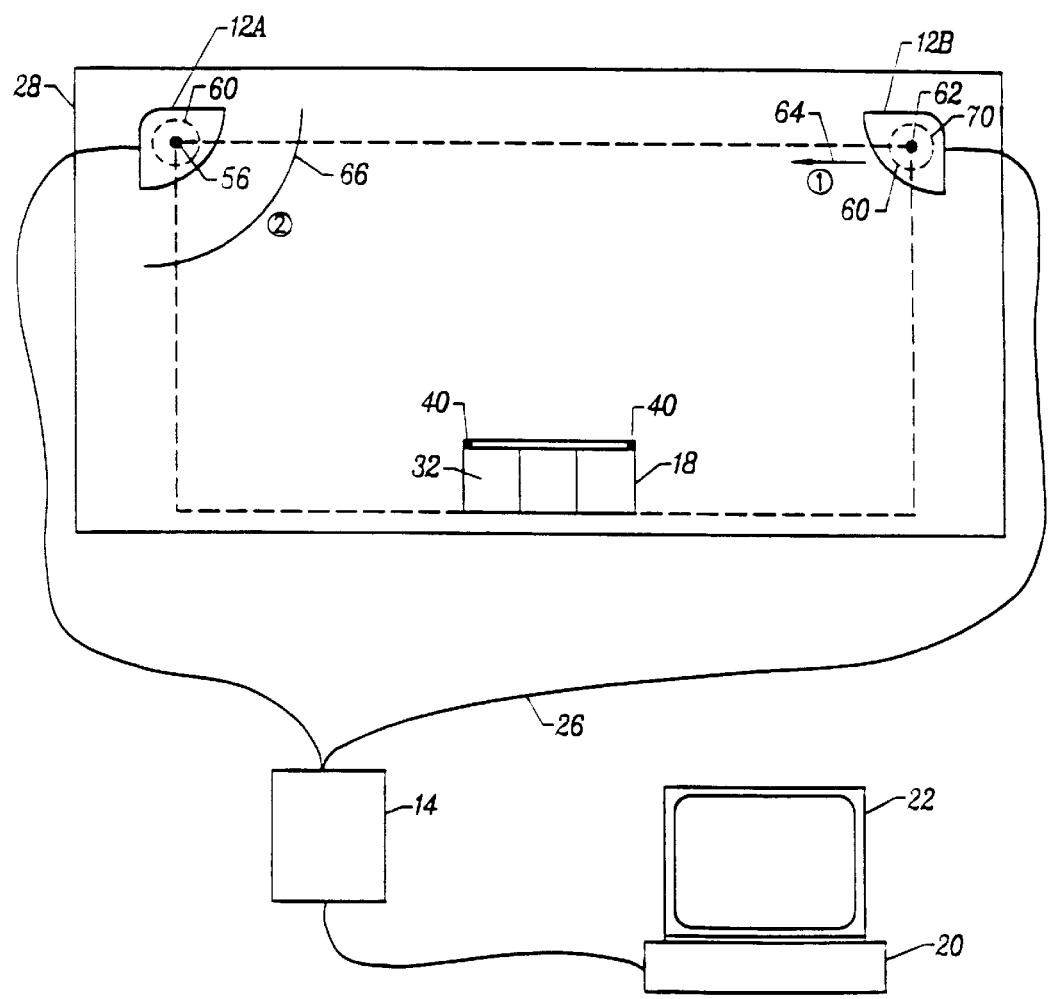
FIG. 3B illustrates a transcription system where a first detector includes a position signal transceiver or transmitter for responding to a reference signal from a second detector.

FIG. 3B illustrates an embodiment which can automatically determine the first and second detector displacement, L. The first detector 12A includes a reference signal receiver 56 and a position signal transceiver 70. Examples of suitable position signal transceivers 70 include, but are not limited to, PZT, PVDF, electrostatic and piezoelectric or piezoceramic ultrasonic transceivers.

During calibration of the system, a reference signal 64 transmitted from a reference signal transmitter 62 included in the second detector 12B is received at the reference signal receiver 56 included in the first detector 12A. In response, a position signal 66 is transmitted from the position signal transceiver 70 in the first detector 12A. The position signal 66 is received by the position signal receiver 60 of the second detector 12B. The time of flight of the position signal 66 between the first and second detectors 12A, 12B can be multiplied by the speed of sound to determine L. When the system is not being calibrated, the position signal transceiver 70 works as a position signal receiver 60. In another embodiment, the position signal transceiver 70 can be replaced with a position signal transmitter 58 and an independent position signal receiver 60.

Figure 3C:
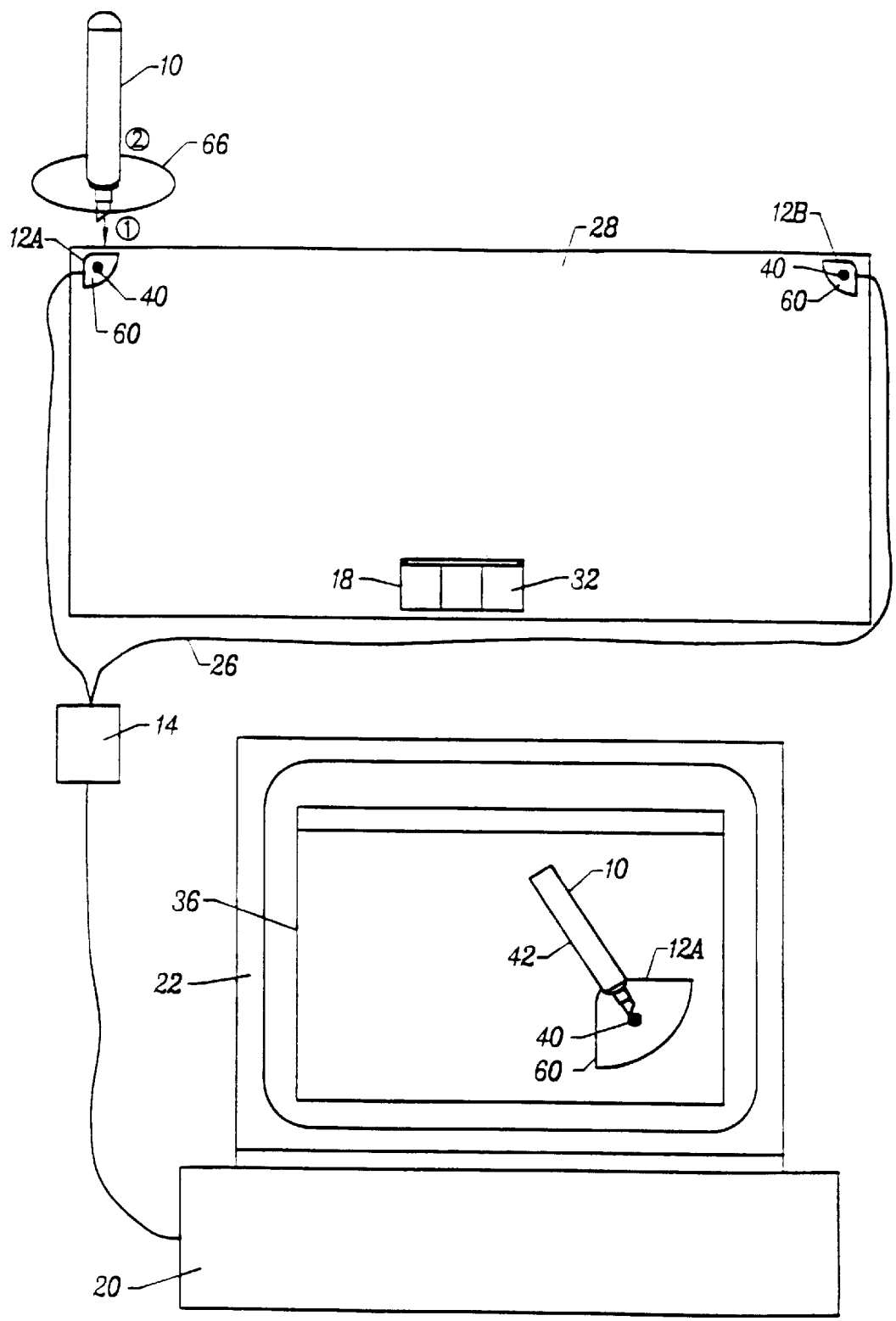
FIG. 3C illustrates a transcription system where a first detector includes a calibration mark for calibrating the transcription system.

FIG. 3C illustrates another embodiment including features for system calibration. The first detector 12A includes a calibration mark 40. During calibration, the user is prompted by the computer to contact the stylus 10 within the calibration mark 40. Upon contact of the stylus 10 with the calibration mark 40, the stylus transmits a position signal 66. The position signal 66 is received at the position signal receiver 60 included in the second detector 12B. The time of flight of the position signal 66 between the first and second detectors 12A, 12B is multiplied by the speed of sound to determine the first and second detector displacement, L.

As discussed above, the processing unit 20 may optionally produce an image on the monitor 22 to guide the user through the calibration. For instance, the processing unit 20 can create an image 42 of a stylus 10 contacting the calibration mark 40 on an image of the first detector 12A. In response, the user can contact the stylus 10 with the calibration mark 40 of the first detector 12A as illustrated. The user can also be prompted to contact the stylus 10 to the calibration marks 40 by commands on the monitor 22 through feedback obtained from a multi-media computer. For instance, "Touch stylus to left detector." can appear on the monitor 22. The command can also take the form of an audible message.

Figure 3D:
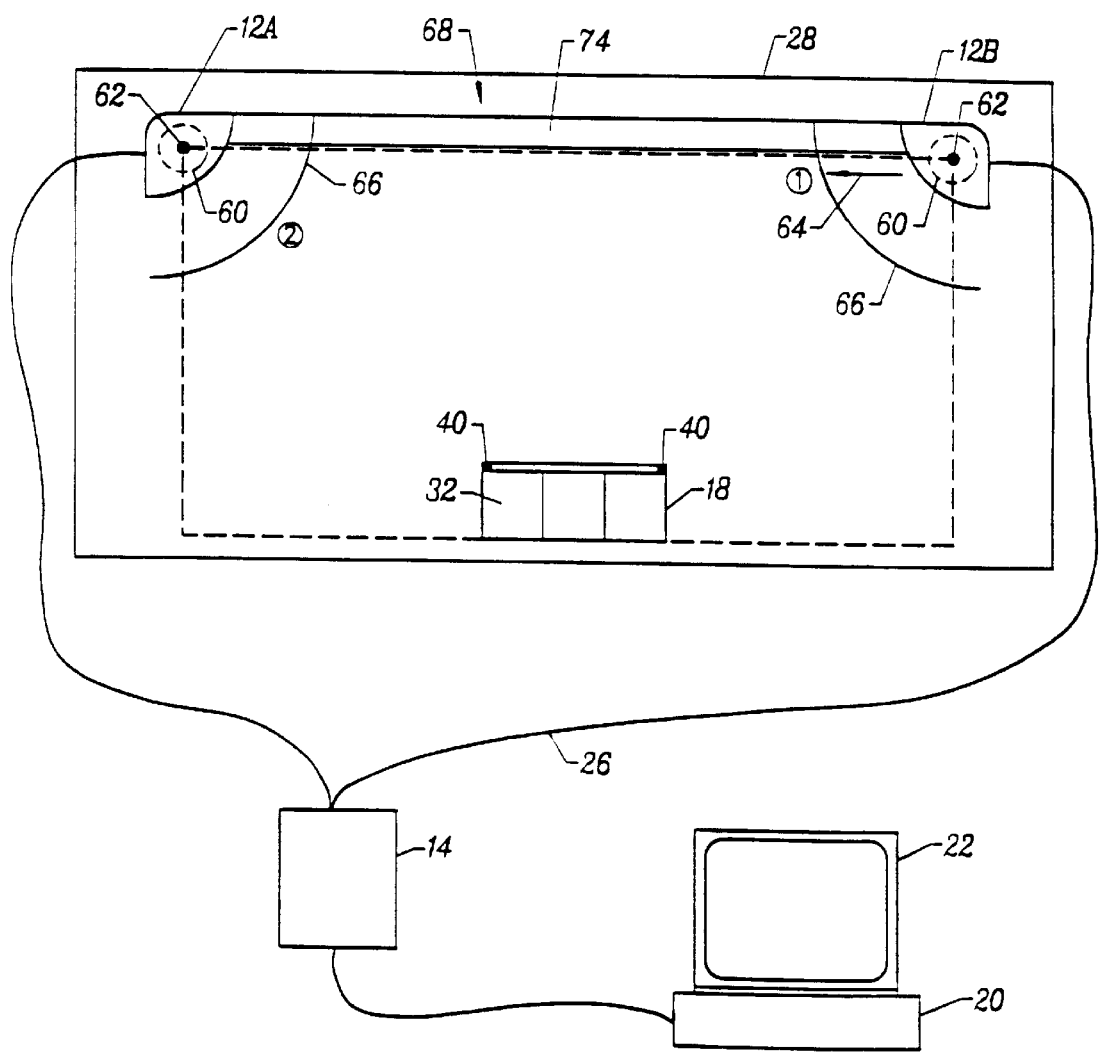
FIG. 3D illustrates a detector assembly where a first and second detectors are separated by a coupling member.

The first and second detectors can be included in a detector assembly 72 as illustrated in FIG. 3D. The detector assembly 72 includes a coupling member 74 attached to each of the first and second detectors 12A, 12B. The coupling member 74 keeps the first and second detectors 12A, 12B at a known displacement. As a result, the first and second detector displacement, L, is a known constant which does not need to be determined during the calibration.

Figure 3E:
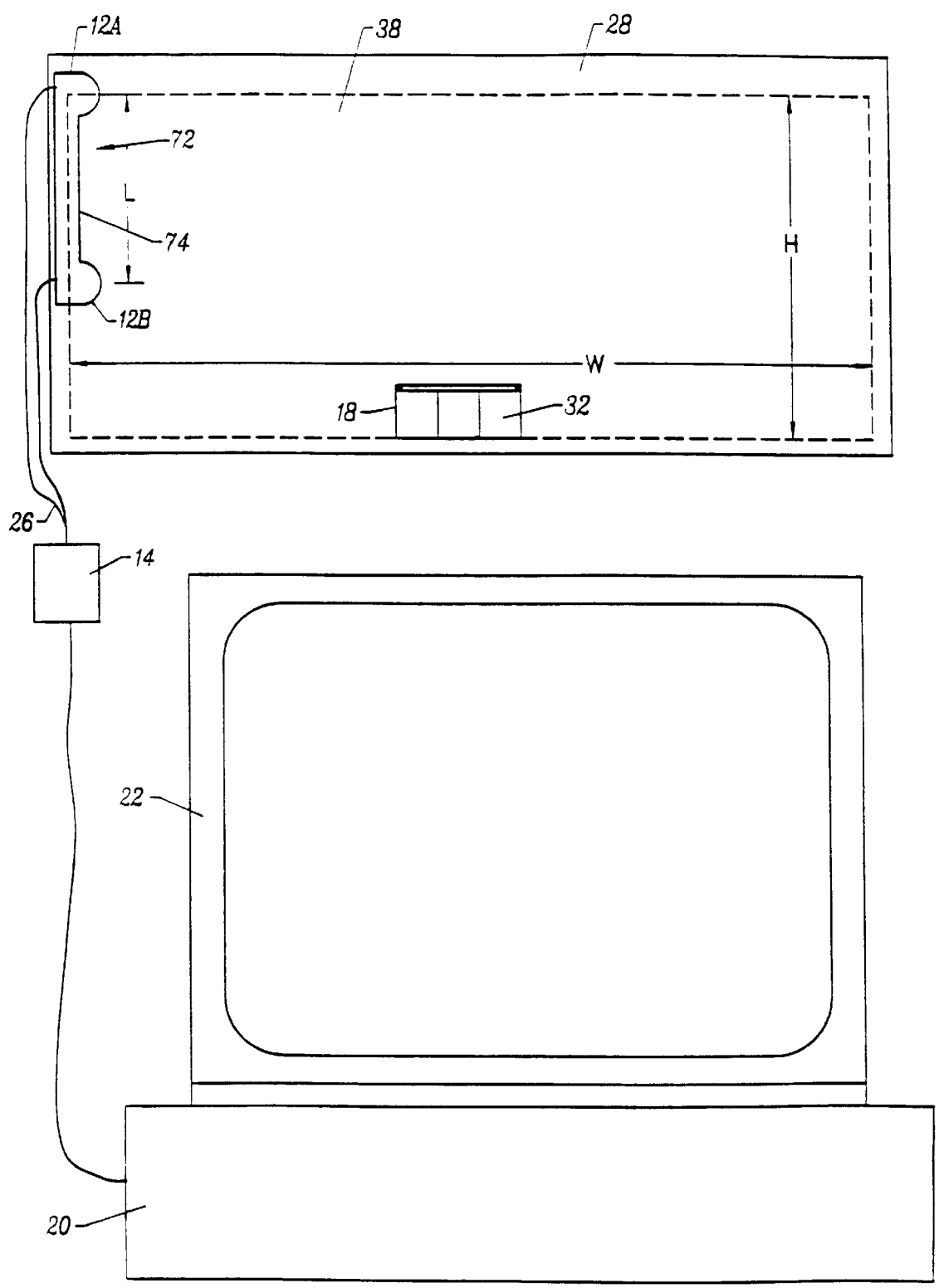
FIG. 3E illustrates a detector assembly where a first and second detectors are positioned along a side of the writing area.

As illustrated in FIG. 3E the detector assembly 72 can be positioned along the side of the writing area 38. This arrangement of the first and second detectors 12A, 12B can be advantageous as it keeps the wires on only one side of the writing surface 28 rather than needing to be guided around the periphery of both sides of the writing surface 28. Further, the first and/or second detectors 12A, 12B can be designed to receive position signals 66 from a 180 degree range of directions called the reception range. The 180 degree reception range allows the writing area width, W, and the writing area height, H, to extend beyond the first and second detector displacement, L.

As also illustrated in FIG. 3E, the position of the template 32 relative to the detector assembly can be determined by the system by contacting two different locations of the template (dark boxes) whose location relative to the overall template 32 is known by the system.

In another embodiment, the system calibrates itself to correct for the effect of temperature changes on the speed of ultrasound signals in the transcription system. Temperature sensors may optionally be incorporated into the stylus, template and/or positioned adjacent one or more of the detectors. According to this embodiment, the temperature adjacent the writing surface is periodically measured and the time of flight calculations are adjusted in view of the measured ambient temperature. By performing this type of calibration periodically, changes in temperature conditions, for example due to whether sunlight is impacting upon the writing surface, can be addressed.

The Stylus

Figure 4A:
FIG. 4A is a side view of a stylus which may be used in a transcription system according to the present invention.

One or more styluses may be used with the transcription system. FIG. 4A illustrates an embodiment of a stylus 10 which can be used with the transcription system illustrated in FIG. 2A. As illustrated, the stylus 10 includes a stylus housing 76 and a writing element 78. Examples of suitable writing elements 78 include, but are not limited to, an inkwell, chalk, pencil, pencil lead, pen and a marker such as a SANFORD EXPO. The stylus housing 76 includes a tip end 80 with a position signal transmitter 58 adjacent the end. The stylus housing 76 as illustrated also includes activation electronics 82, implement electronics 104, and a plurality of reference signal receivers 56. The stylus housing 76 is also capable of housing a power source 84 which is preferably removably attachable to the stylus.

In FIGS. 2A, 2C and 2D, the reference signal transmitters 62 or reference signal receivers 56 are illustrated as being positioned at an upper end of the stylus, however, the reference signal transmitters 62 or reference signal receivers 56 can be positioned at the tip end 80 of the stylus 10 as illustrated in FIG. 4A. Reference signal transmitters 62 or reference signal receivers 56 can also be included as a ring of piezoelectric material 86 extending around the circumference of the stylus 10. The ring of material can be constructed from any material known to transmit the reference signal.

Figure 4B:
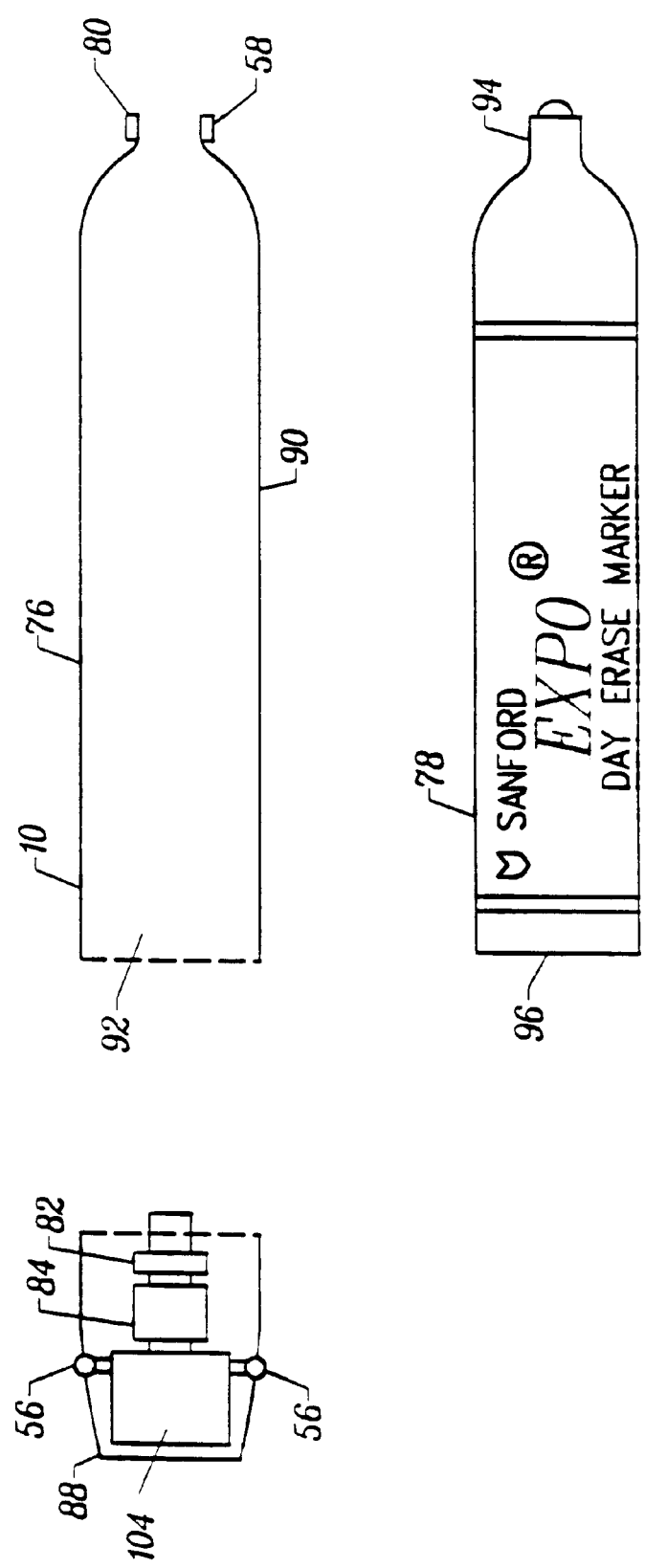
FIG. 4B is a side view of a stylus including a removable cap.

As illustrated in FIG. 4B, the stylus housing 76 may be designed such that the writing element 78 is removable from the stylus housing 76. As illustrated, the stylus housing 76 may include a removable member 88 which is attachable and detachable to an end of a sleeve 90. As illustrated, sleeve 90 defines a volume 92 within which the writing element 78 may be positioned and the removable member 88 serves to maintain the writing element 78 within the sleeve 90. When the writing instrument is replaced, the tip 94 of the replacement writing instrument is inserted through the stylus housing 76 and into the tip end 80 of the stylus 10. The removable member 88 is placed on the stylus 10 so the rear 96 of the writing instrument is in contact with the activation electronics 82.

As illustrated in FIG. 4C, the stylus housing 76 may include a first member 98A which is attachable and detachable to a side of a second member 98B. Detaching the first member 98A from the side of the second member 98B provides easy access to the writing element 78 and the power source 84. By enabling the writing element 78 to be readily removable, the writing element 78 can be replaced when writing media contained in the element is exhausted or a different writing media (type or color) is desired. Similarly, enabling the power source 84 to be readily removable permits the power source 84 to be replaced when the power begins to run low.

As illustrated in FIGS. 4C and 4D, the stylus housing 76 may include an aperture 100 which allows a user to rotate the writing element 78 about its longitudinal axis without having to open or otherwise disassemble the stylus housing 76 and without having to remove the writing element 78 from the stylus housing 76. As illustrated, some writing elements include a tip which is not symmetrical about the longitudinal axis of the writing element, such as a wedge shaped tip of a marker. In such instances, it may be desirable to periodically alter the angular positioning of the tip of the writing element relative to the stylus housing 76. This may be accomplished in this embodiment by rotating the writing element while it is in the housing through the aperture 100 without having to remove or disassemble the stylus.

As also illustrated in FIG. 4A, the stylus housing 76 may optionally include a sensor 102 adjacent the end of the stylus housing 76 out of which the writing element 78 extends which serves to detect if the writing element 78 is out of writing media. For example, the sensor may be used to detect a water content or another solvent content of the portion of the writing element extending from the housing, thereby alerting a user when the writing element is out of ink or has dried out and needs to be replaced. An example of a sensor is a pair of contacts positioned at the end of the stylus housing. In operation, a current, can be passed through the tip of the writing element. The tip of certain writing element will conduct varying amounts of current depending on the amount of writing media which remains within the stylus. Accordingly, the stylus can include logic for monitoring the current through the tip to identify the amount of media remaining in the writing element. When the sensor detects that the amount of media is below a threshold, the stylus can provide a low media signal encoded into a reference signal or a position signal. Upon detecting the low media signal the hardware unit can activate a particular indicator or can provide a second low media signal to the processing unit which can respond accordingly.

It is preferred that at least a portion of the stylus housing 76 is clear or opaque such that it is possible to see the writing element 78 within the housing. This allows the user to observe the color of the writing element 78 without having to open the housing or remove the writing element 78. In certain instances, for example when chalk, graphite or a liquid ink reservoir is used in conjunction with the writing element, it is possible to observe how much writing media is remaining.

The activation electronics 82 can include a contact switch which indicates when the stylus 10 is being used to write. The contact witch typically works based on pressure being exerted between the stylus 10 and a writing surface 28. In operation, the stylus 10 is held such that the tip 94 of the writing instrument is contacted with the writing surface 28. The pressure of the writing instrument on the writing surface 28 closes the contact switch to activate a circuit within the implement electronics 104.

When the circuit within the stylus housing 76 is activated, an activation signal is provided to the system to indicate that the stylus 10 has been contacted with the writing surface 28. The propagation of reference and position signals 66 can be initiated in response to the activation signal. The activation signal may be a position signal 66 or a reference signal 64 transmitted from the stylus 10. Similarly, when the implement electronics 104 is deactivated by lifting the stylus 10 off the writing surface 28, a deactivation signal may be transmitted to the system. The system can also detect when the implement electronics 104 has been deactivated by detecting that a position signal 66, or reference signal 64, has not been transmitted from the stylus 10 for some predetermined period of time.

The activation electronics 82 can optionally include a pressure sensor which measures the pressure exerted between the stylus 10 and the writing surface 28 called the exerted pressure. Examples of pressure sensors which may be used include, but are not limited to strain sensors, piezoelectric elements or linear resistive strips. The activation electronics 82 can produce a signal indicating the exerted pressure. The signal can be received within the implement electronics 104 and can serve to activate the implement electronics 104. The implement electronics 104 can include logic for encoding a pressure signal which indicates the degree of exerted pressure into a reference signal 64 or a position signal 66 transmitted from the stylus 10. Whether the pressure signal is encoded into the reference signal 64 or the position signal 66 depends on whether the stylus 10 includes a position signal transmitter 58, a reference signal transmitter 62, or both.

Additional signals can be encoded into position signals or reference signals by varying the characteristics of the signal. For instance, to encode an additional signal into a reference signal, the value of the additional signal can be digitized and sent as a series of bits in the reference signal. To encode an additional signal into a position signal, the position signal can be transmitted with varying frequencies or durations which are a function of the additional signal value.

The pressure signal can be received by the hardware unit 14 or the processing unit 20. The hardware unit 14 or the processing unit 20 can include logic which can identify the pressure signal and interpret the pressure signal to determine the amount of pressure being exerted on the stylus 10. The hardware unit 14 or the processing unit 20 can also include logic for adjusting the width of each stroke on the monitor image 34 in response to the exerted pressure. For instance, when the pressure signal indicates that large pressure is being exerted, the width of the stroke on the monitor image 34 can be increased and when the exerted pressure is low, the width of the stroke on the monitor image 34 can be decreased. As a result, the monitor image 34 is created to more closely resemble the written image 44.

The implement electronics 104 can also optionally include a power monitoring device which monitors the amount of power remaining in the power source 84. Examples of power measuring devices which may be used include, standard power monitoring circuits and can be included in some microcontrollers. When the available power falls below a threshold level, a power signal can be encoded into a reference signal 64 or a position signal 66 transmitted from the stylus 10. The power signal can be received by the hardware unit 14 or the processing unit 20. The hardware unit 14 or the processing unit 20 can include logic which can identify the power signal. Once the power signal has been identified, the user can be notified of the low power status by a message on the monitor 22 or by an indicator on the hardware unit 14. An example of an indicator (not shown) on the hardware unit 14 may be an LED which flashes once the power signal has been received.

The implement electronics 104 can also include logic for producing an identifier signal which is unique to the type of the stylus 10 being used. The identity signal can be encoded into a reference signal 64 or a position signal 66 transmitted from the stylus 10. The hardware unit 14 or the processing unit 20 can include logic which can identify the identity signal and interpret the identity signal to determine the type and accordingly the characteristics of the stylus 10 from the identity signal. The characteristics of the stylus can include color, line, width, and line pattern.

The identifier signal can be transmitted when the implement electronics 104 are first activated or each stylus 10 can constantly transmit signals which are unique to that particular type of stylus 10. The identifier signal can be received within the hardware unit 14 or the processing unit 20 and used to identify the particular stylus 10 being used to write upon the writing area 38. Once the stylus 10 has been identified, the monitor image 34 is created with characteristics which correlate to the identified stylus 10. For instance, the stroke on the monitor image 34 can have a color matching the color of the stylus 10 being used to write on the writing surface 28 can have a stroke width matched to the width of the stylus 10.

When the stylus transmits an identifier signal which is identified with a particular color, the stylus housing 76 can include a visible identifier which indicates to a user the color of the strokes which will appear on the monitor image 34 when that stylus 10 is used. For instance, the stylus housing can be 50% transparent and 50% red in color to indicate that use of the stylus will cause red colored strokes to appear on the monitor. Of course, the transcription system can include logic for changing the color of a stroke on the monitor after the stroke has been made.

When the stylus transmits an identifier signal which is identified with a particular characteristics, the stylus housing 76 can be designed so it will accept only writing implements with the particular characteristics. For instance, if a stylus housing transmits an identity signal which is identified with the color red, the stylus housing and writing implements can be designed so the stylus housing will not accept writing implements which are not red. One method for achieving this correlation of stylus housings with writing implements is to design the writing implements with particular characteristics so the writing implements have a geometry which is unique to the particular characteristics. For instance, blue writing implements can have a unique length, unique diameter or unique cross sectional shape such as round, hexagonal, octagonal, oval, etc. The stylus housings 76 which accept writing implements with particular characteristics can have sleeves defining volumes 92 which are complementary to the unique writing implement geometry. For instance, if blue pens have a hexagonal cross section, the volume 92 within the correlated stylus housing can have a hexagonal cross section.

The implement electronics 104 can also include logic for responding to inquiry signals from the hardware unit 14 or the processing unit 20. The inquiry signal can be coded into a reference signal 64 which is transmitted from a first or second detector 12A or 12B. The stylus 10 receives the reference signal 64 and logic within the implement electronics 104 recognizes the inquiry signal. The logic can also interpret the inquiry signal as inquiring whether the stylus 10 is a particular type of stylus 10. The logic in the implement electronics can cause the position signal 66 to be withheld or transmitted based on whether the stylus 10 matches the type of stylus inquired about. The hardware unit 14 or the processing unit 20 can include logic for interpreting the transmission or lack of transmission of the position signal 66.

As also illustrated in FIG. 4A, the stylus 10 includes reference signal receivers 56. These receivers are preferably evenly spaced around the stylus 10 so that reference signals 64 can be received from any angle relative to the stylus 10. In a preferred embodiment, the reference signal receiver 56 is an IR signal receiver. An example of an IR receiver that may be used includes, but is not limited to, a photo diode. The reference signal 64 can also be an RF signal. As also illustrated in FIG. 4A, the stylus 10 includes a position signal transmitter 58. In one embodiment, the position signal transmitter 58 is an ultrasound transmitter. Examples of ultrasound transmitters that may be used include, but are not limited to, Polaroid L Series ultrasonic emitters, cylindrical polyvinylidene fluoride (PVDF) rings and similar piezotransducing elements. An example of a position signal 66 includes, but is not limited to, a 40 kHz signal emitted for approximately 0.7 ms.

FIG. 4C illustrates an embodiment of the stylus 10 which can be used with the transcription system illustrated in FIG. 2B. The implement electronics 104 is coupled to the system via an electrical wire 68. As a result, the reference signal 64 can be transmitted to the stylus 10 via the wire 68. The position signal 66 is transmitted from the position signal transmitter 58 in response to receiving the reference signal 64.

The stylus 10 can also be adapted to be used in a transcription system such as the one illustrated in FIG. 2C. For example, the stylus 10 can include a reference signal transmitter 62 and a position signal transmitter 58. The detectors 12A, 12B can be modified to include a reference signal receiver 56 and a position signal receiver 60.

The stylus 10 can also be adapted to be used in a transcription system such as the one illustrated in FIG. 2D. For example, the stylus 10 can include a reference signal transmitter 62 and a position signal receiver 60. The detectors 12A, 12B can be modified to include a position signal transmitter 58. A reference signal receiver 56 is also provided in the system and may optionally be incorporated into one of the detectors 12A, 12B.

The stylus can include a cap for covering a portion of the writing element which extends outside of an end of the stylus housing and is used to write upon a writing surface. The cap may optionally be clear in order to allow the user to observe the color of the writing element without having to remove the cap. The cap may also optionally be sized to fit over a position signal transmitter or position signal receiver positioned adjacent an end of the stylus housing out of which the writing element extends. The stylus housing may optionally include a cap holding mechanism to which the cap may be attached when the stylus is in use.

Figure 4E:
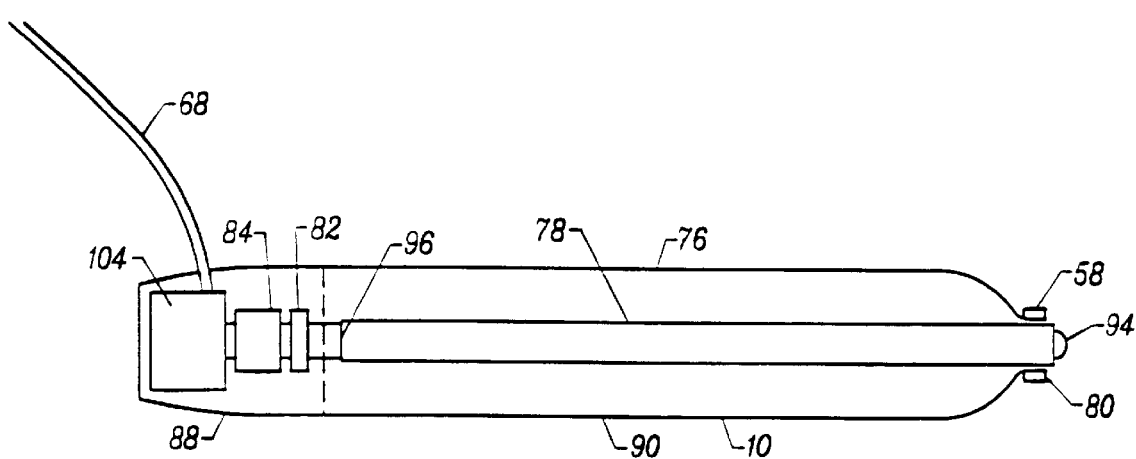
FIG. 4E is a side view of a stylus coupled to a transcription system by an electrical wire for providing a reference signal to the stylus.

An example of a stylus cap is illustrated in FIG. 4D. The cap 106 is configured to be coupled with the stylus 10 as illustrated in FIGS. 4C and 4E. The cap 106 can also configured to be coupled with a back end the stylus as illustrated in FIG. 4D. Accordingly, during operation of the stylus, the cap 106 can be stored on the back of the stylus in order to prevent loss of the cap 106. The cap 106 can serve to protect the tip of the stylus 10 or the writing element 78 when the stylus 10 is not in use. The cap can also serve to prevent certain types of writing elements 78, such as markers, from drying out from exposure to air.

FIG. 4F is a cross section of the stylus housing 76 coupled with the cap. The cap 106 includes a position signal transmitter/receiver accommodation area 108. The position signal transmitter/receiver accommodation area 108 has a volume which is sufficient for a position signal transmitter 58 or a position signal receiver 60 to fit within the cap without being in contact with the cap 106. As a result, the position signal transmitter/receiver accommodation area 108 serves to protect the position signal transmitter 58 or position signal receiver 60 when the cap is coupled with the stylus housing 76.

The cap 106 may include stylus contact points 110 as illustrated in FIGS. 4F and 4G. The stylus contact points 110 are in contact the stylus housing 76 when the cap 106 is coupled with the stylus housing 76. The stylus contact points 110 limit the distance that the cap 106 can be pushed onto the stylus housing 76 to prevent damage to the stylus 10 and/or the writing element 78.

As illustrated in FIG. 4G, the stylus contact points I 10 can contact the tip end 80. When the stylus contact points 110 contact the tip end 80, the volume of the position signal transmitter/receiver accommodation area 108 is reduced. Reducing the volume also reduces the amount of air within the position signal transmitter/receiver accommodation area 108. As a result, the amount of moisture which can be withdrawn from certain writing elements 78 is reduced also reducing the opportunity for certain writing elements 78 to become dried out.

A variety of mechanisms can be utilized for removably attaching the stylus cap to the housing. For example, the cap may include a gripping sleeve section 112 which contacts the stylus housing 76. The gripping sleeve section 112 has enough length that the friction between the gripping sleeve section 112 and the stylus housing 76 keeps the cap 106 in place on the stylus 10.

As illustrated in FIG. 4H, the stylus housing 76 can include a stylus ridge 116 and the cap 106 can include a cap ridge 114. The diameter of the cap ridge 114 is smaller than the diameter of the stylus ridge and the cap 106 is constructed from a flexible materials which pen and marker caps are traditionally constructed from. When the cap 106 is pushed onto the stylus 10, the diameters of the cap ridge 114 and the stylus ridge 116 prevent the cap 106 from sliding on. However, when sufficient pressure is applied to the cap 106, the cap 106 deforms enough for the cap ridge 114 to slide past the stylus ridge 1I16. In this position, pressure is also required to remove the cap 106 from the stylus 10. As a result, the cap 106 remains in place on the stylus 10 until the user applies the pressure necessary to remove the cap 106.

The above cap embodiments are advantageous because traditional cap designs frequently rely on friction between the stylus neck 118 and the cap 106 to keep the cap 106 in place. However, such a cap design could damage a position signal transmitter 58 positioned on the stylus neck 118. Further, traditional caps do not include the volume required to accommodate the position signal transmitter 58.

FIGS. 4K and 4L illustrate further alternative embodiments of styluses that may be used with the system of the present invention. These styluses are designed to be used with a removable, disposable writing element which includes its own power source for powering the operation of the stylus. These embodiments obviate the need for a separate power source 84 and a separate space in the stylus housing for a power source 85, as shown in FIG. 4C. This allows the stylus design to be made smaller and more ergonomic. In particular, as can be seen in FIGS. 4K and 4L, the styluses have a narrower design which allows the styluses to better approximate the size and feel of a standard whiteboard marker.

FIG. 4K illustrates a stylus embodiment where the stylus electronics are positioned toward a distal end of the stylus adjacent the tip. As illustrated, the stylus includes a housing comprised of a proximal body 111, a distal body 113. A removable, disposable writing element 115 is sized to fit within the stylus housing. The writing element 115 includes a power source 117 and power source contacts 119.

Included on the proximal body 111 is an exterior pen housing 121 which is preferably clear to show the color of the writing element being used. Also included on the proximal body 111 is a groove 123 for holding the stylus cap. Power source contacts and electrical traces (not shown) are also included in the proximal body 111 for delivering power from the power source 117 on the writing element 115 to electronics on the distal housing body 113.

Included on the distal body 113 is a piercing element 125 for delivering writing media from the writing element 115 to a stylus tip 127. It is noted that the distal body 113 may optionally include a bore (not shown) through which a writing tip from the writing element 115 can pass and be positioned where the stylus tip 127 is shown. Also included in the distal body is a signal transmitter 129, preferably a transducer, electronics 131 for operating the stylus, and threading 133 for connecting the proximal body 111 to the distal body 113. As also illustrated, a cap 135 is provided which is sized to fit over the stylus tip 127 and the signal transmitter 129.

FIG. 4L illustrates a stylus embodiment where an elongated writing element is employed which allows the diameter of the stylus to be further reduced. As illustrated, the stylus includes a housing 137 with a bore 139 through a middle of the housing. An elongated removable, disposable writing element 141 is sized to fit within the bore 139 in the stylus housing 139. The writing element 141 includes a power source 143 and power source contacts 145. The stylus housing 139 also includes contacts 147 which are positioned to contact the power source contacts 145. Also included on the stylus housing is a stylus tip 149, a signal transmitter 151, preferably a transducer, and electronics 153 for operating the stylus. It is noted that the housing 139 may optionally include a bore (not shown) through which a writing tip from the writing element 141 can pass and be positioned where the stylus tip 149 is shown.

The Eraser

Figure 5A:
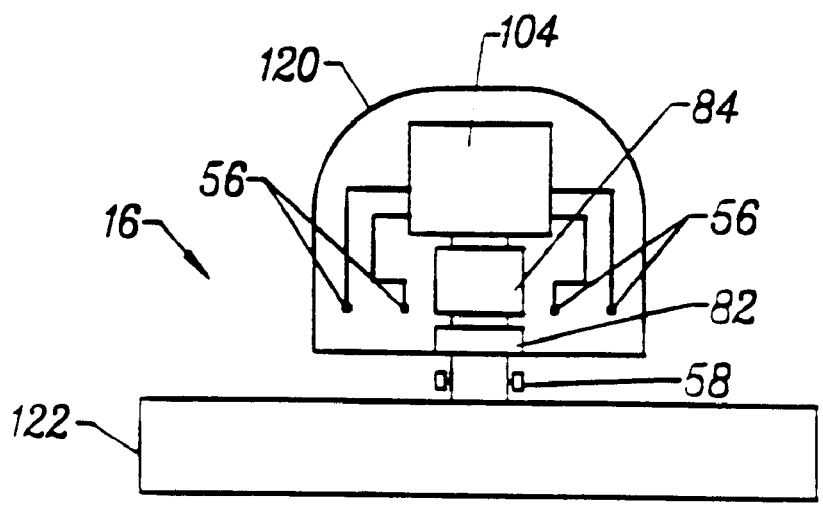
FIG. 5A is a side view of an eraser for use with a transcription system.

FIG. 5A illustrates an eraser 16 which may be used in a system according to the present invention. The eraser 16 illustrated includes a holding surface 120, an eraser pad 122, a position signal transmitter 58, a reference signal receiver 56, activation electronics 82 and implement electronics 104. It is noted that this eraser 16 is designed for use in a transcription system such as the one illustrated in FIG. 2A. However, the eraser 16 can be modified, as described above with regard to the stylus 10, for use with different transcription systems.

In operation, the eraser 16 is positioned such that the eraser pad 122 is pushed against the writing surface 28. The eraser pad 122 is constructed from a material which erases the writing element media from the writing surface 28. For instance, when the writing element 78 is a white board marker, the eraser pad 122 can be a typical white board eraser material. As a result, contact between the eraser pad 122 and the writing surface 28 can serve to erase a portion of the writing image from the writing area 38.

The activation electronics 82 on the eraser 16 can include a contact switch. The pressure of the eraser pad 122 on the writing surface 28 drives the eraser pad 122 against the contact switch closing the contact switch and activating a circuit within the implement electronics 104. Activating the implement electronics 104 can serve to signal the eraser's 16 operation to the hardware unit 14 and/or the processing unit 20 in a similar manner as discussed with respect to the stylus 10.

When the implement electronics 104 are activated, a reference signal 64 received at one of the reference signal receivers 56 triggers a position signal 66 to be transmitted from the position signal transmitter 58. The reference signal receivers 56 are preferably evenly spaced around the eraser 16 so a reference signal 64 can be received from different angles around the eraser 16. The reference signal receivers 56 and the position signal transmitter 58 can be similar to the reference signal receivers 56 and the position signal transmitter 58 used in the stylus 10.

The signal transmitted by the position signal transmitter 58 on the eraser 16 can optionally be different from the signal transmitted by the position signal transmitter 58 on the stylus 10. The hardware unit 14 and/or the processing unit 20 can then distinguish that the signal being received is from the eraser 16 as opposed to the stylus 10. When the transcription system detects that it is receiving signals from the eraser 16, the transcription system erases the monitor image 34 according to the position of the eraser 16 on the writing surface 28.

Figure 5B:
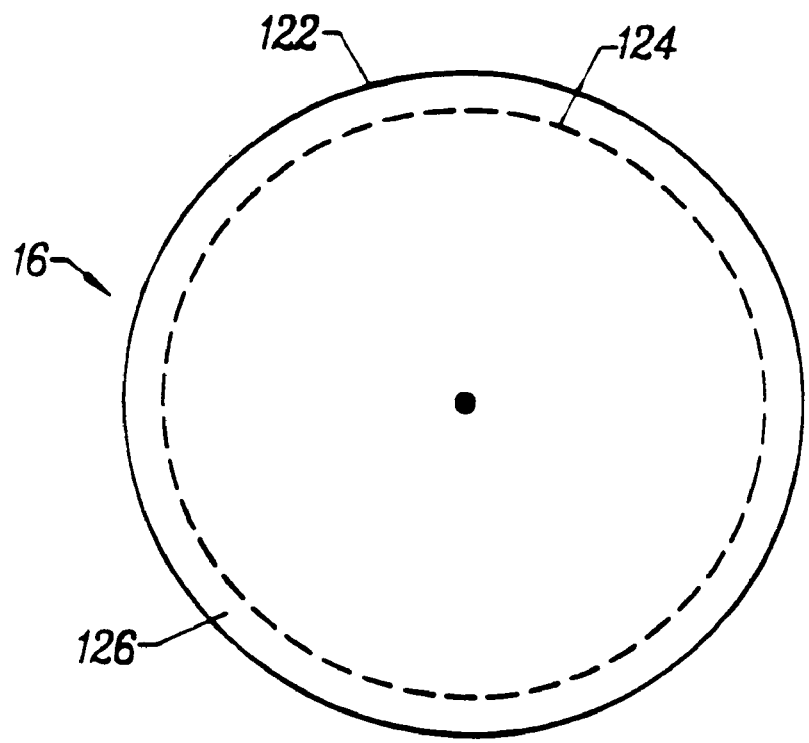
FIG. 5B is a bottom view of the eraser illustrated in FIG. 5A.

The processing unit 20 detects the position of the position signal transmitter 58 on the eraser 16. However, the portion of the written image 44 which is erased is the portion of the written image 44 in contact with any portion of the eraser pad 122 and not simply the position of the position signal transmitter 58. Accordingly, the processing unit 20 includes logic which accounts for the portion of the written image 44 actually contacted by the eraser pad 122. The processing unit 20 can be used to calculate an approximate eraser area 124 which matches the eraser pad footprint 126 as illustrated in FIG. 5B. As the eraser 16 is moved about the writing surface 28, the portion of the monitor image 34 which falls within the approximate eraser area 124 is erased from the monitor image 34. The size of the approximate eraser area 124 can be adjusted so it matches the actual size of the eraser pad footprint 126. Similarly, the approximate eraser area 124 can be calculated to have different shapes which match the shape of the eraser pad footprint 126.

The activation electronics 82 and the implement electronics 104 in the eraser 16 can perform many of the same functions as the activation electronics 82 and the implement electronics 104 in the stylus 10 in addition to the functions described above. For instance, the implement electronics 104 can include logic for transmitting an identity signal and/or low pressure signals encoded into a reference signal. Further, the implement electronics 104 can include logic for responding or not responding to inquiry signals encoded into reference signals 64.

As illustrated, the eraser pad 122 may be sized to be a little smaller than the perimeter of the eraser. This sizing of the eraser pad 122 serves to prevent the user from using an edge of the eraser to erase with since erasing using an edge of the eraser may not cause the contact switch on the eraser to be depressed and erasing movement to be detected. This sizing of the eraser pad thus forces the user to place the eraser pad surface parallel to the writing surface in order to erase.

Detectors

Figure 6A:
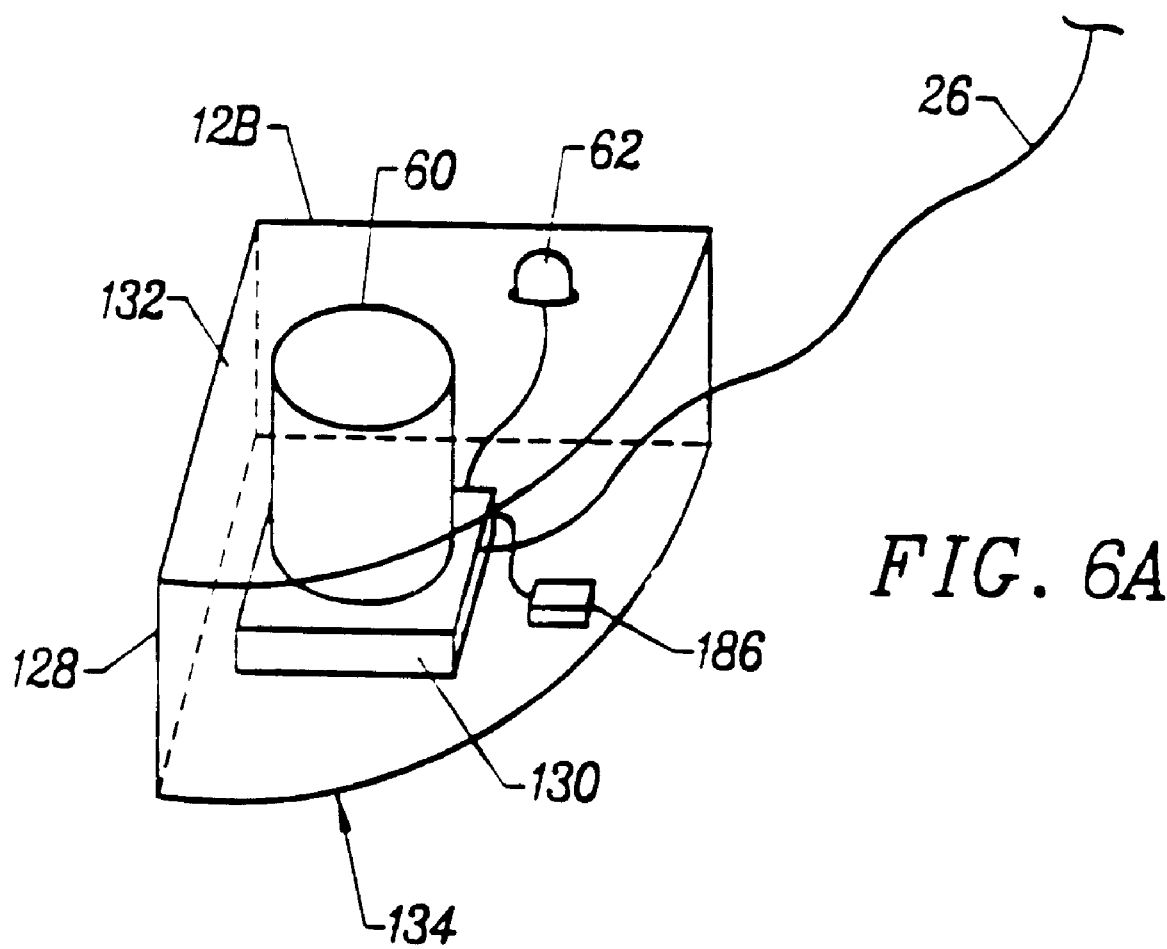
FIG. 6A is a side view of a detector.

FIG. 6A illustrates an embodiment of a detector 12B which may be used with the transcription system illustrated in FIG. 2A. The detector 12B includes a detector housing 128, detector electronics 130 and a position signal receiver 60 and a reference signal transmitter 62. The reference signal transmitter 62 is preferably positioned in an upper surface 132 of the detector housing 128. An example of an ultrasound receiver that may be used is the Polaroid L Series Ultrasonic Receiver. An example of a reference signal transmitter 62 that may be used is an IR transmitter such as an photo diode or an RF transmitter such as an FM transmitter. The position signal receiver 60 may be coupled to the hardware unit 14 through a wire 68 connection (or a wireless connection) in order to communicate to the hardware unit 14 when position signals 66 are received by the detector 12B.

Figure 6B:
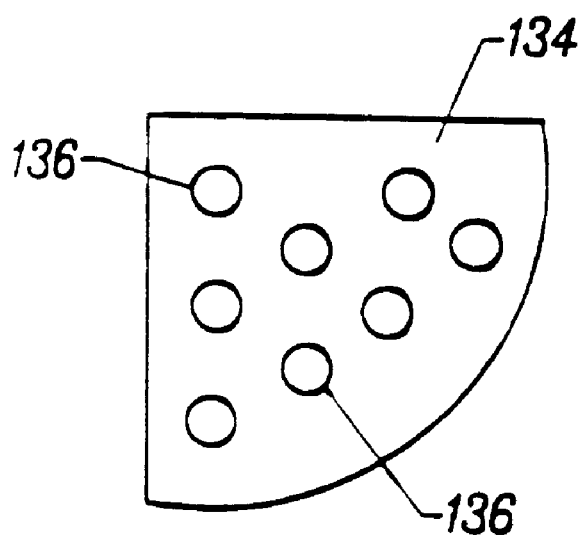
FIG. 6B is a bottom view of a detector.

As illustrated in FIG. 6B, a lower surface 134 of the detector housing 128 includes one or more attachment mechanisms 136 for removably attaching the detector housing 128 to the writing surface 28. Examples of suitable attachments mechanisms include, but are not limited to, suction cups, magnets, VELCRO or a refreshable contact cement. It is also envisioned that mounting brackets may also be attached to the writing surface 28 which may obviate the need for an attachment mechanism.

The detector 12B can be converted to detector 12A for use with the system of FIG. 2A by removing the reference signal transmitter 62. The detector 12B may also be adapted for use with the transcription system of FIG. 2B by removing the reference signal transmitter 62.

The detector 12B may also be adapted for use with the transcription system of FIG. 2C by replacing the reference signal transmitter 62 with a reference signal receiver 56. Examples of reference signal receivers 56 that may be used include, but are not limited to, a photo diode.

The detector 12B may also be adapted for use with the transcription system of FIG. 2D by replacing the reference signal transmitter 62 with a reference signal receiver 56 and by replacing the position signal receiver 60 with a position signal transmitter 58.

Figure 7A:
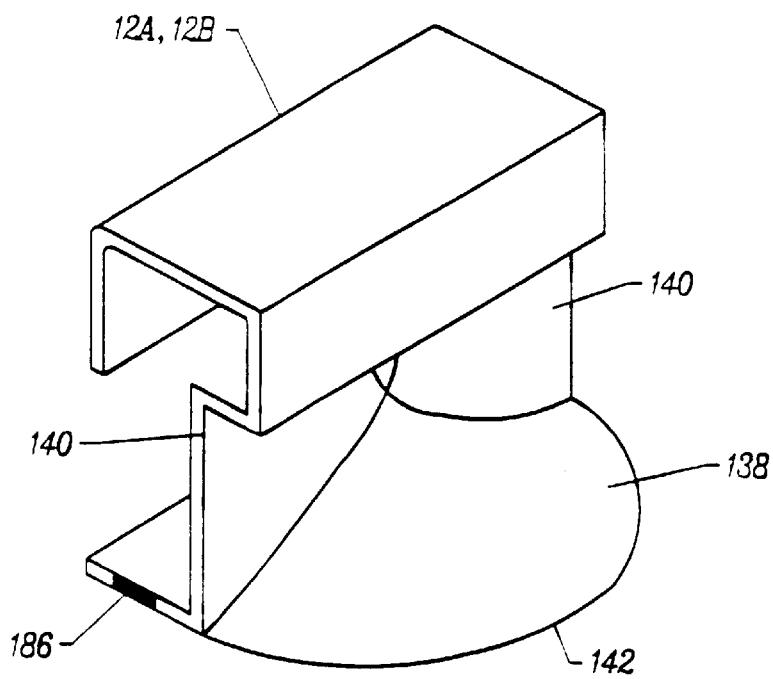
FIG. 7A is a perspective view of a detector including a 180 degree range of reception.

FIG. 7A illustrates another embodiment of detectors 12A, 12B that may be employed. The first or second detector 12A, 12B includes a reflecting surface 138 attached to a frame 140. The reflecting surface 138 has a parabola shaped profile. The parabola is rotated 180 degrees about the parabola's focus to give the reflecting surface 138 a semi-circular footprint 142. The reflecting surface 138 can be constructed from any material which will reflect the position signal 66. In operation, the detectors 12A, 12B are positioned so the reflective surface extends into the writing area 38. The shape of the reflecting surface 138 provides the reflecting surface 138 with about a 180 degree reception range, i.e., the reflecting surface 138 will reflect positions signals 66 transmitted from a range of 180 degrees. As a result, the detectors 12A, 12B can be positioned at a corner of the writing area 38 or along an edge of the writing area 38.

Figure 7B:
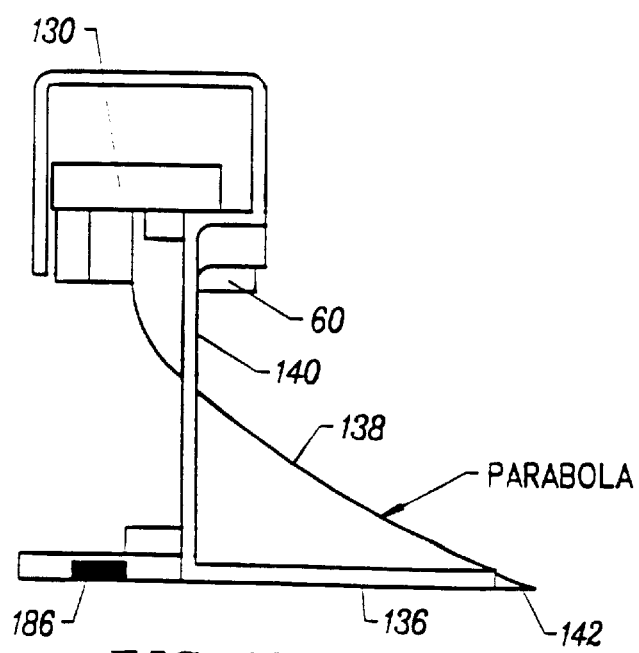
FIG. 7B is a side view of a detector including a 180 degree range of reception.

FIG. 7B is a side view of the detectors 12A, 12B illustrated in FIG. 7A. A position signal receiver 60 positioned at the focal point of the parabola. An example of a position signal receiver 60 that may be used is the L-series manufactured by Polaroid. The parabolic shape causes position signals 66 traveling at right angles to the frame 140 to be reflected into the position signal receiver 60. As a result, the reflecting surface 138 can serve to concentrate the position signals 66 and increases the opportunity for a position signal 66 to be received by the position signal receiver 60. A suitable height of the position signal receiver 60 above the writing surface 28 includes, but is not limited to, approximately 1.7 inches. A suitable radius for the footprint of the reflecting surface includes, but is not limited to, approximately 1.8 inches. A suitable equation for defining the shape of the parabola includes, but is not limited to, $y\ 1.3x^2$.

Figure 7C:
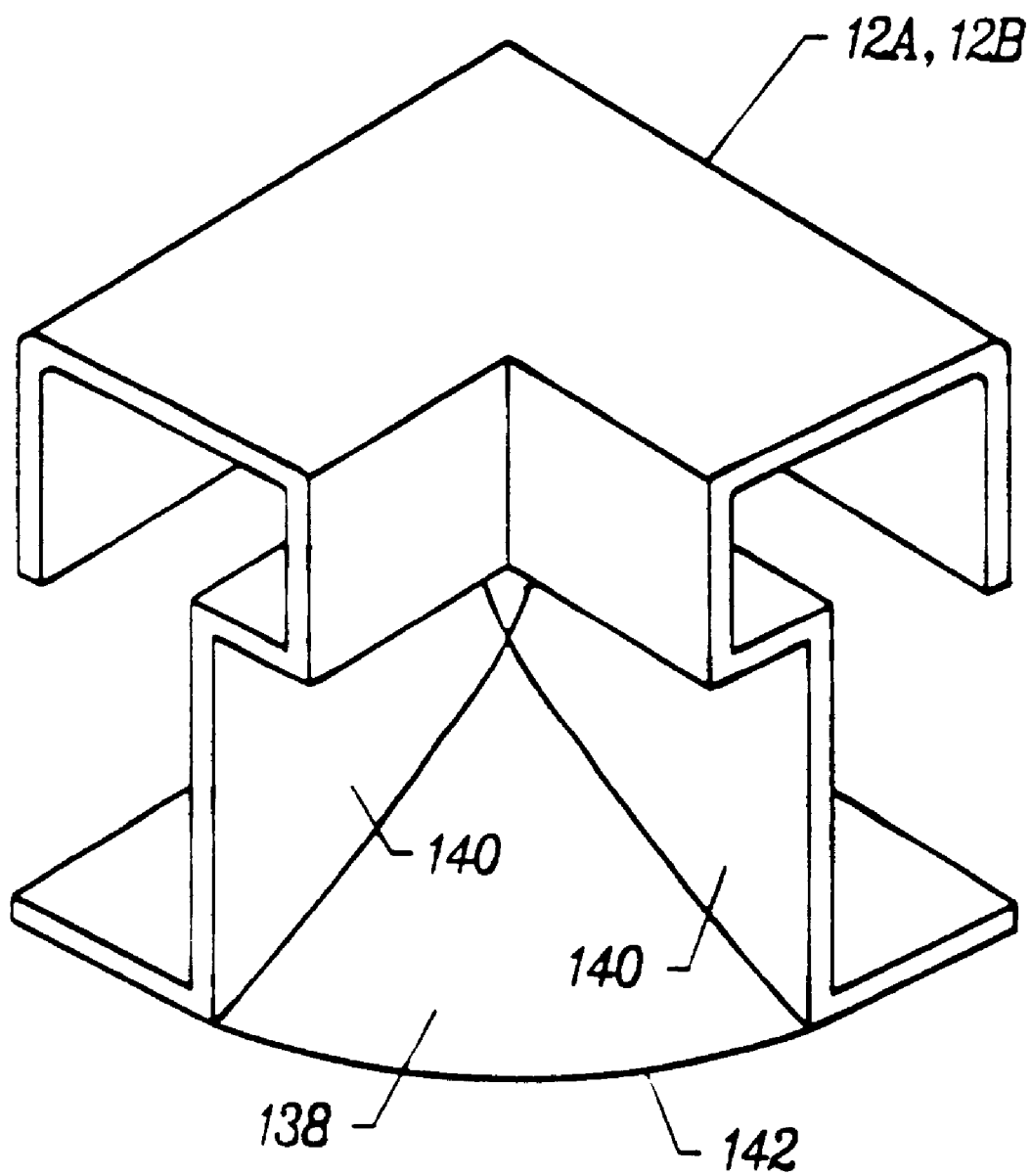
FIG. 7C is a perspective view of a detector including a 90 degree range of reception.

The reflecting surface 138 can be designed to receive position signals 66 from varying angles. For instance, the reflecting surface 138 can have a parabola shaped profile which is rotated about 90 degrees about the parabola's focus as illustrated in FIG. 7C. As a result, the reflecting surface has a 90 degree range of reception. The frame 140 can act as a filter by screening signals from outside the reception range and accordingly outside the writing area 38. A detectors 12A, 12B having a 90 degree range of reception can be positioned at a corner of the writing area 38.

Figure 7D:
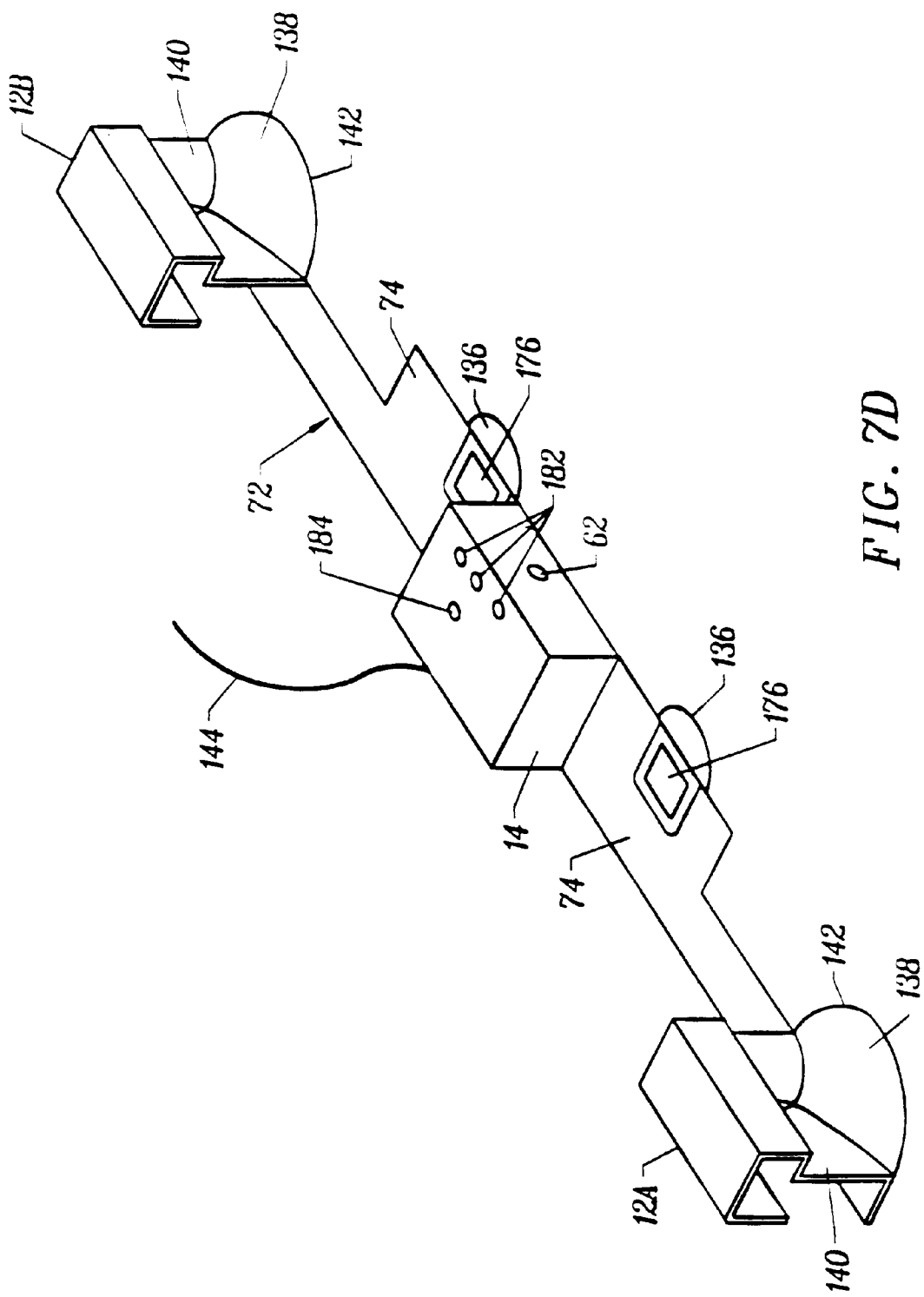
FIG. 7D illustrates a detector assembly which includes a hardware unit with control switches and indicators.

FIG. 7D illustrates a detector assembly 72 with the hardware unit 14 mounted on the coupling member 74. A cable 144 configured to be coupled with the processing unit 20 extends from the hardware unit 14. The cable 144 can be permanently coupled with the hardware unit 14 or can be removably coupled with the hardware unit 14 via a serial port. In operation, the coupling member 74 is attached to the writing surface 28 via the attachment mechanisms. The coupling member 74 can be attached along the top, bottom or side of the writing surface 28. Since the hardware unit 14 is positioned adjacent the writing surface 28, the reference signal transmitter 62 or the reference signal receiver 56 can be included on the hardware unit 14. Although the detectors 12A, 12B illustrated in FIG. 7A are shown as the detectors of FIGS. 6A–6B, the detectors of FIGS. 7A–7C can be substituted.

FIGS. 7E and 7F illustrate a detector assembly 72 with a coupling member serving as the hardware unit 14 by housing the electronics performing the functions associated with the hardware unit 14. The attachment mechanisms 136, the first detector 12A and the second detector 12B can be removably coupled with the coupling member 74 or can be integral with the coupling member 74. The coupling member 74 can be constructed from a first member 146 and a second member 148. The first member 146 can be coupled to the second member 148 by a hinge 150 extending through a vertical side of the coupling member 74. As illustrated in FIG. 7G, the hinge 150 permits the coupling member 74 to adopt two or more configurations. A distance between the first and second detectors can change in at least two of the configurations. As illustrated in FIGS. 7E and 7F, in one configuration, the detector assembly 72 adopts a configuration where the displacement between the detectors is known. As illustrated in FIG. 7G, the detector assembly 72 can adopt a second configuration where the first and second detector are adjacent to one another. The second configuration can place the detector assembly 72 in a more compact form which is suitable for transporting the detector assembly 72.

To facilitate the formability of the detector assembly 72, the electronics can be positioned primarily within the first or second member 146, 148. Flexible wiring can pass through or in proximity of the hinge 150 to permit electrical communication between the first member 146 and the second member 148. For instance, the signals from the second detector 12B coupled with the second member 148 can be communicated with the electronics positioned primarily in the first member via flexible wires passing through the hinge 150 or in proximity to the hinge 150.

As illustrated in FIG. 7H, the hinge 150 can also extend through a horizontal side of the coupling member 74. The detector assembly 72 can also include a third member 152 and a second hinge 154 as illustrated in FIG. 7I. The first and second hinges 150, 154 permit the detector assembly 72 to adopt a first configuration and a second configuration.

The coupling member 74 can include releasable locking mechanisms for locking the coupling member 74 into the first or second configuration. The locking mechanism can be included in the hinge itself or on opposing portions of the first and second members 146, 148 which come into contact when the coupling member 74 is in a desired position. The hinge can also provide enough friction that the coupling member 74 remains in a particular position once the coupling member 74 is moved into the particular position.

As illustrated in FIG. 7J, the detector assembly 72 can be capable of telescopic expansion where it includes a second member 148 which fits slidably within the first member 146. The slidability of the second member within the first member 146 permits the detector assembly 72 to adopt a first configuration and at least one second configuration. As illustrated in FIG. 7K, the first member 146 includes a blocking structure 156 and a first flange 158 while the second member 148 includes a second flange 160. When the second member 148 is slid into the first member 146, the blocking structure 156 and the second flange 160 come into contact to limit the inward displacement of the second detector 12B. The second flange 160 contacting the blocking structure can indicate that the coupling member 74 is in a position suitable for transportation. When the second member 148 is withdrawn from the first detector 12A, the second flange 160 contacts the first flange 158 to prevent the second member 148 from being pulled out of the first member 146. The contact of the first flange 158 and the second flange 160 can indicate that the coupling member 74 is in a position suitable for operation of the transcription system.

The detector assembly 72 illustrated n FIGS. 7J and 7K can include a sensor system for automatically determining the displacement, L, between the detectors. For instance, the first or second members 146, 148 can include a resistive strip (not shown). The opposite member can include a contact which touches the resistive strip at different locations depending on the position of the first member 146 relative to the second member 148. The resistive strip and the contact can be in electrical communication with the hardware controller. The hardware controller can complete a circuit through the contact and the resistive strip. The resistance in the circuit varies depending on the position of the contact relative to the resistive strip. Since the position of the contact relative to the resistive strip depends on the position of the first member 146 relative to the second member 148, a relationship between the detector displacement, L, and the resistance in the circuit can be determined. By using this relationship, the displacement, L, between the detectors can be determined from the resistance in the circuit. As a result, the coupling member of FIGS. 7K and 7J can have a variable L which can be automatically determined and does not need to be calculated during calibration.

The coupling member 74 illustrated in FIGS. 7J and 7K can also include one or more releasable locking mechanisms. The one or more locking mechanisms can be used to lock the first and second members 146, 148 relative to one another once the user has moved them into a desired position.

Figure 7L:
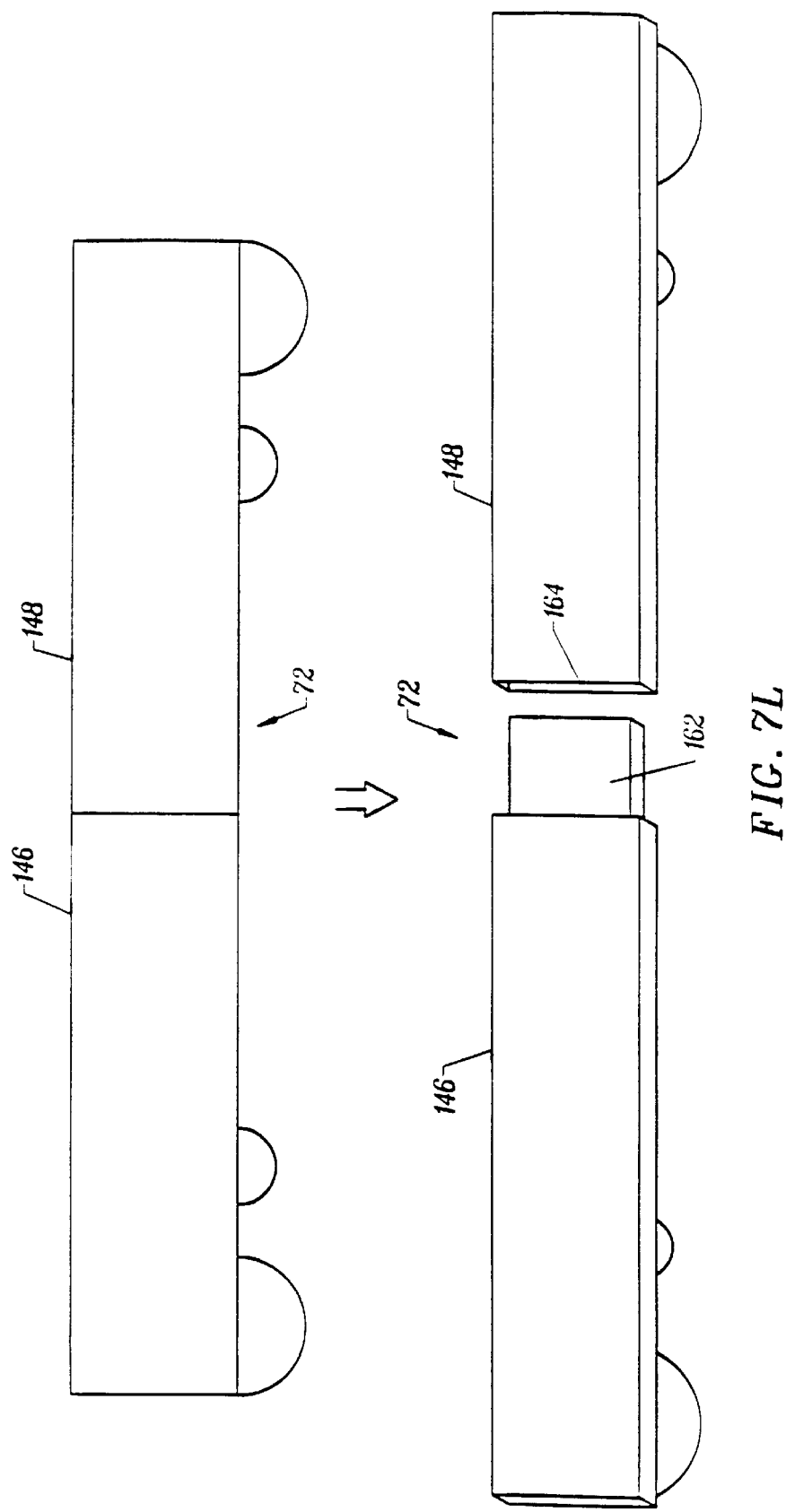
FIG. 7L is a side view of a detector assembly where a coupling member is constructed from first and second members which are detachable from one another.

As illustrated in FIG. 7L, the detector assembly 72 can have a first configuration where the first and second detectors 12A, 12B are at a known displacement and a second configuration where the first and second members 146 and 148 are detached from one another. The first configuration can be formed by inserting a portion 162 of the first member 146 into an opening 164 in the second member 148. Conversely, the second configuration can be formed by withdrawing the portion 162 of the first member 146 from the second member 148. The detector assembly 72 can include a releasable locking mechanism which serves to retain the detector assembly 72 in the first configuration until the user chooses to detach the first member 146 from the second member 148.

Electrical communication between the first and second members 146, 148 can be achieved by including electrical leads on the first and second members 146, 148 which are positioned to be in contact with one another when the first and second members are attached to one another. Alternatively, a cable can be removably attached to the first and second members 146, 148. When the first and second members 146, 148 are detached, the cable can be detached from one or both of the first and second members 146, 148 in order to completely detach the first and second members 146, 148.

Figure 7M:
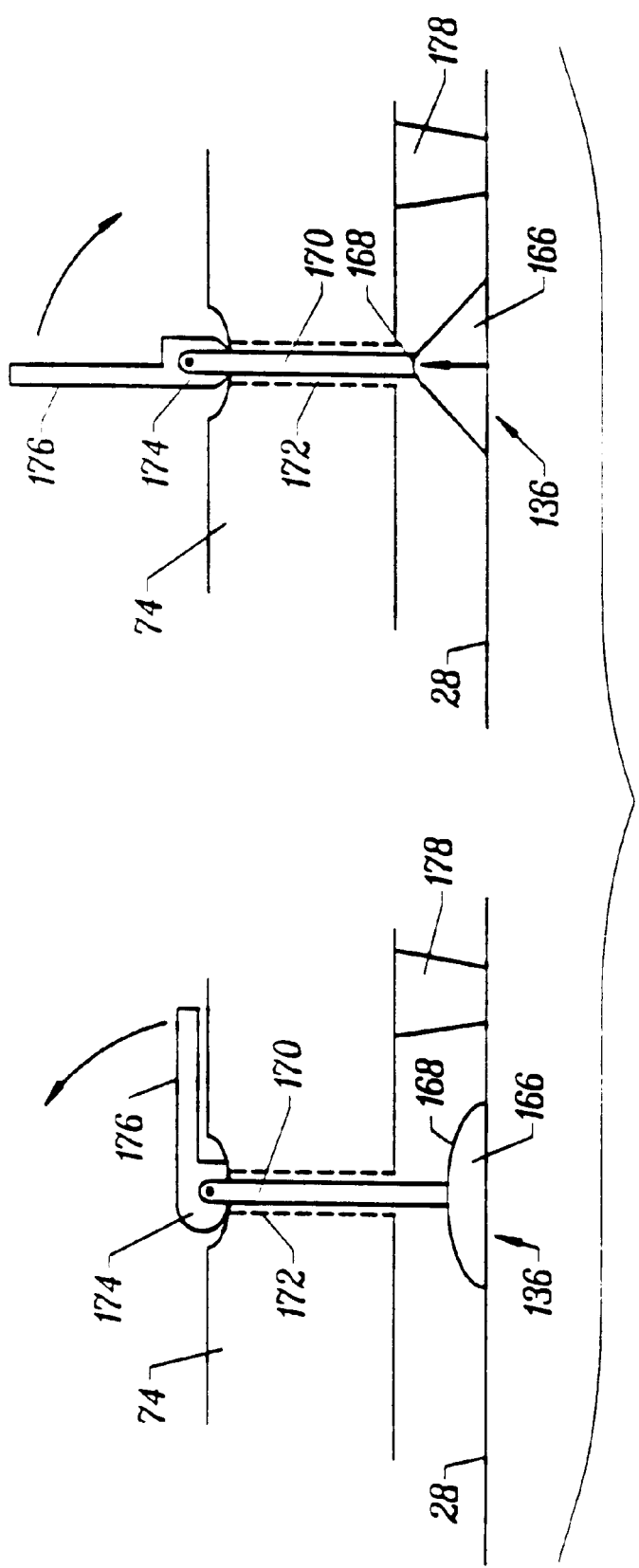
FIG. 7M illustrates a user activatable attachment mechanism which can be used to coupled a detector or coupling member with a writing surface.

FIG. 7M illustrates a user actuated attachment mechanism 136 which can be included with the coupling member 74. The attachment mechanism 136 includes a suction cup 166. A center 168 of the suction cup 166 is coupled with a member 170 extending through an opening 172 in the coupling member 74. The member 170 is movably coupled with a cam 174 included on an actuation lever 176.

In operation, the coupling member 74 is positioned so the suction cup 166 is in contact with the writing surface 28. Pressure is applied to the suction cup 166 to force air out from between the suction cup 166 and the writing surface 28. Forcing the air out causes a vacuum to be formed between the suction cup 166 and the writing surface 28. As illustrated, an end of the actuation lever 176 is then actuated so as to rotate the cam 174. The rotation of the cam 174 causes the center of the suction cup 166 to be pulled toward the coupling member 74. The coupling member 74 can include supports 178 which keep the coupling member 74 at a constant displacement from the writing surface 28. Since the coupling member 74 is at a constant distance from the writing surface 28, the motion of the center 168 of the suction cup 166 toward the coupling member 74 serves to increase the amount of vacuum between the suction cup 166 and the writing surface 28. As a result, the user actuated suction cups 166 can support a load exceeding the load which is supportable by normal suction cups. The increased load support ability provides sufficient support for a detector assembly 72 to be mounted to a vertical writing surface 28.

Although the above discussion describes the user actuated attachment mechanism 136 as being included on the coupling member 74, the attachment mechanism 136 can be included on a first and/or second detector 12A, 12B which stands independently or which is included in a detector assembly 72. Further, the number of user actuated attachment mechanisms 136 on a single detector and/or coupling member 74 can be increased until a detector or detector assembly is held all firmly in place on a writing surface 28.

In FIG. 7D, the detectors 12A, 12B are illustrated as having a 180 degree angular range of reception. However, is noted that the detectors 12A, 12B preferably have ranges of reception selected from the group of about 70 to 110 degrees, about 80 to 100 degrees, about 90 degrees, about 160 to 200, about 170 to 190 degrees, and about 180 degrees.

Figure 7N:
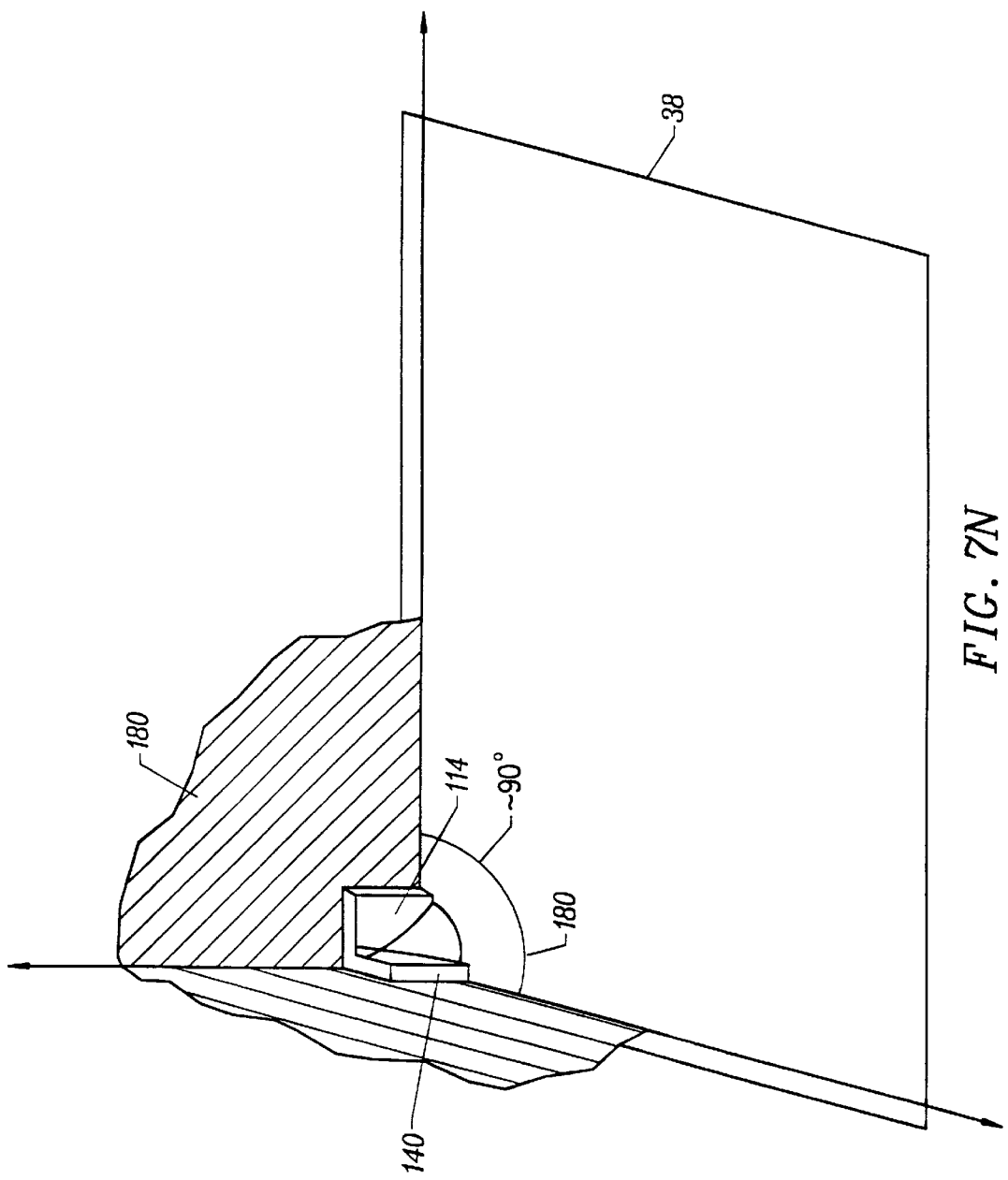
FIG. 7N illustrates a detector with a shielding element which shields a position signal receiver from position signals transmitted from outside a predetermined region extending over about 90 degrees.
Figure 70:
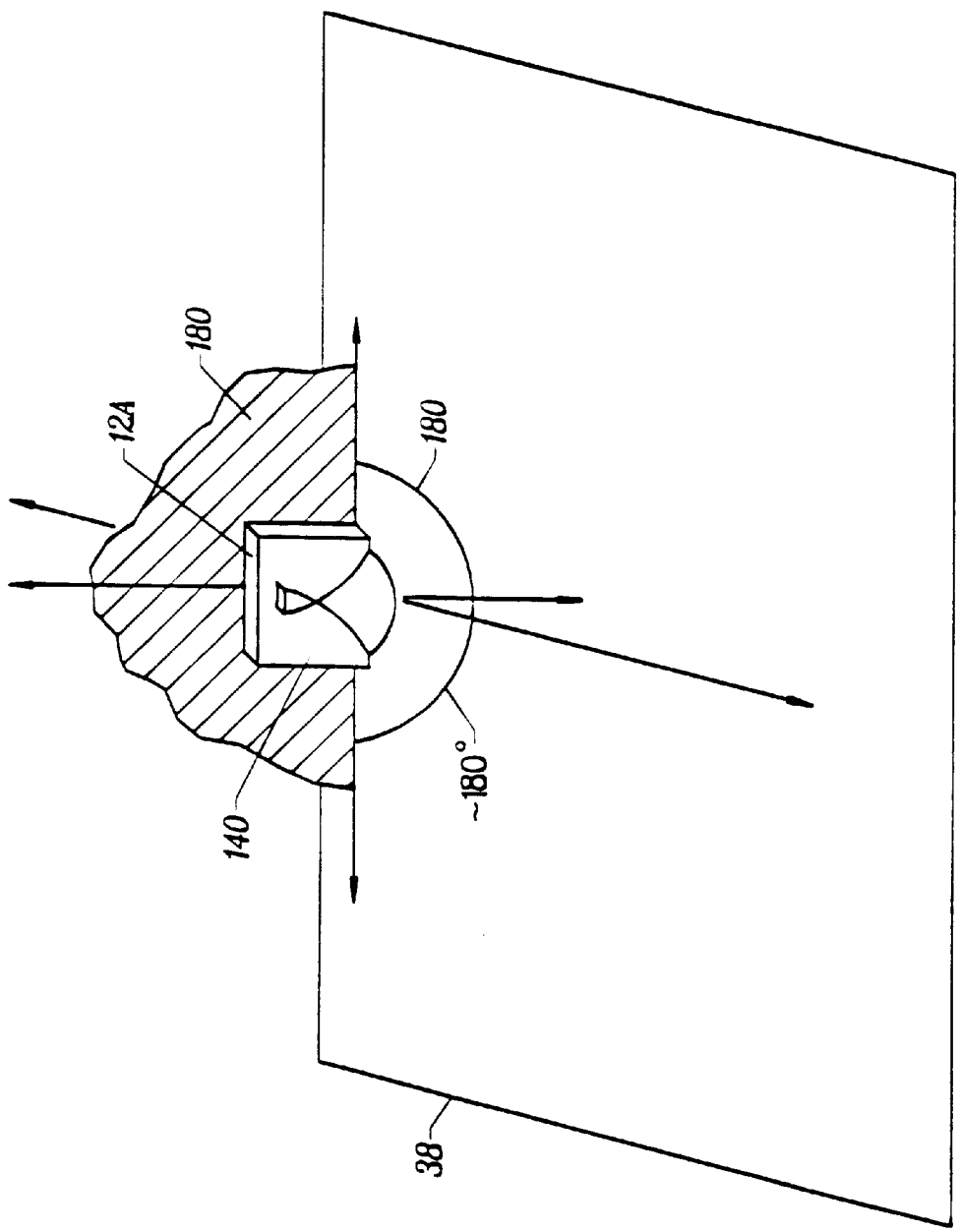

As illustrated in FIGS. 7A and 7C, the angular range of reception can be at least partially defined by a shielding element 118. The shielding element 118 is oriented relative to the position signal receiver 60 to shield the position signal receiver 60 from position signals transmitted by the stylus 10 when the stylus 10 is positioned outside a predetermined region 180. FIGS. 7N and 7O illustrate portions of a predetermined region 180 for detectors 12A, 12B with a range of reception of about 90 degrees and about 180 degrees respectively. In FIG. 7N, the predetermined region 180 has an angular range of about 90 degrees extending outward from the detector parallel to the writing surface 28. In FIG. 7O, the predetermined region 180 has an angular range of about 180 degrees extending outward from the detectors 12A, 12B parallel to the writing surface 28. The predetermined region preferably has an angular range selected from the group including about 70 to 110 degrees, about 80 to 100 degrees, about 90 degrees, about 160 to 200, about 170 to 190 degrees, and about 180 degrees.

The detector assembly may include a plurality of control switches 182 and an indicator 184, as illustrated in FIGS. 7D, 7F and 7G. The user can activate each control switch 182 to control various functions which are performed by the processing unit 20 or the hardware unit 14. For example, activating a control To switch can cause the current monitor image 34 to be saved; cause the current monitor image 34 to be saved and moved to the background while a new monitor image area 36 is brought to the foreground for the creation of a new monitor image 34; cause the current monitor image 34 to be moved to the background while a new monitor image area 36 is brought to the foreground for the creation of a new monitor image 34; cause a copy of the current monitor image to be saved in the background while the current monitor image remains in the foreground for any additional adjustments; cause the entire monitor image 34 to be erased while retaining the current monitor image area 36 in the foreground; bring a new monitor image area 36 into the foreground; maximize the current monitor image area 36 to fill the available space on the monitor; bring the last monitor image area 36 to the foreground when another program was last used in the foreground; notify the processing unit 20 that an overlay has been positioned on the writing surface; notify the processing unit 20 that an overlay has been removed form the writing surface; enable or disable selected functions; change or select the color of particular strokes on the monitor image 34; change the particular color correlated with a particular stylus 10; fax the monitor image 34; E-mail the monitor image 34; and/or print the monitor image 34. As discussed, certain embodiments of the transcription system require calibration, and activating a particular control switch can initiate calibration or recalibration. As discussed, the transcription system can be used simultaneously with other programs. Activating the control switches can serve to control the various functions of these other programs. For instance, actuating a particular control switch can cause POWER POINT to move to the next slide or display. Similarly, activating a different control switch 182 can cause POWER POINT to move to the previous slide or display. A wide variety of additional system functions can be envisioned and are intended to fall within the scope of the present invention.

The indicators 184 can be used to indicate to the user a condition of the system. For instance, an indicator 184 can be an LED which flashes when a power source within the stylus 10 is running low in power, to acknowledge that a control switch 182 has been activated and/or to acknowledge that an error condition has occurred.

As illustrated in FIGS. 6A, 7B and 7C, the first and/or the second detector 12A, 12B can include a contact switch 186 coupled with the detector electronics 130. The contact switch is closed when the detectors 12A, 12B is positioned adjacent the writing surface 28 and is opened when the detectors 12A, 12B are removed from the writing surface 28. The detector electronics can include logic for identifying when the contact switch has gone from closed to open. In response, the detector electronics 130 can provide a re-calibrate signal which is received by the hardware unit 14. The hardware unit 14 includes logic for identifying the re-calibrate unit.

Electronics

Figure 8A:
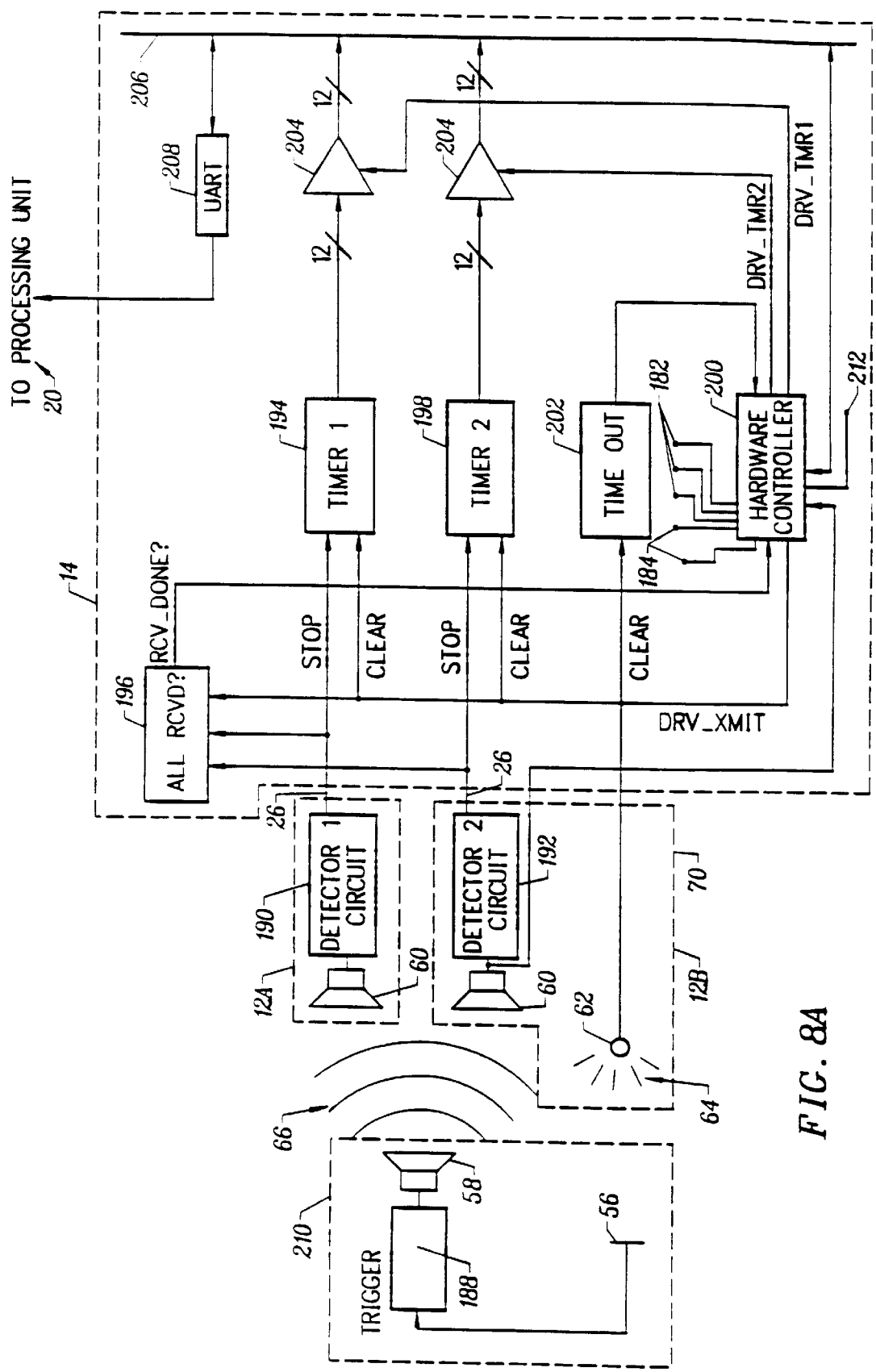
FIG. 8A illustrates a block diagram of circuitry that can be used with the system illustrated in FIG. 2A.

FIG. 8A illustrates a block diagram for controlling the transmission and emission of the various reference signals 64 and position signals 66 and for determining the time for the first and second detectors 12A, 12B to receive a position signal 66. Various portions of block diagram are positioned in the first detector 12A, the second detector 122B, the hardware unit 14, the processing unit 20 and/or an implement 210 which can be either a stylus 10 or an eraser 16. For instance, the implement 210 includes a reference signal receiver 56 coupled with a trigger circuit 188 which is coupled with a position signal transmitter 58. The trigger circuit 188 triggers the transmission of a position signal 66 in response to receiving a reference signal 64. The first detector 12A includes apposition signal receiver 60 coupled with a first detector circuit 190. The second detector 12B includes a reference signal transmitter 62 and a position signal receiver 60 coupled with a second detector circuit 192. The detector circuits provide a signal when the position signal receiver 60 has received a position signal 66.

The output from the first detector circuit stops a first timer 194 and asserts a first toggle within a toggle block 196. The output from the second detector circuit 192 stops a second timer 198 and asserts a second toggle within the toggle block 196. The first timer 194, the second timer 198 and the toggle block 196 can be located within the hardware unit 14 and/or the processing unit 20.

The hardware unit 14 and/or the processing unit 20 includes a hardware controller 200. Examples of hardware controllers that can be used include, but are not limited to microsequencer, microcontroller or microprocessor. The hardware controller 200 periodically provides a DRV__XMIT signal on a DRV__XMIT line. The DRV__XMIT signal is received by the first timer 194, the second timer 198, the toggle block 196 and the reference signal transmitter 62 in the second detector 12B. The DRV__XMIT signal is also received by a timeout counter 202.

In operation, the hardware controller 200 provides a DRV__XMIT signal which causes the reference signal transmitter 62 to transmit a reference signal 64, resets the first and second timers 194, 198 and clears any toggles within the toggle block 196 which were previously asserted. The reference signal receiver 56 receives the reference signal 64. The trigger circuit 188 triggers the position signal transmitter 58 to transmit a position signal 66. The position signal receiver 60 within the first detector 12A receives the position signal 66 and the first detector circuit provides a signal indicating that a position signal 66 has been received. The signal from the first detector circuit stops the first timer 194 and asserts the first toggle in the toggle block 196. The position signal receiver 60 in the second detector 122B receives the position signal 66 and the second detector circuit 192 provides a signal indicating that a position signal 66 has been received. The signal from the second detector circuit 192 stops the second timer 198 and asserts the second toggle in the toggle block 196.

When the first and second toggles are asserted, an RCV__DONE? signal is received by the hardware controller 200. The hardware controller 200 sequentially activates the tri-state buffers 204. The data from the first timer 194 is received on a bus 206 via the tri-state buffers 204. The data from the second timer 198 is received on the bus 206 via the tri-state buffers 204. The processing unit 20 can receive information from the bus 206 via a UART 208. After the data from the first timer 194 and the second timer 198 is received on the bus 206, the DRV__XMIT signal is provided again.

When the time out counter reaches some pre-determined limit, called the timeout limit, before both toggles in the toggle block 196 are asserted, the DRV__XMIT signal is provided without the data on the first and second timers being received by the bus 206. As a result, if one of the detectors 12A, 12B misses a position signal 66, the next cycle of position detection is performed. The timeout limit can be administratively set to some value which is appropriate for most writing surfaces 28. The timeout limit can also be calculated by the processing unit 20 or the hardware controller 200. When the timeout limit is calculated, the timeout limit can be determined by dividing the writing area diagonal, D, by the speed of sound. The calculated timeout can be increased by some administratively determined factor. Whether the timeout limit is an administratively set value or a calculated value, it is conceivable that the transcription system can record the position of the implement when the implement is positioned outside the writing area 38 or off the writing surface 28.

Figure 8B:
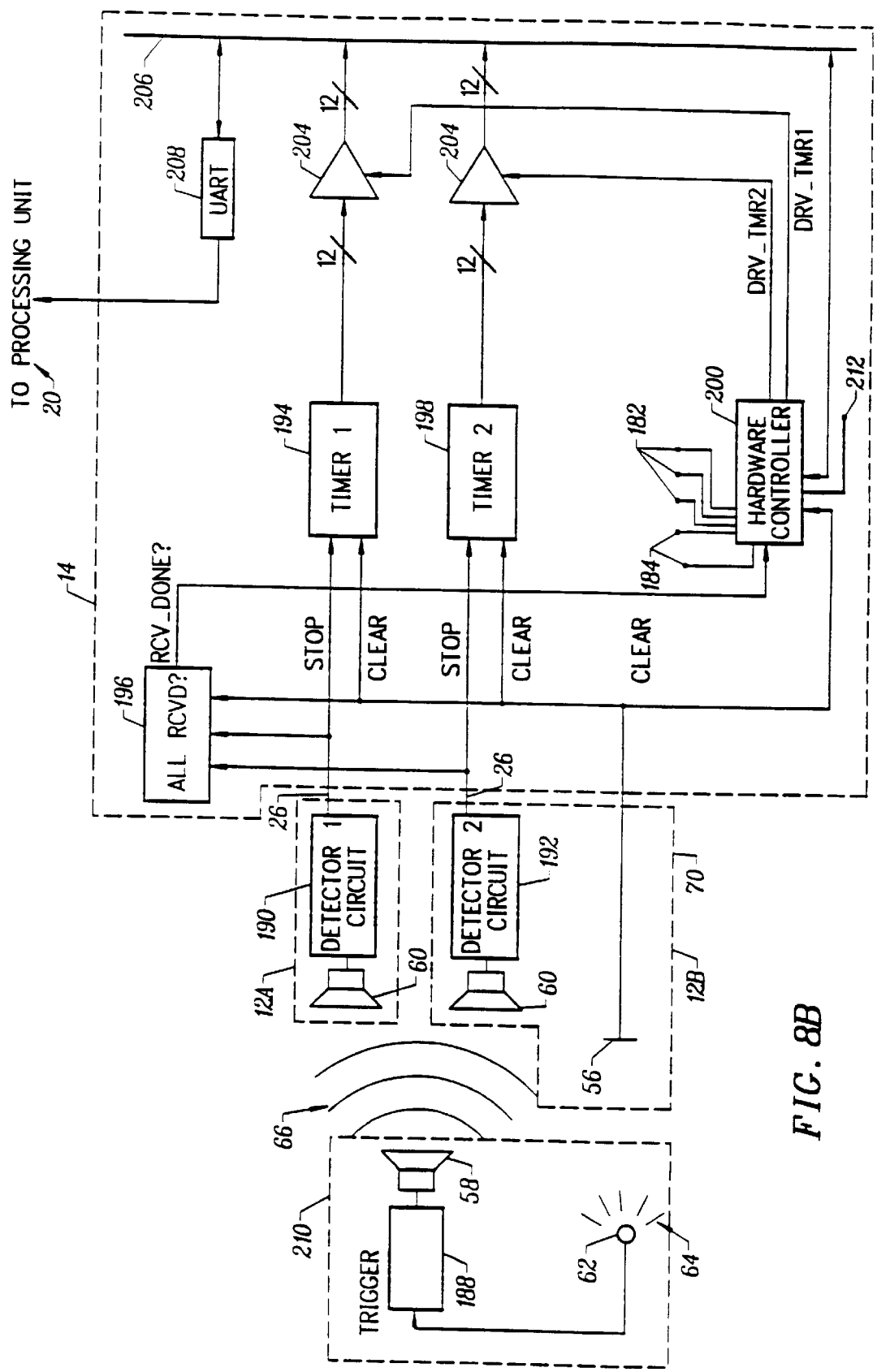
FIG. 8B illustrates a block diagram of circuitry that can be used with the system illustrated in FIG. 2C.

FIG. 8B illustrates another embodiment of a block diagram for controlling the transmission and emission of the various reference signals 64 and position signals 66. The block diagram is suitable for use with the system illustrated in FIG. 2C. The implement 210 includes a reference signal transmitter 62 and the hardware unit 14 includes a reference signal receiver 56. The trigger circuit 188 in the implement 210 is designed so a reference signal 64 and a position signal 66 are regularly transmitted from the implement 210 with a period on the order of a typical administratively set timeout limit.

In operation, the reference signal 64 is received by the reference signal receiver 56. Receipt of the reference signal 64 causes the first timer 194 and the second timer 198 to be cleared. The position signal 66 is received by the first and second detectors 12A, 12B, stopping the first and second timers 194, 198 and asserting the first and second toggles within the toggle block 196. When the first and second toggles are asserted, an RCV__DONE? signal is received by the hardware controller 200. The hardware controller 200 sequentially activates the tri-state buffers 204 to deliver the data from the first and second timers 194, 198 to the bus 206. Since the reference signal 64 and the position signal 66 are periodically transmitted, the above sequence is repeated when the hardware unit 14 receives another reference signal 64 from the implement 210.

Figure 8C:
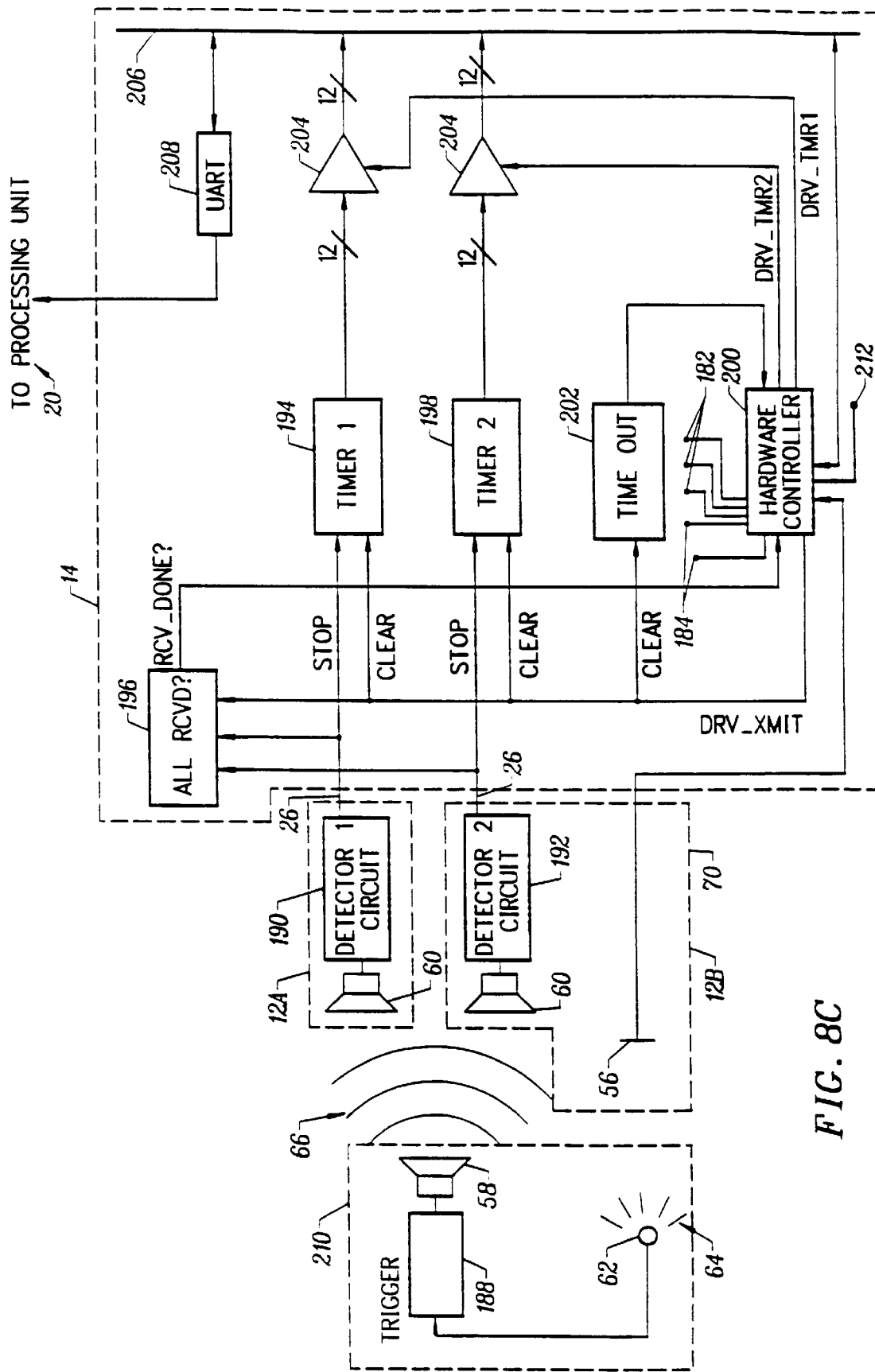
FIG. 8C illustrates a block diagram of circuitry that can be used with the system illustrated in FIG. 2D.

FIG. 8C illustrates another embodiment of a block diagram which can be used with the system illustrated in FIG. 2C. The implement 210 includes a reference signal transmitter 62 and the hardware unit 14 includes a reference signal receiver 56. The trigger circuit 188 in the implement 210 is designed so for each reference signal 64 transmitted from the implement 210, a plurality of position signals 66 are regularly transmitted from the implement 210 with a period on the order of the timeout limit.

In operation, upon activation of the implement electronics by placing the implement 210 in contact with the writing area 38, a reference signal 64 is transmitted from the implement 210 along with a position signal 66. The reference signal 64 is received by the reference signal receiver 56. In response to receiving the reference signal 64, the hardware controller 200 provides an DRV_XMIT signal which clears the first timer 194, the second timer 198 and the timeout counter 202. The position signal 66 is received by the position signal receivers 60, stopping the first and second timers 194, 198 and asserting the first and second toggles within the toggle block 196. When the first and second toggles are asserted, an RCV_DONE? signal is received by the hardware controller 200. The hardware controller 200 sequentially activates the tri-state buffers 204 to deliver the data from the first and second timers 194, 198 to the bus 206 and over a serial communication line via the UART 208 to the processing unit 20.

After the timeout counter reaches a defined time interval, the hardware controller 200 provides another DRV-XMIT signal. The defined time interval is equal to the period which the position signals 66 are transmitted from the implement 210. This time interval allows the hardware controller 200 to provide DRV-XMIT signals with the same frequency that the position signals 66 are transmitted. Further, the DRV-XMIT signals are provided at approximately the same time the position signals 66 are transmitted. As a result, the reference signal 64 serves to synchronize the DRV-XMIT signals with the transmission of position signals 66. The reference signal 64 can be transmitted with a frequency which is sufficient to prevent drift in the synchronization between the transmission of the position signals and the DRV-XMIT signals.

In each of FIGS. 8A–8C, the hardware unit 14 includes control switches 182. Signals from the control switches 182 and the position signal receiver 60 are received by the hardware controller 200. Suitable control switches 182 include, but are not limited to toggle switches and contact switches. Each hardware unit 14 also includes indicators 184 which can be activated by the hardware controller 200 or the processing unit. The indicators can be used to indicate to the user various conditions of the system. Suitable indicators include, but are not limited to, an LED, an LCD display, an LED display, a speaker for providing audible messages, a beeper and a buzzer.

In operation, the control switches 182 can be activated by the user. Based on the particular control switch 182 which is activated, the hardware controller 200 can perform a particular function itself or can load a second control signal onto the bus 206. The processing unit 20 can include logic for identifying the second control signal and carrying out a function in response to the particular control signal. Examples of functions which can be carried out by the hardware unit 14 or the processing unit are described above.

The hardware controller 200 can include logic for identifying various signals encoded into the position signals or encoded into the reference signals. For instance, the hardware controller 200 can include logic which identifies a power signal, an identity signal and/or a pressure signal encoded into position signals 66 or reference signals. In response to identifying at least one of these signals, the hardware controller 200 can load a second power, identity and/or pressure signal onto the bus 206. The second power, identity and pressure signals can be the same or different than the power, identity and pressure signals which were originally received. The hardware controller 200 can also activate an indicator 184 in response to identifying one of these signals. For instance, the indicator can be an LED and the hardware controller 200 can light the LED in response to identifying a power signal. As discussed above, the hardware controller 200 can include logic for identifying the implement 210 based on the response of the implement 210 to an inquiry signal. When the implement 210 has been identified, an identity signal can be loaded onto the bus 206. The processing unit 20 is in communication with the bus 206 and can include logic for identifying and responding to at least one of the signals which have been loaded onto the bus 206. The response of the processing unit 20 to identifying these signals will be discussed in more detail below.

The hardware controller 200 can also include logic for identifying error conditions. Example error conditions include, but are not limited to, a user's hand blocking a portion of the position signal transmitter and a detector 12A, 12B being moved after the system was calibrated. These error conditions can be identified when one of the detectors 12A, 12B receives a position signal while the other detector does not. The error condition can be identified when an RCV_DONE? signal is not received before the next cycle is begun as indicated by transmission of a position signal. The lack of the RCV_DONE? signal indicates that only one or none of the toggles were asserted before a new cycle was initiated as indicated by transmission of a position signal. When this condition is met for some pre-determined number of cycles, an error condition has occurred. The user can be notified of this indication via an indicator 184. For instance, the indicator can be an LED which flashes when the error condition is identified or a speaker which produces an audible message or an audible beep. Further, the hardware unit 14 can load an error signal onto the bus so it can be received by the processing unit. The processing unit can include logic for identifying the error signal and responding to it. For instance, upon identifying the error signal, the processing unit can cause an error message to appear on the monitor.

The hardware controller 200 illustrated in FIGS. 8A–8C can include logic for identifying when the implement 210 has been removed from the writing area 38. For instance, when position signals are not received for some pre-determined period of time, the implement can be characterized as being removed. One method for determining that the pre-determined period of time is elapsed is to monitor the number of times that the timeout counter 202 consecutively reaches the timeout limit. When a pre-determined number of timeouts has been achieved, the implement 210 is characterized as being removed from the writing area 38. The number of timeouts that should occur before the implement 210 is characterized as removed from the writing area 38 is preferably 1–20, more preferably 2–10 and most preferably 2–3.

The hardware controller 200 can also include logic for communicating to the processing unit 20 that the implement 210 has been removed from the writing area 38. As illustrated in FIGS. 8A–8C, signals from the hardware controller 200 can be received by the bus 206. When the hardware controller 200 identifies that the implement 210 has been removed from the writing area 38, the hardware controller 200 can load a stylus removed signal onto the bus 206. The processing unit 20 includes logic for identifying the stylus removed signal and adjusting the monitor image 34 accordingly.

The hardware controller 200 can also be coupled with detector circuits 190, 192 within the first or second detector 12A, 12B. The hardware controller 200 can include logic for identifying a re-calibrate signal provided by the detector electronics. As described above, the re-calibrate signal occurs when the first or second detector 12A, 12B has been removed from the writing surface 28. In response to identifying the re-calibrate signal, the hardware controller 200 can load a second re-calibrate signal onto the bus where it can be accessed by the processing unit. In response, the processing unit can initiate a re-calibration of the system.

The hardware controller 200 can also include logic for encoding inquiry signals into the reference signals 64 transmitted from the reference signal transmitter 62. As described in more detail below, these inquiry signals are identified by the implement 210 which can respond to the inquiry signal. The sequence of inquiry signals and responses can be used to identify the implement 210.

In each of FIGS. 8A–8C, the hardware controller 200 is coupled with a temperature sensor 212 so as to receive a temperature signal from the temperature sensor 212. There is a known relationship between the speed of sound and temperature. As will be described in detail below, the speed of sound can play a role in calibration of the transcription system and determining the position of the stylus 10. As a result, the hardware controller 200 can produce a second temperature signal which is received by the processing unit 20. The processing unit 20 can process the second temperature signal to determine the speed of sound which can then used in calibration and position calculations. The processing unit 20 can also include logic for monitoring the second temperature signal and periodically recalculating the speed of sound. Alternatively, the hardware controller 200 can include logic for processing the temperature signal to determine the speed of sound. The hardware controller 200 can then produce a speed of sound signal which is received by the processing unit 20. The processing unit 20 can then process the speed of sound signal to determine the speed of sound for use in calculations. The hardware controller can also include logic for periodically monitoring the temperature sensor 212 and updating the speed of sound signal.

Although the temperature sensor 212 is illustrated as being located within the hardware unit 14, the temperature sensor is preferably located where it can be positioned close to the writing surface 28 during operation of the transcription system. Proximity to the writing surface 28 provides information regarding the temperature at the writing surface 28 where changes in the temperature are most likely to influence the transcription system. Suitable locations for the temperature sensor 212 include, but are not limited to, a first detector 12A, second detector 12B, or coupling member 74. The temperature sensor 212 can also be included in an independent module which can be coupled to the writing surface 28. Further, the temperature sensor 212 can be coupled directly to the processing unit 20. As a result, the processing unit 20 can receive and process the temperature signal directly. Additionally, the transcription system can include a plurality of temperature sensors 212 in different locations to maximize the accuracy of temperature determinations or to identify the existence of temperature gradients. Suitable temperature sensors 212 include, but are not limited to, thermocouples and thermistors.

The hardware units 14 illustrated in FIGS. 8A–8C can include an internal power source such as a battery or can include a cable to an external power source such as a wall socket or the processing unit 20. The hardware units 14 can also include a power switch, such as a toggle switch, for turning the hardware unit 14 on and/or off. One of the indicators 184 can indicate whether the hardware unit 14 is on or off. For instance, the indicator 184 can be an LED which is lit when the hardware unit 14 is switched in. Further, the hardware unit 14 can include a power level sensor for detecting a level of power available to the hardware unit 14. When the available power level falls below a particular threshold level, this can be indicated to the user by an indicator 184. For instance, the indicator 184 can be an LED which is lit when the power level falls below the threshold or an LED used to indicate whether the hardware unit 14 is on or off can flash when the power level falls below a particular threshold.

The block diagrams illustrated in FIG. 8A–8C can be readily adapted for use with other transcription system embodiments, such as the transcription system embodiments illustrated in FIGS. 2B–2D. For example, in order to adapt the block diagrams for use with the transcription system illustrated in FIG. 2B, the reference signal transmitter 62 and the reference signal receiver 56 can be replaced with a wire for carrying the reference signal 64.

In FIGS. 8A–8C, the first and second detector circuits 190, 192 are illustrated as being positioned in the first and second detectors 12A, 12B. It is noted, however, that the first and second detector circuits 190, 192 may also be included in the hardware unit 14. Further, the reference signal transmitter 62 is illustrated as being positioned in the second detector 12B in FIGS. 8A and 6B. However, the reference signal transmitter 62 can also be positioned in other locations within the system including the hardware unit 14. Further, although the hardware unit is illustrated as a housing containing electronics, the hardware unit can refer to a collection of electronics which perform the functions discussed as being performed within the hardware unit. As a result, the hardware unit is conceivably distributed among several locations.

The block diagrams illustrated in FIGS. 8A–8C can be adapted for use with other systems. For instance, the block diagram illustrated in FIG. 8A can be adapted for use with the system illustrated in FIG. 3B by including a reference signal receiver 56 within the first detector 12A and replacing the position signal receiver 60 in the first detector 12A with a position signals transceiver 70. The first detector 12A can then be designed so the position signal transceiver 70 responds to receiving a reference signal 64 during calibration of the system by transmitting a position signal 66.

Figure 9:
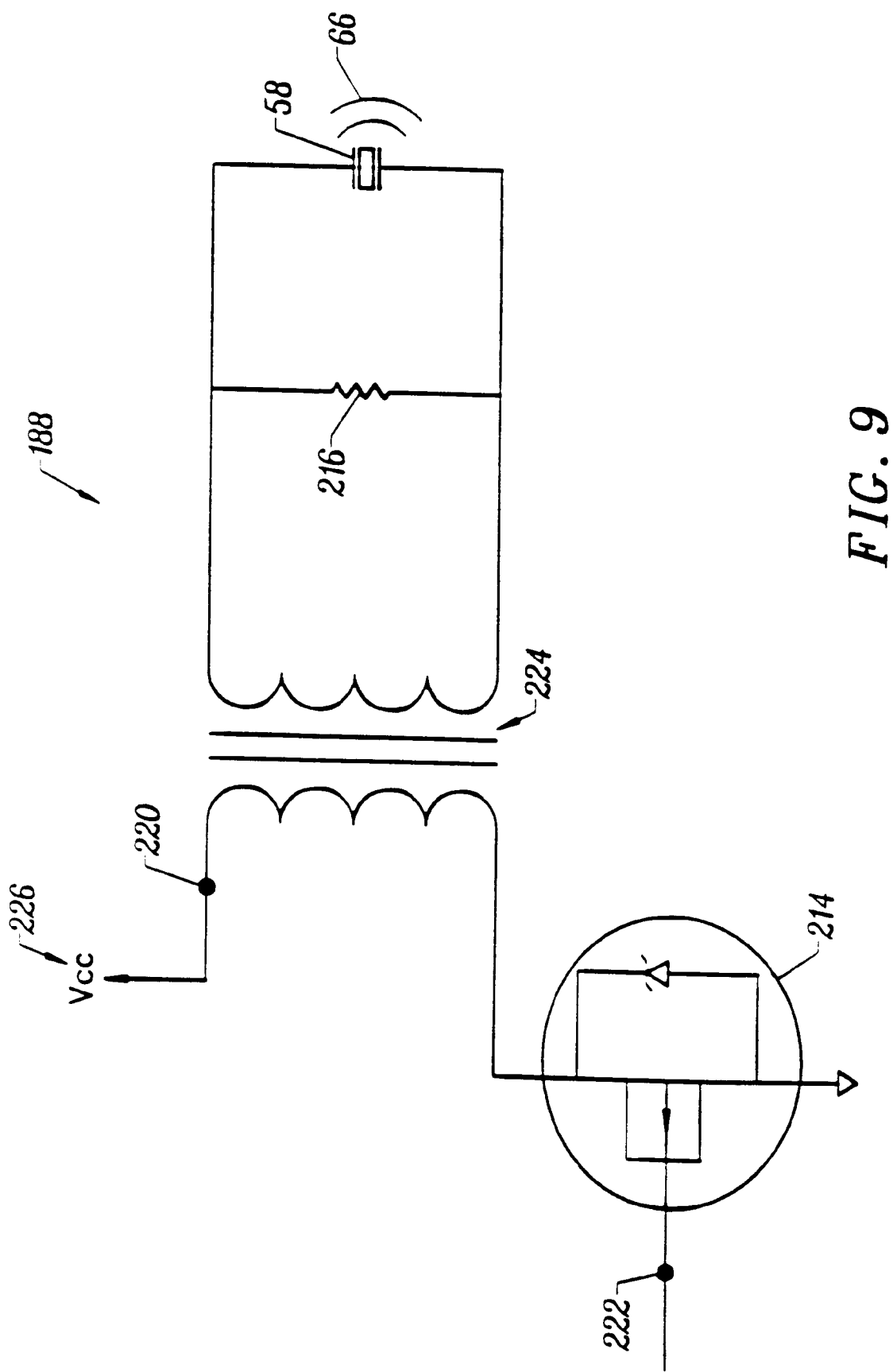
FIG. 9 is a diagram of a circuit for triggering transmission of a position signal in response to receiving a reference signal.

An example of a trigger circuit 188 that may be included in the implement electronics 104 is illustrated in FIG. 9. The trigger circuit 188 triggers the position signal transmitter 58 to transmit a position signal 66 in response to a reference signal receiver 56 receiving a reference signal 64. The circuit can be included in the stylus 10 or in the eraser 16. The trigger circuit 188 includes a transistor 214, a first node 220, a second node 222 and a transformer 224. An n-channel MOSFET transistor is shown with a self-contained zener diode, but other suitable devices might also be used. A power source 226 is coupled with the first node 220. Suitable power sources 226 include, but are not limited to, a battery such as a 5 V battery. Suitable position signal transmitters include, but are not limited to, an ultrasound transducer.

The first node 220 is also coupled with the transformer. A suitable transformer transforms the 5 V signal to a 570 V peak-to-peak signal. The transformer 224 is coupled with the source of the transistor 214. The drain of the transistor is coupled with the ground. The transformer 224 is coupled with the ultrasound transducer 58. A resistor 216 is coupled in parallel between the transformer to assist in damping electrical ringing. When the potential at the second node 222 exceeds a threshold potential, current flows from the power source 226, through the transformer 224 and the transistor 214, to the ground. The voltage output from the transformer 224 drives the ultrasound transducer 58. As a result of this configuration, the ultrasound position signal 66 is triggered by the IR reference signal 64.

As shown above, the second node 222 is coupled with the base of the transistor 214. The second node 222 can also be coupled with additional electronics within the implement electronics 104 and/or a reference-signal detector via an amplifier (not shown). The second node 222 can also be coupled with the hardware unit 14 via an electrical wire 68 as illustrated in FIG. 2B. When the second node 222 is coupled with the hardware unit 14, the ultrasound position signal 66 is triggered by a reference signal 64 received via the electrical wire 68. Similarly, when the second node 222 is coupled with a reference signal receiver, the ultrasound position signal 66 is triggered by a reference signal 64 received at the reference signal receiver.

Figure 10:
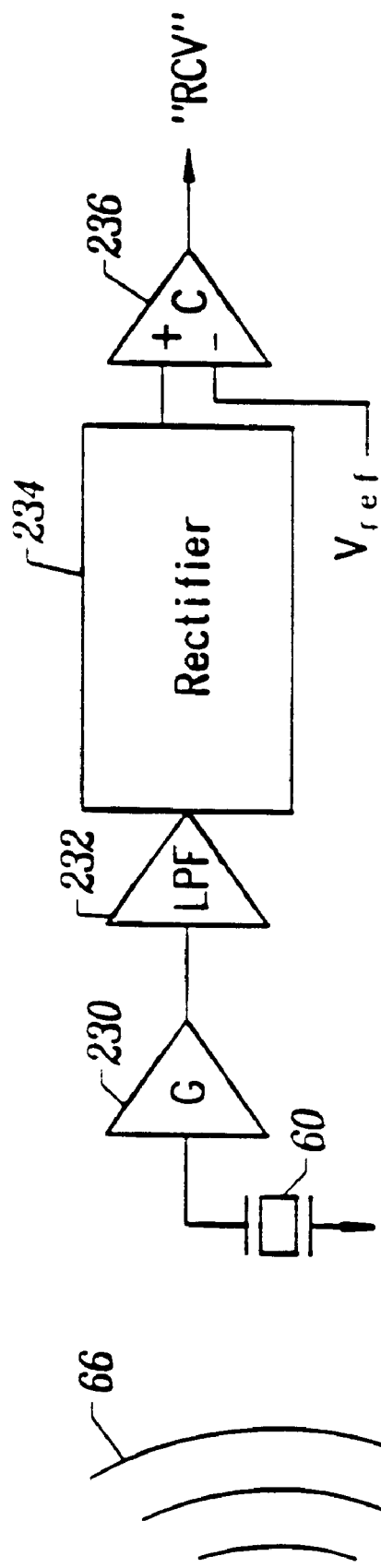
FIG. 10 is a diagram of a circuit that can be used to detect when a position signal has been received at a detector.

FIG. 10 illustrates a detector circuit which may be used as the first and/or second detector circuit illustrated in FIGS. 8A–8C. The detector circuit is typically included in the detector electronics 130 but may be positioned in another location within the system. The detector circuit includes an amplifier 230, a low pass filter 232, rectifier 234 and a comparator 236. In operation, the signal received at the position signal receiver 60 is amplified and then filtered. The filtered signal is then rectified. The rectified signal is provided to the comparator which provides a signal when the signal from the rectifier rises above some threshold value. The signal from the comparator indicates that a position signal 66 has been received at the position signal receiver 60.

In the circuit illustrated in FIG. 10, the presence of the rectifier 234 improves the quality of the monitor image 34. One source of error in creation of the monitor image 34 results when the leading edge of the position signal 66 does not exceed the comparator's 236 threshold value but a subsequent part of the same signal does exceed the threshold value. This error results in the stylus 10 appearing further from first and second detectors 12A, 12B than the true location of the stylus 10. Rectifying the signal increases the opportunity for the comparator's threshold value to be exceeded and the position signal 66 detected. The earlier a position signal 66 is detected, the less severe the error described above. As a result, the rectifier 234 serves to reduce the error resulting from missed position signals 66.

Converting Time of Flight Signals to a Recorded Image

Figure 11A:
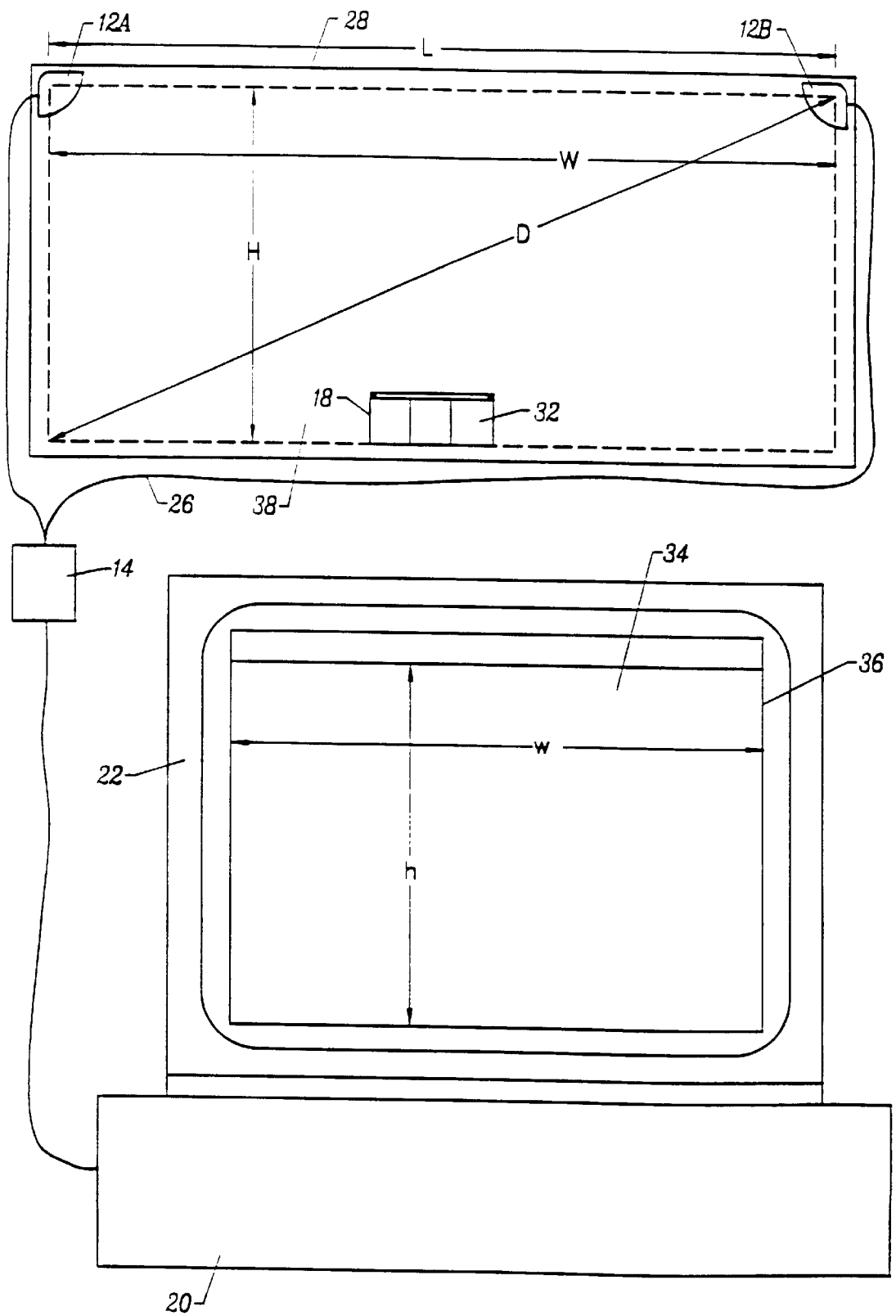
FIG. 11A illustrates dimensions of a writing area and a monitor image area.
Figure 11B:
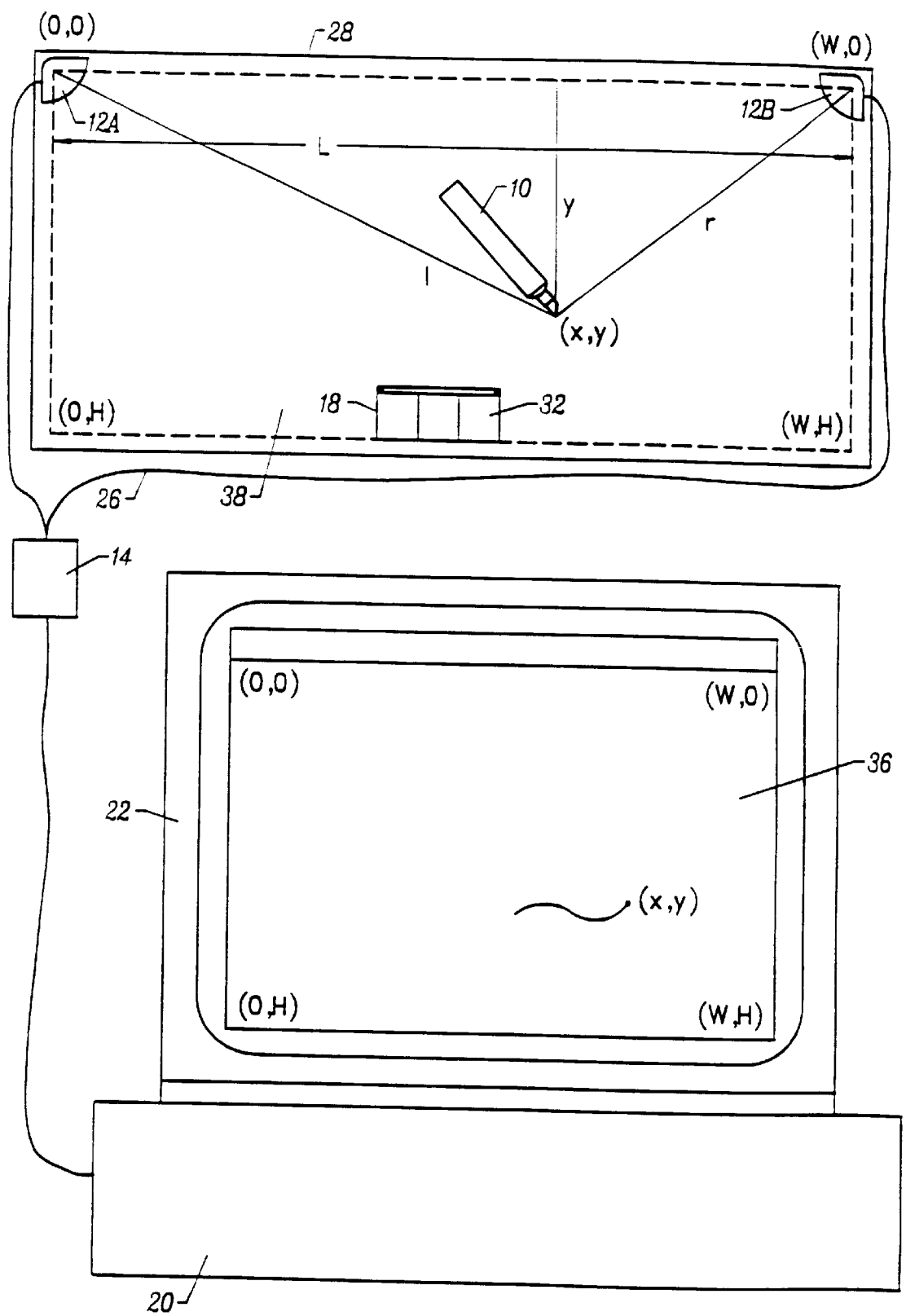
FIG. 11B illustrates coordinate systems transposed on the writing area and the monitor image area when the first and second detectors are position along the top of the writing area.

FIGS. 11A–11B illustrate how the time of flight measurements may be translated into an image on a monitor image area 36. The first and second detectors 12A, 12B are displaced by a distance, L. The writing area 38 has a width dimension, W, a height dimension, H and a diagonal direction, D. Similarly, the monitor image area 36, has a width dimension, w and a height dimension h. Each of these dimensions are illustrated in FIG. 11A. The L, H and W dimensions can be known values or can be determined during calibration of the system. Once, the H and W dimensions are determined, the monitor image area 36 is created on the monitor 22. The monitor image area 36 is created with a h:w ratio which matches the ratio of H:W. As a result, the actual h and w values can vary. After the monitor image area 36 is created, the size and dimensions of the monitor image area 36 can be adjusted by the user using traditional techniques for manipulating windows. For instance, a mouse can be used to click and drag an edge or corner of the monitor image area 36. Further, the size of the monitor image 34 relative to the monitor image area 36 can be magnified and reduced by the user with traditional techniques for magnifying and reducing images on a monitor. An example of a typical techniques for user magnification and reduction of images and image areas is used in drawing programs such as VISIO, etc. Scroll bars can be included on the monitor image area 36 to scroll to portions of the monitor image 34 which are not currently displayed on the monitor. It is conceivable that the user may write outside the writing area 38. When a user writes outside the writing area, the processing unit can include logic for expanding the size of the monitor image area 36 to accommodate positions outside the writing area 38.

As illustrated in FIG. 11B, a Cartesian coordinate system can be transposed on the writing area 38. The coordinate system is transposed on the writing area 38 so the corners of the writing area 38 is positioned at (0, 0), (0, H), (W, 0) and (W, H). The position of the stylus 10 relative to the corners of the writing area 38, (x, y), can be determined using Equation 1 and Equation 2.

$$x = \frac{L^2 - r^2 + l^2}{2L} \qquad \text{Equation 1}$$

$$y = (l^2 - x^2)^{1/2} \qquad \text{Equation 2}$$

As illustrated in FIG. 11B, the variable l represents the distance between the stylus 10 and the first detector 12A. The variable r represents the distance between the stylus 10 and the second detector 12B. The variables r and l can be calculated from Equation 3 and Equation 4.

$$l = Ct_1 \qquad \text{Equation 3}$$

$$r = Ct_2 \qquad \text{Equation 4}$$

The variable $t_1$ is the time of flight of the position signal 66 between the stylus 10 and the first detector 12A and $t_2$ is the time of flight of the position signal 66 between the stylus 10 and the second detector 12B. C is the speed of sound. As described above, C can be a function of temperature. As described above, the transcription system can include a temperature sensor 212 and logic for determining the speed of sound from temperature measurements. As a result, when the transcription system includes a temperature sensor 212, the determined speed of sound is used in these calculations. When the transcription system does not include a temperature sensor 212, the speed of sound at standard conditions can be used.

$$y = \frac{L^2 + l^2 - r^2}{2L} \qquad \text{Equation 5}$$

$$x = (r^2 - y^2)^{1/2} \qquad \text{Equation 6}$$

Figure 11C:
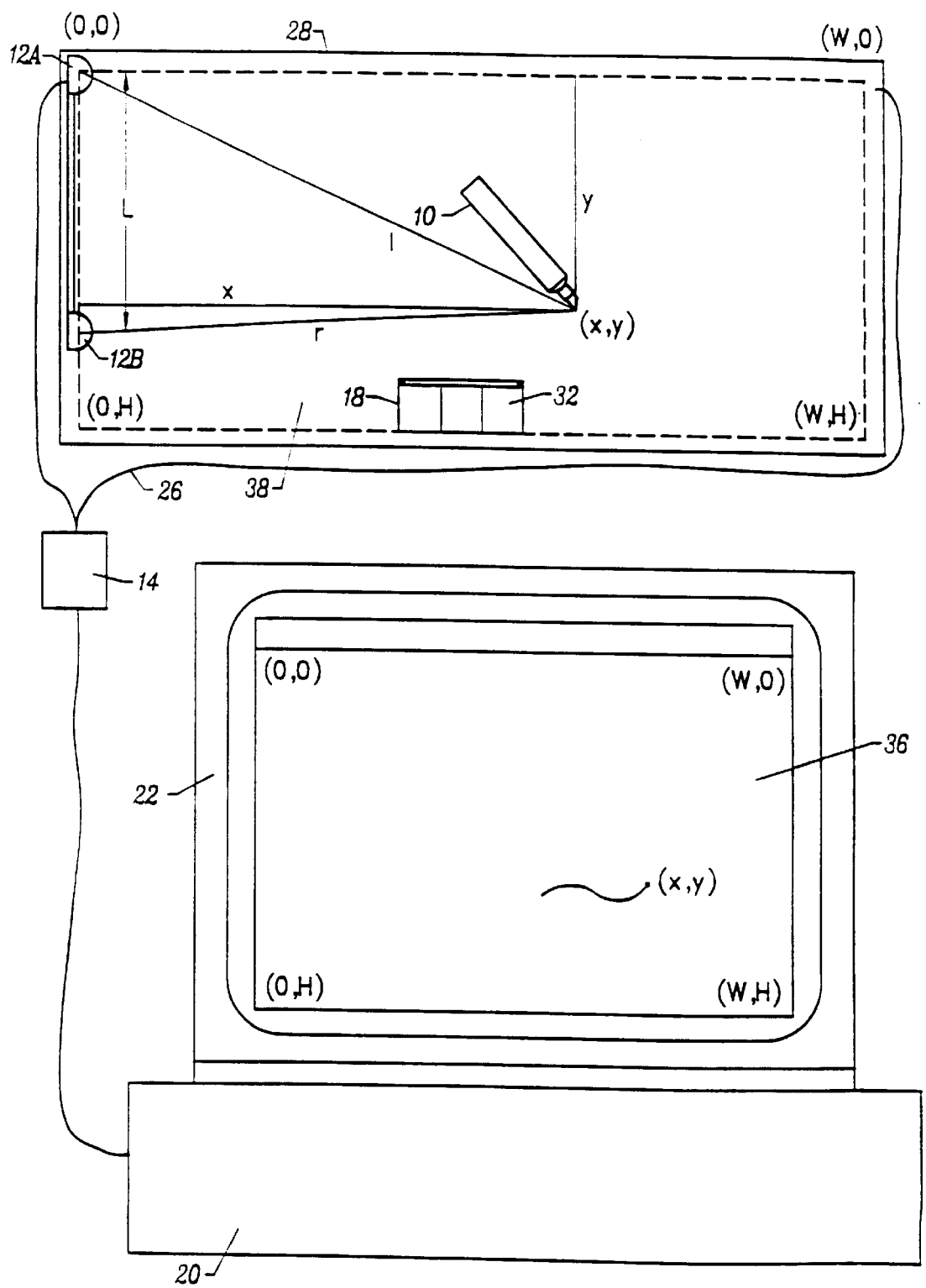
FIG. 11C illustrates coordinate systems transposed on the writing area and the monitor image area when the first and second detectors are position along a side of the writing area.

FIG. 11C illustrates the first and second detectors 12A, 12B positioned along a side of the writing area 38. The Cartesian coordinate system transposed on the writing area 38 illustrated in FIG. 11B is transposed on the writing area 38 illustrated in FIG. 11C. Although the coordinate system is the same, the changed position of the first and second detectors 12A, 12B relative to writing area 38 requires a different set of equations to determine the stylus position, (x, y). The stylus position, (x, y), can be determined using Equation 5 and Equation 6.

As illustrated in FIGS. 11B and 11C, a Cartesian coordinate system is also transposed on the monitor image area 36. The corners of the monitor image area 36 are defined as (0, 0), (0, H), (W, 0) and (W, H) so they are correlated to the position of the writing area corners 38. As a result, the stylus position, (x, y), on the writing area 38 translates to a position on the monitor image area 36.

Figure 11D:
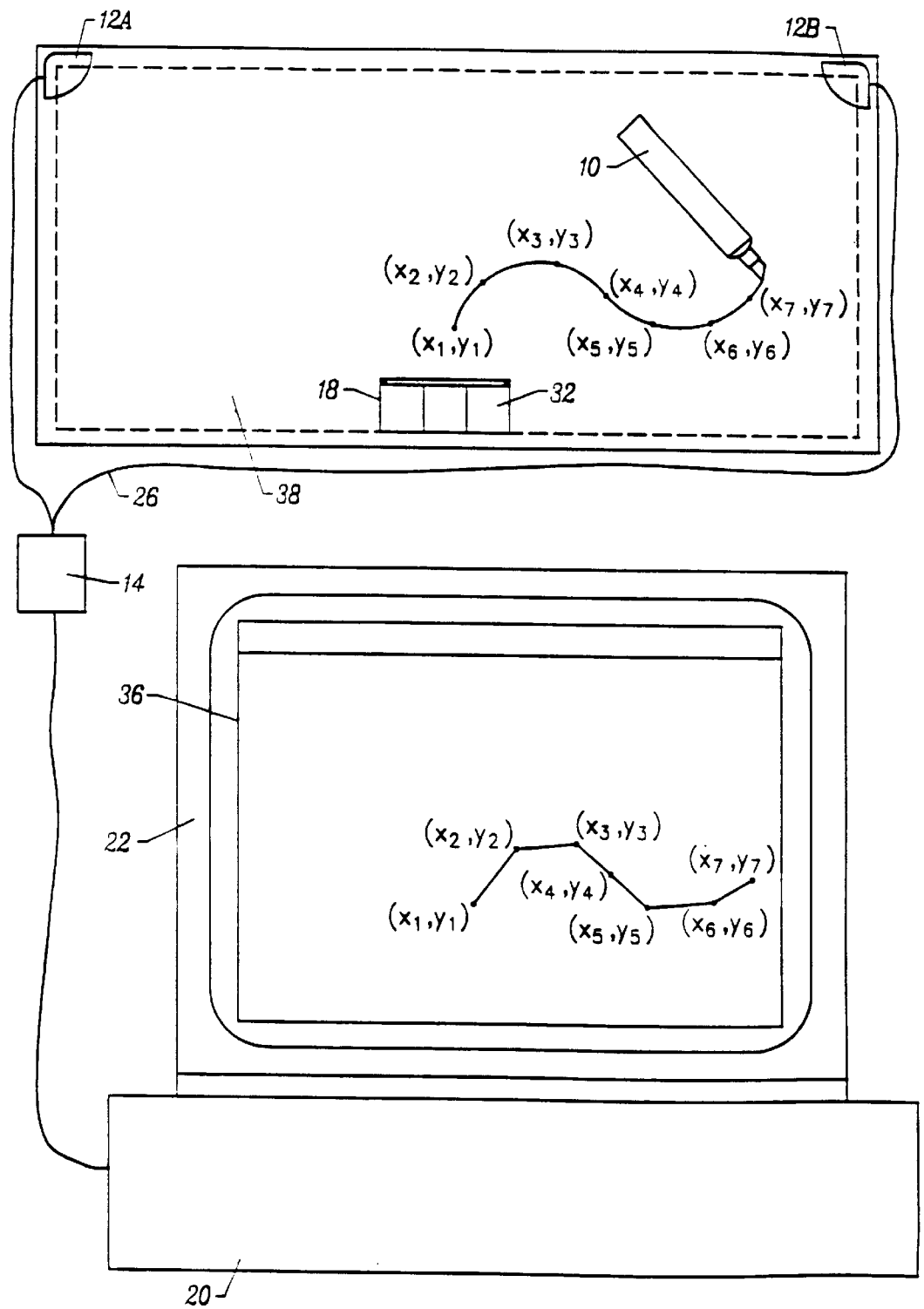
FIG. 11D illustrates creation of a monitor image.

Creation of the monitor image 34 is illustrated in FIG. 11D. The stylus position, (x, y) is periodically sampled as the stylus is moved along the writing area 38. For instance, during the stroke illustrated in FIG. 11C, the stylus position during each sample is expressed as a set of Cartesian coordinates, $(x_n, y_n)$. The sampled positions are then translated to positions on the monitor image area 36. The image forms when line segments are drawn between consecutively sampled positions which have been translated to the monitor. The resolution of the monitor image 34 can be increased by increasing the frequency that the stylus position, (x, y), is sampled. Further, the resolution of the monitor image 34 can also be smoothed with position filtering logic as will be discussed below.

Accuracy

There are a number of sources of error in the determination of the radial distances. Some of these sources will introduce consistent biases to the radial distances that do not adversely affect the resolution of the system. Other sources of error will introduce approximately independent errors for each position calculation. Errors of this type include noise in the infrared and ultrasound signals and errors due to the fact that arrival times of the pulses are quantized with a time resolution equal to the clock speed of the system. In one embodiment of the system, these errors combine to yield an overall system jitter of ±300 ns. These "random" errors limit the spatial resolution of the system.

In one embodiment, with a 4'×8' writing surface and approximately 20 inches of separation between detectors, the empirically determined resolution of the system is approximately 100 dots per inch (DPI). Increasing the distance between the detectors will improve resolution. Moving the detectors around the perimeter of the writing surface will not significantly change the average or worst-case resolution.

Data Structures

Figure 12:
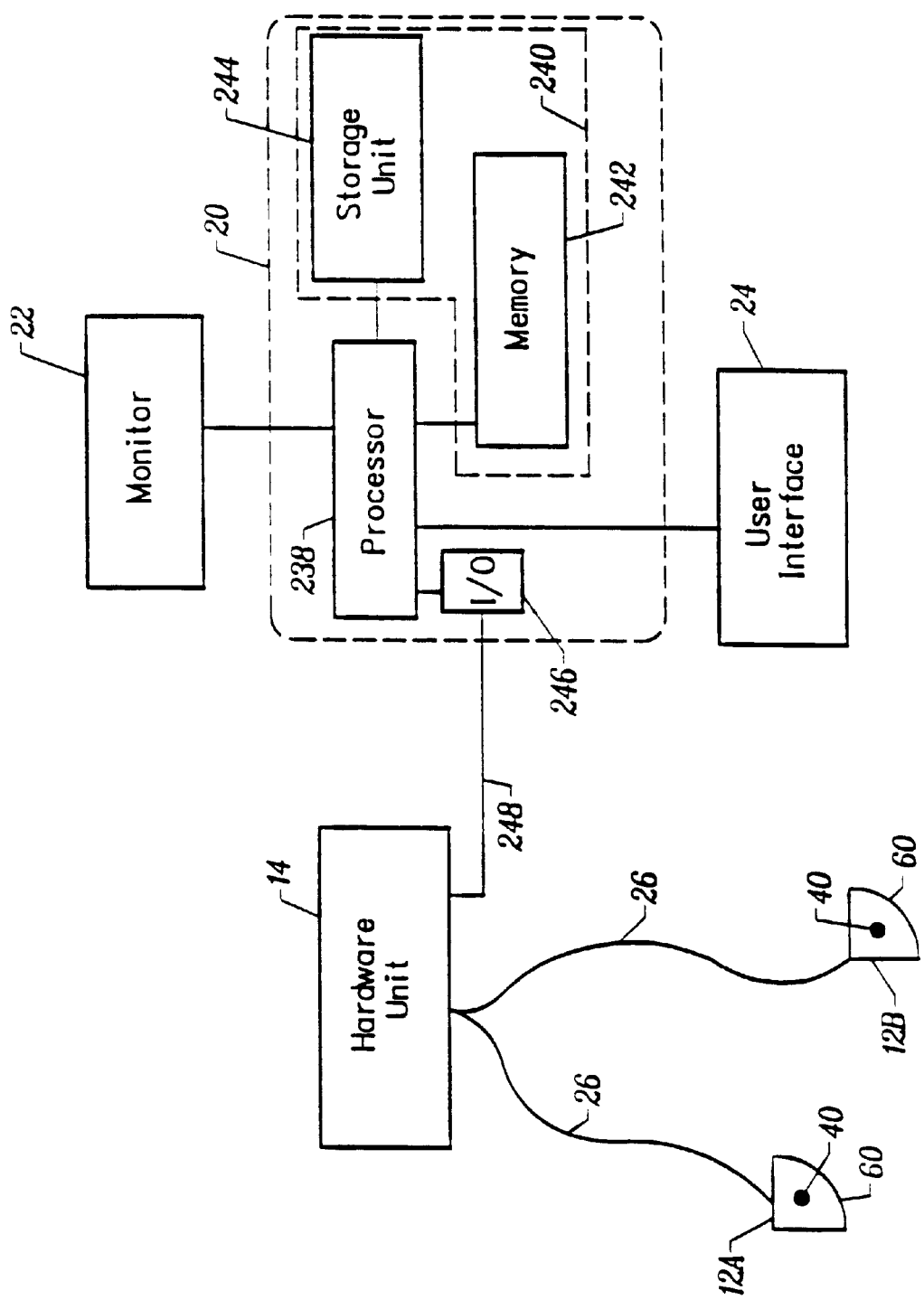
FIG. 12 is a block diagram of a processing unit.

FIG. 12 provides a block diagram of an embodiment of the system. The processing unit 20 illustrated includes a processor 238 in communication with a memory 240 including a volatile memory 242 and a storage unit 244. Suitable processing units 20 include, but are not limited to, IBM and Macintosh personal computers and central servers. The processor 238 is also in communication with the hardware unit 14 via an input/output unit 246 and a serial channel 248. Suitable processors 238 include, but are not limited to, microprocessors and CPUs. The storage unit can include logic and various data structures. The volatile memory 242 is utilized during execution of the logic included in the storage unit 244.

Figure 13:
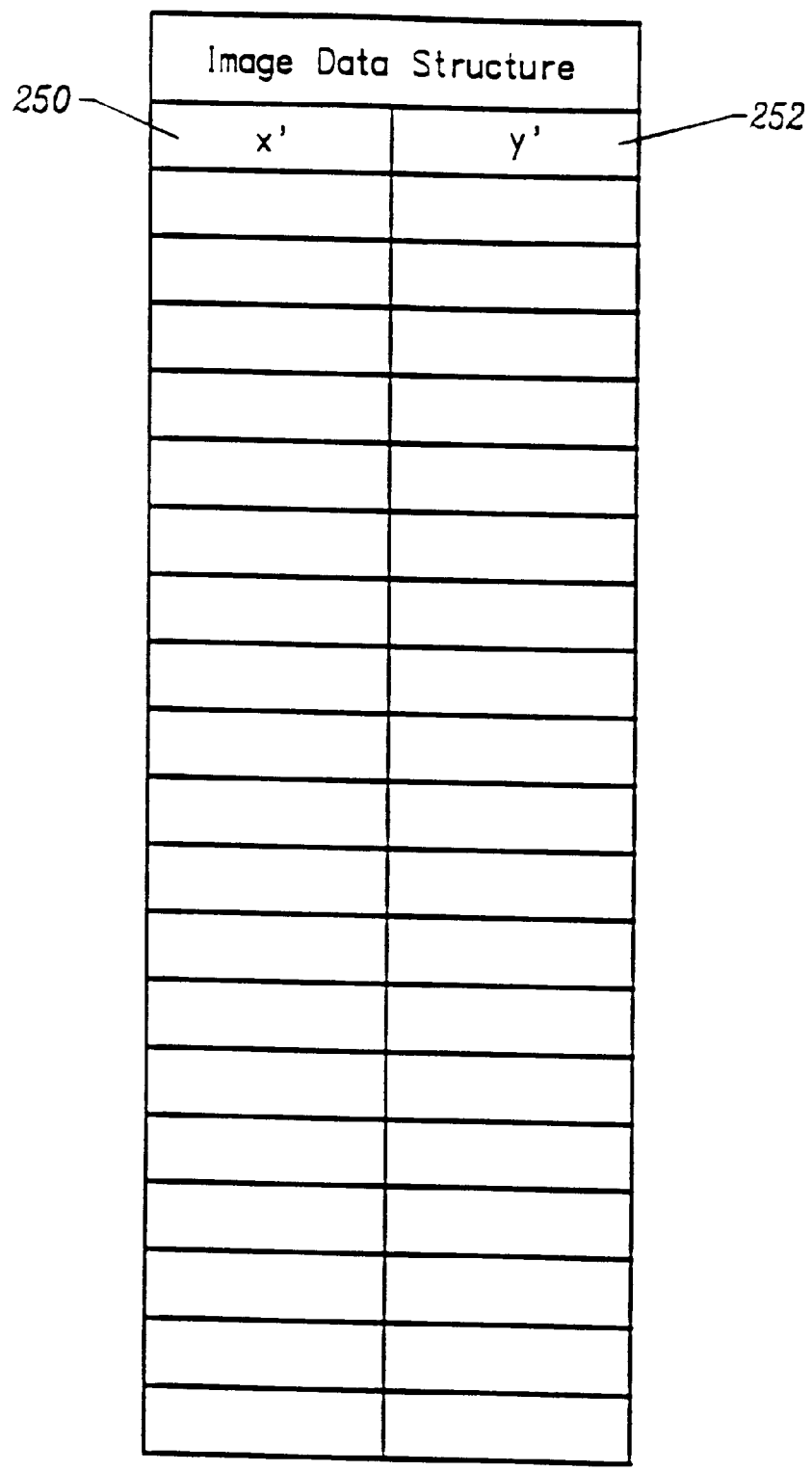
FIG. 13 illustrates an image data structure used to store a series of stylus positions.

FIG. 13 illustrates a data structure for an image data structure which can be stored in the memory 240. The image data structure includes a column of x fields 250 correlated with y fields 252. As described above, the position of the stylus 10 relative to the detectors is periodically sampled as the stylus 10 is moved along the writing area 38. The Cartesian coordinates for the sampled positions are stored in the image data structure. The x coordinate for each sampled position is stored in an x field and the y coordinate for the position is stored in the corresponding y field.

The monitor image 34 is created by forming lines between sequential positions in the image data structure to form a stroke. Certain rows can include break entries which indicate that the stylus 10 was removed from the writing surface 28. These entries are created when an activation or deactivation signal 66 has been received as discussed above. When such an entry exists, lines, splines and the like may be drawn between the series of positions following the entry but not between positions on opposite sides of the entries. As a result, a second stroke is created which is independent of the first stroke.

FIG. 14 illustrates an implement characteristic data structure 254 which can be stored in the memory 240. The implement characteristic data structure 254 includes a column of implement identifier fields 256 correlated with implement fields 258, first implement characteristic fields 260 and second implement characteristic fields 262. The implement identifier field 256 lists an identifier which can be unique to each type of implement which can be used on the writing area 38. For instance, each type of stylus 10 and each type of eraser 16 can be identified by a unique number. Each implement field 258 lists whether the implement is an eraser 16, a stylus 10 or other implement which can be used on the writing area 38. The first implement characteristic field 260 and the second implement characteristic field 262 list characteristics of the implement identified in the corresponding implement field 258. For instance, when the identified implement is a stylus 10, the first implement characteristic field 260 can list information indicating the color or thickness of the stroke left by the stylus 10. The implement characteristic data structure 254 can optionally include additional implement characteristic fields which can list additional implement characteristics.

The implement characteristic data structure 254 is used to identify the implement being used on the writing area 38. As a result, when the eraser 16 is is being used on the writing area 38, the monitor image 34 is erased. Further when the stylus 10 is being used on the writing area 38, the characteristics correlated with the identified stylus 10 can be used to create each stroke on the monitor image 34. For instance, when a blue stylus 10 is used to write on the writing area 38, the strokes which appears on the monitor image 34 can be created with a blue color. As a result, the characteristics of the monitor image 34 can be reflected in the written image 44.

It is noted that the system can be adjusted such that when strokes of different colors cross over each other, the system may either display one stroke on top of the other stroke, or illustrate the overlapping portion of the strokes as a mixture of the different colors. For example, when a blue stroke is written over a yellow stroke, the system may either record the overlapping portion as being the first stroke (yellow), the last stroke (blue), or a combination of the two strokes (green). By providing a mixture of the different colored strokes, the actual appearance of the image formed by the different strokes can be better simulated.

FIG. 15A illustrates an control section relative to template data structure which can be stored in the memory 240. The control section relative to template data structure includes a function field 264 and a plurality of coordinate fields 266–280. The plurality of coordinate fields include an x' upper left corner field 266, a y' upper left corner field 268, an x' upper right corner field 270, a y' upper right corner field 272, an x' lower left corner field 274, a y' lower left corner field 276, an x' lower right corner field 278 and a y' lower right corner field 280. The x' upper left corner field 266 and the y' upper left corner field 268 lists the coordinates of the upper left corner of a particular control section 32 on the template 18. Similarly, the remaining coordinate fields 270–280 list the coordinates for other corner of the particular control section 32. The coordinates are listed relative to the template 18. For instance, an imaginary or real coordinate system can be transposed on the template 18 with the origin of the coordinate system located at one calibration mark 40 and an axis of the coordinate system extending through another calibration mark 40. The coordinates listed in fields 266–280 are measured on the transposed coordinate system. As a result, the listed coordinates indicate the spatial relationship of each control section 32 relative to the calibration marks 40.

Each set of coordinate fields 266–280 is correlated with a function field 264 which lists a function performed by the hardware unit 14 or the processing unit 20 when the stylus 10 is positioned within the control section 32 defined by the coordinate fields 266–280. For instance, when the stylus is positioned within an control section 32 with coordinates corresponding to the function field 264 labeled "print", the hardware unit 14 or the processing unit 20 will cause the monitor image 34 to be printed. Similarly, when the stylus is positioned within an control section 32 with coordinates corresponding to the function field 264 labeled "2", the hardware unit 14 or the processing unit 20 will cause the number 2 to be displayed in the display 48 of the calculator image 46.

FIG. 15B illustrates an control section relative to detectors data structure which can be stored in the memory 240. The control section relative to detectors data structure includes function fields 264 similar to the function fields listed in the control section relative to template data structure. The control section relative to detectors data structure also includes a plurality of coordinate fields 282–296. The plurality of coordinate fields 282–296 include an x upper left corner field 282, a y upper left corner field 284, an x upper right corner field 286, a y upper right corner field 288, an x lower left corner field 290, a y lower left corner field 292, an x lower right corner field 294 and a y lower right corner field 296. The x upper left corner field 282 and the y upper left corner field 284 respectively list the x and y coordinates of the upper left corner of a particular control section 32 on the template 18. Similarly, the remaining fields 286–296 list the coordinates for other corners of the control section 32. The coordinates are listed relative to the detectors 12A, 12B. Specifically, the coordinates listed in fields 282–296 are measured on a coordinate system such as the coordinate systems illustrated in FIG. 11B and/or FIG. 11C. As a result, the listed coordinates indicate the spatial relationship of each control section 32 relative to the detectors 12A, 12B.

The data structures illustrated in FIGS. 15A and 15B presume control sections 32 which are rectangular in shape, however, it is contemplated that control sections 32 with alternative shapes are also suitable for use with the template 18. For instance, the control sections 32 can be circular, triangular, elliptical, etc. A single template 18 can include control sections 32 with a single control section 32 geometries or with different geometries. When the template 18 includes circular control sections 32, the data structures illustrated in FIGS. 15A and 15B can include fields which contain information defining the position of the center of the circles and fields which contain information defining the diameter of the circles. Similarly, when the template 18 includes triangular control sections 32, the data structures illustrated in FIGS. 15A and 15B can include fields which contain information defining the positions of each of the three corners of the triangles.

Process Flows

The transcription system can optionally include calibration logic, stylus identification logic, image creation logic and overlay calibration logic. The transcription system can also optionally include handwriting recognition logic for converting the monitor image 34 directly into ASCII text or converted directly into presentation software such as Microsoft Power Point. Any of the logic discussed above or below can be included on a computer readable medium which can be loaded onto the processing unit 20 or the hardware controller 200 The logic may also be stored remotely and loaded onto a local processor unit or the hardware unit by electronic transmission over a public network, such as the INTERNET. Suitable computer readable media include, but are not limited to, computer disks, floppy disks, compact disks, tapes such as magnetic tapes, personal digital assistants, hand held computers. Similarly, the logic can be remotely stored and accessed via a network or modem.

The calibration logic guides the user in calibrating the system and can determine variables required for operation of a particular embodiment of the transcription system. For instance, the calibration logic can include logic for determining a displacement between detectors, a displacement between calibration marks and the detectors, a displacement between a template and the detectors, and a displacement between a control section and the detectors, and the writing area dimensions. As will be described in more detail below, the logic required can vary between different embodiments of the transcription system.

The calibration logic may be accessed when the user installs the transcription system on a new writing surface. The calibration logic can also be accessed at the command of the user when the user feels the system may have become uncalibrated. The re-calibrate command can be given by activating a particular control switch 182, by positioning the stylus within the perimeter of a particular control on the template, section or by using a user interface to provide particular input to the processing unit or hardware unit. Further, the calibration logic can be broken up into smaller bits of logic which can be accessed independently as will be described below.

Figure 16A:
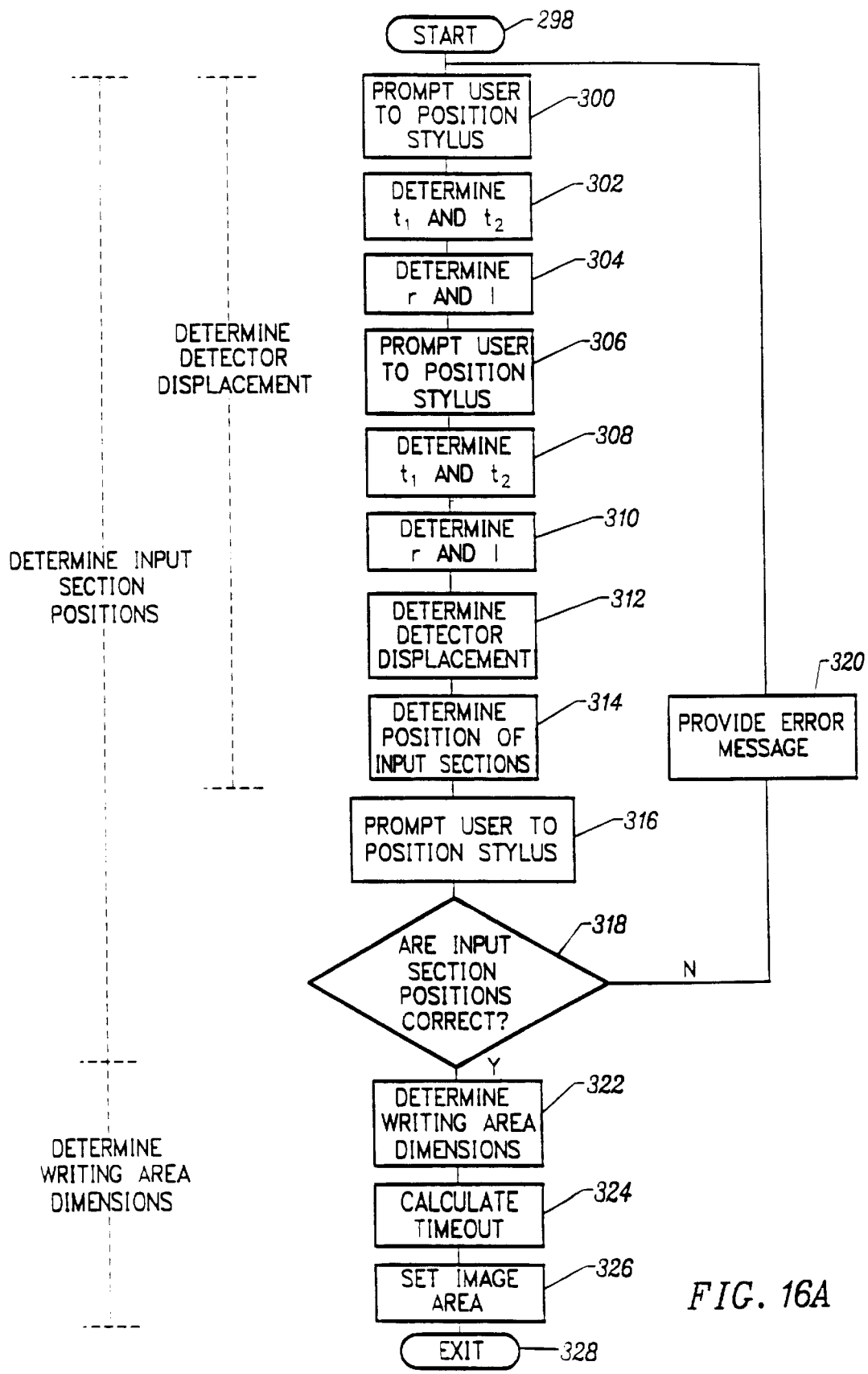
FIG. 16A is a flow diagram showing operation of an embodiment of a calibration module.

An example of calibration logic process flow is illustrated in FIG. 16A. Portions of the calibration logic which pertain to logic for determining the detector displacement, the control section positions and the writing area dimensions are labeled as such in the brackets along the left edge of FIG. 16A. The process flow of FIG. 16A is suitable for use with the systems illustrated in FIGS. 2A–2D which can require use of the template 18 during the determination of the displacement between the detectors. Because the template is used during the determination of the displacement between the detectors 12A, 12B and during determination of the control section positions, there can be some overlap in the logic used to determine the control section positions and in the logic used to determine the detector displacement. This overlap is illustrated by labeled brackets which vertically overlap in FIG. 16A.

The logic for determining the writing area dimensions can be independent from the logic for determining detector displacement and control section position as illustrated by the brackets in FIG. 16A. As a result, it is conceivable that different portions of the calibration logic can be accessed independently, i.e. at different times during operation of the transcription system. For instance, the user can determine control section positions several times but determine the writing area dimensions once but As a result, the user can move the template 18 to a new position on a writing surface and then determine the new control section positions without having to re-determine the dimensions of the writing area.

In FIG. 16A, control is passed from the start block 298 to process block 300. At process block 300 the user is directed to touch the stylus 10 to the calibration mark 40 in the upper left corner of the template 18. The direction takes the form of creating a template image 42 on the monitor 22 and showing a stylus 10 contacting the upper left corner of the template 18 as discussed with respect to FIG. 1C. Control is then passed to process block 302 where the time for the position signal 66 to pass from the stylus 10 to the first detector 12A and the second detector 12B, $t_1$ and $t_2$, is accessed from the bus 206. Control is then passed to process block 304 where r and l are calculated via Equation 3 and Equation 4. The calculated r and l are stored as $r_1$ and $l_1$. Control is then passed to process block 306 where the user is directed to touch the stylus 10 to the calibration mark 40 in the upper right corner of the template 18. Control is then passed to process block 308 where the time for the position signal 66 to pass from the stylus 10 to the first detector 12A and the second detector 12B, $t_1$ and $t_2$, is accessed from the bus 206. Control is then passed to process block 310 where r and l are calculated via Equation 3 and Equation 4. The calculated r and l are then stored as $r_2$ and $l_2$.

$$L = \frac{((l_2^2 - l_1^2) - (r_2^2 - r_1^2))}{2W_T} \quad \text{Equation 7}$$

$$H = y_1 + C \quad \text{Equation 8}$$

Control is passed from process block 310 to process block 312 where the displacement between the detectors, L, is determined by using the stored $r_1$, $l_1$, $r_2$, and $l_2$ in Equation 7, where $w_T$ is a known constant equal to the width between the calibration marks 40 on the template 18. The calculated L is then stored.

Control is passed from process block 312 to process block 314 where the coordinates of the control sections 32 on the template 18 is determined relative to the detectors 12A, 12B. L, $r_1$, $l_1$, $r_2$ and $l_2$ are used in Equation 1 and Equation 2 to determine and store the coordinates of the calibration marks 40 relative to detectors 12A, 12B. As discussed above, the control section relative to template data structure lists the coordinates of the control sections 32 relative to the calibration marks 40 on the template 18. Using traditional principles of geometry, these coordinates can be used in combination with the determined positions of the calibration marks 40 relative to the detectors, to determine the coordinates for the control sections 32 relative to the detectors 12A, 12B. The determined coordinates for the control sections are entered into the appropriate fields of the control section relative to detectors data structure.

Control is passed form process block 314 to process block 316 where the user is prompted to position the stylus within a particular one of the control sections 32. The prompt can take the form of the prompts discussed above with respect to process blocks 300 and 306. Control is then passed to decision block 318 where a determination is made whether the position of the control sections 155 relative to the detectors has been properly calculated. The determination can be made by calculating r and l for when the stylus is positioned within the perimeter of the particular control section at process block 316. The determined r and l are used in Equations 1 and 2 to determine the position of the stylus 10 relative to the detectors. The determined position is checked against the fields of the control section relative to detectors data structure which correspond the particular control section to determine whether the determined position falls within the particular control section. When the determined position does not fall within the perimeter of the particular control section, the determination is negative and control is passes to process block 320. At process block 320 the user is provided with an error message indicating an error during the calibration. For example, the error message can be a readable massage shown on the monitor or an indicator on the hardware unit can be activated to indicate the error condition. Control is returned from process block 320 to process block 300.

When the determination at decision block 318 is positive, control is passed to process block 322 where the dimensions of the writing area 38, W and H, are determined using one of several techniques. For instance, the user can be presented with a menu of typical writing area dimensions on the monitor 22 and the user can then use a user interface 24 to select the appropriate writing area dimensions from the menu. Additionally, the user can use a user interface 24 to directly enter the dimensions of the writing area 38 into the processing unit. In another technique where the first and second detectors 12A, 112B define the writing area 38 and the template is positioned along a bottom edge of the writing area as illustrated in FIG. 11B, W can be set equal to the stored L. To determine H, the L, $r_1$ and $r_2$ determined as described above are used in Equations 1 and 2 to determine $y_1$ for the upper left calibration mark 40. The determined $y_1$ is then used in Equation 8 to determine the writing area height, H, where C is a constant equal to about the height of the template 18. Equations 7 and 8 are appropriate for use with the transcription system illustrated in FIG. 11B but can be easily adapted to the transcription system of FIG. 11C using the principles of triangulation. Once the writing area dimensions are determined by any of the above techniques, W and H are stored along with the calculated L.

Control is passed from process block 322 to process block 324 where the $$D = (H^2 + W^2)^{1/2} \quad \text{Equation 9}$$

writing area diagonal 38 is determined via Equation 9 and stored. The timeout limit is then determined by dividing the length of the diagonal, D, by the speed of sound. The timeout limit can be stored and/or loaded onto the bus 206 where it can be accessed by the hardware controller 200.

Control is passed from process block 324 to process block 326. The ratio of W:H is then calculated and used to define a monitor image area 36 as illustrated in FIG. 1D. The monitor image area 36 is the position on the monitor 22 where the monitor image 34 will be formed. The ratio of the length and width of the monitor image area 36, h:w, is equal to the ratio of W:H. Control is then passed to the exit block 328.

As described above, certain embodiments of the transcription system do not require that the timeout limit be calculated such as when the timeout limit is an administratively determined value. As a result, the need to determine the is timeout limit as described with respect to process block 324 can be eliminated. Further, if the user does not intend to use the control sections 32 on the template, the need to perform the functions in process blocks 314–421 can be eliminated. As a result, the logic illustrated in FIG. 16A is intended to be illustrative and must be adjusted to accommodate different embodiments of the transcription system.

Figure 16B:
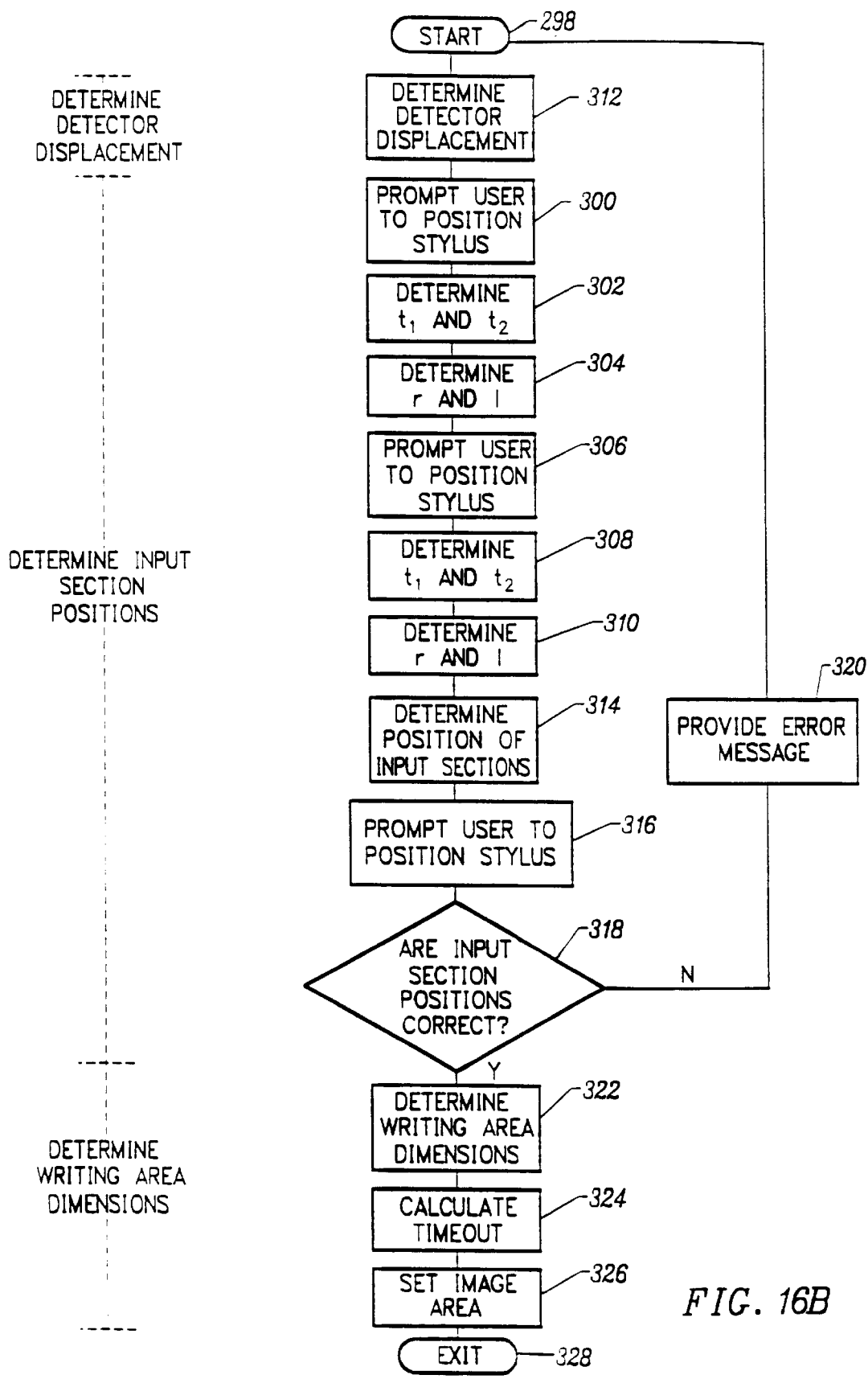
FIG. 16B is a flow diagram showing determining the dimensions of a writing area in a transcription system as illustrated in FIG. 3B.

The calibration logic illustrated in FIG. 16A can be easily adapted for use with other transcription systems. For instance, FIG. 16B illustrates calibration logic which is similar to the logic illustrated in FIG. 16A, however, process block 312 is moved to a position between the start block 298 and the process block 300. Such calibration logic is suitable for use with the systems of FIGS. 3B–3E.

In the systems of FIGS. 3B–3E, the determination of the displacement between the detectors 12A, 12B can be independent of the template 18. As a result, the logic for determining the displacement of the detectors, position of the control sections and dimensions of the writing area can be independent of one another as illustrated by the brackets along the left edge of FIG. 16B. As a result, in certain embodiments of the transcription system, the user can determine the writing area dimensions and detector displacement once but determine the detector displacement or the control section positions several times. As a result, a user can move the template 18 to a new position on the writing surface and determine the new control section positions without having to re-determine the dimensions of the writing area or re-determine the detector displacement.

The logic used to determine the displacement between the detectors 12A, 12B in the systems of FIGS. 3B–3E can vary depending on which system is used. To determine the detector displacement with the system of FIG. 3C, the user is prompted to position the stylus 10 at the calibration mark 40 on the first detector 12A and the time for the position signal 66 to travel from the first detector 12A to the second detector, $t_2$ is determined. The displacement between the detectors, L, is then determined by multiplying $t_2$ by the speed of sound. The dimension L can then stored in the memory and control passed to process block 300 of FIG. 16B.

To determine the displacement between the detectors in the system of FIG. 3B, the processing unit 20 or hardware unit 14 can cause the reference signal receiver 56 and the position signal transceiver 70 on the first detector 12A to become engaged. The processing unit 20 or hardware unit 14 can also cause a reference signal 64 to be transmitted from the second detector 12B. The reference signal 64 will be received at the reference signal receiver 56. In response, a position signal 66 is transmitted from the position signal transceiver 70 and the time for the position signal to travel between the first and second detectors, $t_2$ is determined. The displacement between the detectors, L, is then determined by multiplying $t_2$ by the speed of sound. The dimension L can then stored in the memory and control passed to process block 300 of FIG. 16B.

As described above, certain embodiments of the transcription system do not require that the timeout limit be calculated. As a result, the need to perform the acts described with respect to process block 324 is eliminated. Further, the template is not required for calibration of the transcription systems illustrated in FIGS. 3B and 3C and can be eliminated from the transcription system. As a result, the need to perform the determine control section position logic can also be eliminated. Consequently, it is conceivable to calibrate the transcription systems illustrated in FIGS. 3B and 3C by performing only the acts described with respect to process blocks 312, 322, and 326 of FIG. 16B.

It is not necessary to determine the displacement between the detectors in the system of FIGS. 3D and 3E because the coupling member 74 can keep the detectors 12A, 12B at a known displacement. As a result, the determine detector displacement logic can be eliminated from FIG. 16B. Additionally, when the timeout limit does not need to be calculated, the need to perform the functions in process blocks 324 is eliminated. Further, the need to perform the determine control section position logic can be eliminated by removing the template 18 from the system. As a result, it the transcription systems of FIGS. 3D and 3E can be operated by performing only the acts described with respect to process block 322 and 326.

The above calibration logic process flows are intended to be exemplary and are not intended to limit the calibration techniques. For instance, many techniques for determining the writing area dimension as discussed with respect to process block 322 are conceivable but not disclosed. Further, various combinations of the techniques disclosed with respect to process block 322 can also be used to determine the writing area dimensions.

The writing area 38 dimensions calculated during the above calibration logic can be stored in the memory 240 for subsequent uses. As a result, the system does not need to be calibrated each time the system is used. Each time the system is turned on, the user can be asked if the system has been positioned on a new writing surface 28. This inquiry can take the form of a question on the monitor 22. When the user indicates that the system has not been positioned on a new writing surface 28, the processing unit 20 can work from the previously stored writing area 38 dimensions. In other embodiments, the system can depend on the user to calibrate the system when the system is positioned on a new writing surface 28. In these embodiments, the system does not need to inquire whether the system has been positioned on a new writing surface 28. In other embodiments, the bus is monitored for a re-calibrate signal which is placed on the bus by the hardware unit 14 when the first or second detector 12A, 12B has been removed from the writing surface 28. When a re-calibrate signal is identified, the system must be re-calibrated once the system is re-installed on another writing surface 28. As a result, one of the above calibration logic process flows can be accessed when the re-calibrate signal is detected.

Figure 17:
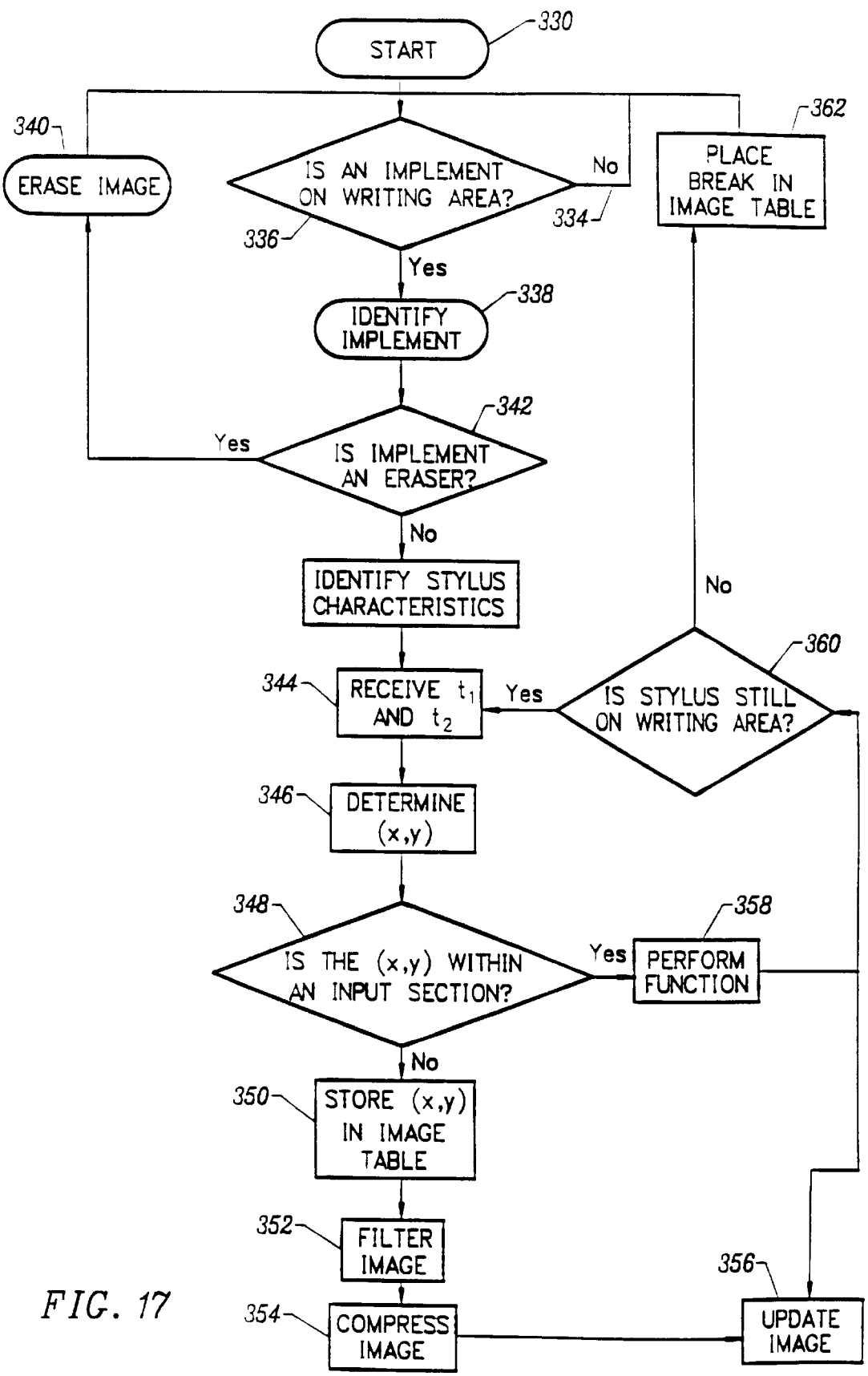
FIG. 17 is a flow diagram showing determining the positions of the stylus relative to the detectors and creating the monitor image from the determined positions.

A process flow of the image creation logic is illustrated in FIG. 17. Control is passed from the start block 330 to decision block 334 where a determination is made whether a stylus 10 or eraser 16 is being used in the writing area 38. This determination can be made by monitoring the bus 206 for signals which are a result of output from a stylus 10 or an eraser 16. When the determination is negative, control is returned to decision block 334. When the determination is positive, control is passed to process block 336 where the implement is identified by monitoring the bus 206 for an identity signal. Control is then passed to decision block 338 where a determination is made whether the implement is an eraser 16. This determination is made by accessing the implement characteristic data structure 254. The implement identity signal is compared with the implement identifier fields 256 until a match is found. The corresponding implement field 258 is accessed to identify whether the implement is a stylus 10 or an eraser 16. When the determination is positive, control is passed to subroutine 340 where the portion of the written image 44 which is erased is also erased from the monitor image 34. Control is then returned to decision block 334.

When the determination at decision block 338 is negative, control is passed to decision block 342 where the first implement characteristic field 260 and the second implement characteristic field 262 corresponding to the identified stylus 10 are accessed. The first and second characteristics of the stylus 10 stored in the memory 240. Control is then passed to process block 344 where $t_1$ and $t_2$ are received. Control is then passed to process block 346 where $t_1$ and $t_2$ are used in Equations 1 and 2 or 5 and 6, depending on the system being used, to determine the stylus position, (x, y).

Control is passed from process block 346 to decision block 348. At decision block 348, a determination is made whether the stylus position, (x, y), is within any of the control sections 32 of the template 18. The determination can be made by comparing the (x, y) with the coordinates sets listed in the control section relative to detectors data structure. When the determination is negative, control is passed from decision block 348 to process block 350 where the current stylus position, (x, y), is stored in the image data structure.

Control is passed from process block 350 to process block 352 where the image data structure is filtered. For instance, in one filtering technique the position which was most recently stored in the image data structure is compared with a moving average of positions stored before the most recently stored position. If the most recently entered position deviates from the moving average by more than a threshold deviation, the most recently entered position can be rejected by removing it from the image data structure. The number of positions that should be included in the moving average is preferably 2–100, more preferably 2–20 and most preferably 4–10. Another filtering technique includes determining the distance of the most recently entered position from the previously entered position. When the distance is above some threshold displacement, the most recently entered position can be rejected by removing it from the image data structure.

The filtering techniques described above can eliminate two sources of error which can arise during use of the system. One source of error derives from reflections of positions signals 66. During a position detection cycle, a position signal 66 can be reflected off an object such as the user and then interfere with the next detection cycle. Another source of error can result from sudden variations in the system. For instance, the stylus 10 can suddenly be held at a different angle to the writing surface 28. These sources of error can be eliminated by using either of the filtering techniques disclosed above alone or in combination.

After filtering at process block 352, control is passed to process block 354 where the image data structure is compressed. A single line can be represented as only two positions. As a result, redundant positions along a line can be eliminated to reduce the number of positions necessary to create the monitor image 34. The compression can take the form of fitting the series of positions to a more compact form such as a spline.

Control is passed from process block 354 to process block 356 where the monitor image 34 is updated by plotting the most recent entry in the image data structure on the monitor image 34 and creating a line between the most recent entry in the image data structure and the previous entry in the image data structure. The line is created using the first and second implement characteristic of the stylus 10 which were determined at decision block 342.

When the determination at decision block 348 is positive, control is passed to process block 358. At process block 358, the function listed in the function field correlated with the control section 32 where the stylus 10 is positioned is performed. For instance, a new monitor image area 36 may be created on the monitor 22 so a new monitor image 34 can be created or the previous monitor image 34 may be saved.

Control is passed from process block 356 and process block 358 to decision block 360. At decision block 360, a determination is made whether the stylus 10 is still on the writing area 38. This determination can be made by monitoring the bus 206 for signals which are a result of output from a stylus 10. When a pre-determined period of time passes without detecting such a signal, the determination is negative, however, when such signals are received within the pre-determined period of time, the determination is positive. In another embodiment the determination can be made by monitoring the bus 206 for a stylus removed signal loaded onto the bus 206 by the hardware controller 200. When a stylus removed signal is detected, the determination is negative and when a stylus removed signal is not detected, the determination is positive. In other embodiments, the determination can be made using a combination of these two techniques. When the determination is positive, control is returned to process block 344. When the determination is negative, control is passed to process block 362 where a break entry is placed in the image data structure. Control is then returned to decision block 334.

The pressure placed on the stylus 10 can also be taken into account during the above process flow. As described above, the hardware controller 200 can load onto the bus 206 a pressure signal which indicates the pressure being placed on the stylus 10 by the user. The processing unit 20 can receive the pressure signal and can include logic for adjusting the width of strokes on the monitor 22 in response to the amount of pressure being placed on the stylus 10. For instance, when a line width is listed in a first or second implement characteristic field 260, 262, the listed line width can be increased or decreased in proportion to the pressure being placed on the stylus 10. When line widths are not listed in the first or second implement characteristic fields 260, 262, a standard line width can be used for each stylus 10. The standard line width can be adjusted according to the amount of pressure being placed on the stylus 10.

Figure 18:
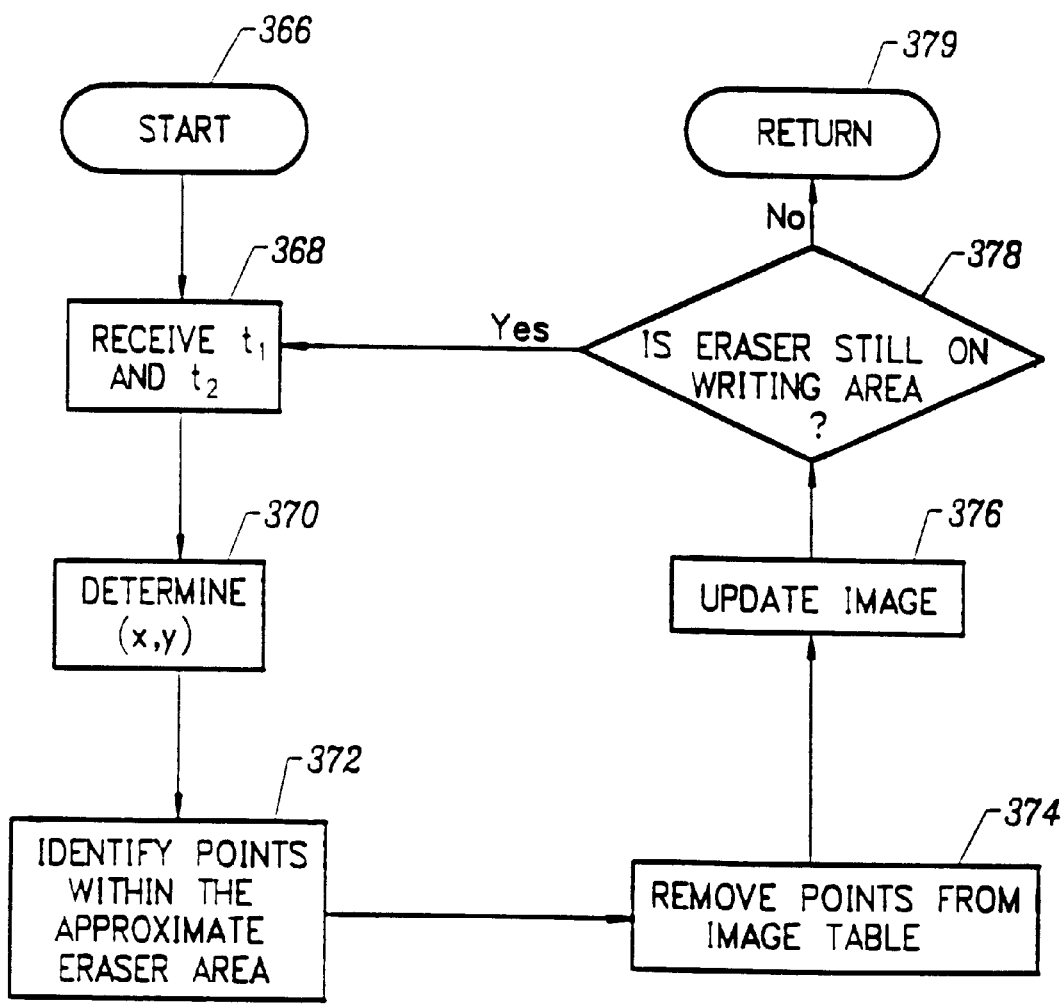
FIG. 18 is a flow diagram showing erasing a monitor image by erasing the written image.

FIG. 18 illustrates a process flow for an image erasing subroutine. Control is passed from the start block 366 to process block 368 where the time for the position signal 66 to pass from the stylus 10 to the first detector 12A and the second detector 12B, $t_1$ and $t_2$, is received. Control is then passed to process block 370 where $t_1$ and $t_2$ are used in Equations 1 and 2 or 5 and 6, depending on the system being used, to determine the position of the eraser 16 (x, y). Control is then passed to process block 372 where positions listed on the image data structure which fall within the approximate eraser area 124 are identified. The identification can be made by using a relationship between the approximate eraser area 124 and the position of the eraser 16. For instance, when the eraser 16 has a round shape, the approximate eraser area 124 can be defined to cover all points within two inches of the eraser 16 position. All the positions listed in the image data structure which are within two inches of the eraser 16 position are then identified.

Control is passed from process block 372 to process block 374 where the identified positions are removed from the image data structure. Control is then passed to process block 376 where the monitor image 34 is updated. The image update can take the form of removing from the monitor image 34 the positions which are removed from the image data structure or re-creating the monitor image 34. Control is then passed to decision block 378 where a determination is made whether the eraser 16 is still positioned on the writing area 38. This determination can be made by monitoring the bus 206 for signals which are a result of output from the eraser 16. When a pre-determined period of time passes without detecting such a signal, the determination is negative, however, when such signals are received within the pre-determined period of time, the determination is positive. In another embodiment the determination can be made by monitoring the bus 206 for an stylus removed signal loaded onto the bus 206 by the hardware controller 200. When an stylus removed signal is detected, the determination is negative and when an eraser removed signal is not detected, the determination is positive. In other embodiments, the determination can be made using a combination of these two techniques. When the determination is positive, control is returned to process block 368. When the determination is negative, control is passed to the return block 379 which returns control to the image creation logic.

The processing unit 20 can also include logic which allows the creation of the monitor image 34 to be played back to the user. This is possible when the monitor image 34 is stored in an image data base as opposed to being stored as a bitmap. During the playback, the monitor image 34 is created by sequentially plotting and connecting the positions listed in the image data structure on the monitor image area 36. The process of plotting and connecting positions is performed at a rate which allows the user to observe the image creation. The playback of the monitor image 34 allows the user to re-capture information which has been erased or can extract information from the actual creation of the monitor image 34. Further, the user can stop the playback at a particular point and edit the image at the point where it was stopped.

As discussed above, several different embodiments of the system can identify the type of implement being used upon the writing area 38. For instance, whether the implement is an eraser 16 or a stylus 10 can be identified as well as the type of the eraser 16 or stylus 10. Different types of styluses 10 can write with different colors or line widths. Different types of erasers 16 can be erasers 16 have a footprint with a different size or shape. Different types of implements are generally listed in the implement characteristic data structure 254 with different implement identifiers.

Figure 19A:
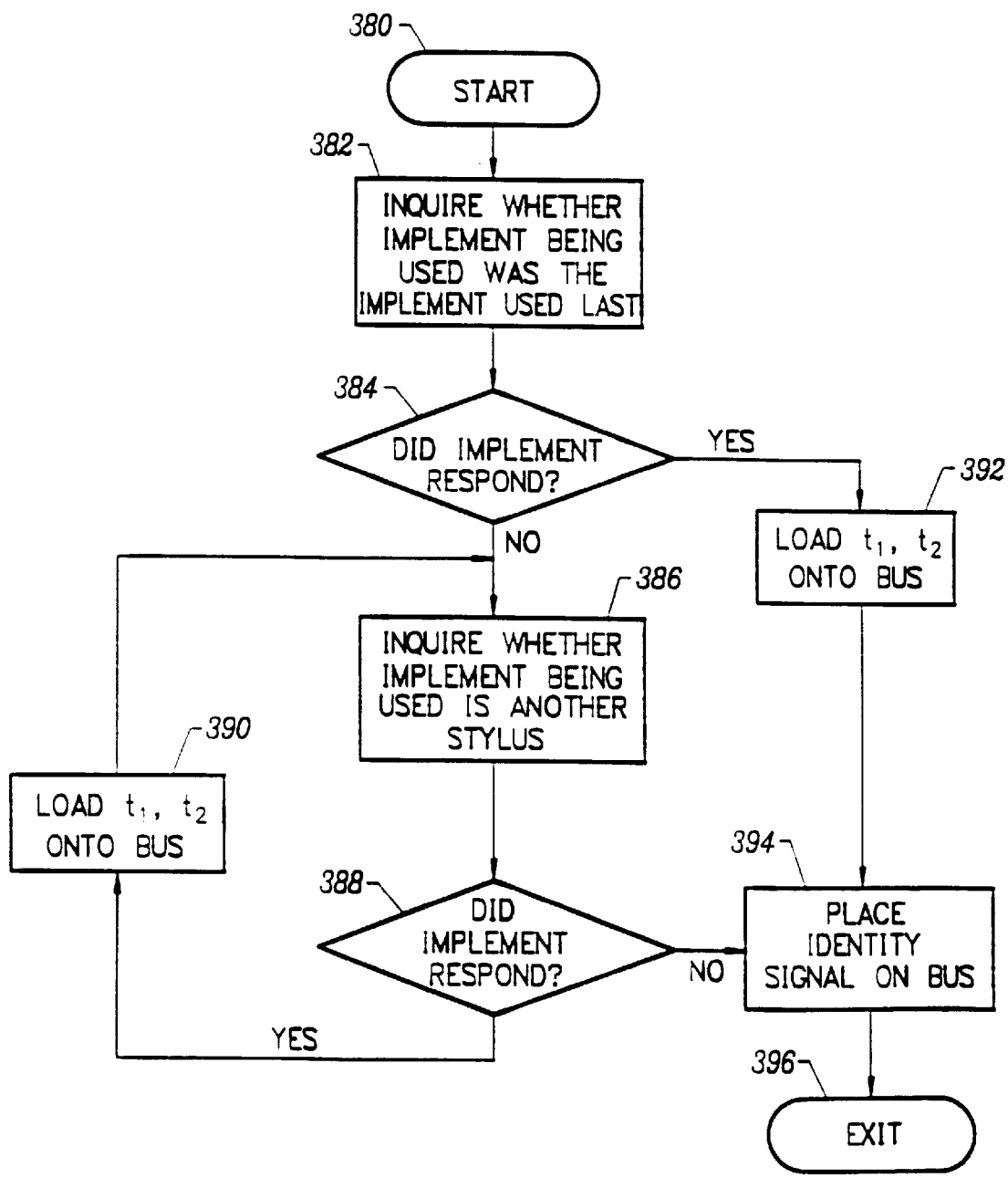
FIG. 19A is a flow diagram showing stylus identification logic.
Figure 19B:
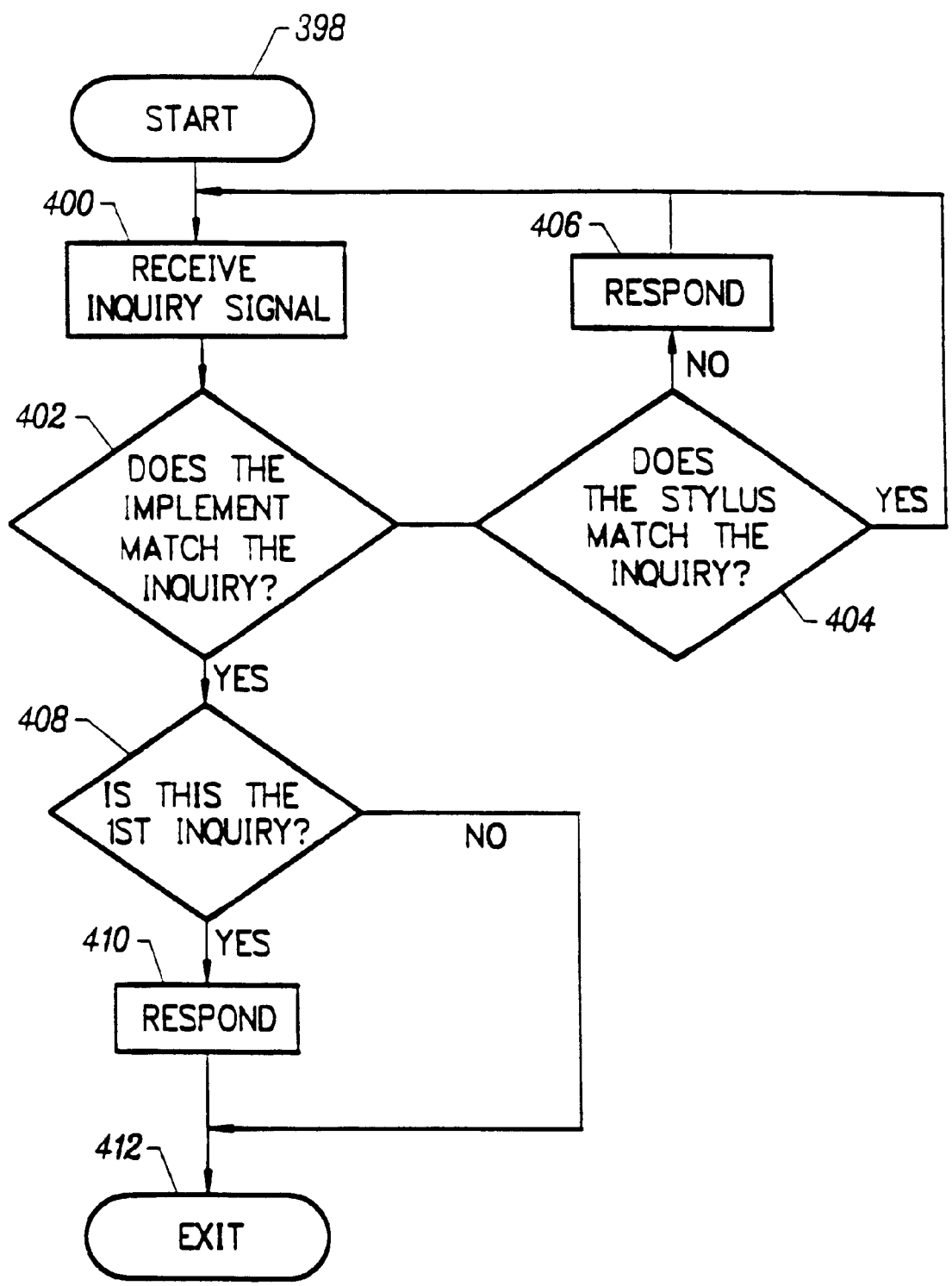
FIG. 19B is a process flow for stylus identification logic which is complementary to the process flow illustrated in FIG. 19A.

FIGS. 19A–19B illustrate one embodiment of implement identification logic. The implement identification logic operates via a series of inquiries and responses between the implement and the hardware controller 200 or the processing unit 20. The implement responds to the inquiries by responding or not responding to the inquiry signals with a position signal 66. The implement identification process flow can be accessed each time the implement produces an activation signal. As a result, the implement is identified each time the implement contacts the writing area 38.

The process flow illustrated in FIG. 19A can be included in the hardware controller 200 of the hardware unit 14. The process flow can also be adapted for inclusion in the processing unit 20. Control is passed from the start block 380 to process block 382. At process block 382, an inquiry signal is transmitted to the implement. The inquiry signal can be coded into a reference signal 64. The implement electronics 104 includes logic which receives the reference signal 64 and recognizes the inquiry signal. The logic interprets the inquiry signal as inquiring whether the implement is the same type of implement which was last used on the writing area 38.

Control is passed from process block 382 to decision block 384 where a determination is made whether the implement is a type which matches the type requested by transmission of the inquiry signal. The determination is based on whether the implement responds to the inquiry signal by transmitting a position signal 66. When the implement responds with a position signal 66, the determination is positive and when the implement does not respond, the determination is negative.

When the determination at decision block 384 is negative, control is passed from decision block 384 to process block 386 where an inquiry signal is transmitted to the implement. The implement includes logic which recognizes the signal as inquiring whether the implement is a particular type of implement. Control is then passed to decision block 388 where a determination is made whether the implement is a type which matches the type requested by transmission of the inquiry signal. The determination is based on whether the implement responds to the inquiry signal by transmitting a position signal 66. When the implement responds with a position signal 66, the determination is negative and when the implement does not respond, the determination is positive. When the determination is positive, control is passed to process block 390 where the $t_1$ and $t_2$ values for the transmitted position signal 66 are loaded onto the bus 206. Control is then returned to process block 386.

When the determination at decision block 384 is positive, control is passed to process block 392 where the $t_1$ and $t_2$ values for the transmitted position signal 66 are loaded onto the bus 206. Control is passed from process block 392 to process block 394. Similarly, when the determination at decision block 388 is positive control is passed to process block 394. At process block 394, an identity signal is loaded onto the bus 206. The processing unit 20 can use the identity signal to match the implement being used with a implement listed in an implement identifier field 256 of the implement characteristic data structure 254. As a result, the processing unit 20 can identify the implement being used on the writing area 38. Control is passed from process block 394 to exit block 396.

FIG. 19B illustrates a process flow which is included in the implement electronics 104 and which is complementary to the process flow illustrated in FIG. 19A. Control is passed from start block 398 to process block 400 where an inquiry signal is received. The inquiry signal can be coded in a reference signal 64 from a reference signal transmitter 62. The implement electronics 104 can include logic for identifying the inquiry signal. The logic also interprets the inquiry as an inquiry whether the implement is a particular type of implement. Control is passed from process block 400 to decision block 402 where a determination is made whether the implement is the type of implement inquired about in the inquiry signal. When the determination is negative control is returned to decision block 404.

At decision block 404 a determination is made whether the received inquiry signal is the first inquiry signal the implement has received during the period of time the implement has been continuously in contact with the writing area 38. When the determination is negative, control is passed to process block 406 where the implement transmits a position signal 66. Control is then returned to process block 400. Similarly, when the determination at decision block 404 is positive, control is passed to process block 400.

When the determination at decision block 402 is positive, control is passed to decision block 408. At decision block 408 a determination is made whether the received inquiry signal is the first inquiry signal the implement has received during the period of time the implement has been continuously in contact with the writing area 38. When the determination is positive, control is passed to process block 410 where the implement transmits a position signal 66. Control is passed from process block 410 to exit block 412. Similarly, when the determination at decision block 408 is negative, control is passed to exit block 412.

The above implement identification logic can include additional logic for prioritizing transmission of the inquiry signals. For instance, the inquiry signals can be transmitted so the inquiries pertaining to the most recently used implement types are transmitted at the beginning of a series of inquiries. Further, inquiry signals relating to the least recently used or unused implement types can be transmitted later in the inquiry sequence. For instance, if a red stylus 10 is used first, an eraser 16 second and a black stylus 10 third, the next series of inquiry signals may inquire whether the stylus 10 is a black stylus 10 first, an eraser 16 second and a red stylus 10 third. Because the most recently used implements are most likely to be used for a new stroke, the prioritization scheme minimizes the number of inquiries which must be made to identify the implement. Other priority logic may also be utilized, e.g., always putting the eraser second after the last pen used.

The above implement identification logic also minimizes the number of position data points which are lost because the implement does not transit a position signal 66. The first time a implement receives an inquiry signal, the implement does not respond with a position signal 66 if the implement does not match the implement sought by the inquiry signal. However, each subsequent time the implement receives an inquiry signal, the implement transmits a position signal 66 when the implement does not match the implement sought by the inquiry but does not transmit a position signal 66 when the implement does match the implement sought by the inquiry signal. As a result, a large number of non-matching inquiry signals can be transmitted and a maximum of only two data points will be lost in the process of identifying the implement.

Figure 20:
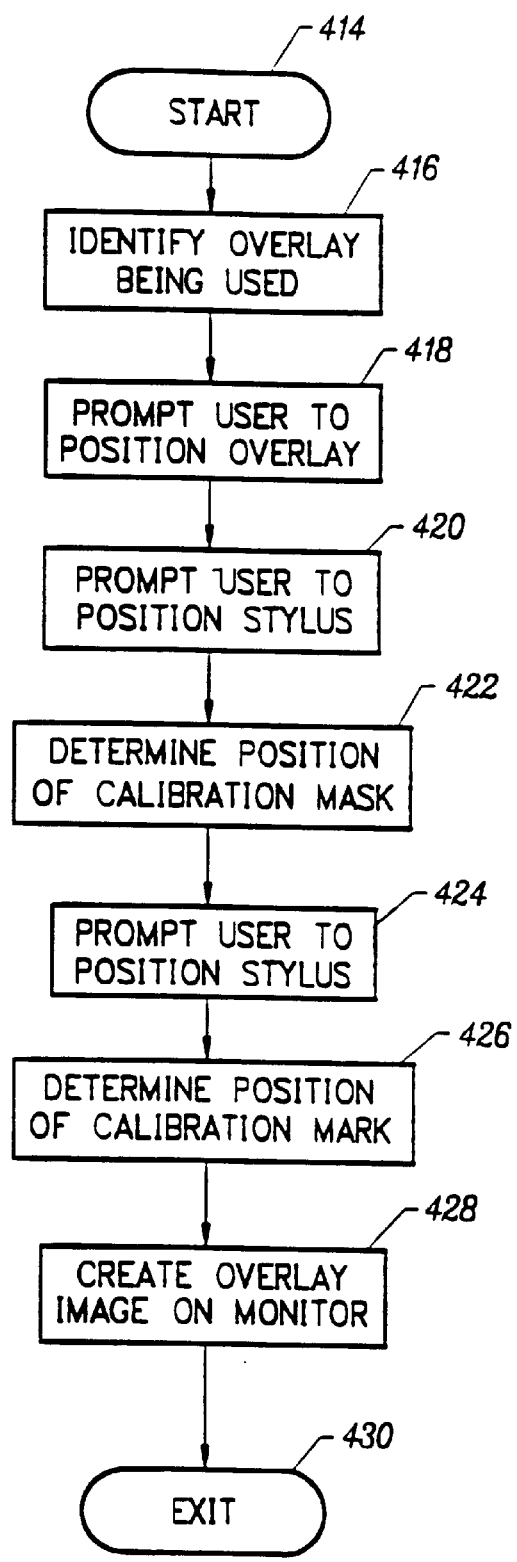
FIG. 20 illustrates background image calibration logic.

The transcription system can also include calibration logic for calibrating the position of a background image relative to a writing surface. The background image may be positioned adjacent the writing surface (e.g., positioned on or behind the writing surface), may form the writing surface, or may be projected onto the writing surface. FIG. 20 illustrates an example process flow for background image calibration logic. The start block 414 is accessed when the processing unit 20 or the hardware unit 14 is notified that a background image 50 will be used with the transcription system. The user can notify the system that a background image 50 is being used by positioning the stylus tip in a particular one of the control sections 32 on the template 18 or by entering information to the processing unit 20 via the user interface 24. Alternatively, the hardware unit 14 can include a control switch 182 which can be activated to indicate that a background image 50 is being used.

Control is passed from start block 414 to process block 416 where the user identifies the background image 50 which will be used in combination with the writing surface 28. As described above, the composite images 52 can be created internally or externally and then stored in the processing unit 20 as an Image file.

Upon saving composite images 52 as Image files, the user can provide each Image file with different identifying characteristics such as different names and/or different locations (i.e. different directories) within the processing unit 20. The different identifying characteristics can be created using traditional file management programs such as WINDOWS 95, PC DOCS and IMANAGE. At process block 416, the user can be presented with a menu listing each of the composite images 52 which has been stored as an Image file or listing each of the Image files in the current directory. The user can scroll through the list to identify the Image file of interest. Once the proper Image file has been identified, the user can select the proper Image file. One suitable method for selecting the proper Image file is using a user interface 24 which controls a cursor, such as a mouse, and double clicking on the identified Image file. Alternatively, the user can select the identified Image file by highlighting the identified Image file and then clicking on a box which may include a word such as "OK".

Control is passed from process block 416 to process block 418 where the user is directed to position the background image 50 upon the writing surface 28. The method for directing the user can be similar to the methods of directing the user to position the stylus in contact with the calibration marks 40. Once the background image 50 is positioned relative to the writing surface 28, the user can notify the processing unit 20 using techniques which are similar to the techniques used to notify the processing unit 20 that an background image 50 will be used. Control is passed from process block 418 to process block 420 where the user is prompted to contact the stylus tip with a calibration mark 40 present on the background image 50. Prompting the user to contact the stylus with the calibration marks 40 on the background image 50 can be similar to the prompts discussed with respect to FIG. 1B. For instance, the monitor image 34 can include an image of the stylus contacting the calibration point on the composite image 52. Control is passed to process block 422 where $t_1$ and $t_2$ are determined and used in Equations 1–4 to determine the position of the first calibration mark relative to the detectors, $(x_1, y_1)$. Control is passed to process block 424 where the user is directed to contact the stylus tip with a second calibration mark 40 present on the background image 50. Control is passed to process block 426 where $t_1$ and $t_2$ are determined and used in Equations 1–4 to determine the position of the second calibration mark 40 relative to the detectors, $(x_2, y_2)$.

Control is passed from process block 426 to process block 428 where the composite image 52 is created upon the monitor 22. The composite image 52 is scaled so the first calibration mark 40 on the composite image 52 is positioned on the monitor image at $(x_1, y_1)$ and the second calibration mark 40 on the composite image 52 is positioned on the monitor image 34 at $(x_2, y_2)$. Control is passed from process block 428 to exit block 430 which can be a return to the start block of the image creation logic.

The logic illustrated in FIG. 20 is intended to be illustrative and not intended to be limiting. For instance, as discussed above, the background image 50 can include more than two calibration marks 40 to increase the quality of correlation between the position of the background image 50 on the writing surface 28 and the position of the background image 50 on the image area 36. Increasing the number of calibration marks 40 can increase the number of acts required to perform out the background image calibration.

Additional permutations of the background image calibration logic are also contemplated. For instance, the select background image act illustrated in process block 416 can be replaced with a select background image sequence act. As discussed above a background image sequence can be a sequence of composite images 52 which are established by the user. The user can then advance through the background image sequence to the desired composite image 52. Suitable means for advancing through the overlay image sequence include, but are not limited to, positioning the stylus tip in a particular one of the control sections 32 on the template 18, entering information via a user interface 24 or activating a control switch 182 on the hardware unit 14. Similar mechanisms can be used to reverse through the background image sequence. Further, when a background image is projected onto the writing surface 28, the projector can be coupled with the processing unit 20 and the background images can be advanced or reversed with the composite images 52.

The transcription system disclosed above is described with a hardware unit 14 which is independent of the processing unit 20. It is noted, however, that the hardware unit 14 and the processing unit 20 can be integrated in a single unit. For instance, the hardware controller 200, the processor 238, the volatile memory 242 and the storage unit 244 can be contained in a single hardware unit 14. The hardware controller 200 and the processor can be integrated into a single processing element. Further, the storage unit 244 and/or the volatile memory can be incorporated into a single memory device. Integrating the hardware unit 14 and the processing unit 20 permits the functions which are characterized above as performed by the processing unit 20 to performed by the hardware unit 14. For instance, the image data structure can be created and stored within the hardware unit 14 as the written image 34 is created. As a result, the monitor image 34 can be stored without using a processing unit 20 and without being displayed on a monitor 22. After the image data structure has been stored in the hardware unit 14, the hardware unit 14 can be coupled with a monitor 22, a printer, a network and/or a processing unit 20. These connections respectively allow the image stored in the hardware unit 14 to be displayed, printed, forwarded to another location or downloaded to another storage medium.

Additionally, while the hardware unit 14 is illustrated above as a housing for a plurality of electronics, it is noted that the hardware unit 14 can refer to any collection of electronics which perform the function(s) of the electronics within the illustrated hardware unit. As a result, the hardware unit can actually be distributed among different locations throughout a transcription system. Further, the hardware unit can be included in several different housings and/or several different types of housings.

Further, the first and second detectors 12A, 12B are disclosed as being removable from a writing surface 28. However, the first and second detectors 12A, 12B can also be integrated with the writing surface 28. In embodiments where the first and second detector 12A, 12B are integrated with the writing surface 28, the calibration acts described above can be eliminated since the writing area 38 dimensions will be constants which can be administratively entered into the system before the system is sold to the end consumer. Additionally, although the system is disclosed with first and second detectors 12A, 12B, additional detectors may be added to the system to facilitate the calibration process, to provide additional resolution to the monitor image 34 or the further refine the monitor image 34.

EXAMPLE

Figure 21:
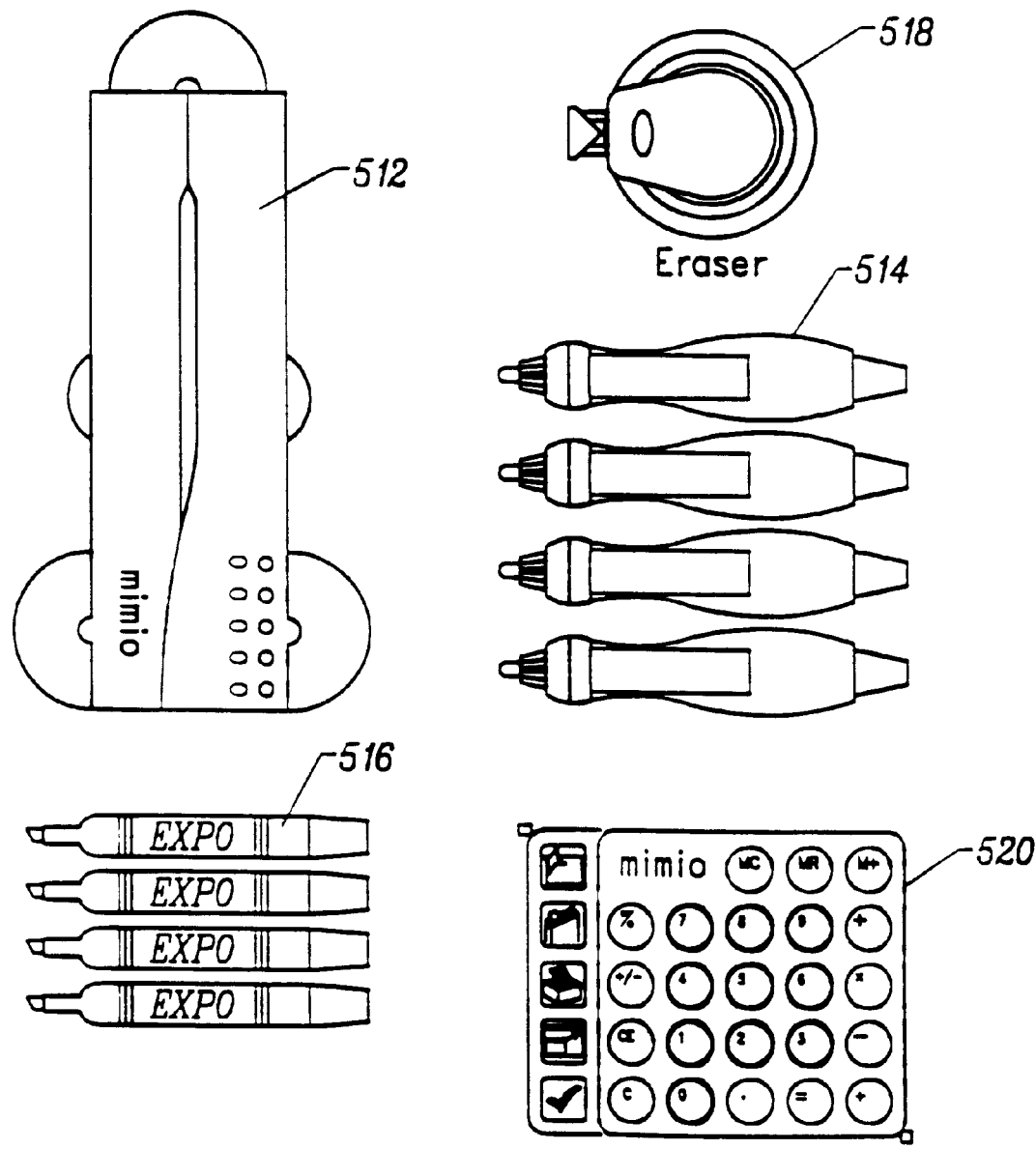
FIG. 21 illustrates an embodiment of a transcription system kit.

The following is an example of a transcription system according to the present invention, its contents and operation. FIG. 21 illustrates a transcription system kit. As illustrated, the kit includes a detector assembly 512, a set of styluses 514, a set of whiteboard markers 516, an eraser 518, and a template 520.

Figure 22:
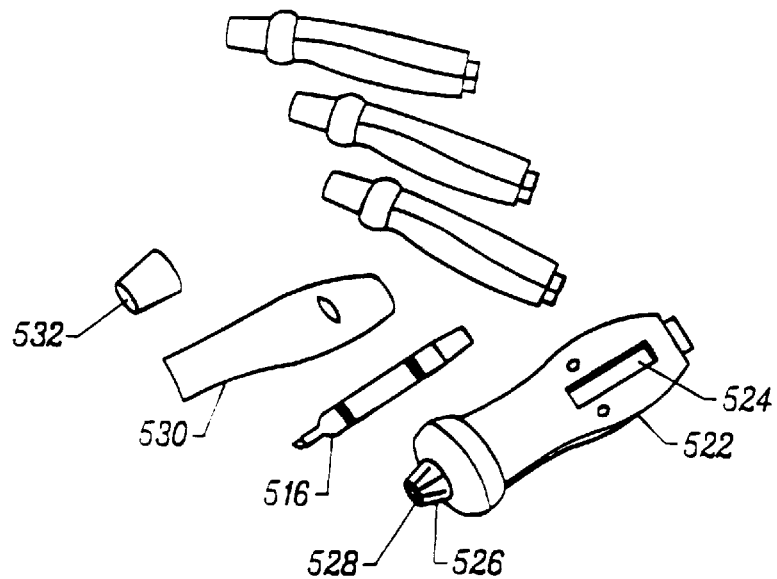
FIG. 22 illustrates a stylus which has been taken apart so that a marker can be placed within the stylus.

FIG. 22 illustrates a stylus 514 which has been taken apart so that a marker 516 can be placed within the stylus 514. As illustrated, the stylus 514 includes a stylus body 522 which houses a AAA battery 524 and an ultrasound transmitter 526 adjacent a writing end 528 of the stylus. The stylus 514 also includes a side cover 530 which is sufficiently clear or translucent such that one can see the marker 516 through the side cover 530. The stylus 514 also includes a cap 532 which is sufficiently clear or translucent such that one can see a writing tip of the marker 516 through the cap 532.

Figure 23A:
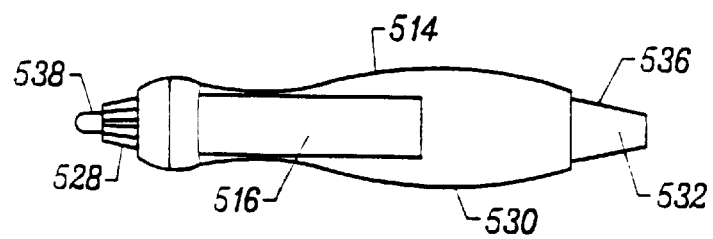
FIG. 23A illustrates a side view of the stylus where the stylus cover is in full view.
Figure 23B:
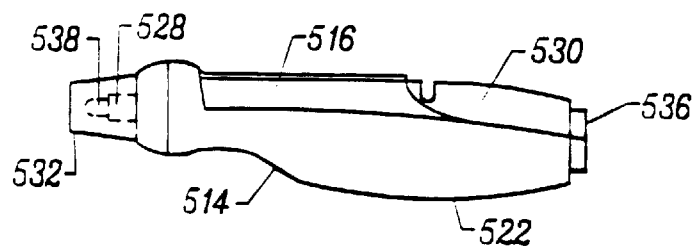
FIG. 23B illustrates a side view of the stylus where the stylus cover is on top and the stylus body is below.

FIGS. 23A and 23B illustrate a stylus 514 containing a marker 516.

FIG. 23A illustrates a side view of the stylus 514 where the stylus cover 530 is in full view. As illustrated, the writing tip 538 of the marker is uncapped and the cap 532 is attached to an end 536 of the stylus 514 opposite the writing end 528. As can be seen in FIG. 23A, the marker 516 is in full view within the stylus 514 through the stylus cover 530.

FIG. 23B illustrates a side view of the stylus 514 where the stylus cover 530 is on top and the stylus body 522 is below. As illustrated, the writing tip 538 of the marker 516 is capped by the cap 532. The cap 532 preferably seals the writing tip to prevent the marker 516 from drying out. As can be seen, the cap 532 is sufficiently clear or translucent such that one can see the writing tip 538 of the marker through the cap 532. This allows the user to rapidly identify the color of the marker.

Figure 24C:
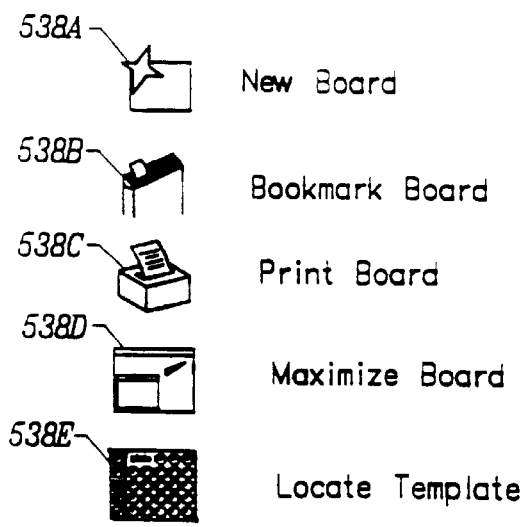
FIG. 24C illustrates the user inputs on the detector assembly.
Figure 24A:
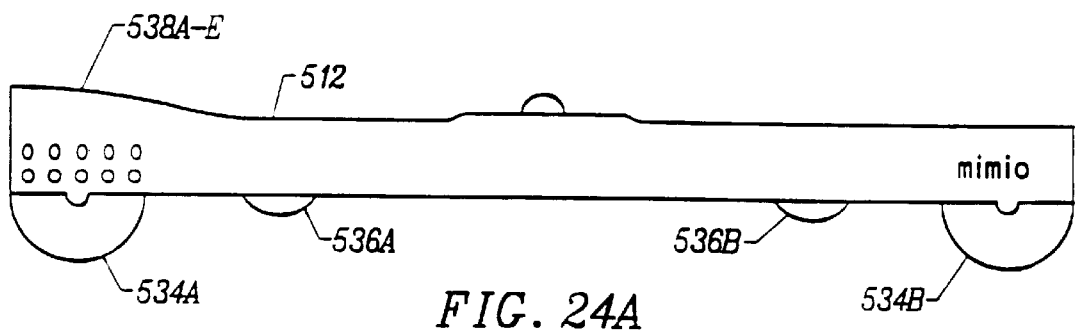
FIG. 24A illustrates the detector assembly unfolded.

FIG. 24A illustrates the detector assembly 512 unfolded (folded in FIG. 21). The detector assembly includes two signal receivers 534A, 534B, two suction cup assemblies with attachment levers 536A, 536B and a series of user inputs 538A–E.

Figure 24B:
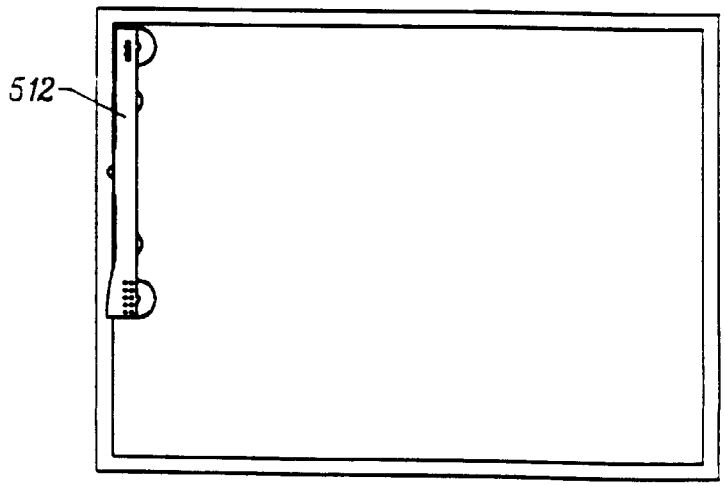
FIG. 24B illustrates the detector assembly attached to a whiteboard surface via the suction cup assemblies.

FIG. 24B illustrates the detector assembly 512 attached to a whiteboard surface via the suction cup assemblies.

FIG. 24C illustrates the user inputs 538A–E on the detector assembly 512. The new board input causes the transcription system software to save what has been inputted on the whiteboard and to open a new blank file for capturing transcription information. The bookmark board input causes the transcription system software to save what has been inputted on the whiteboard while retaining the currently displayed information. The print board input causes what is currently being electronically displayed by the transcription system to be printed. The maximize board input causes the transcription system application window to be maximized and make the transcription system application the active window. The locate template input causes the transcription system software to activate the run a protocol to determine the position of the template on the whiteboard.

Figure 25:
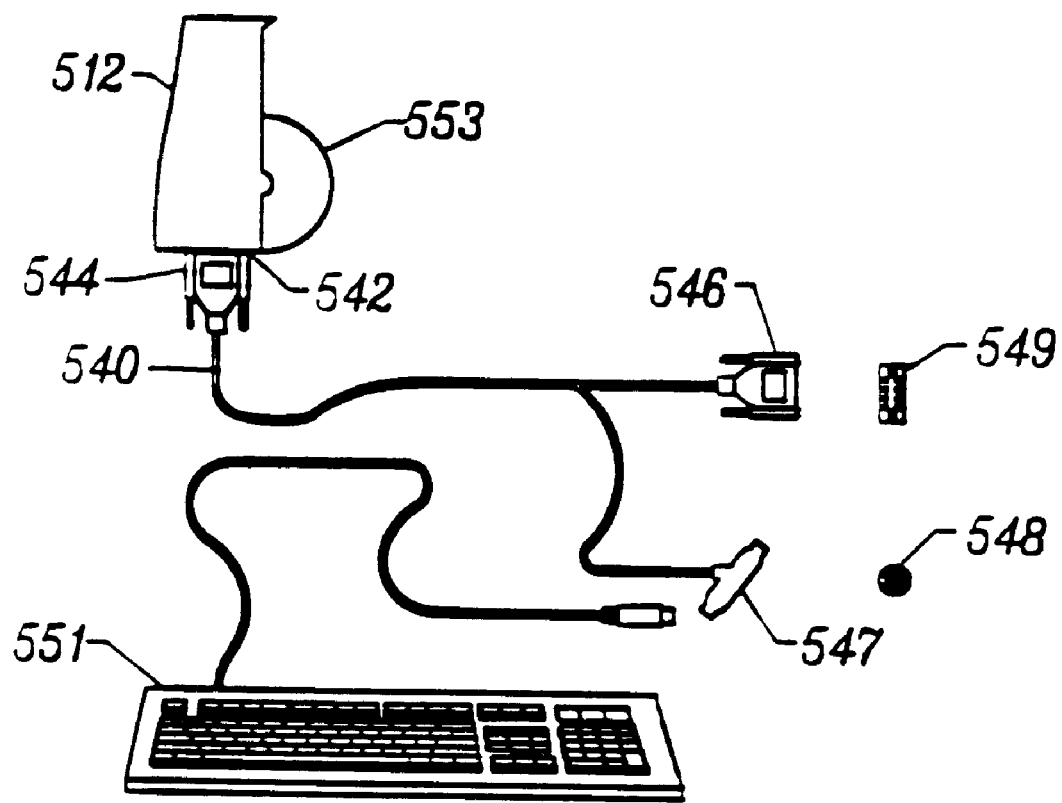
FIG. 25 illustrates how the detector assembly can be attached to a processor via a connection cable.

FIG. 25 illustrates how the detector assembly 512 can be attached to a processor via a connection cable 540, in this instance a processor of a personal computer. As illustrated, the detector assembly 512 includes a data port 542 to which a detector assembly connector 544 on the connection cable 540 can be attached. The connection cable 540 also includes a serial connector 546 for connecting the connection cable 540 to one of the serial ports 549 of the personal computer. As illustrated, the connection cable 540 includes a keyboard passthrough 547. As a result, it is possible to connect the keyboard passthrough 547 to the keyboard port 548 of the personal computer and connect the keyboard 551 to the keyboard passthrough 547. When the detector assembly 512 is connected to the personal computer, a light 553 on the detector assembly 512 goes on.

Figure 26A:
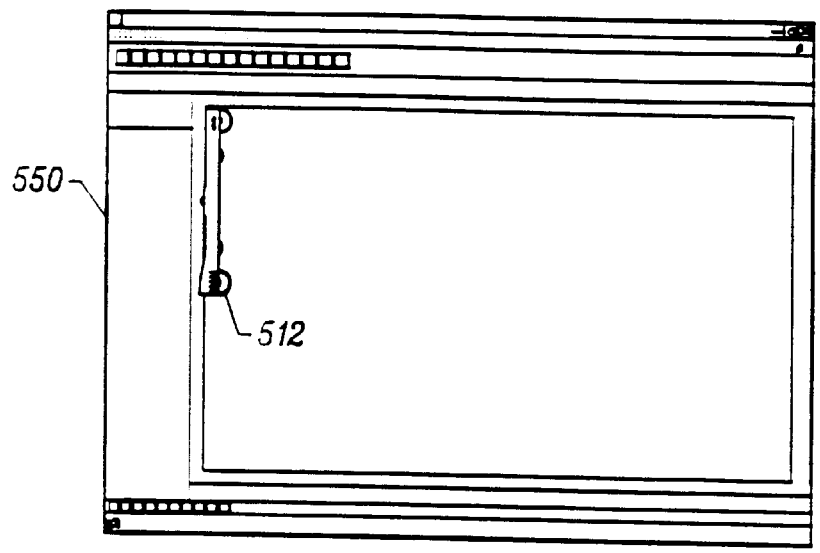
FIG. 26A illustrates a user interface for the transcription system.
Figure 26B:
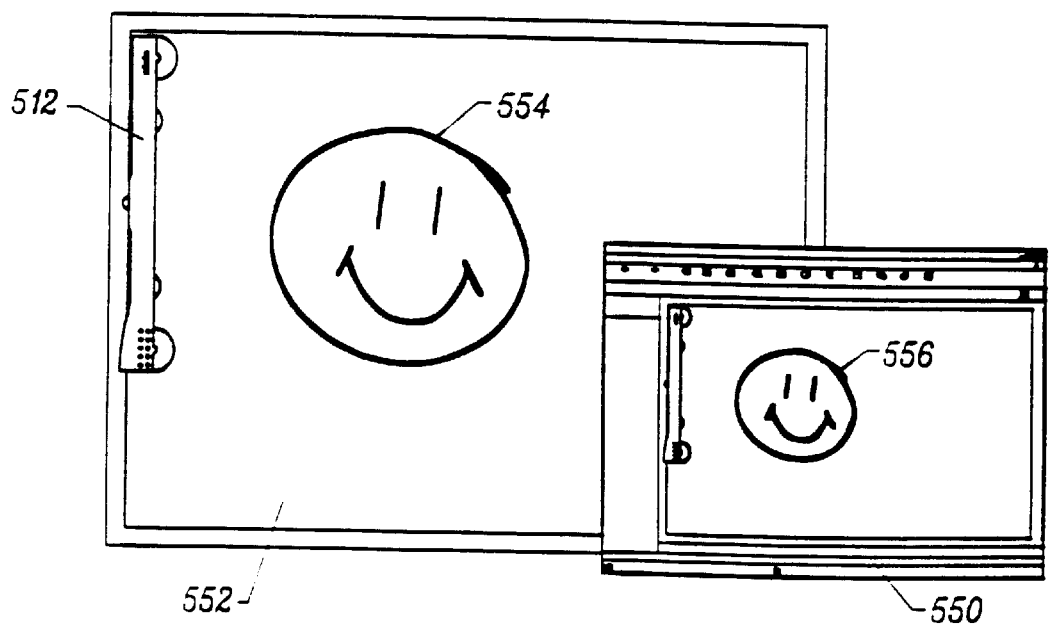
FIG. 26B illustrates a whiteboard with a detector assembly attached and a smiley face written using a transcription system stylus.

FIG. 26A illustrates a user interface 550 for the transcription system. As illustrated, the user interface 550 illustrates putting the detector assembly 512 in the upper left hand corner of the writing surface. FIG. 26B illustrates a whiteboard 552 with a detector assembly 512 attached and a smiley face 554 written using a transcription system stylus. FIG. 26B also illustrates the user interface 550 which shows an electronically transcribed image 556 of the smiley face 554.

Figure 27A:
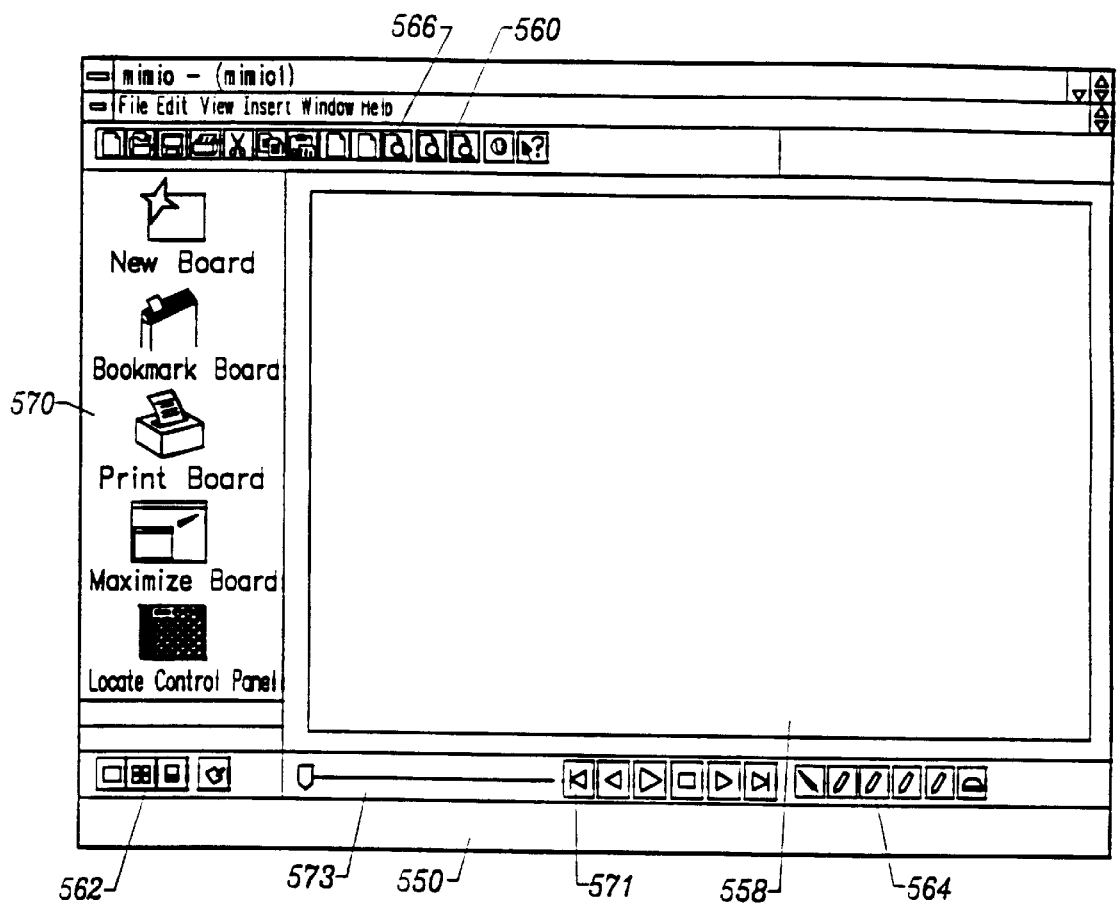
FIG. 27A illustrates the user interface in greater detail and some of the functions which the user interface 550 performs.

FIG. 27A illustrates the user interface 550 in greater detail and some of the functions which the user interface 550 performs. For example, the user interface 550 includes a board display area 558 where captured data is displayed. The user interface 550 also includes various toolbars. Three of the most common toolbars are illustrated: The main toolbar 560 includes various common Windows functions including open, delete, save and print. The display toolbar 562 allows the user to change the way the data is being viewed (zoom, multiple board view, etc.). The pen toolbar 564 allows the user to alter the user to input or edit data with virtual pens and erasers. As with most Windows applications, the menu bar 566 allows the user to access program features. Most of the functionality provided through the menu bar can be more readily accessed through the toolbars. The navigation toolbar 570 allows the user to alter various configuration options including board size and pen color. The playback toolbar 571 allows the user to take a recorded transcription session and to playback the transcription session. As illustrated, user can go to the beginning, move back, play, stop, move forward, or go to the end. The playback toolbar 571 also includes a sliding lever 573 which allows the user to move to any portion of the recorded transcription session by moving the sliding lever 573.

FIG. 27B illustrates the display toolbar 562 and its operation. As illustrated, the display toolbar 562 includes a button for a multiple board view, a single board view, and a full screen view. Also illustrated is a single board and multiple board display. The display toolbar 562 also includes a button for notes. Pressing the notes button brings up a notes window which may contain additional information about the image being displayed.

Figure 27C:
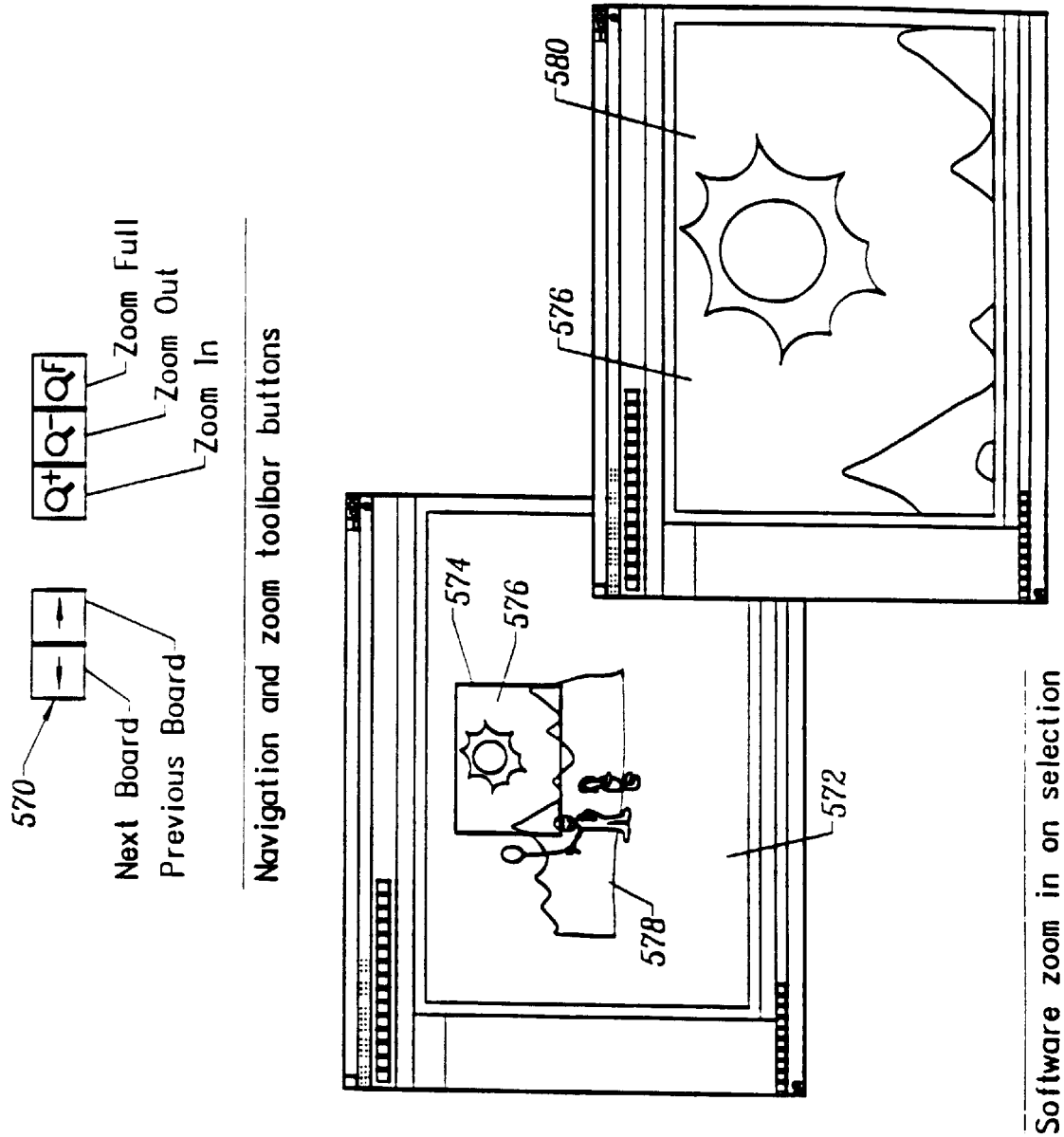
FIG. 27C illustrates the navigation toolbar and its operation.

FIG. 27C illustrates the navigation toolbar 570 and its operation. As illustrated, the navigation toolbar 570 includes buttons for next board, previous board, zoom full, zoom in, and zoom out. FIG. 27C also illustrates a screen 572 where a box 574 has been drawn around a portion 576 of an image 578 and a screen 580 where the portion 576 of the image 578 has been enlarged to fit the screen 576.

Figure 27D:
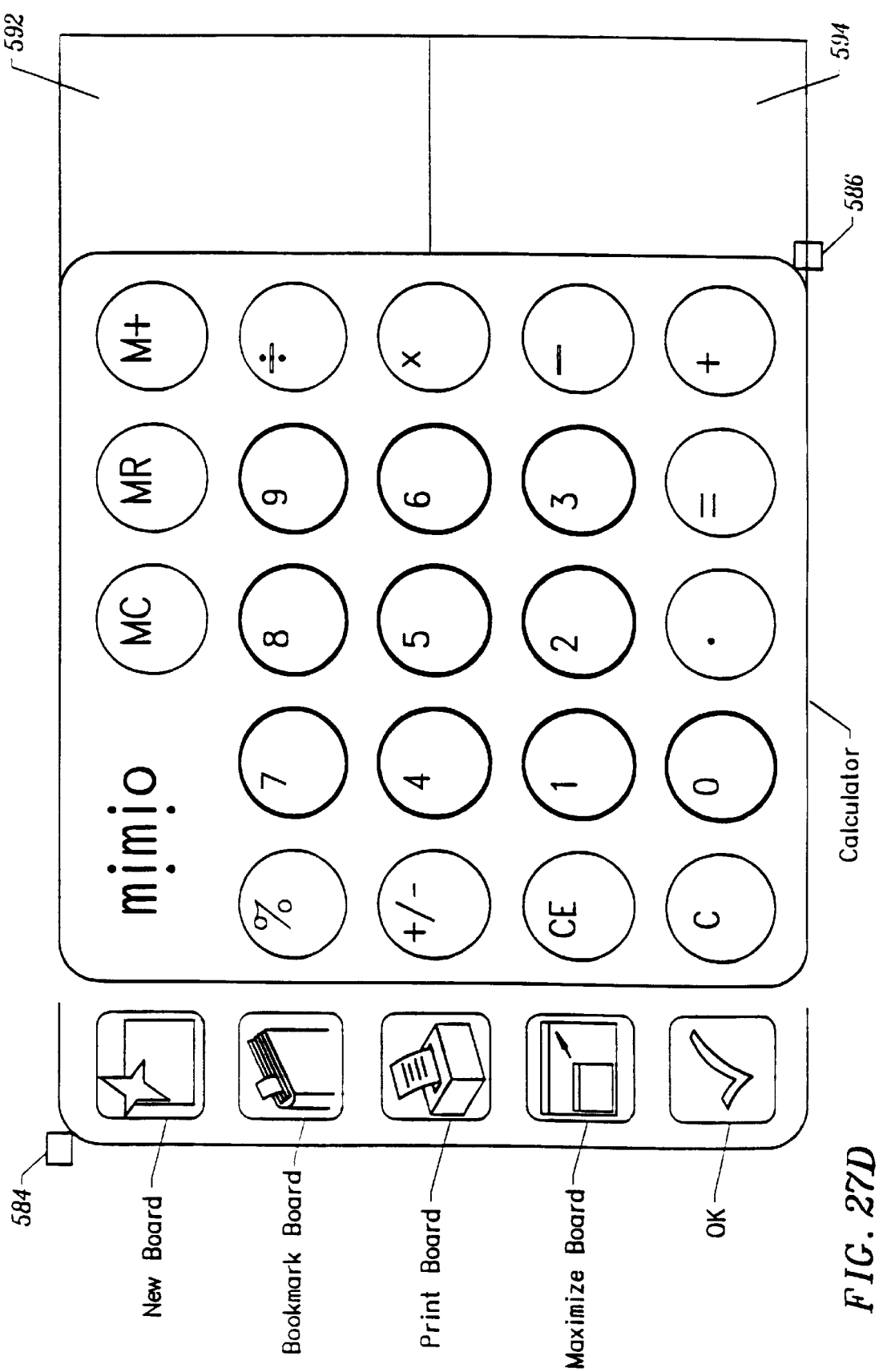
FIG. 27D illustrates the template in greater detail.

FIG. 27D illustrates the template 520 in greater detail. As illustrated, the template includes a series of user inputs, many of which also appear on the detector assembly 512. The new board input causes the transcription system software to save what has been inputted on the whiteboard and to open a new blank file for capturing transcription information. The bookmark board input causes the transcription system software to save what has been inputted on the whiteboard while retaining the currently displayed information. The print board input causes the transcription system software to print what is currently being electronically displayed by the transcription system. The maximize board input causes the transcription system software to maximize the transcription system application and make the transcription system application the active window. The template 520 also includes first and second calibration marks 584, 586 which the transcription system uses to determine the position of the template 520 relative to the detector assembly 512 a writing surface, as discussed in FIGS. 27E(1)–27E(4).

The template 520 also includes a calculator which allows the user to operate the transcription system and perform calculations at the writing surface using a stylus.

The template 520 also includes a mouse region 592 which serves as a virtual touch pad for the user. The user can move a stylus within the mouse region 592 and cause a cursor associated with the system to move. Thus, by moving the stylus within the mouse region 592, the stylus can serve as a mouse for the system.

The template 520 also includes a graffiti region 594 which can recognize handwritten signals, such as graffiti used with the PALM PILOT. The system includes logic for utilizing the movement of the stylus within the graffiti region 594 and translating that movement into handwritten signals.

FIGS. 27E(1)–27E(4) illustrate the template 520 and the detector assembly 512 on a writing surface 582 [FIG. 27E(1)] and a sequence of images [FIGS. 27E(2–4)] displayed on a user interface to allow the transcription to determine the position of the template 520 relative to the detector assembly 512 on the writing surface 582. In order to initiate this sequence, the user may press the locate template input on the detector assembly 512 [FIG. 54C].

As illustrated in FIG. 27E(2), the user is directed to contact a first calibration mark 584 on the template 520 with the stylus. Once the user contacts the first calibration mark 584 with the stylus, the user interface changes [FIG. 27E(3)] and directs the user to contact a second calibration mark 586 on the template 520. Once the user contacts the second calibration mark 586 with the stylus, the user interface changes [FIG. 27E(4)] and directs the user to contact the checkmark box 588 on the template 520. After performing this sequence, the transcription system knows the position of the template 520 relative to the detector assembly 512 and the user can employ the template 520.

Figure 28A:
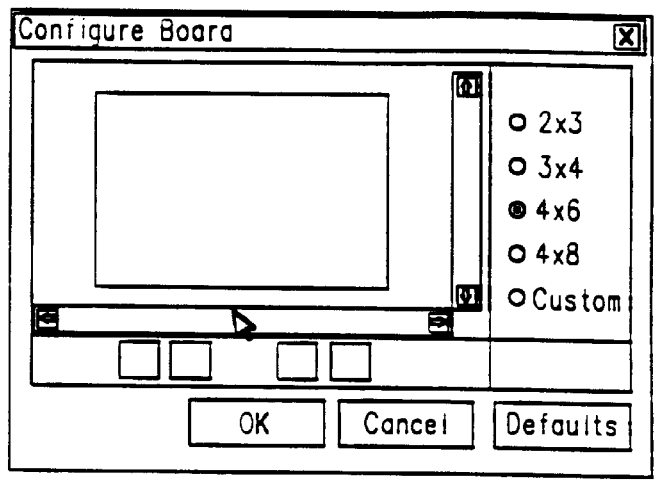
FIG. 28A illustrates a window which allows the user to configure the writing surface.
Figure 28B:
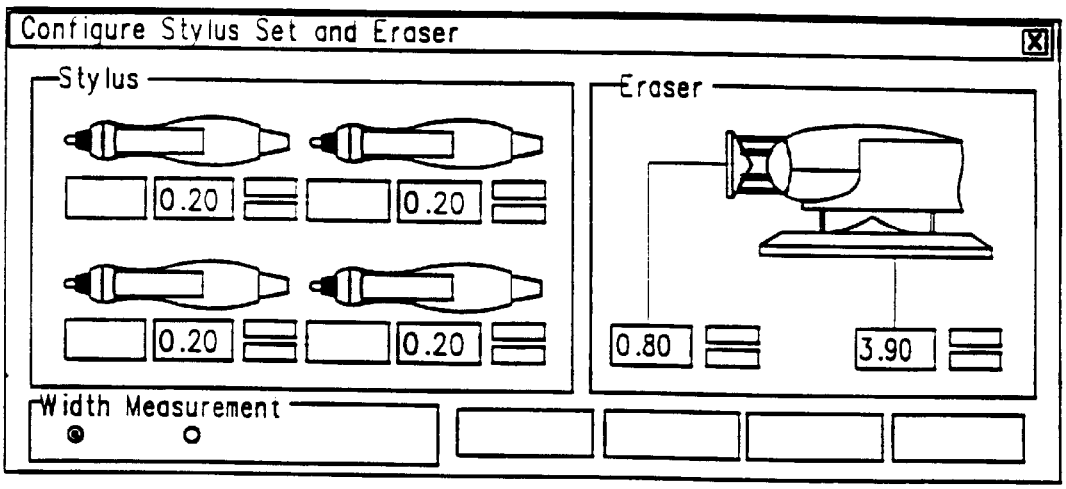
FIG. 28B illustrates a window which allows the user to configure the stylus.

FIGS. 28A and 28B illustrate two windows which may be accessed by the navigation toolbar 570. FIG. 28A illustrates a window which allows the user to configure the writing surface. FIG. 28B illustrates a window which allows the user to configure the stylus.

Once data has been introduced into the transcription system, the data can be exchanged with various application in many different ways. For example, a Windows clipboard can be used to export images from the transcription system into other applications. Alternatively, images can be identified, dragged and dropped into other applications. Alternatively, transcription system files can be saved in a variety of different formats and then opened by other applications.

The transcription system can be used locally or networked with other computers which include the transcription system operating system. For example, the transcription system operating system can support network conferencing through Microsoft's NETMEETING™ software.

While the present invention is disclosed by reference to the preferred embodiments and examples detailed above, it is to be understood that these examples are intended in an illustrative rather than limiting sense, as it is contemplated that modifications and combinations will readily occur to those skilled in the art, which modifications and combinations will be within the spirit of the invention and the scope of the appended claims.

What is claimed is:

1. An eraser for use in a transcription system which includes a plurality of signal receivers for positioning adjacent a writing surface and for receiving position signals transmitted from the eraser when the eraser is positioned adjacent the writing surface, the transcription system using times of flight of the position signals to determine a position of the eraser adjacent the writing surface, the eraser comprising:

an eraser body;

a first eraser pad attached to the eraser body for erasing writing on the writing surface;

a first position signal transmitter attached to the eraser body adjacent the first eraser pad for transmitting position signals when the first eraser pad contacts the writing surface;

a second eraser pad attached to the eraser body at a different location than the first eraser pad for erasing writing on the writing surface; and a second position signal transmitter attached to the eraser body adjacent the second eraser pad for transmitting position signals when the second eraser pad contacts the writing surface.

2. An eraser according to claim 1 wherein the second eraser pad has a different surface area where the second eraser pad contacts the writing surface than the first eraser pad.

3. An eraser according to claim 1 wherein the first and second position signal transmitters transmit ultrasound signals.

4. An eraser according to claim 1 wherein the first and second position signal transmitters transmit radar signals.

5. An eraser according to claim 1 wherein the first and second position signal transmitters transmit micro-impulse radar signals.

6. An eraser according to claim 1 wherein the eraser further includes a reference signal transmitter for transmitting a reference signal when the eraser is sensed to be in contact with the writing surface.

7. An eraser according to claim 6 wherein the reference signal transmitter transmits an infra-red signal.

8. An eraser according to claim 1 wherein the eraser further includes a first contact switch for sensing when the first eraser pad is contacted with a writing surface, the first position signal transmitter transmitting position signals when the first eraser pad is sensed by the first contact switch to be in contact with the writing surface; and a second contact switch for sensing when the second eraser pad is contacted with a writing surface, the second position signal transmitter transmitting position signals when the second eraser pad is sensed by the second contact switch to be in contact with the writing surface.

9. An eraser according to claim 8 wherein the eraser further includes a reference signal transmitter for transmitting a reference signal when the eraser is sensed to be in contact with the writing surface.

10. An eraser according to claim 8 wherein the reference signal transmitter transmits an infra-red signal.

\* \* \* \* \*

UNITED STATES PATENT AND TRADEMARK OFFICE
CERTIFICATE OF CORRECTION

PATENT NO. : 6,310,615 B1
DATED : October 30, 2001
INVENTOR(S) : Davis et al.

It is certified that error appears in the above-identified patent and that said Letters Patent is hereby corrected as shown below:

Title page,
Item [63], should read -- Continuation of application No. 09/589,534, filed on Jun. 7, 2000, now Pat. No. 6,232,962, and is a continuation of application No. 09/368,094 filed on Aug. 3, 1999, and a continuation-in-part of application No. 09/273,887, filed on Mar. 22, 1999, now Pat. No. 6,191,778, and a continuation-in-part of application No. 09/079,430, filed on May 14, 1998, now Pat. No. 6,104,387.
  Provisional application No. 60/109,361, filed on Nov. 20, 1998, and provisional application No. 60/090,744, filed on June 26, 1998. --

Signed and Sealed this

Third Day of December, 2002

JAMES E. ROGAN
*Director of the United States Patent and Trademark Office*